US012621398B2

(12) United States Patent
Kawata et al.

(10) Patent No.: US 12,621,398 B2
(45) Date of Patent: May 5, 2026

(54) INFORMATION PROCESSING DEVICE AND INFORMATION PROCESSING METHOD

(71) Applicant: SONY GROUP CORPORATION, Tokyo (JP)

(72) Inventors: Haruka Kawata, Tokyo (JP); Ayako Chiba, Tokyo (JP); Kanako Yana, Tokyo (JP); Chihiro Fukiage, Tokyo (JP); Shigeo Sugimori, Tokyo (JP); Shin Hasegawa, Tokyo (JP); Erina Ohsugi, Tokyo (JP); Kumiko Matsuno, Tokyo (JP)

( * ) Notice: Subject to any disclaimer, the term of this patent is extended or adjusted under 35 U.S.C. 154(b) by 268 days.

(21) Appl. No.: 18/549,251

(22) PCT Filed: Feb. 4, 2022

(86) PCT No.: PCT/JP2022/004458
§ 371 (c)(1),
(2) Date: Sep. 6, 2023

(87) PCT Pub. No.: WO2022/196167
PCT Pub. Date: Sep. 22, 2022

(65) Prior Publication Data
US 2024/0179259 A1      May 30, 2024

(30) Foreign Application Priority Data
Mar. 19, 2021     (JP) ................................. 2021-045746

(51) Int. Cl.
*H04N 1/21*          (2006.01)
*G06F 3/0483*        (2013.01)
*G06F 3/0484*        (2022.01)

(52) U.S. Cl.
CPC ......... *H04N 1/2183* (2013.01); *G06F 3/0483* (2013.01); *G06F 3/0484* (2013.01)

(58) Field of Classification Search
CPC .. H04N 1/2183; H04N 5/765; H04N 21/8153; H04N 23/661; G06F 3/0483;
(Continued)

(56) References Cited

U.S. PATENT DOCUMENTS

2008/0133526 A1* 6/2008 Haitani ................... G06F 16/58
2016/0360160 A1* 12/2016 Eizenberg ............ H04N 23/661
(Continued)

FOREIGN PATENT DOCUMENTS

EP       3051463 A1     8/2016
JP     2013055626 A     3/2013
(Continued)

OTHER PUBLICATIONS

International Search Report and Written Opinion of PCT Application No. PCT/JP2022/004458, issued on Apr. 26, 2022, 09 pages of ISRWO.

*Primary Examiner* — Twyler L Haskins
*Assistant Examiner* — John H Morehead, III
(74) *Attorney, Agent, or Firm* — CHIP LAW GROUP

(57) ABSTRACT

There is provided an information processing device that includes a distribution management unit, an event data management unit, and a filter processing unit. The event data management unit performs instruction processing pertaining to image distribution for image data captured at a specific event and transmitted to a server device. The event data management unit performs processing for managing, in association with the image data, evaluation information for an image that is distributed. The filter processing unit performs filtering processing on the image data using the evaluation information as a filter condition.

20 Claims, 66 Drawing Sheets

(58) Field of Classification Search
CPC .. G06F 3/0484; G06F 3/0482; G06F 3/04847;
G06F 3/04845; G06F 16/58; G06Q 10/10;
G06Q 50/01; G06Q 50/10
See application file for complete search history.

(56) References Cited

U.S. PATENT DOCUMENTS

| | | | |
|---|---|---|---|
| 2017/0185869 A1* | 6/2017 | Dua | G06F 16/58 |
| 2018/0165645 A1* | 6/2018 | Magpayo | H04L 51/10 |
| 2018/0356945 A1* | 12/2018 | Gannon | G06F 3/04883 |
| 2019/0138194 A1* | 5/2019 | Ryan | G06F 16/958 |
| 2019/0220482 A1* | 7/2019 | Crosby | G06F 16/55 |
| 2019/0233104 A1* | 8/2019 | Kanji | G06F 21/56 |

FOREIGN PATENT DOCUMENTS

| | | | |
|---|---|---|---|
| JP | 2016-053891 A | 4/2016 | |
| JP | 2016-081173 A | 5/2016 | |
| JP | 2019-200642 A | 11/2019 | |
| JP | 2019-220994 A | 12/2019 | |
| JP | 2020205062 A | 12/2020 | |
| JP | 2021-015336 A | 2/2021 | |
| KR | 20160127526 A | 11/2016 | |
| KR | 20160127536 A | 11/2016 | |
| WO | WO-2014073274 A1 | 5/2014 | |
| WO | WO-2015190567 A1 | 12/2015 | |
| WO | 2019/155695 A1 | 8/2019 | |

* cited by examiner

TRANSFERRED IMAGES

IMAGES UPLOADED TO LIVE GALLERY

400

TIME VIEW

PINCH OUT

PINCH IN

EVENT VIEW

TIME VIEW

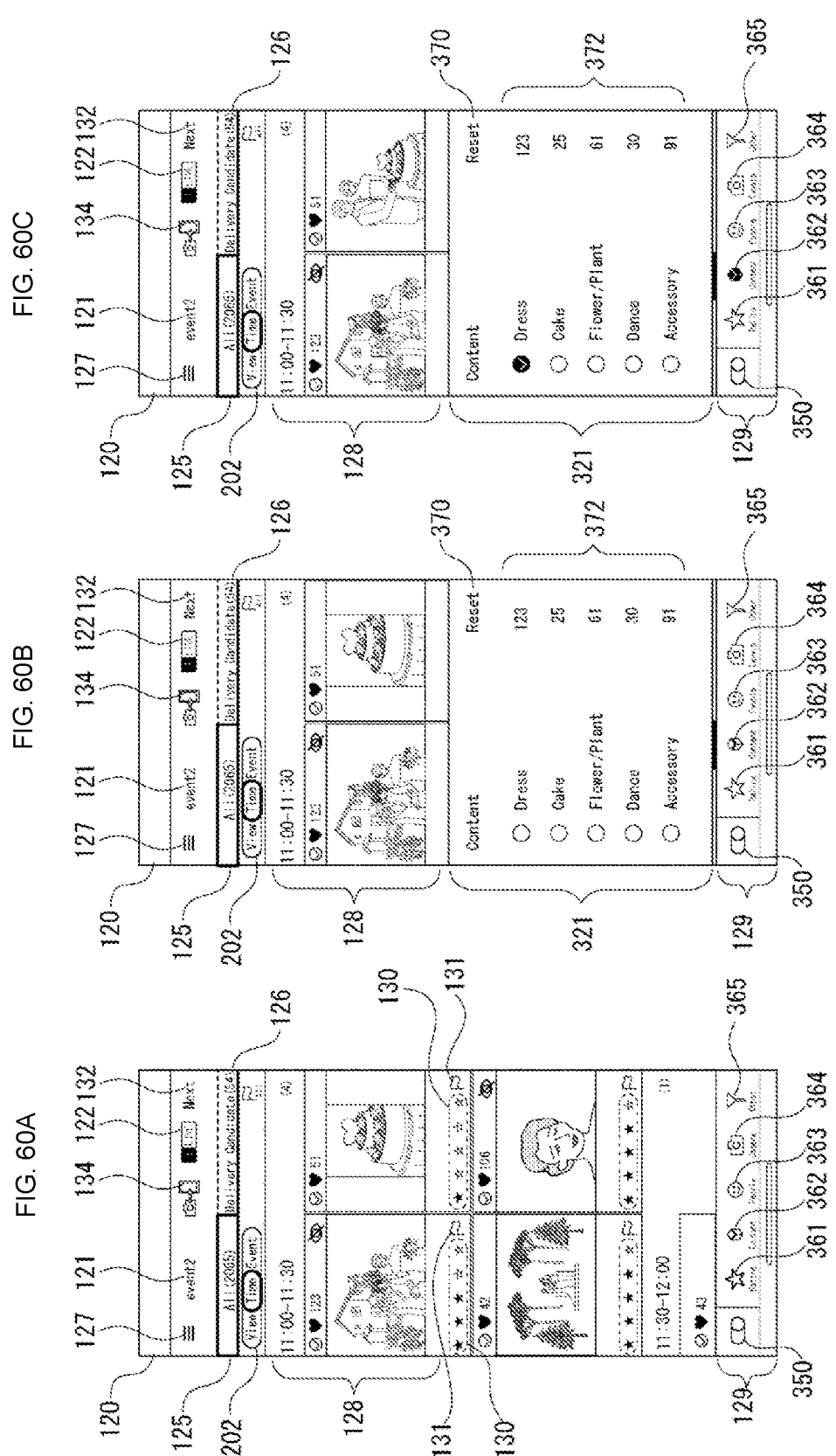

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/004458 filed on Feb. 4, 2022, which claims priority benefit of Japanese Patent Application No. JP 2021-045746 filed in the Japan Patent Office on Mar. 19, 2021. Each of the above-referenced applications is hereby incorporated herein by reference in its entirety.

TECHNICAL FIELD

The present technique relates to an information processing device, an information processing method, and a program, and particularly relates to an information processing technique used when distributing images of an event, creating image collections, and the like.

BACKGROUND ART

At events related to weddings, such as wedding ceremonies, wedding receptions, and afterparties, there are services where a photographer takes photos, creates a photo album as an image collection, and provides the photo album to attendees and the like.

In such a case, the photographer or the like imports images captured using an image capturing device into a personal computer, a smartphone, or the like after the event, edits the images using editing software or the like, and creates an image collection. It can be assumed that the image collection will be provided through a social networking service (SNS), a cloud service, email, a messaging application, and the like.

PTL 1 below discloses a technique for transferring and sharing an image taken with a camera to a smartphone or the like.

CITATION LIST

Patent Literature

[PTL 1]
JP 2016-81173A

SUMMARY

Technical Problem

In recent years, improvements in communication environments provide more opportunities for users who do not attend an event in person to attend the event remotely.

For example, a fixed camera can be set up in a wedding hall to enable people who cannot attend a wedding ceremony in person to attend remotely, such as by viewing a live broadcast of the wedding ceremony on a terminal device such as a personal computer, a smartphone, or the like.

However, only viewing images from a fixed camera, for example, is not enjoyable for remote attendees.

It is also conceivable to create an image collection of an event using images selected from a large number of images taken by a photographer so that the images can be viewed by the people concerned. In this case, it is difficult for the person who produces the image collection, such as the photographer, to determine and select which images, from a large number of images, to add to the image collection.

Accordingly, an object of the present disclosure is to provide a technique that enables remote users to enjoy live distribution more, and makes it possible to streamline the selection of images by a photographer or the like.

Solution to Problem

An information processing device according to the present technique includes: a distribution management unit that performs instruction processing pertaining to image distribution for image data captured at a specific event and transmitted to a server device; an event data management unit that performs processing for managing, in association with the image data, evaluation information for an image that is distributed; and a filter processing unit that performs filtering processing on the image data using the evaluation information as a filter condition.

The distribution management unit controls the distribution by making instructions pertaining to the distribution of the image data transmitted to the server device.

The event data management unit associates the evaluation information pertaining to the image distributed with the image data. The filter processing unit filters the image data captured at the event using the evaluation information.

BRIEF DESCRIPTION OF DRAWINGS

FIGS. 24A, 24B, and 24C are explanatory diagrams illustrating zooming in/zooming out on a time view in the embodiment.

FIGS. 60A, 60B, and 60C are explanatory diagrams illustrating a content condition panel in the embodiment.

DESCRIPTION OF EMBODIMENTS

Figure 1:
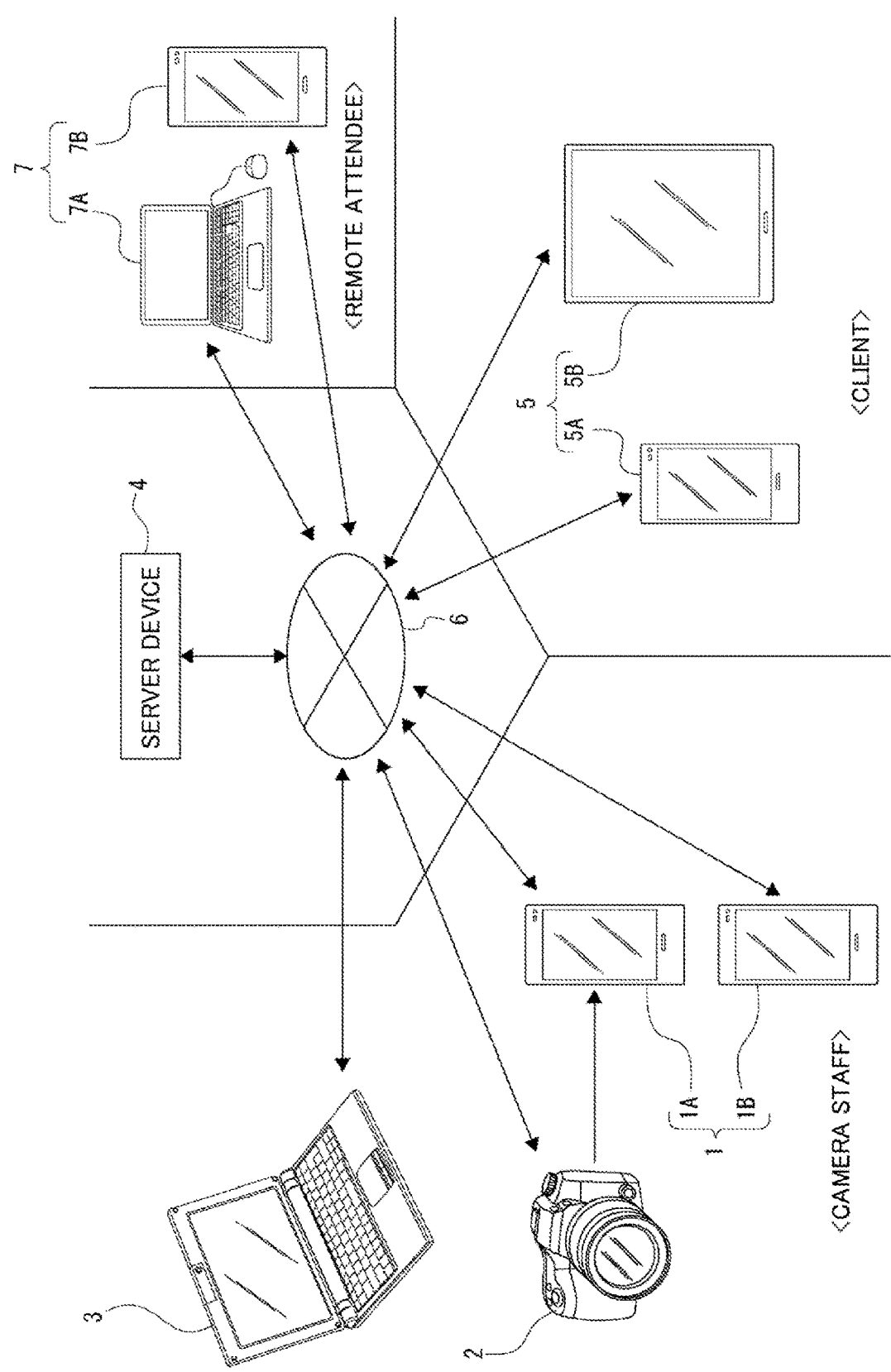
FIG. 1 is an explanatory diagram illustrating the configuration of a system for providing a service in an embodiment of the present technique.

An embodiment will be described hereinafter in the following order.

<1. System Configuration and Task Sequence for Image Collection Provision Service>

<2. Configuration of Information Processing Device>

<3. Advance Setting Processing>

<4. Transfer/Editing Processing after Start of Event>

<5. Selection & Live Gallery>

<6. Server Project Correspondence Processing>

<7. Web Gallery Delivery Processing>

<8. Final Delivery Processing>

<9. Live Gallery Distributed Images>

<10. Filtering>

<11. Conclusion and Variations>

1. System Configuration and Task Sequence for Image Collection Provision Service This embodiment will provide descriptions assuming a case where a photographer captures still images (takes photographs) at an event such as a wedding ceremony, for example, generates an image collection as content using the captured images, and provides the content to a client for a fee or free of charge.

Note that the content is not limited to still images, and moving images with audio, moving images without audio, and the like may be captured, and an image collection including such a moving image or an image collection containing a plurality of moving images may be generated.

In the descriptions, photographers, their assistants, and the like, will be referred to as "camera staff".

"Client" is a collective term referring not only to an ordering party in particular, but also to users who are provided with and can view an image collection. For example, a bride and groom, as well as related parties such as their relatives, friends, and the like, are collectively referred to as "clients".

Additionally, the present embodiment assumes that there are also attendees who do not attend the event, such as a wedding ceremony, in person, but rather view a live broadcast of the event from a remote location. Although such attendees at remote locations are also clients, they will be called "remote attendees" when there is a need to distinguish them in the descriptions.

"Image collection produced by a photographer or the like" refers broadly to content that is a collection of images (still images, moving images, and the like), such as a photo album, and the form in which the collection is provided is not limited; however, the present embodiment will assume that the image collection is implemented as a web gallery, and the image collection for final delivery can be provided.

The "web gallery image collection" referred to here is a digital image collection that enables photographs from an event, such as a wedding ceremony, to be viewed immediately on a website after the event ends.

Although a website is used in the descriptions, it should be noted that this is merely an example, and the image collection may be provided in the form in which a content file serving as the image collection can be transmitted to the terminal devices of clients using email, digital messages, SNS, and the like.

The image collection for final delivery is, for example, an image collection of an event officially created by the camera staff as a photo album and provided to the client at a later date. Image data captured at the event may be edited to create a digital image collection in the form of image album content, slideshow content, or the like, or an image collection may be created using a paper medium, for example. The digital image collection may be provided as a download, streamed, or the like, or may be stored in a portable storage medium such as a disk-form storage medium, a card-form storage medium, a tape-form storage medium, a flash memory medium, or the like.

Furthermore, in the embodiment, live gallery distribution is performed primarily assuming that remote attendees will view the gallery.

"Live gallery distribution" refers to distributing image data, captured by a photographer at an event such as a wedding ceremony or the like, over the web during the event, such that remote attendees too can view the images (still images, moving images, and the like) captured by the photographer almost in real time.

For example, although it is possible to place a fixed-point camera or the like in an event venue and distribute a live moving image of the event, simply watching a moving image from a fixed-point camera is not very interesting.

Accordingly, remote attendees are given the ability to sequentially view, for example, still images captured by the photographer as images in a live gallery using their terminal devices such as personal computers (PCs), smartphones, or the like. Remote attendees can therefore sequentially view images taken by the photographer at the venue in addition to moving images from a fixed-point camera, for example, which makes it possible to improve the sense of immersion.

To create an image collection as a web gallery to be published after an event, an image collection for final delivery, or the like, it is necessary for the camera staff to select, from the captured images, the images which are to be included in the image collection.

However, thousands of photographs are often taken at a single event, and thus selecting the images to be included in an image collection is an extremely troublesome task for the camera staff.

The present embodiment makes it possible to use the responses of viewers of the stated live gallery in selections for the image collection in the web gallery, the image collection for final delivery, and the like.

As a result, an image collection which the client can view immediately can be generated as the web gallery image collection, prior to the image collection for final delivery. The web gallery image collection is not simply a large number of captured images arranged in a simple manner, but rather is a collection of selected images of a quality which viewers can enjoy.

On the other hand, the image collection for final delivery is positioned as an item which can be created by the camera staff taking the time to edit the images in a more creative manner.

FIG. 1 illustrates terminal devices 1A and 1B, an image capturing device 2, a personal computer 3, a server device 4, terminal devices 5A and 5B, a network 6, and terminal devices 7A and 7B.

Note that the terminal devices 1A and 1B are terminal devices used by camera staff, and will be collectively referred to as "staff terminals 1" to distinguish them in the descriptions.

The terminal devices 5A and 5B are terminal devices used by users who are the "clients" described above and will therefore be collectively referred to as "client terminals 5" for descriptive purposes.

The terminal devices 7A and 7B are terminal devices used by remote attendees who are clients, and will therefore be collectively referred to as "remote attendee terminals 7" for descriptive purposes.

Mobile terminal devices such as smartphones, tablet devices, or the like are given as examples of the staff terminals 1 and the client terminals 5 here.

For example, the terminal device 1A is assumed to be a smartphone used by a photographer, and the terminal device 1B is assumed to be a smartphone used by an assistant.

The terminal device 5A is assumed to be a smartphone used by a bride, and the terminal device 5B is assumed to be a tablet device used by a friend at the venue. Devices such as PCs, smartphones, and the like are illustrated as the remote attendee terminals 7. These are terminal devices which can be used by the remote attendees at home or when they are out.

The staff terminals 1, the client terminals 5, and the remote attendee terminals 7 may be any kind of what are known as information processing devices, and various types thereof are conceivable, such as, for example, personal computer devices, mobile telephone devices, game consoles, audio devices, video devices, communication devices, television devices, and the like. In other words, any information processing devices that can perform information processing computations, such as devices including microcomputers, can be used as the staff terminals 1, the client terminals 5, and the remote attendee terminals 7 of the present disclosure.

However, the staff terminals 1 and the client terminals 5 are assumed to be used at event venues or the like, and it is therefore preferable that those terminals be portable terminals such as smartphones, tablet devices, or the like.

Various types of image capturing devices, such as video cameras or still cameras, are conceivable as the image capturing device 2. The image capturing device 2 illustrated in the drawings is assumed to be a camera used by a photographer at a wedding ceremony venue.

The image capturing device 2 and the staff terminal 1 (e.g., the terminal device 1A) are assumed to be capable of data communication. The data communication is performed through File Transfer Protocol (FTP), for example.

Specifically, it is conceivable that the terminal device 1A serves as an FTP server, and image files captured by the image capturing device 2 (including image data and metadata) are uploaded sequentially or at once through FTP communication.

It is therefore assumed that FTP settings for transferring data to the terminal device 1A have been made in the image capturing device 2.

The content of the FTP setting information may be a host name of the FTP server, a storage destination path, a username, a password, a connection type, and the like.

However, the image capturing device 2 and the terminal device 1A are not necessarily limited to FTP, and may use another protocol instead.

It is sufficient for the image capturing device 2 and the terminal device 1A to be capable of transferring images, metadata, and the like using some kind of communication method. For example, short-range wireless communication such as Bluetooth (registered trademark), Wi-Fi (Wireless Fidelity (registered trademark)), NFC (Near Field Communication (registered trademark)), or the like, infrared communication, or the like may be used to enable information communication between the devices.

Furthermore, the image capturing device 2 and the terminal device 1A may be capable of communicating with each other through wired connection communication such as wired LAN or the like.

An information processing device used by camera staff to create image collection content for final delivery is illustrated as an example of the personal computer 3. This personal computer 3 is used in tasks for obtaining data pertaining to images of an event from the server device 4 and creating the image collection content for final delivery using an image editing application or the like.

The server device 4 provides and manages various types of information for the camera staff to create a web gallery, the image collection for final delivery, and the like.

For example, an application program for an image collection provision service is installed in the staff terminal 1, and the processing described later is performed in accordance with that application program. In response, the server device 4 manages data pertaining to the event, generates a web gallery, and the like.

Furthermore, the server device 4 performs live gallery distribution in response to an instruction from the staff terminal 1.

The staff terminal 1 and the server device 4 are assumed to be constantly connected while the stated application program is running, for example, such that event data is synchronized. An example of the event data will be described later, but the event data includes image data captured at the event, data used to generate a web gallery, data pertaining to a live gallery, and the like.

"Synchronization" in the present disclosure refers to ensuring that at least some of the event data stored in the staff terminal 1 has the same content as the event data stored in the server device 4. The particular data to be synchronized includes image data, rating information, selection information, editing information, evaluation information, archive information, analysis information, distribution information, and the like. The content of each will be described later.

The network 6 is assumed to be the Internet, a home network, a Local Area Network (LAN), a satellite communication network, or another type of network, for example.

The staff terminal 1 can upload image data and the like to the server device 4, transmit information for synchronization, and the like over the network 6.

The client terminals 5 and the remote attendee terminals 7 can access a webpage provided by the server device 4 over the network 6 and view a web gallery after the event.

The client terminals 5 and the remote attendee terminals 7 can access a webpage provided by the server device 4 over the network 6 and view a live gallery during the event.

The personal computer 3 can obtain image files for creating the image collection content for final delivery from the server device 4 over the network 6.

Note that the image capturing device 2 includes a display panel provided in a rear surface of the device, a display device such as a viewfinder, or the like, for example, in various operational inputs can be made using the functions of various types of operators, a touch panel, or the like. In other words, the device is fully functional as a user interface. The image capturing device 2 is also provided with a microcomputer, and is capable of various types of information processing, communication, and the like.

As such, the image capturing device 2 is assumed to function as an information processing device as described in the present disclosure, communicating with the server device 4 without going through the terminal devices 1A and 1B, executing processing performed by the terminal devices 1A and 1B described later, and the like.

Although the embodiment will primarily describe processing performed by the staff terminal 1 and the server device 4, an example is also conceivable in which some or all of the processing by the staff terminal 1 described hereinafter is performed by the image capturing device 2.

Figure 2:
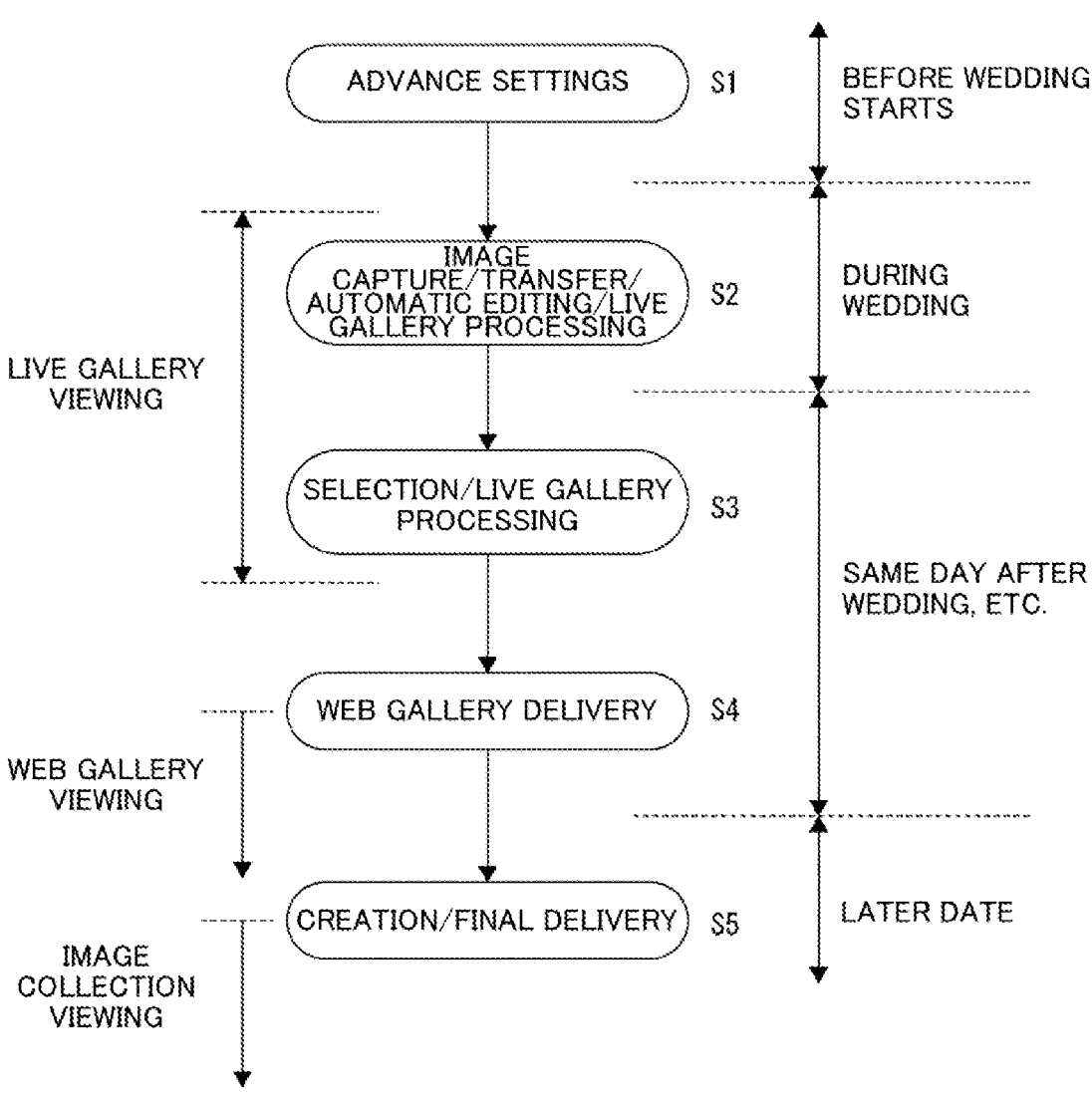
FIG. 2 is an explanatory diagram illustrating a task sequence for providing a service in the embodiment.

A sequence by which a system such as that illustrated in FIG. 1 provides a live gallery and an image collection is illustrated schematically in FIG. 2. This is a task sequence performed in the staff terminal 1 based on operations made by the camera staff serving as a service provider.

Advance settings are performed as step S1. For example, the camera staff makes communication settings between the staff terminal 1 and the image capturing device 2, event settings, image retouch settings, live gallery settings, and the like. These advance settings are made before the start of the event, which is a wedding ceremony or the like.

Image capture/transfer/automatic editing/live gallery processing during the event is performed as step S2.

Image files captured by the photographer using the image capturing device 2 during the event are sequentially transferred to the staff terminal 1 (e.g., the terminal device 1A).

The staff terminal 1 imports the image files, transfers the image files and the like to the server device 4, performs automatic editing of images according to the advance settings, and the like.

Furthermore, in response to operations made by the camera staff, the staff terminal 1 performs processing for making various types of instructions pertaining to live gallery distribution to the server device 4. In response to the instruction processing, the server device 4 distributes some or all of the transferred images as live gallery images. This enables remote attendees to view the images captured by the photographer during the event.

Tasks which can be performed on the day of the wedding ceremony, after the ceremony has ended, are indicated as step S3.

The camera staff performs selection operations using the staff terminal 1. "Selection" includes selecting images to be posted in the web gallery, selecting a cover image and highlight images, and even editing images and the like. The staff terminal 1 performs event data update processing and the like in response to operations made by the camera staff. Processing for synchronizing the event data with the server device 4 side is also performed sequentially.

Note that the selection in step S3 may be performed while the wedding ceremony or the like is underway.

Additionally, the live gallery may be made viewable only during the event, but may also be made viewable for a certain amount of time even after the event has ended. Processing for ending the live gallery, resuming uploads to the server device 4, and the like may also be performed.

Processing for web gallery delivery is performed in step S4. The web gallery is created based on the event data in the server device 4. The camera staff confirms the content of the web gallery in the staff terminal 1 and performs operations to make the gallery viewable to clients. This makes it possible for clients to view the web gallery, which is an image collection of the event, on the day of the event after the event has ended, for example.

Processing for creating the image collection for final delivery and making the final delivery is illustrated as step S5.

At a later date, the camera staff creates the image collection content for final delivery using the personal computer 3, for example, and provides that content to a client.

This enables the client to receive the image collection content as a final delivery.

Live gallery distribution will be described here.

Images captured by the image capturing device 2 of the photographer are transferred to the staff terminal 1 sequentially during the event, and are further transferred to the server device 4.

Figure 3:
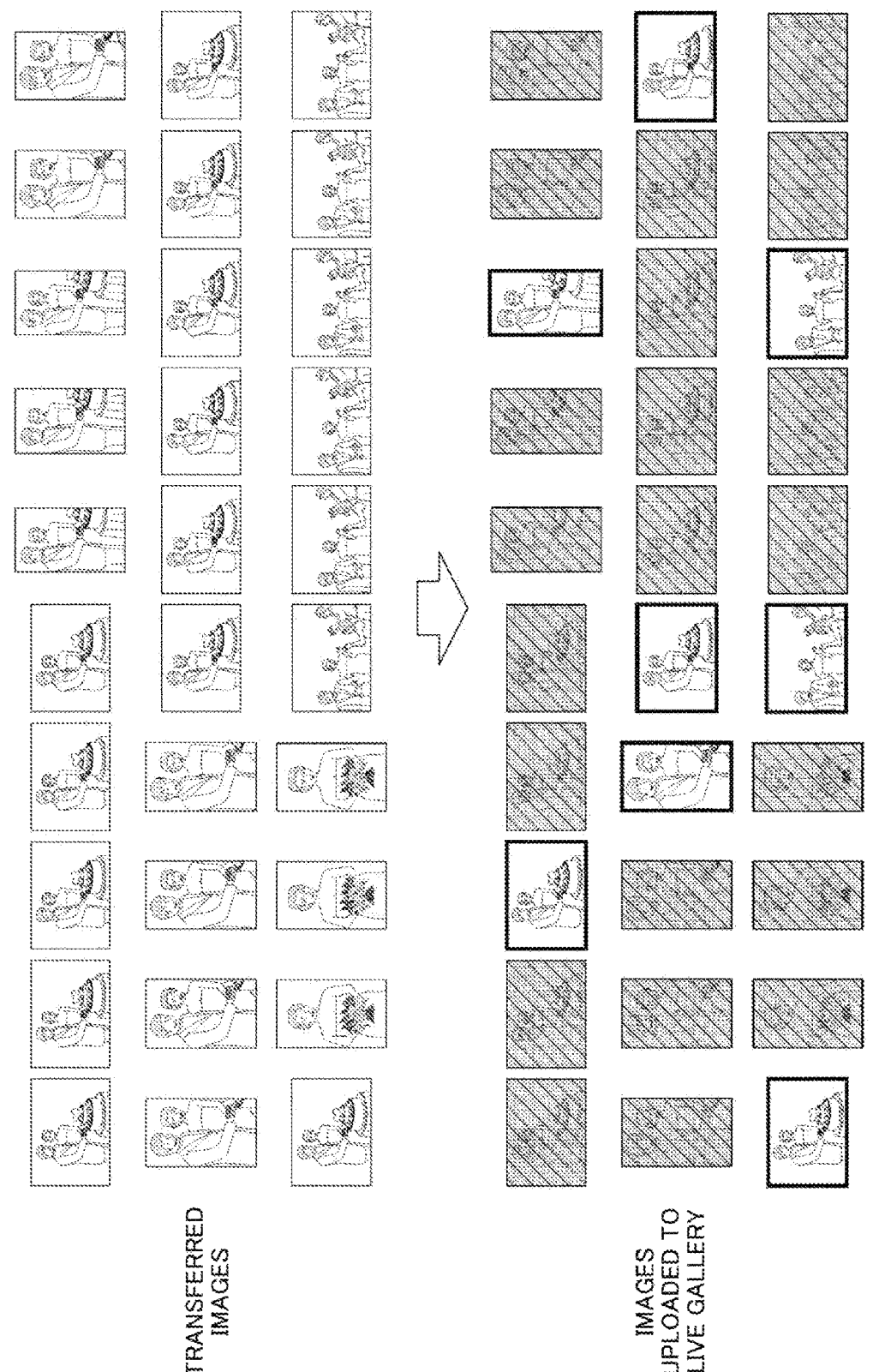
FIG. 3 is an explanatory diagram illustrating live gallery distribution in the embodiment.

As such, basically all the images taken by the photographer are transferred to the server device 4. These are illustrated in FIG. 3 as "transferred images".

While the images are being transferred in this manner, the camera staff can issue start instructions, stop instructions, and the like pertaining to the live gallery to the server device 4 using the staff terminal 1. In this case, "start instruction" refers to an instruction for determining an image for which distribution is to be started based on an image capture time in the image capturing device 2, a reception time in the staff terminal 1, and the like.

"Stop instruction" refers to an instruction for determining an image which is not to be distributed based on the image capture time in the image capturing device 2, the reception time in the staff terminal 1, and the like. For example, of all the transferred images, the server device 4 does not consider image data captured by the image capturing device 2 after a stop instruction is made as candidates for uploading to the live gallery.

In other words, the server device 4 assumes that images captured between the start instruction and the stop instruction are images pertaining to live gallery distribution processing, for example.

Here, all the images from between the start instruction and the stop instruction may be distributed through a live gallery, but it is preferable to select some of those images for live gallery distribution.

For example, when the transferred images in FIG. 3 are images from between the start instruction and the stop instruction, those images are taken as distribution candidates, and the images actually to be distributed are selected through automatic processing performed by the server device 4. Only the selected images are uploaded to the live gallery.

FIG. 3 illustrates a state in which some of the transferred images are selected as images to be uploaded to the live gallery. Images with diagonal hatching are images not selected to be uploaded.

The server device 4 selects images suitable for distribution through, for example, image analysis processing, artificial intelligence (A) processing using training data, or the like, and only some of the transferred images are used for live gallery distribution.

For example, the server device 4 selects only one of images of a subject having similar image capture times, and selects suitable images by determining the composition, the focus state, the things, people, and the like present as subjects, and the like. Furthermore, by determining whether an image is a failed image such as a dark image, an image in which the main subject is out of focus, or the like, the server device 4 can remove images not suitable for live gallery distribution from selection candidates and select the images to actually be distributed from among the images suitable for live gallery distribution.

Doing so prevents the number of images for live gallery distribution from becoming unreasonably large, which makes it possible to provide a high-quality live gallery.

2. Configuration of Information Processing Device

Figure 4:
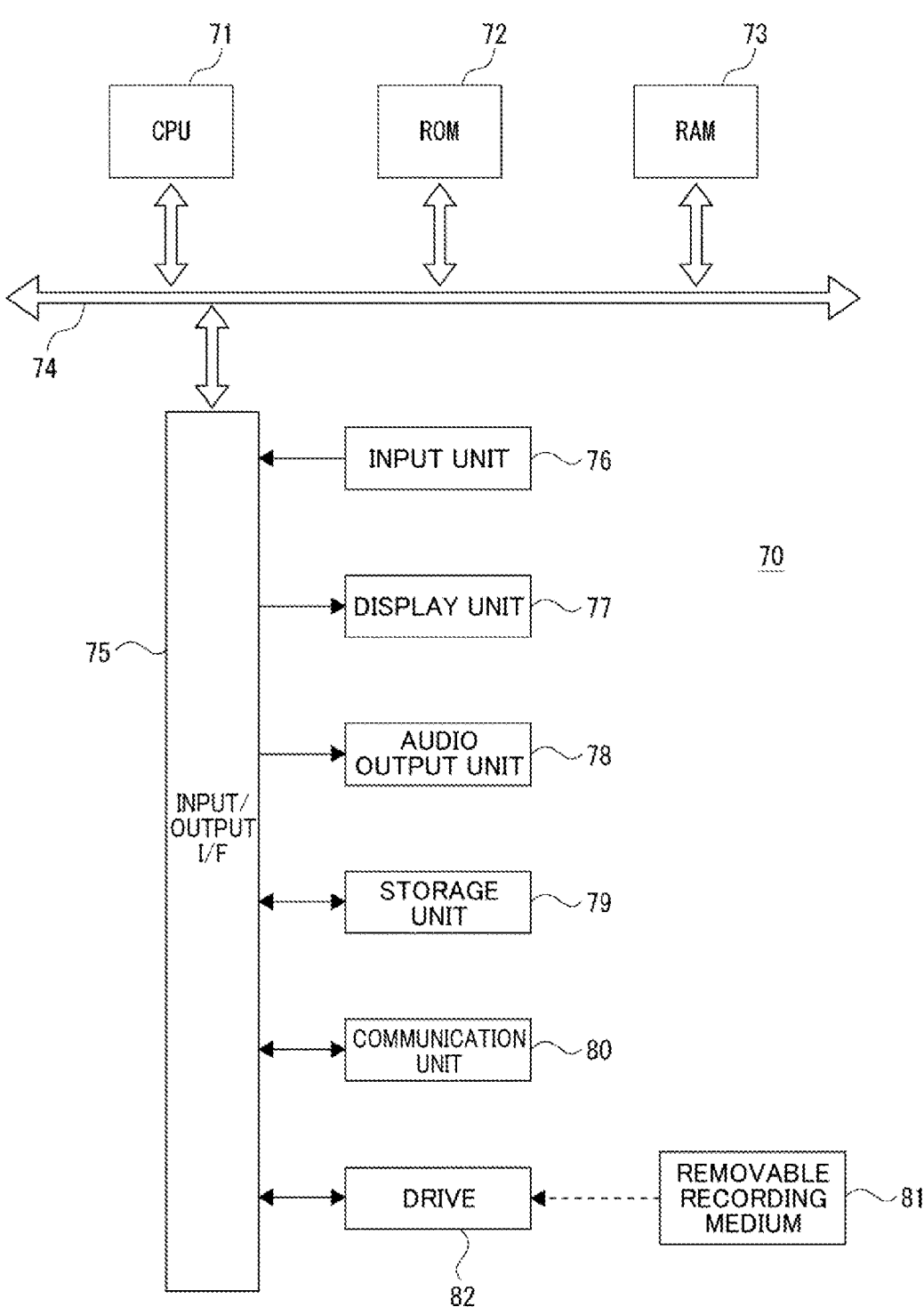
FIG. 4 is a block diagram illustrating the configuration of a terminal device and a server device in the embodiment.

FIG. 4 illustrates an example of the configuration of an information processing device 70 that can be configured as the staff terminals 1, the client terminals 5, the remote attendee terminals 7, the server device 4, or the personal computer 3. The staff terminals 1, the personal computer 3, or the server device 4 can execute the processing described later by having the configuration of the information processing device 70 described below. The image capturing device 2 can also execute processing similar to that executed by the staff terminals 1, which will be described later, by having the configuration of the information processing device 70 described below.

A Central Processing Unit (CPU) 71 of the information processing device 70 executes various types of processing in accordance with a program stored in a Read Only Memory (ROM) 72 or a program loaded from a storage unit 79 into a Random Access Memory (RAM) 73. The RAM 73 also stores, as appropriate, data required for the CPU 71 to execute the various types of processing.

A Graphics Processing Unit (GPU), a General-Purpose Computing on Graphics Processing Unit (GPGPU), an artificial intelligence (AI) processor, and the like may be provided instead of the CPU 71 or in conjunction with the CPU 71.

The CPU 71, the ROM 72, and the RAM 73 are connected to each other by a bus 74. An input/output interface 75 is also connected to the bus 74.

An input unit 76 constituted by operators or an operation device is connected to the input/output interface 75.

For example, various types of operators or operation devices, such as a keyboard, a mouse, keys, a dial, a touch panel, a touch pad, and a remote controller, are conceivable as the input unit 76.

A user operation is detected by the input unit 76, and a signal corresponding to the input operation is interpreted by the CPU 71.

A display unit 77 constituted by a liquid crystal panel (Liquid Crystal Display; LCD), an organic electro-luminescence (EL) display, or the like, an audio output unit 78 constituted by a speaker, or the like, are integrated with or connected as separate entities to the input/output interface 75.

The display unit 77 is a display unit that performs various displays, and is configured of, for example, a display device provided in the housing of the information processing device 70, or, for example, a separate display device connected to the information processing device 70.

The display unit 77 executes the display of images for various types of image processing, images to be processed, and the like in the display screen based on instructions of the CPU 71. The display unit 77 displays various operation menus, icons, and messages, i.e., a Graphical User Interface (GUI), in response to instructions from the CPU 71.

The storage unit 79, which is constituted by a hard disk, a solid-state memory, or the like, a communication unit 80 that communicates through various types of communication methods, and the like may be connected to the input/output interface 75.

The storage unit 79 is used for storing image data, management data, and the like. Various programs are also stored in the storage unit 79.

The communication unit 80 performs communication processing over a transmission path such as the Internet, communication such as wired/wireless communication or bus communication with various types of devices, and the like.

When this information processing device 70 is assumed to be the staff terminal 1, the communication unit 80 has a function for FTP communication with the image capturing device 2, a function for communicating with the server device 4 over the network 6, and so on. Alternatively, the communication unit 80 may have a function for communicating using short-range wireless communication, infrared communication, wired connection communication, or the like, such as the aforementioned Bluetooth, Wi-Fi, NFC, and the like. The communication unit 80 may also have a function for communicating over a communication line for mobile phones, such as Long Term Evolution (LTE).

When the information processing device 70 is assumed to be the server device 4, the personal computer 3, the client terminal 5, the remote attendee terminals 7, or the like, the communication unit 80 has at least a function for communicating over the network 6.

A drive 82 is also connected to the input/output interface 75 as necessary, and a removable recording medium 81 such as a magnetic disk, an optical disc, a magneto-optical disc, or a semiconductor memory is mounted as appropriate.

The drive 82 can be used to read data files such as image files, various computer programs, or the like from the removable recording medium 81. The read data files are stored in the storage unit 79, images or sounds included in the data file are output to the display unit 77 or the audio output unit 78, and the like. The computer programs or the like read from the removable recording medium 81 are installed in the storage unit 79 as necessary.

In the information processing device 70, for example, software for the processing of the present disclosure can be installed through network communication using the communication unit 80 or through the removable recording medium 81. Alternatively, the software may be stored in advance in the ROM 72, the storage unit 79, or the like.

Figure 5:
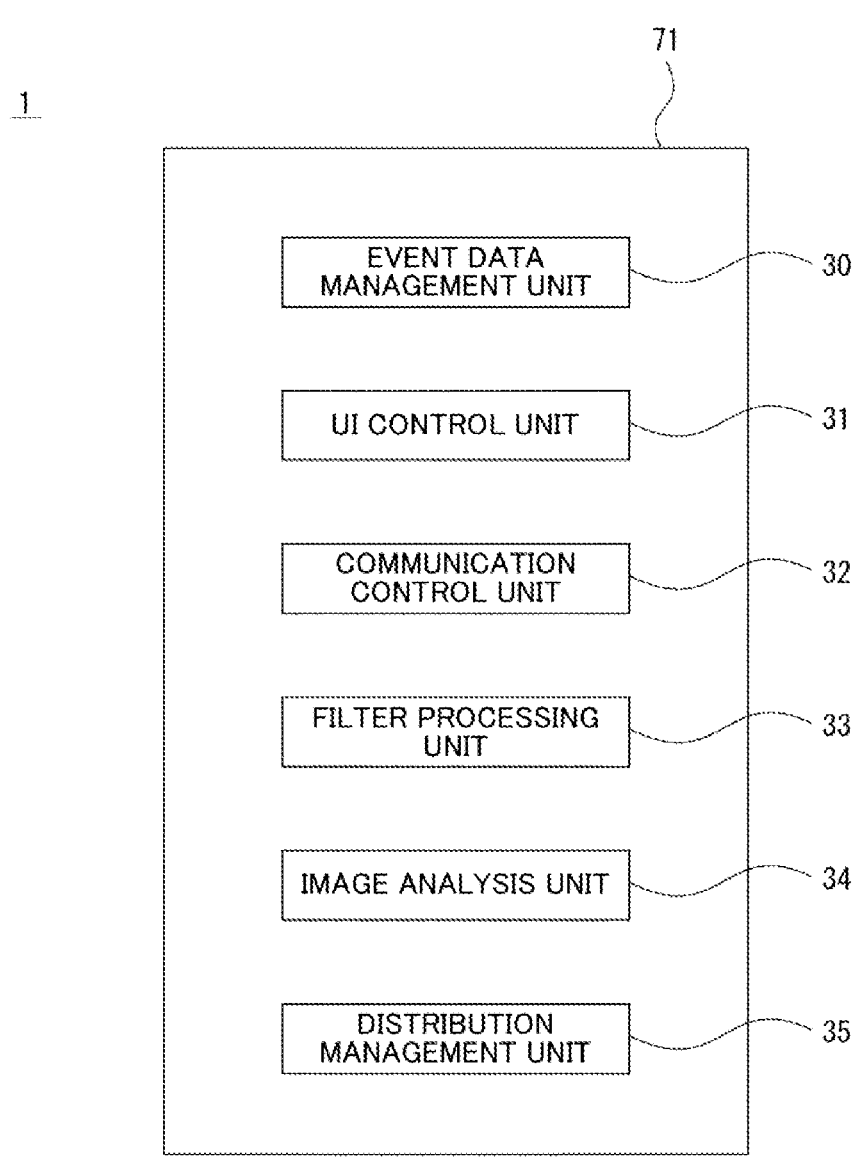
FIG. 5 is an explanatory diagram illustrating the functional configuration of a staff terminal in the embodiment.

When the information processing device 70 is assumed as the staff terminal 1, a functional configuration such as that illustrated in FIG. 5 is constructed in the CPU 71 by application programs in the information processing device 70.

FIG. 5 illustrates an event data management unit 30, a User Interface (UI) control unit 31, a communication control unit 32, a filter processing unit 33, an image analysis unit 34, and a distribution management unit 35 as functions provided in the information processing device 70 used as the staff terminal 1.

The event data management unit 30 is a processing function for storing image data received through communication with the image capturing device 2 and additional information, including rating information, that corresponds to the image data, and the like as event data pertaining to a specific event. The event data management unit 30 also performs event data update processing in response to operational inputs made by the camera staff.

The event data management unit 30 also receives evaluation information for the images distributed as a live gallery from the server device 4, and manages the evaluation information in association with the image data.

Furthermore, with respect to the image data distributed as a live gallery, the event data management unit 30 also receives, from the server device 4, distribution information indicating that the images are images which are distributed to the live gallery, and manages the distribution information in association with the image data.

Figure 6:
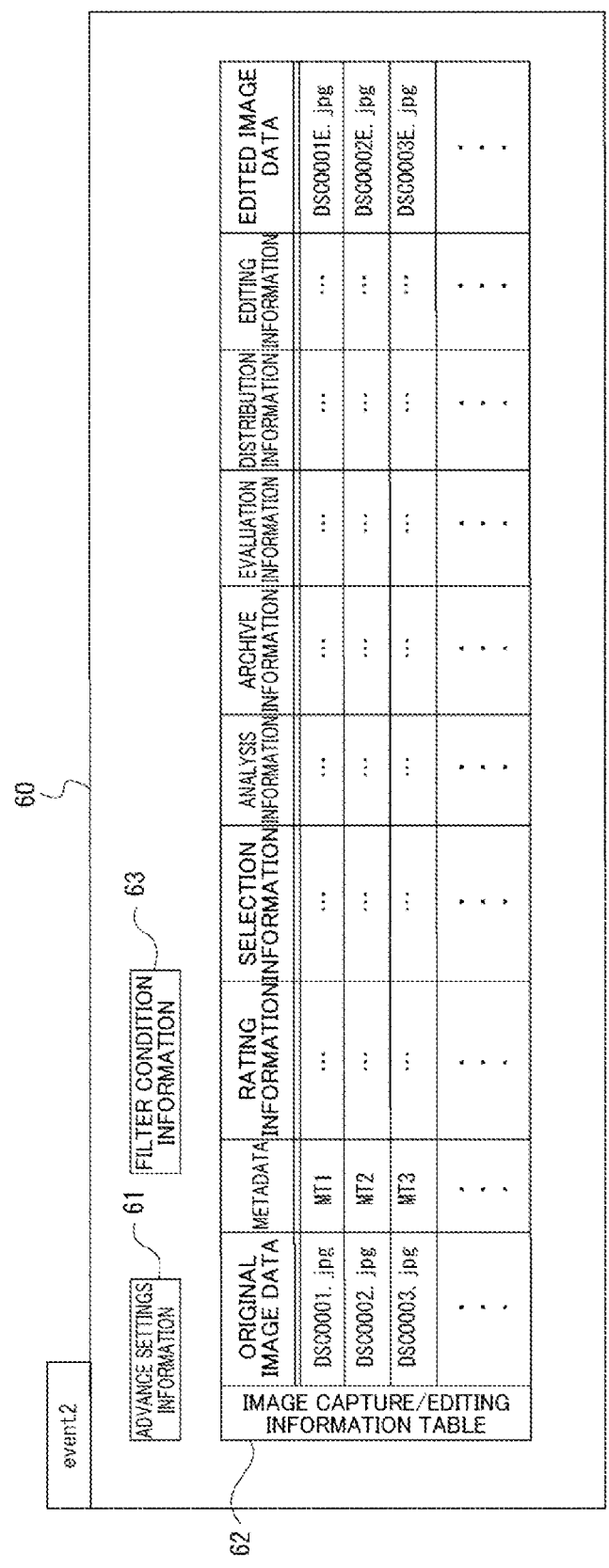
FIG. 6 is an explanatory diagram illustrating staff terminal-side event data in the embodiment.

FIG. 6 schematically illustrates an example of the content of the event data.

The event data is a data set including images and various types of content for a single event registered as a project by the camera staff operating the staff terminal 1. FIG. 6 illustrates event data 60 for an event having a project name of "event2". In this example, the event data 60 includes advance settings information 61, an image capture/editing information table 62, and filter condition information 63.

The advance settings information 61 is information set by the camera staff through the advance settings made in step S1 of FIG. 2. This includes editing information such as, for example, retouching parameters and the like.

The image capture/editing information table 62 is a table in which sequential information is added and updated in the processing in steps S2 and S3 of FIG. 2. This image capture/editing information table 62 denotes various types of information corresponding to image files transferred from the image capturing device 2.

Each image file transferred from the image capturing device 2 includes image data and metadata (MT1, MT2, and so on). This image data is managed as original image data, and the added metadata is also managed.

Image data includes, for example, RAW data, data compressed in JPEG format, or the like, and although any data format may be used, data compressed in JPEG format, such as "DSC0001.jpg", will be described here as an example.

The metadata (MT1, MT2, and so on) includes the image capture time of the image data, camera information such as the model, the manufacturer, and the serial number of the image capturing device 2, the data format, the data size, angle of view information, focus point information, and other types of information added by the image capturing device 2.

Rating information corresponding to the image data is stored in the image capture/editing information table 62. The rating information is information indicating an evaluation value given to the image by the photographer, and is, for example, six levels of evaluation information expressed as a number of stars, such as "no star", "one star", "two stars", "three stars", "four stars", and "five stars". For example, a higher number of stars indicates a higher rating. Of course, such evaluation information is merely an example. Such rating information serves as a reference for the camera staff to select images, and therefore, for example, an image rated highly as indicated by the rating information is likely to be used when setting selection flags (setting images to be used in the image collection), which will be described later. In other words, such images can be said to be images likely to be used in the web gallery and in the final delivery.

When the photographer captures an image, the captured image can be confirmed and the rating information added thereto. A user interface through which the rating information is input is provided in the image capturing device 2. It is conceivable to transfer the rating information to the staff terminal 1 along with the image data, which is included in the metadata corresponding to the image data, for example. Alternatively, it is also conceivable to write the rating information to the Exif XMP region of the image file.

The staff terminal 1 extracts and manages the rating information from the metadata (or Exif data).

The rating information can be added, updated, or the like in accordance with the image data through operations made in the staff terminal 1.

Selection information corresponding to the image data is stored in the image capture/editing information table 62.

One piece of the selection information is used image information indicating whether an image is to be posted to the web gallery. This corresponds to the "selection flag" (also sometimes called simply a "flag"), which will be described later, where the flag being "off" indicates the image is not to be used in the web gallery, and the flag being "on" indicates the image is selected to be used in the web gallery.

Another piece of the selection information is cover image information indicating that the image is selected as a cover image provided as a front cover at the top of the web gallery.

Another piece of the selection information is highlighted image information indicating that the image is selected for highlighting (a highlighted display) in the web gallery. "Highlighted display" means that the image is displayed larger than the other images. Alternatively, normal images may be monochromatic images, whereas the highlighted images may be displayed in color. Conversely, it is also conceivable to display the normal images in color and the highlighted image in monochrome, in the sense of "highlighting". Additionally, normal images may be distinguished by being displayed without borders, and the highlighted images may be distinguished by being displayed with borders, or the like. Many different methods are conceivable for the highlighted display.

Analysis information corresponding to the image data is stored in the image capture/editing information table 62.

The analysis information is information indicating an analysis result obtained from image analysis processing executed by the function of the image analysis unit 34. This is information indicating, for example, an analysis result such as whether the person serving as the subject has their eyes closed.

The information may also include information that personally identifies the subject. The information may also include recognition result information for things determined through semantic segmentation processing or the like on the image.

Archive information corresponding to the image data is stored in the image capture/editing information table 62.

The archive information is information indicating that archive settings have been made by the user. Archiving operations and the like will be described later. At its simplest, for example, flag information of "0" or "1", indicating whether an image has archive settings made, is conceivable.

Evaluation information corresponding to the image data is stored in the image capture/editing information table 62.

The evaluation information is information on an evaluation of an image, and may be evaluation information from a user, or information of evaluation made through, for example, AI determination or the like.

In particular, the information of an evaluation from a user includes the presence or absence of a high rating (i.e., "liked"), the number of high ratings, or the like by remote attendees who have viewed the live gallery.

Distribution information corresponding to the image data is stored in the image capture/editing information table 62.

This distribution information is information indicating whether the image is an image to be distributed through the live gallery.

The distribution information is updated in response to a synchronization request from the server device 4. This makes it possible to manage whether the server device 4 has distributed each piece of image data in the live gallery from the staff terminal 1 side as well.

Information indicating that the live gallery has been deleted through an operation made from the staff terminal 1 after being distributed may also be included.

Editing information corresponding to the image data is stored in the image capture/editing information table 62.

The editing information includes various types of image processing parameters, such as retouching parameters, tilt correction parameters, and the like. The retouching parameters include image quality adjustment parameters such as a brightness adjustment value, a color adjustment value, a contrast adjustment value, a sharpness adjustment value, and the like.

The retouching parameters can be set in the advance settings, but can also be set for individual images. The tilt correction parameters are assumed to be set individually. Because of this, the editing information corresponding to the image data is stored such that parameters set for individual images can be stored.

Note that edited image data corresponding to the image data may be stored in the image capture/editing information table 62, as illustrated.

"Edited image data" is image data for which image editing has been performed on the original image data based on editing information determined in the advance settings, editing information set individually, and the like. In addition to image data retouched using the editing information, image data for which the quality of the image has been changed may also be considered edited image data. "Changing the quality" includes, for example, changing the image size, changing the resolution, cropping, changing the framerate of a moving image, and the like.

In the drawings, edited image data is distinguished from the original image data by adding an "E" to the filename, such as "DSC0001E.jpg". This edited image data is used for display in the user interface of the staff terminal 1 and the like.

Such edited image data does not necessarily have to be generated and stored, and instead may be displayed by applying the editing information as needed when displaying an image, for example. Accordingly, the editing information may be updated and managed in the image capture/editing information table 62, and the edited image data need not be stored. However, as illustrated in the drawings, generating and storing the edited image data as needed is of course useful from the standpoint of reducing the processing load during display processing and the like.

The filter condition information 63 in the event data 60 is information that stores filter conditions for filtering the images in the staff terminal 1.

Although the filter processing will be described in detail later, in the present embodiment, when displaying an image list in the staff terminal 1, the images can be filtered under filter conditions specified through operations made by the camera staff. The filter conditions are stored as the filter condition information 63, and are updated sequentially in response to user operations for selecting conditions. Although an all tab 125 and a candidate tab 126, which will be described later, are provided as image lists, the filter conditions for the all tab 125 and the filter conditions for the candidate tab 126 are stored independently as the filter condition information 63.

The CPU 71 of the information processing device 70 serving as the staff terminal 1 performs additional storage and updating of information of the event data 60 described above through the function of the event data management unit 30 in FIG. 5.

Note that the format of the event data 60, the format of the image capture/editing information table 62, and the like are merely examples, and this data may be in any format as long as at least the above-described content is managed for each event. For example, the original image data, metadata, rating information, selection information, analysis information, archive information, evaluation information, distribution information, editing information, and edited image data included in the image capture/editing information table 62 are not limited to being stored together as a table. As long as this information is associated at least with each single piece of original image data, the information can be stored in any format and in any manner.

The event data management unit 30 may also have a function for simply obtaining event data 90 (see FIG. 8) stored in the server device 4, which will be described later. In other words, this is a configuration in which the advance settings information 61, the image capture/editing information table 62, and the like of FIG. 6 are obtained as necessary through communication with the server device 4, such that the information can be referenced as needed without being stored within the staff terminal 1.

Even in such a case, the event data management unit 30 receives the evaluation information for the images distributed through the live gallery delivered from the server device 4 through the communication processing with the server device 4, and performs processing for managing the evaluation information in association with the image data. For example, the staff terminal 1 may manage the evaluation information and the image data in association with each other as temporary information by sequentially obtaining that information and data from the server device 4 in an already-associated state, or, if the image data is already stored, may manage the evaluation information received from the server device 4 in association with the stored image data by adding the evaluation information as metadata of the image data.

The UI control unit 31 of FIG. 5 is a function that controls the presentation of images, rating information, and the like pertaining to the event data 60 of the specific event, and performs processing for detecting operational inputs. In other words, this is a function that performs user interface processing.

The user interface processing includes presenting various types of information, providing an environment in which operational inputs can be made, processing for detecting operations made by the user, processing for detecting/estimating the intentions of the user, and the like.

Specifically, the UI control unit 31 performs control processing for providing the user with an operational input environment, presenting information, and the like by causing the display unit 77 and the audio output unit 78 to execute outputs such as display outputs and audio outputs for the user, for example.

Alternatively, the UI control unit 31 performs processing for detecting operations made by the user, for example.

Alternatively, the UI control unit 31 performs both processing for providing an operational input environment to the user and processing for detecting operations made by the user, for example.

Then, in the present embodiment in particular, the UI control unit 31 performs control enabling the selection of a plurality of types of filter conditions by making operations, and causing the images extracted through the filtering processing executed by the filter processing unit 33 to be presented based on the selected filter conditions.

Of course, the UI control unit 31 may perform other user interface processing.

The communication control unit 32 is a function that performs processing pertaining to communication with the image capturing device 2, communication control and synchronization with the server device 4, and the like.

For example, the communication control unit 32 executes and controls communication for synchronizing the event data with the server device 4, which is an external device, in response to the event data 60 being stored or updated.

For example, when an image is transferred from the image capturing device 2, the communication control unit 32 controls the processing for transferring the image data from the communication unit 80 to the server device 4, notifies the server device 4 of the details of an update when the content of the event data 60 is updated, and the like.

The filter processing unit 33 is a function that performs processing for filtering images among a set of images captured for the event and extracting images to be displayed in response to operations made by the user. The filter conditions are set through user operations. Specifically, a rating, a specific thing, a person, the type of the image capturing device 2, the state of archive settings, whether the eyes are closed, high evaluation information (whether or not the images has been "liked"), metadata, or the like are set as the filter conditions.

The image analysis unit 34 is a function that performs image analysis to determine whether a subject person has their eyes closed, recognize a thing that serves as a subject, or recognize an individual subject. Various recognition processing is performed using, for example, facial detection algorithms, semantic segmentation processing, personal determination algorithms, and the like. The information in the analysis result for each image is managed in the event data 60 as the analysis information.

Note that the image analysis unit 34 may receive analysis results for each image in the server device 4, for example.

Accordingly, it is not necessary to perform actual image analysis processing as a function provided in the staff terminal 1.

The distribution management unit 35 is a function that performs instruction processing for live gallery distribution by the server device 4.

For example, the distribution management unit 35 performs processing for communicating, to the server device 4, a "start instruction", a "stop instruction", a "resume instruction", an "end instruction", a "resume upload instruction", a "delete instruction", and the like as the instruction processing. In other words, when the UI provided to the camera staff under the control of the UI control unit 31 detects an operation pertaining to live distribution, the distribution management unit 35 issues one of the aforementioned instructions and causes the communication control unit 32 to transmit the instruction to the server device 4.

The functions in FIG. 5 described above are merely examples. By the information processing device 70 including at least the event data management unit 30, the UI control unit 31, the filter processing unit 33, and the distribution management unit 35, the information processing device 70 can perform the processing of the staff terminal 1 of the present embodiment.

Each of these functions is implemented, for example, by installing an application program for creating image collection content in the information processing device 70.

Figure 7:
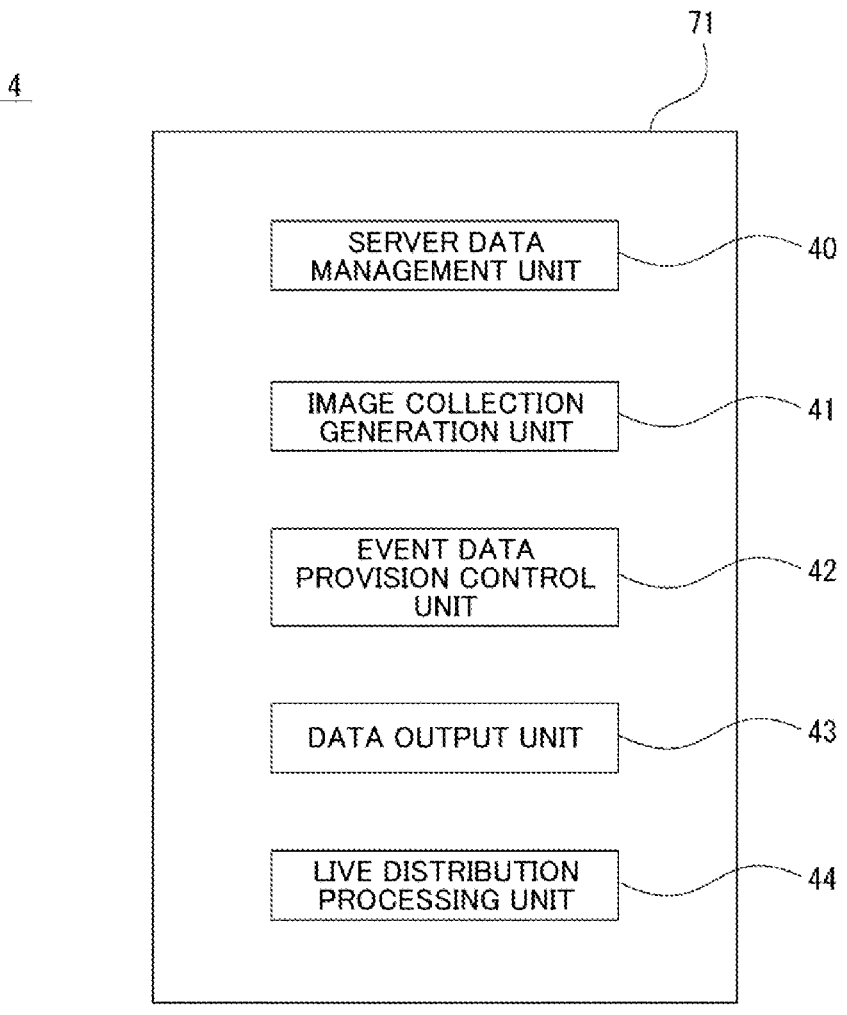
FIG. 7 is an explanatory diagram illustrating the functional configuration of a server device in the embodiment.

Next, assuming that the information processing device 70 illustrated in FIG. 4 serves as the server device 4, a functional configuration such as that in FIG. 7 is constructed in the CPU 71 by the application programs in the information processing device 70.

FIG. 7 illustrates a server data management unit 40, an image collection generation unit 41, an event data provision control unit 42, a data output unit 43, and a live distribution processing unit 44 as functions provided in the information processing device 70 serving as the server device 4.

The server data management unit 40 is a processing function for managing the storage and updating of the event data in the server device 4.

Figure 8:
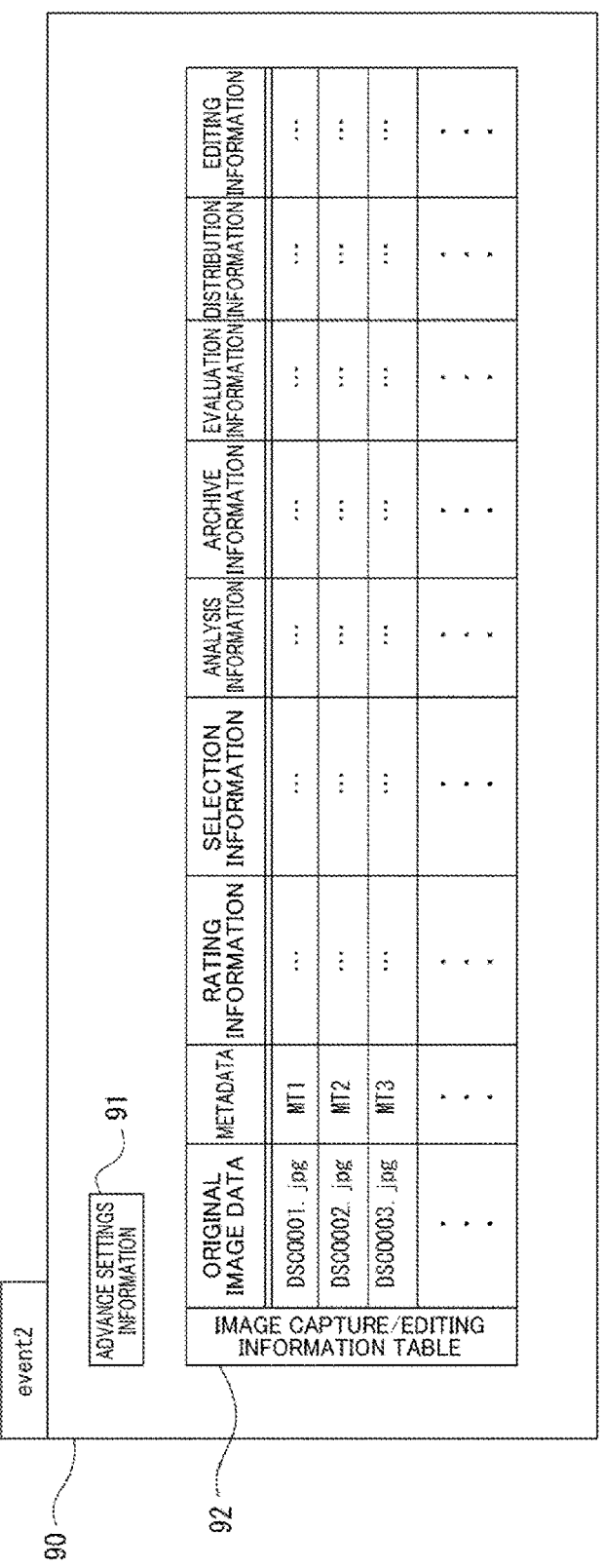
FIG. 8 is an explanatory diagram illustrating server device-side event data in the embodiment.

FIG. 8 schematically illustrates the content of the event data 90 on the server device 4 side. As in FIG. 6, the event data 90 is event data for the event having an event name of "event2".

In this example, the event data 90 includes advance settings information 91 and an image capture/editing information table 92.

The advance settings information 91 is the same information as the advance settings information 61 in the staff terminal 1. For example, the content set in the advance settings in step S1 of FIG. 2 is managed in the same manner in the server device 4.

The image capture/editing information table 92 has almost the same information as the image capture/editing information table 62. In other words, the original image data, metadata, rating information, selection information, analysis information, archive information, evaluation information, distribution information, and editing information can be managed for each image.

Although the edited image data is not associated in the image capture/editing information table 92, this is because edited images are created when uploading to the live gallery, when generating the web gallery, and the like.

However, the server device 4 may of course generate the edited image data sequentially and associate the edited image data with the original image data in the image capture/editing information table 92.

The CPU 71 of the information processing device 70 serving as the server device 4 performs additional storage and updating of information of the event data 90 described above through the function of the server data management unit 40 in FIG. 7.

In the embodiment, the event data 60 is managed by the event data management unit 30 on the staff terminal 1 side, the event data 90 is managed by the server data management unit 40 on the server device 4 side, and the event data 60 and 90 are synchronized, but as a variation, the event data may be stored and managed by either one of those devices. For example, if the event data 60 is stored by the server data management unit 40, receiving the event data sequentially as described above makes it possible to manage and used the event data in association with the image data on the staff terminal 1 side even if the event data 60 is not stored on the staff terminal 1 side.

The image collection generation unit 41 in FIG. 7 is a function for generating image collection content as a web gallery of the specific event. In particular, the image collection generation unit 41 generates webpage data to serve as image collection data, i.e., a web gallery, by referring to the selection information and the editing information in the event data 90.

Figure 9:
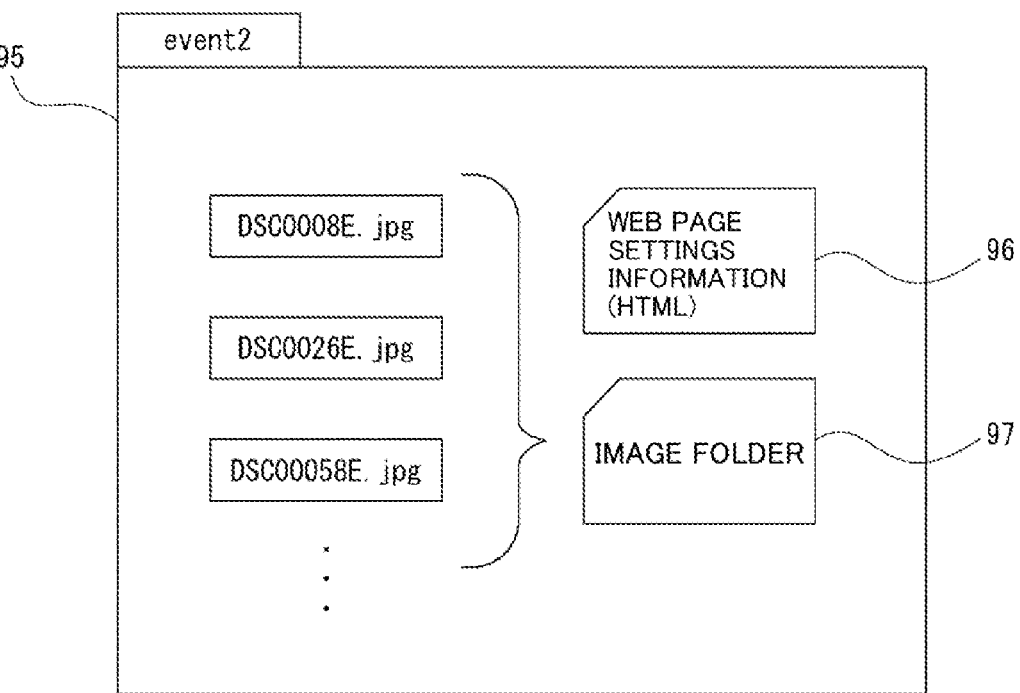
FIG. 9 is an explanatory diagram illustrating web gallery information generated by a server device in the embodiment.

FIG. 9 illustrates an example of the generated web gallery data.

The server device 4 generates page information in HTML (HyperText Markup Language) or XML (Extensible Markup Language) format as the web gallery data, e.g., as webpage settings information 96, and generates an image folder 97 that is called from the webpage settings information 96 and in which the images to be displayed in the page are collected.

The edited image data for the images used as the web gallery is included in the image folder 97.

The event data provision control unit 42 in FIG. 7 is a function for performing control to cause the staff terminal 1 to execute transmission for providing the event data 90.

For example, in response to the staff terminal 1 logging into the server device 4 and specifying an event, some or all of the event data 90 of that event is transmitted to the staff terminal 1. The staff terminal 1 takes the received content as the event data 60 managed by that staff terminal 1 itself. This makes it possible for, for example, an assistant to perform operations on the terminal device 1B side using the event data 60.

Of course, the event data provision control unit 42 is also assumed to control the provision of event data to the terminal device 1A, the personal computer 3, and the like.

The data output unit 43 performs control for transmitting some or all of the data included in the event data, e.g., the metadata, rating information, selection information, analysis information, archive information, evaluation information, distribution information, editing information, or image data (e.g., the original image data), to a terminal device (e.g., the personal computer 3) as a file in a predetermined format.

In other words, this is a processing function for providing, to the camera staff, data necessary for creating the image collection content for final delivery.

The live distribution processing unit 44 is a function for performing processing for executing live gallery distribution. Specifically, processing such as starting, stopping, resuming, and ending a live gallery is performed based on instruction information from the staff terminal 1.

The live distribution processing unit 44 also performs processing for selecting images to be uploaded to the live gallery from the image data transferred from the staff terminal 1. Processing for uploading selected image data to the live gallery is also performed. Processing for obtaining evaluation information (likes) by viewers of the live gallery is also performed.

The functions in FIG. 7 described above are merely examples. By the information processing device 70 serving as the server device 4 including the server data management unit 40 that manages the event data 90, the event data can be synchronized between the staff terminal 1 and the server device 4. Additionally, by the server device 4 including the image collection generation unit 41, the web gallery can be generated immediately. By the server device 4 including the live distribution processing unit 44, the live gallery can be distributed during the event. Each of the functions in FIG. 6 is implemented, for example, by installing an application program for creating image collection content in the information processing device 70.

A live gallery viewing screen implemented by the server device 4 having the function of the live distribution processing unit 44 will be described here.

Figure 10:
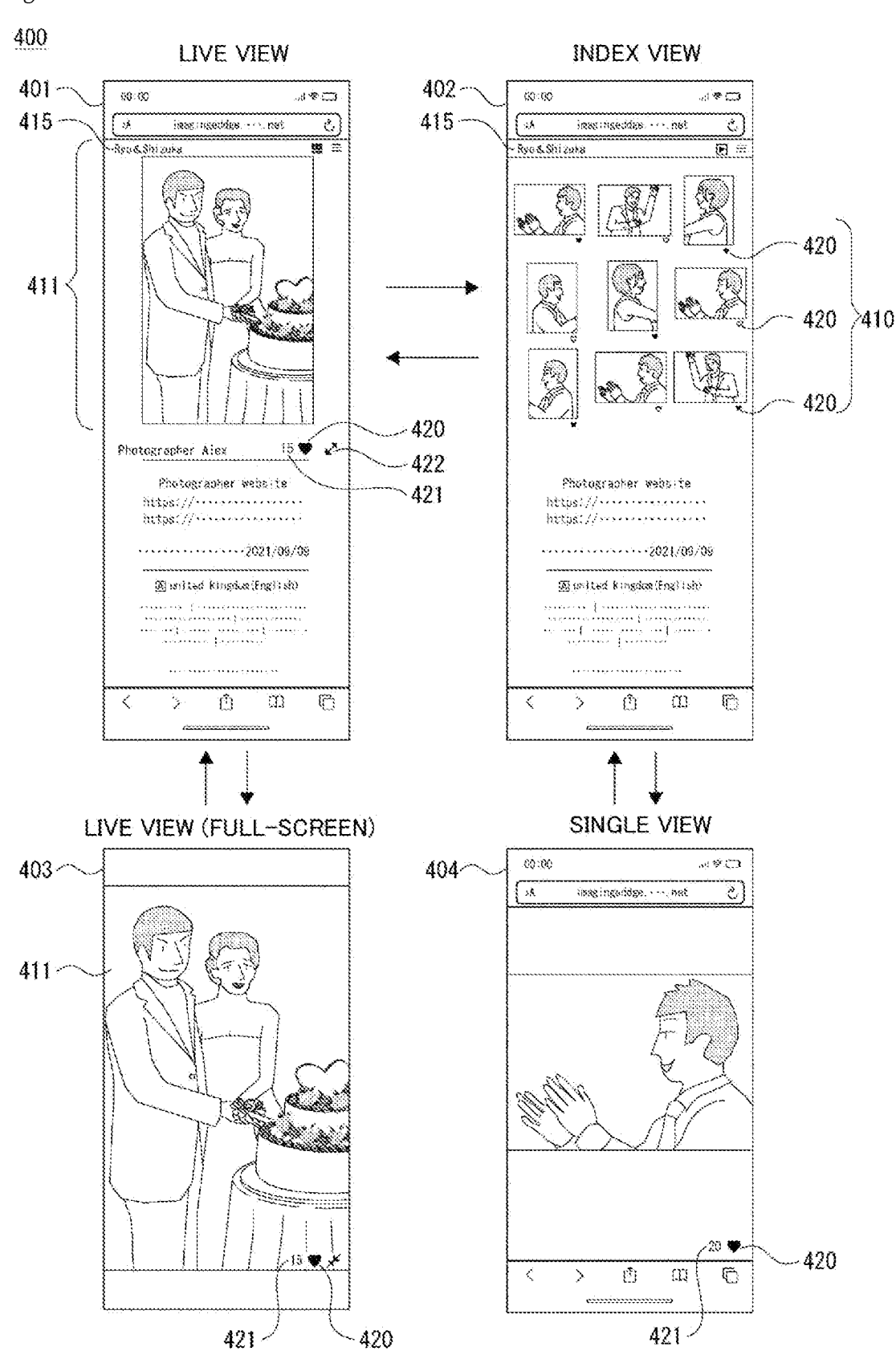
FIG. 10 is an explanatory diagram illustrating a live gallery screen in the embodiment.

FIG. 10 is an example of a live gallery viewing screen 400 viewed using the remote attendee terminal 7.

A remote attendee or the like can view the live gallery viewing screen 400 while switching as desired among, for example, a live view 401, a live view (full-screen) 403, an index view 402, and a single view 404.

The live view 401 and the live view (full-screen) 403 are screens in which the latest images are automatically displayed sequentially in a live display part 411 set within those screens.

A remote attendee can browse the live gallery by using the remote attendee terminal 7 to access a URL which has been communicated to the attendee in advance. For example, the live view 401 can be viewed first.

In the live view 401, only images having image capture times which are newer than the displayed image are displayed, in chronological order by image capture time.

It is also possible to view only images through a full-screen display, as indicated by the live view (full-screen) 403.

The server device 4 performs processing for sequentially selecting the image data transferred from the staff terminal 1 during the event and uploading the data to the live gallery. Accordingly, images are added to and updated in the live gallery every predetermined period of time.

In the remote attendee terminal 7, the live gallery is viewed using a browser, a dedicated application, or the like, and by automatically performing processing for updating to the latest state periodically, for example, the browser or the like enables the viewer to view the live gallery in a state where new images are sequentially added to the gallery. The latest content may also be viewed in response to the user performing an update operation or the like in the browser.

Images are added to the live gallery sequentially in this manner, and thus the latest images are displayed in the live view 401.

When the latest image is updated in the live gallery, the displayed image is switched approximately once every 10 seconds. Effect processing may be performed at this time.

If there are a plurality of latest images, the display is switched in order starting with the oldest image. Additionally, if there is no image to be displayed next when the latest image is being displayed, that image may be displayed until the next time a new image is added.

It is not possible to manually move forward and backward through the images in the live view 401.

Additionally, a full-screen button 422 in the live view 401 is used to switch to the live view (full-screen) 403.

The index view 402 is a screen that displays a list of the images distributed thus far in a list display part 410. For example, images which are older in chronological order are displayed at the bottom, and images which are newer are displayed at the top.

Each time a new image is distributed through an automatic update, the new image is added to the list displayed in the index view 402. Alternatively, adding images through updates may be performed in response to manual operations.

If an image distributed so as to be partway in the order by image capture time, that image is inserted and displayed so as to maintain the chronological order.

A single view 404 is a screen that displays an enlarged version of a single image selected from the index view 402 through an operation such as tapping or clicking. It is possible to move through the images by performing left and right directional operations on the screen in the single view 404. For example, images which are older in chronological order are displayed by performing a right directional operation, and images which are newer are displayed by performing a left operation.

If a new images uploaded while the single view 404 is being displayed, that image too can be displayed by moving through the images.

Figure 11:
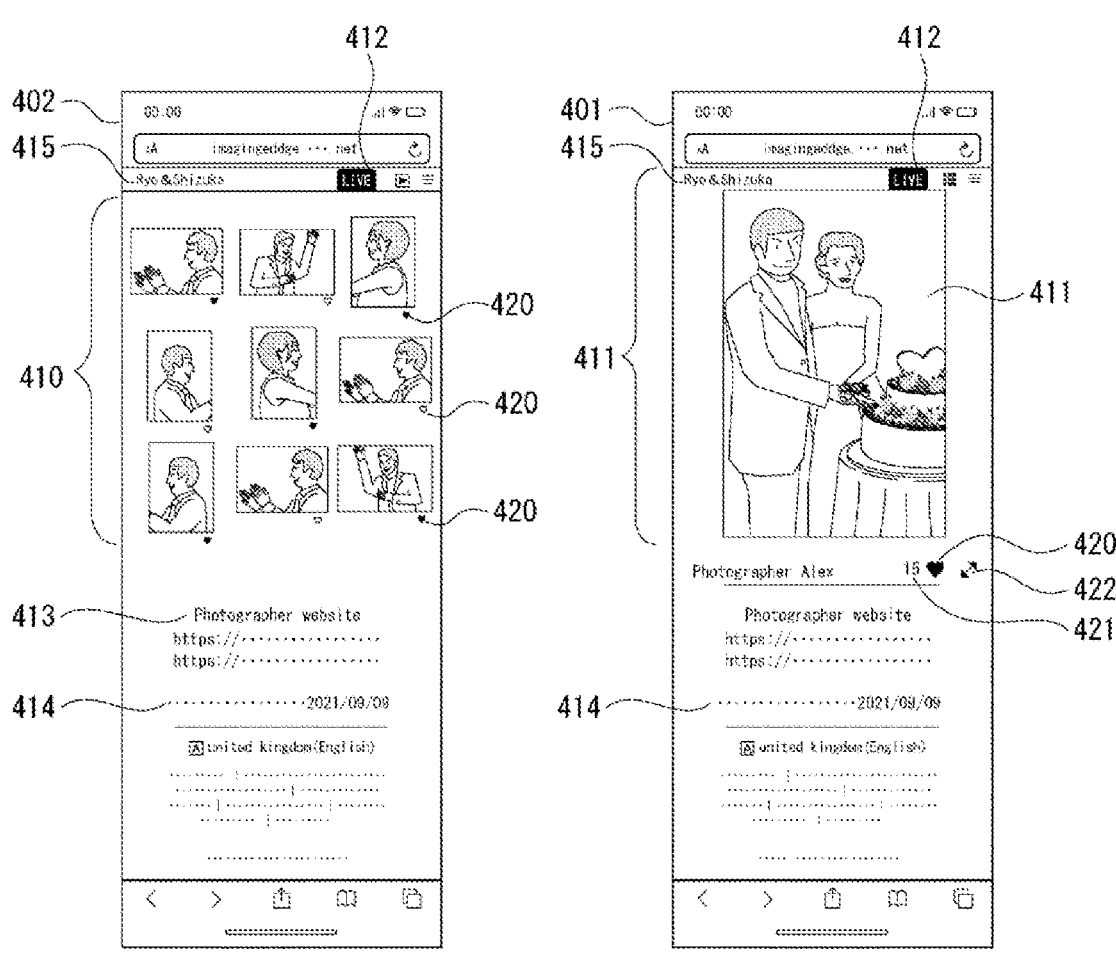
FIG. 11 is an explanatory diagram illustrating an index view and a live view of a live gallery in the embodiment.

FIG. 11 illustrates the live view 401 and the index view 402.

A project name 415 is displayed in the live view 401 and the index view 402.

A live icon 412 is also displayed in the live view 401 and the index view 402. For example, the live icon 412 is hidden before distribution, but is displayed during distribution. A pause icon is displayed while the distribution is stopped. The live icon 412 is hidden after the event ends. A message indicating that the event has ended may be displayed at the same time.

Using these displays, a viewer such as a remote attendee can confirm the distribution state of the live gallery. For example, the viewer can recognize that the distribution has been paused when the images in the live view 401 have not been updated for an extended period of time.

A photographer name 413 is displayed in the live view 401 and the index view 402, and thus the name of the photographer is clearly shown to remote attendees and the like.

In addition to the name, a URL of the photographer's webpage or the like may be displayed, for example.

An expiration date 414 is displayed in the live view 401 and the index view 402. This indicates the date up until which the live gallery can be viewed.

A message or the like may be displayed along with, or instead of, the expiration date 414. The expiration date 414 and the like may also be displayed after the distribution of new images in the live gallery has ended or the like.

As illustrated in FIGS. 10 and 11, a high rating button 420 and a high rating number 421 are displayed for corresponding images in each view.

A viewer can give a high rating, i.e., a "like", by operating the high rating button 420. These high ratings are aggregated by the server device 4 and displayed as the high rating number 421. Additionally, the server device 4 can sequentially notify the staff terminal 1 of information about the high rating number for each image, which enables the staff terminal 1 to manage the high rating number as the evaluation information indicated in FIG. 6.

Although the viewer of the live gallery performs the operation for giving a high rating by tapping/clicking the high rating button 420, the high rating can be removed by tapping/clicking the button again.

3. Advance Setting Processing

A specific example of the processing performed in the system described above, and particularly an example of the processing performed by the staff terminal 1 and the server device 4, will be described hereinafter.

First, an example of the processing for making the advance settings in the staff terminal 1, indicated as step S1 in FIG. 2, will be described with reference to FIGS. 12, 13A, 13B and 13C.

Note that the processing of the staff terminal 1 described below is processing performed by the CPU 71 of the information processing device 70 having the functions illustrated in FIG. 5.

Additionally, each screen example described with reference to the flowcharts below assumes that the information processing device 70 serving as the staff terminal 1 is a smartphone, for example, and that the content is displayed in a display formed in the housing thereof.

Figure 12:
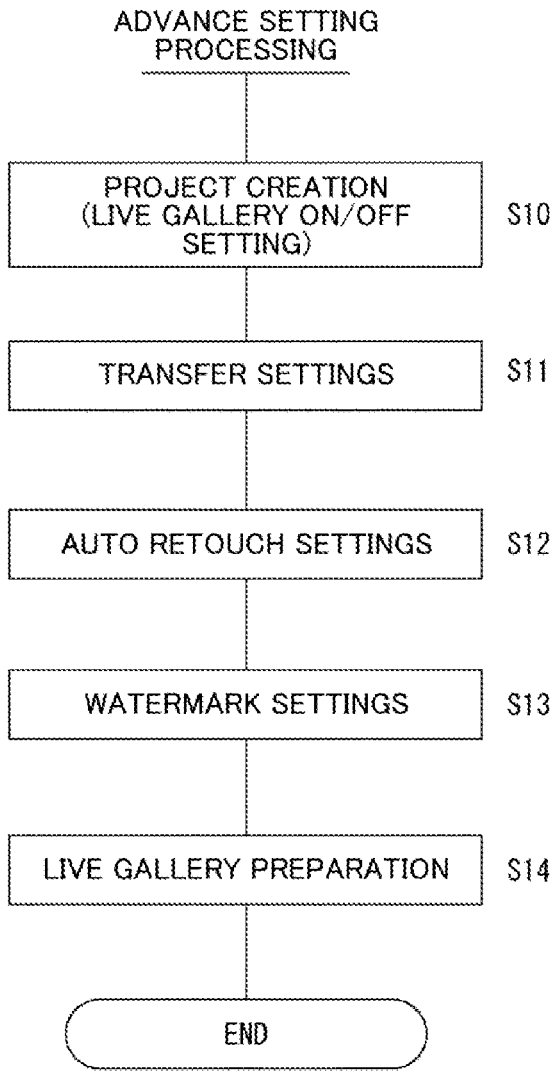
FIG. 12 is a flowchart illustrating advance setting processing by a staff terminal in the embodiment.

FIG. 12 illustrates processing performed by the staff terminal 1.

For example, the camera staff launches an application program using the staff terminal 1 and performs an operation for preparation processing. In response to this operation, and the staff terminal 1, the CPU 71 executes the processing of step S10 on.

In step S10, the staff terminal 1 performs project creation processing. This is processing for setting a project in which an image collection is to be created for a given event. At this time, the camera staff can also set a live gallery for the project being created.

Figures 13A, 13B, 13C:
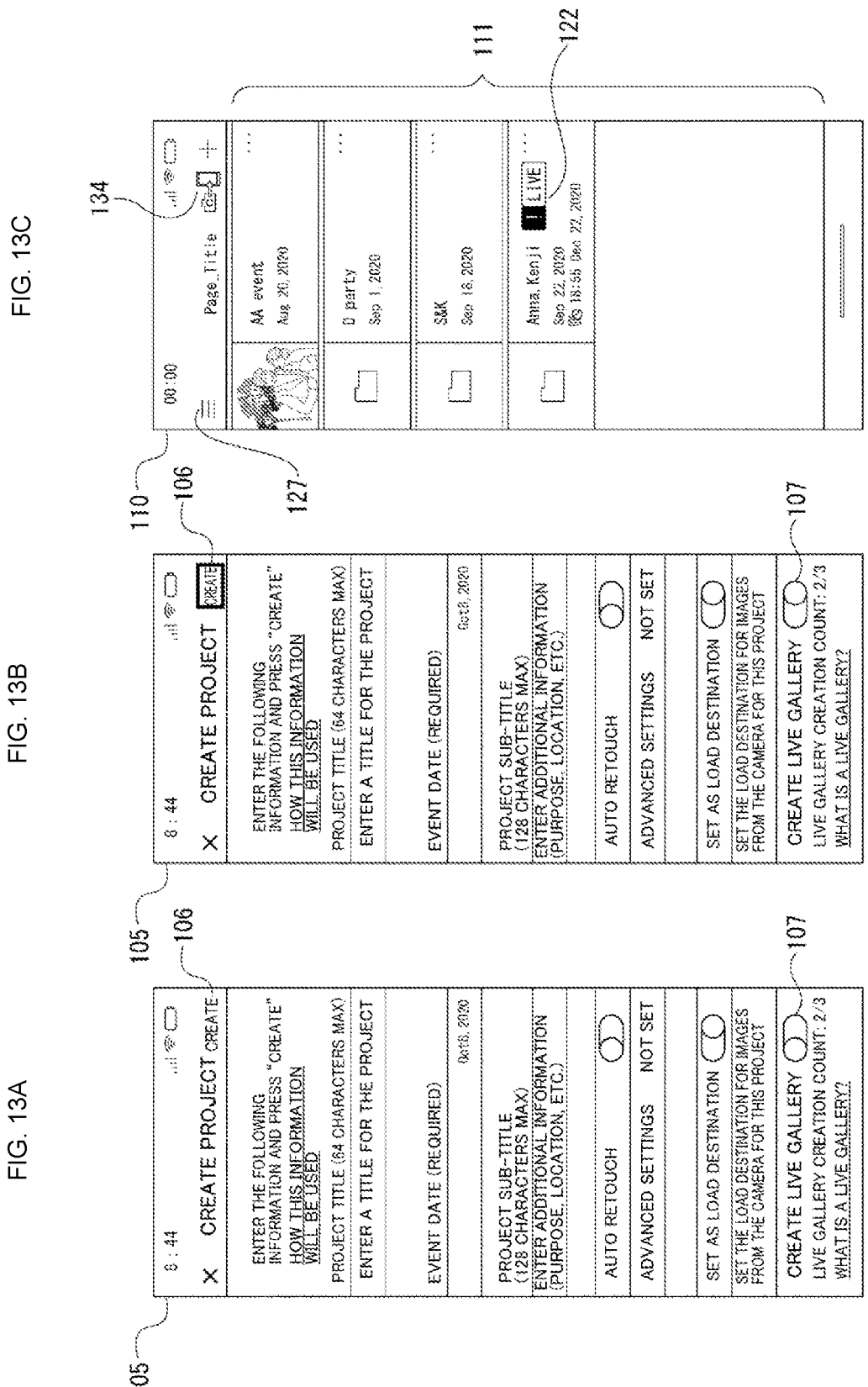
FIGS. 13A, 13B, and 13C are explanatory diagrams illustrating a project creation screen and a project list screen in the embodiment.

For example, after the application program is launched, a project creation screen 105 such as that illustrated in FIG. 13A is displayed in the display unit 77 of the staff terminal 1.

In this project creation screen 105, the camera staff can create a project for which an image collection is to be created. For example, the title of the project (the name of the event or the like), the date/time of the event, the location, whether or not auto retouch settings are applied, and so on can be entered.

A create project button 106, a live gallery setting button 107, and the like are provided in the project creation screen 105.

The live gallery setting button 107 is an operator for setting whether to execute live gallery distribution in the project being created.

The camera staff operates the create project button 106 after entering various types of information in the project creation screen 105 and then operating the live gallery setting button 107, which is in the state illustrated in FIG. 13A, to be turned on as illustrated in FIG. 13B.

A single project for which a live gallery is to be provided is created as a result.

The created project is displayed in a project list screen 110, as illustrated in FIG. 13C.

A list area 111, in which the project names of individual projects are displayed as a list, is provided in the project list screen 110. An add icon 112, a communication icon 134, a menu icon 127, and the like are also displayed.

FIG. 13C illustrates an example in which four projects are displayed. Information such as the project name, the date/time, the location, and the like is presented for each project, for example.

A live icon 122 is displayed for projects created with live gallery set to on.

Note that if the camera staff operates the create project button 106 in the state illustrated in FIG. 13A, without turning the live gallery setting button 107 on, the project will be created as a project without a live gallery, and the live icon 122 will not be displayed. However, the settings can be changed to implement a live gallery afterwards.

In step S10 of FIG. 12, the staff terminal 1 performs control to provide a user interface through such a screen using the function of the UI control unit 31, and performs project creation processing in response to the operations made by the camera staff.

Note that this project creation processing is performed, for example, in a state where the staff terminal 1 and the server device 4 are online and connected. In this case, the staff terminal 1 transmits, to the server device 4, information for synchronization processing in accordance with the details of the operations made by the user, through the function of the communication control unit 32.

Through this, the server device 4 can also be in a state in which the information of a single project is entered in a synchronized manner.

In step S11 of FIG. 12, the staff terminal 1 makes transfer settings. The "transfer settings" are settings for FTP transfer with the image capturing device 2, and are settings for the format of the files to be transferred, FTP connection server settings, and the like, for example.

Through the function of the UI control unit 31, the staff terminal 1 displays a screen for transfer settings to the camera staff, and makes the necessary transfer settings in response to operations made by the camera staff.

In step S12, the staff terminal 1 makes auto retouch settings. "Auto retouch settings" refers to processing for setting image editing processing parameters to be applied in common to each image.

Through the function of the UI control unit 31, the staff terminal 1 displays a screen for auto retouch settings to the camera staff, and makes the necessary auto retouch settings in response to operations made by the camera staff. The parameters in the auto retouch settings are denoted in the event data 60 of the created project as the advance settings information 61.

These auto retouch settings are also made in a state where the staff terminal 1 and the server device 4 are online and connected, for example, and the staff terminal 1 transmits information on the parameters of the auto retouch settings to the server device 4 for synchronization processing.

As a result, the advance settings information 91 having the same content as the advance settings information 61 of the event data 60 can be stored in the server device 4 as the event data 90 of the project.

In step S13, the staff terminal 1 makes watermark settings. The name of the photographer, for example, can be inserted as a watermark (digital watermark) on the images in the web gallery. The watermark settings correspond to processing for setting whether there is a watermark, the content of the watermark, and the like.

Through the function of the UI control unit 31, the staff terminal 1 displays a screen for watermark settings to the camera staff, and makes the necessary watermark settings in response to operations made by the camera staff. The information of the watermark settings is also written in the event data 60 of the created project as the advance settings information 61.

These watermark settings are also made in a state where the staff terminal 1 and the server device 4 are online and connected, for example, and the staff terminal 1 transmits information on the watermark settings to the server device 4 for synchronization processing.

As a result, the advance settings information 91 synchronized with the advance settings information 61 can be stored in the event data 90 of the project in the server device 4 as well.

As step S14, the staff terminal 1 can perform live gallery preparation processing through the function of the UI control unit 31. This is a task in which the live gallery is trialed in response to an operation by the camera staff to confirm whether the live gallery can be executed correctly.

Figures 14A, 14B:
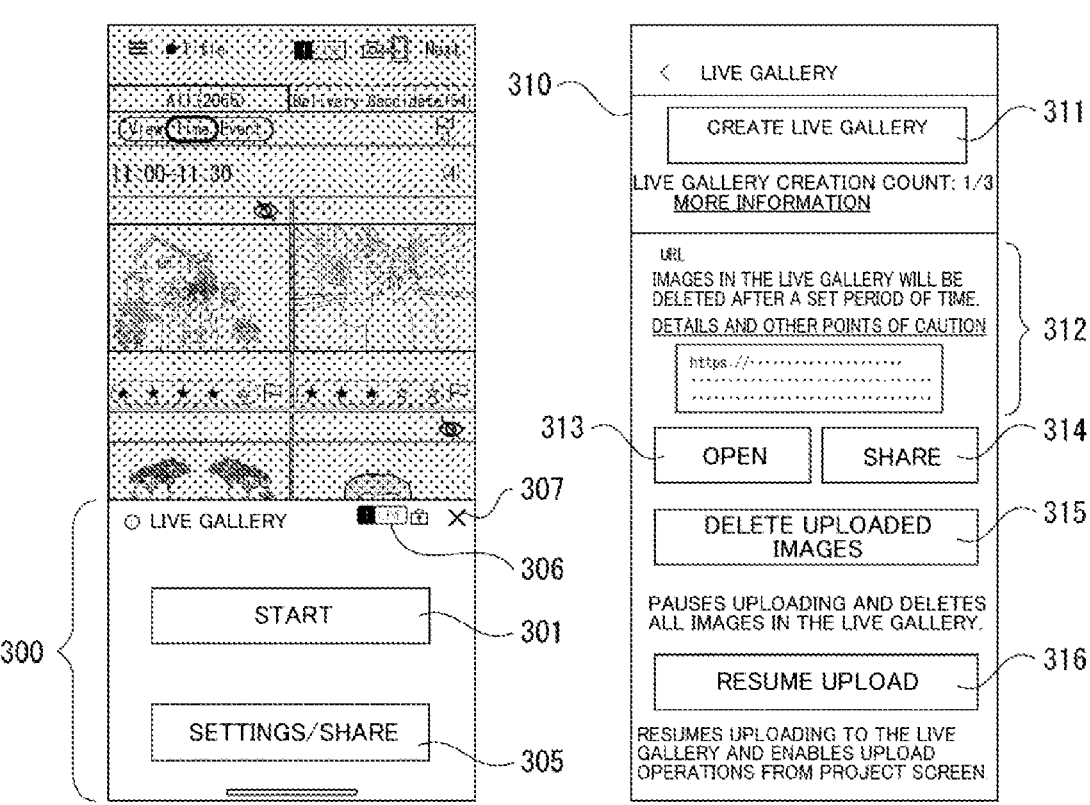
FIGS. 14A and 14B are explanatory diagrams illustrating preparation for a live gallery in the embodiment.

FIGS. 14A and 14B illustrate examples of UI screens for the preparation processing.

FIG. 14A illustrates a state in which a management panel 300 for instructing the live gallery to be distributed is displayed on the screen. Although this management panel 300 will be described in detail later, the panel can be opened from a screen displaying a list of captured images during the actual event (while the project is being executed).

A start instruction pertaining to the distribution of the live gallery is transmitted from the staff terminal 1 to the server device 4 in response to a start button 301 being operated in the management panel 300. Then, images captured by the image capturing device 2 and transferred to the server device 4 through the staff terminal 1 undergo selection processing in the server device 4 and are them uploaded to the live gallery. Accordingly, trial photos are uploaded to the live gallery in response to the camera staff taking trial shots using the image capturing device 2.

FIG. 14B illustrates a live gallery settings screen 310 which, in the staff terminal 1, can be transitioned to from the screen illustrated in FIG. 14A. For example, pressing a settings/share button 305 indicated in FIG. 14A transitions the screen to the live gallery settings screen 310 illustrated in FIG. 14B.

A create live gallery button 311, a URL display part 312, an open button 313, a share button 314, a delete button 315, a resume upload button 316, and the like are provided in the live gallery settings screen 310.

The create live gallery button 311 is operated when a live gallery is to be executed in a single project. For example, the camera staff can set the live gallery to be executed by operating the create live gallery button 311 even if the live gallery setting has not been turned on during the above-described project creation.

The URL of the live gallery is displayed in the URL display part 312.

The open button 313 is an operator for accessing the URL of the live gallery and starting to view the live gallery.

Accordingly, the camera staff takes a trial shot using the image capturing device 2 after operating the start button 301 illustrated in FIG. 13A, and then operates the open button 313. As a result, the staff terminal 1 accesses the live gallery, and displays the live gallery viewing screen 400 described above with reference to FIG. 10. The camera staff can therefore confirm whether the live gallery is functioning correctly.

The delete button 315 is an operator for instructing an image which has been uploaded to the live gallery to be deleted from the live gallery. After confirming that the live gallery is operating, the camera staff can delete the image uploaded as a trial by operating the delete button 315.

For example, making it possible to delete all images at once using the delete button 315 or other required operations is a useful function for the camera staff.

Once the live gallery is confirmed as described above, the camera staff operates the share button 314 to share the URL of the live gallery with clients.

The staff terminal 1 performs processing for providing the URL to the client terminal 5 in response to the share button 314 being operated. For example, the URL is transmitted to the client who requested the camera staff to photograph the wedding ceremony, such as the client terminal 5 of the bride, a relative, or the like. For example, the bride or the like shares the URL with the remote attendee terminals 7 of people who are remote attendees on the day of the wedding ceremony, such as friends, acquaintances, and the like. This enables remote attendees to view the live gallery on the day of the event.

The above-described processing of trialing the live gallery, deleting images uploaded as trials, providing the URL of the live gallery to the client terminals 5, and the like is performed in step S14 of FIG. 12.

Note that the order of the stated steps S11, S12, S13, and S14 may be different. Additionally, the processing of each step need not be performed as part a series of processes, and may be performed as necessary in response to user operations during startup, for example.

Additionally, processing may be skipped if it is not necessary. For example, the transfer settings made in step S11 may be performed each time a project is created in step S10, but if FTP transfer settings have been made already and the settings do not particularly need to be changed thereafter, step S11 may be skipped after the project is created in step S10, and the sequence may move to step S12. Of course, the same applies to the processing of steps S12 and S13, and these may be skipped if no particular changes are required after the settings.

Additionally, the communication with the server device 4 for synchronization may be performed at the timing of each instance of processing, but the advance settings information 61 and 91 may be synchronized by transmitting the information collectively at the point in time when several settings have been made.

Furthermore, if there is content set in an environment in which an online connection with the server device 4 cannot be made, the set information may be transmitted such that the advance settings information 61 and 91 are synchronized once a state of online connection is achieved.

4. Transfer/Editing Processing after Start of Event

A specific example of the processing by the staff terminal 1 in step S2 of FIG. 2, which is performed after the start of the event, will be described next with reference to FIG. 15. That is, this is mainly processing pertaining to the transfer of image data executed by the staff terminal 1, the event data, and the like through the functions of the event data management unit 30, the communication control unit 32, and the image analysis unit 34 illustrated in FIG. 5 while a wedding ceremony or the like is underway.

Figure 15:
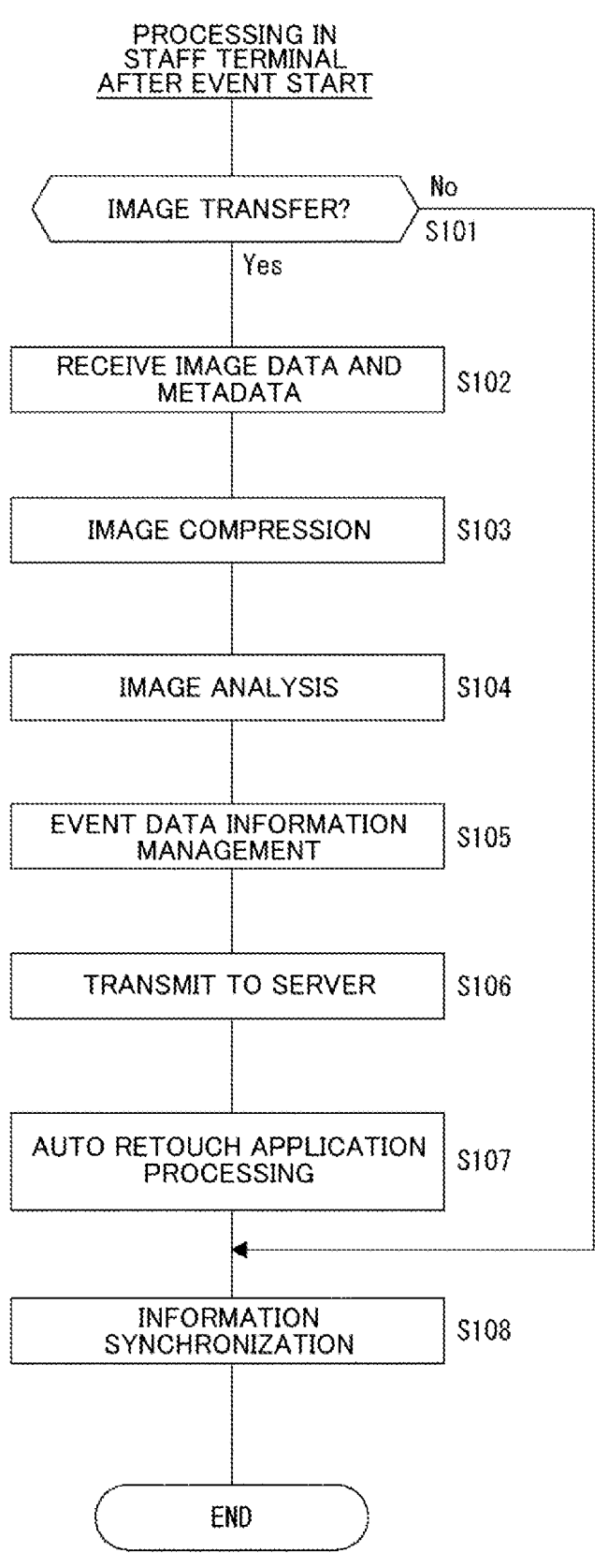
FIG. 15 is a flowchart illustrating transfer/editing processing by a staff terminal in the embodiment.

The staff terminal 1 repeatedly executes the processing illustrated in FIG. 15 as a result of the project processing being started after the start of the event.

In step S101 of FIG. 15, the staff terminal 1 checks whether image files have been transferred from the image capturing device 2. The processing moves from step S101 to step S108 during the period in which images are not being transferred, but moves from step S101 to step S102 when images have been transferred.

For example, during a wedding event, the photographer uses the image capturing device 2 to capture scenes of the ceremony, the wedding reception, and the like. After, for example, still images have been captured, the image capturing device 2 transfers the image files sequentially to the staff terminal 1 automatically or in response to an operation made by the photographer. Note that the timing of the transfer is merely an example. A transfer may be made each time a single image is captured, or a plurality of images may be transferred together.

When shooting a moving image, the moving image may be transferred during a period of no recording, each time the recording has been started and then stopped, or may be transferred during recording after the recording is started. The entire recorded moving image may be transferred, or only a predetermined period of time at the beginning may be transferred.

The photographer can also add rating information to the captured images by making operations on the image capturing device 2 side. For example, the photographer confirms the image immediately after capturing and then enters the rating information. The rating information is written into the metadata.

An image file including image data and metadata may be transferred, for example, in response to the photographer confirming the captured image and entering the rating information.

Upon detecting that such an image file has been transferred, the staff terminal 1 performs processing for receiving the image data and the metadata in step S102. In this case, the received image data is managed as the original image data in the image capture/editing information table 62 of the event data 60. The received metadata is also managed correspondingly.

The staff terminal 1 performs image compression processing in step S103. For example, compression processing is performed to increase the compression rate of the received image data. This processing generates the image data to be transmitted to the server device 4.

The staff terminal 1 performs image analysis processing in step S104. In other words, the image analysis processing is performed on the received image or the image compressed in step S103 to detect a person as a subject, perform individual recognition, object recognition, and pupil detection, determine whether the eyes are closed, and the like. The analysis information is generated according to the analysis result. The analysis information is registered in the image capture/editing information table 62 of the event data 60.

The staff terminal 1 performs event data management in step S105. This is processing for managing the rating information, for example. In this processing, the metadata of the received image file is confirmed, and the rating information added on the image capturing device 2 side is extracted and managed in the image capture/editing information table 62 of the event data 60.

Other parts of the event data 60 may be updated at this time. For example, information may be added to the metadata in the event data 60.

In step S106, the staff terminal 1 transmits information to the server device 4 to synchronize the event data 60 and 90. In this case, the staff terminal 1 transmits the image data compressed in step S103, the metadata, rating information, analysis information, and the like serving as the content of the event data 60, and the like to the server device 4. The event data 90 is updated on the server device 4 side in response to receiving this information, and is therefore kept in synchronization with the event data 60.

The staff terminal 1 performs auto retouch application processing in step S107. In other words, image processing using retouching parameters set in advance automatically is performed on the original image data to generate the edited image data, which is managed in the image capture/editing information table 62.

This edited image data is generated to be used in the UI display in the staff terminal 1.

Although this example describes the auto retouch application processing as processing performed when the image file is received, the processing may be performed at another point in time, e.g., as necessary when a request to display a single image is made.

It is also conceivable to apply image processing to the compressed image data generated in step S103. In this case, for example, the order of the processing of steps S106 and S107 may be switched such that the compressed image data is transmitted to the server after being subjected to the image processing for applying the auto retouch.

The processing for synchronizing information of step S108 is performed in the processing illustrated in FIG. 15 regardless of whether images are transferred. This information synchronization processing is processing which updates the content of the event data 60 based on the transmission of information from the server device 4. In particular, the latest evaluation information, distribution information, and the like for each image are received from the server device 4, and the event data 60 is updated.

As a result, the staff terminal 1 can manage each image while sequentially updating the information on the high rating numbers from viewers of the live gallery, information on whether the server device 4 has uploaded images to the live gallery, and the like.

By performing the above-describe processing illustrated in FIG. 15, the staff terminal 1 enters a state in which images captured by the photographer are imported and information corresponding to the images is managed through the event data 60. For example, all the captured images are managed through the event data 60 at the point in time when the wedding ceremony ends.

Additionally, by sequentially transmitting for the purpose of synchronization, the event data 90 on the server device 4 side is in a state of synchronization with the event data 60 on the staff terminal 1 side during the wedding ceremony as well as at the point in time when the wedding ceremony ends.

During the processing illustrated in FIG. 15, a list of the images transferred from the image capturing device 2, a communication state, and the like are displayed in a time view 120 and the like, which will be described later, which makes it possible for the camera staff to confirm the status of the importing of images to the staff terminal 1.

5. Selection & Live Gallery

UI-related processing by the staff terminal 1 will be described next.

This is processing performed in association with operations made by the camera staff after the event, such as a wedding ceremony or the like, has been started, and is performed in parallel with the above-described processing illustrated in FIG. 15. In terms of FIG. 2, this includes the live gallery distribution instruction processing of steps S2 and S3, and the selection processing.

An example of the UI-related processing will be described with reference to the flowcharts in FIGS. 16 to 22 and the screen examples in FIGS. 23, 24A, 24B, 24C, 25, 26, 27, 28, 29, 30A, 30B, 30C, 31, 32A, 32B, 32C, 32D, 32E, 32F, 32G, 32H, 33, and 34.

Note that FIGS. 16 to 22 illustrate individual parts of a series of flowcharts, with the connection relationships indicated by "c1", "c2", "c3", "c4", "c5", "c6", "c7", and "c8".

The processing in these flowcharts is processing performed by the functions of the event data management unit 30, the UI control unit 31, the communication control unit 32, the filter processing unit 33, and the distribution management unit 35 in FIG. 5.

Figure 16:
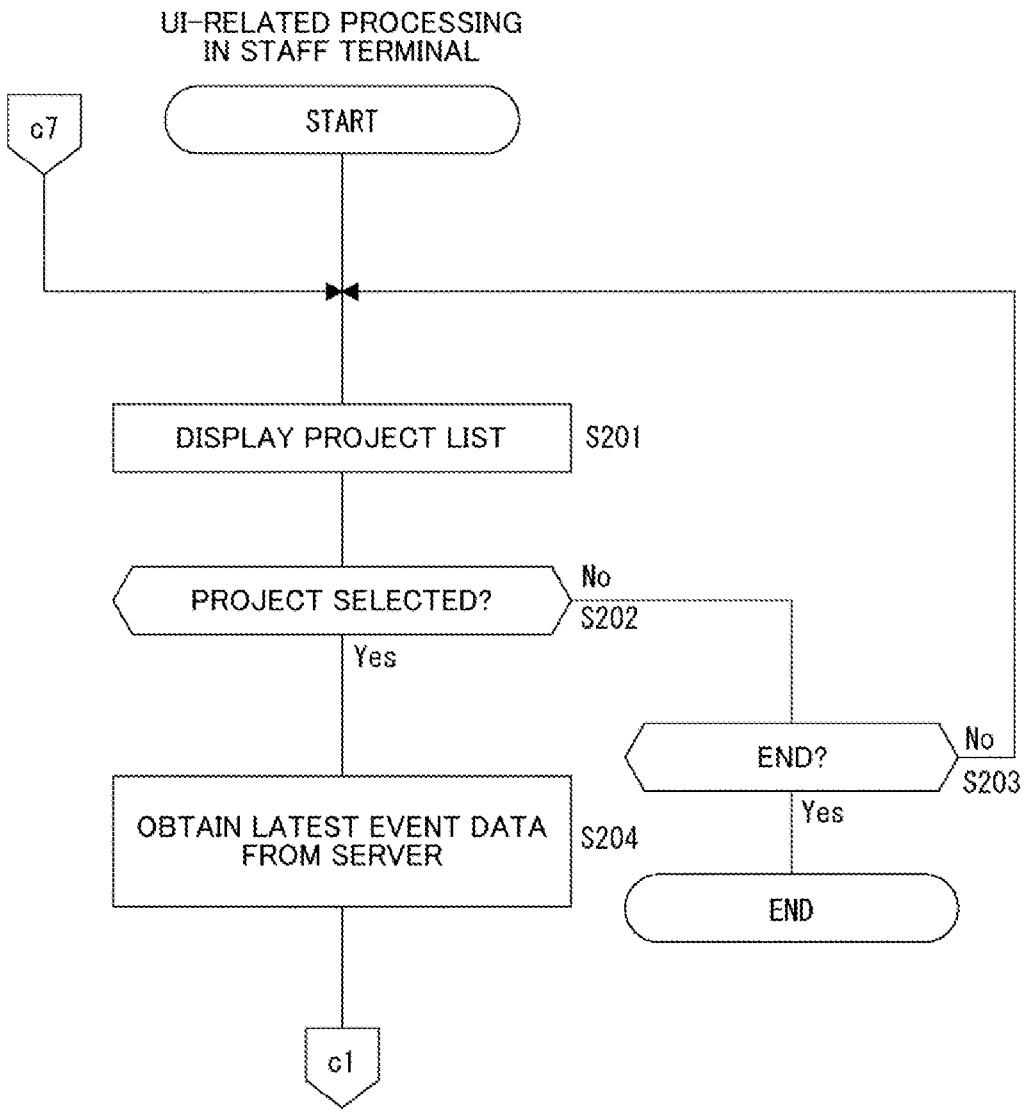
FIG. 16 is a flowchart illustrating UI-related processing by a staff terminal in the embodiment.

Step S201 in FIG. 16 illustrates processing for displaying a list of projects (event names and the like) in the project list screen 110 as illustrated in FIG. 13C.

In step S202, the staff terminal 1 monitors whether a project selection operation has been made in the project list screen 110, and monitors for an operation to terminate the application program in step S203.

If an operation for terminating the application program is made, the application program is closed and the processing ends.

When the camera staff makes an instruction to distribute a live gallery, makes selections, and the like after the start of the wedding ceremony or the like, the camera staff makes operations for selecting the desired project in the project list screen 110. For example, an operation such as tapping one of the projects displayed in the list area 111 is made.

Upon detecting such an operation, the staff terminal 1 moves the processing from step S202 to step S204, and obtains the latest event data for the selected project. For example, the staff terminal 1 makes a request for the event data 90 of the selected project to the server device 4, and imports the event data 90 transmitted in response. The staff terminal 1 then compares that data with the event data 60 held by itself and updates the information to the latest content. For example, the data is compared to some information that makes it possible to distinguish between new and old information, such as update time information, version management information, or the like for the event data 60 and the event data 90, and if the information is different, the event data 60 is updated to the latest content.

For example, in terms of the terminal device 1A carried by the photographer, the assistant may be inputting rating information and selection information on the terminal device 1B side during the wedding ceremony, and these may not be reflected in the event data 60 on the terminal device 1A side.

In addition, when the assistant attempts to enter rating information, selection information, or the like in the terminal device 1B carried by the assistant, it is appropriate to enter the information which is the latest on the terminal device 1A side as a reference.

Accordingly, the staff terminal 1 receives the event data 90 of the server device 4, to which the latest information has been transmitted from both the terminal devices 1A and 1B, and updates the information in the event data 60 if its own event data 60 is not the latest.

Note that there are also cases where there is only one staff terminal 1 and the information in the staff terminal 1 is always the latest. In such a case, the processing of step S204 may be considered unnecessary.

Figure 17:
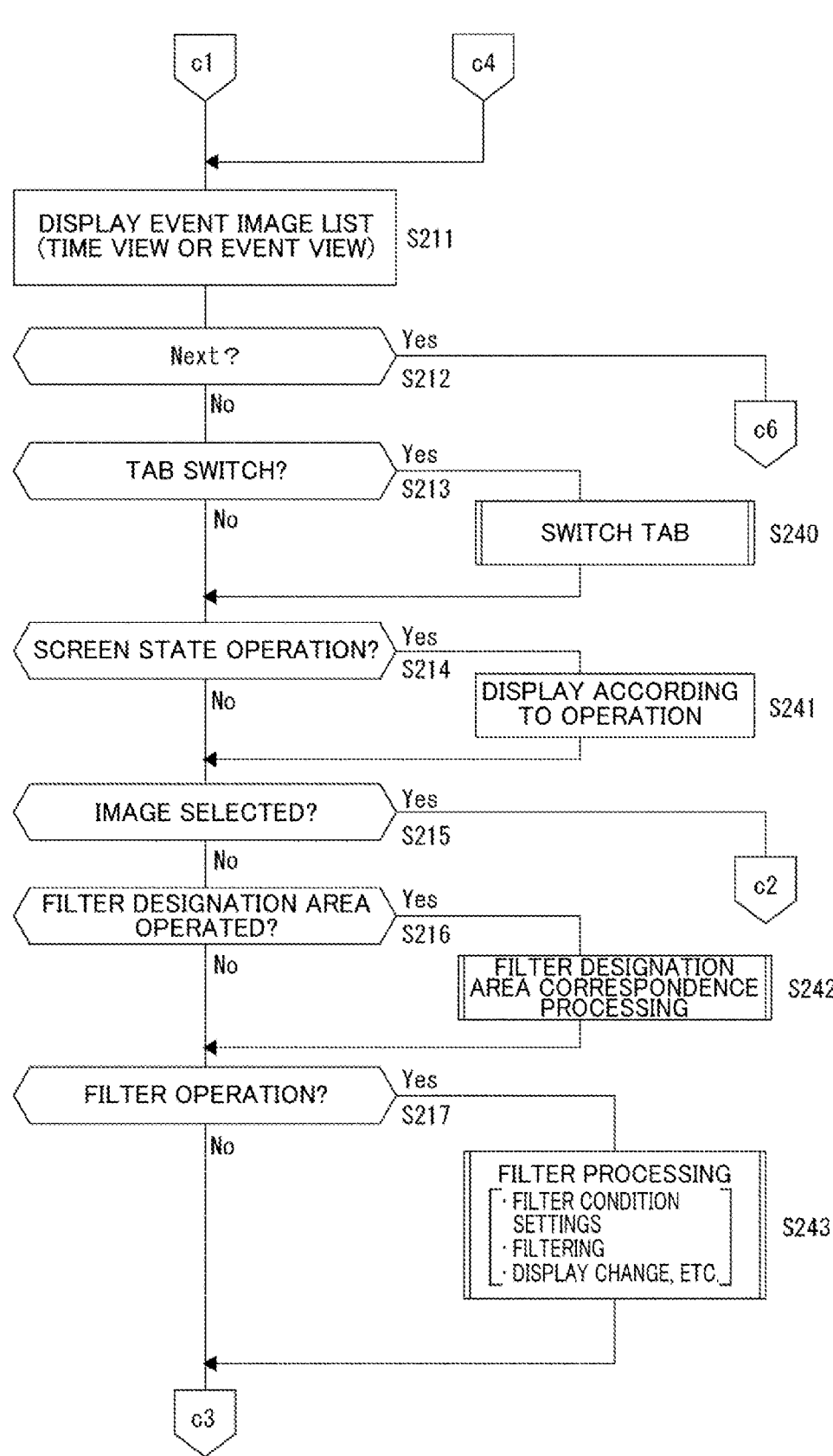
FIG. 17 is a flowchart illustrating UI-related processing by a staff terminal in the embodiment.

The staff terminal 1 then moves the sequence to step S211 in FIG. 17, where the event image list is displayed. For example, the time view 120 is displayed, as illustrated in FIG. 23.

The time view 120 is a list display which is a simple chronological display in which the images are arranged in an image area 128 by the image capture time.

Figures 24A, 24B, 24C:
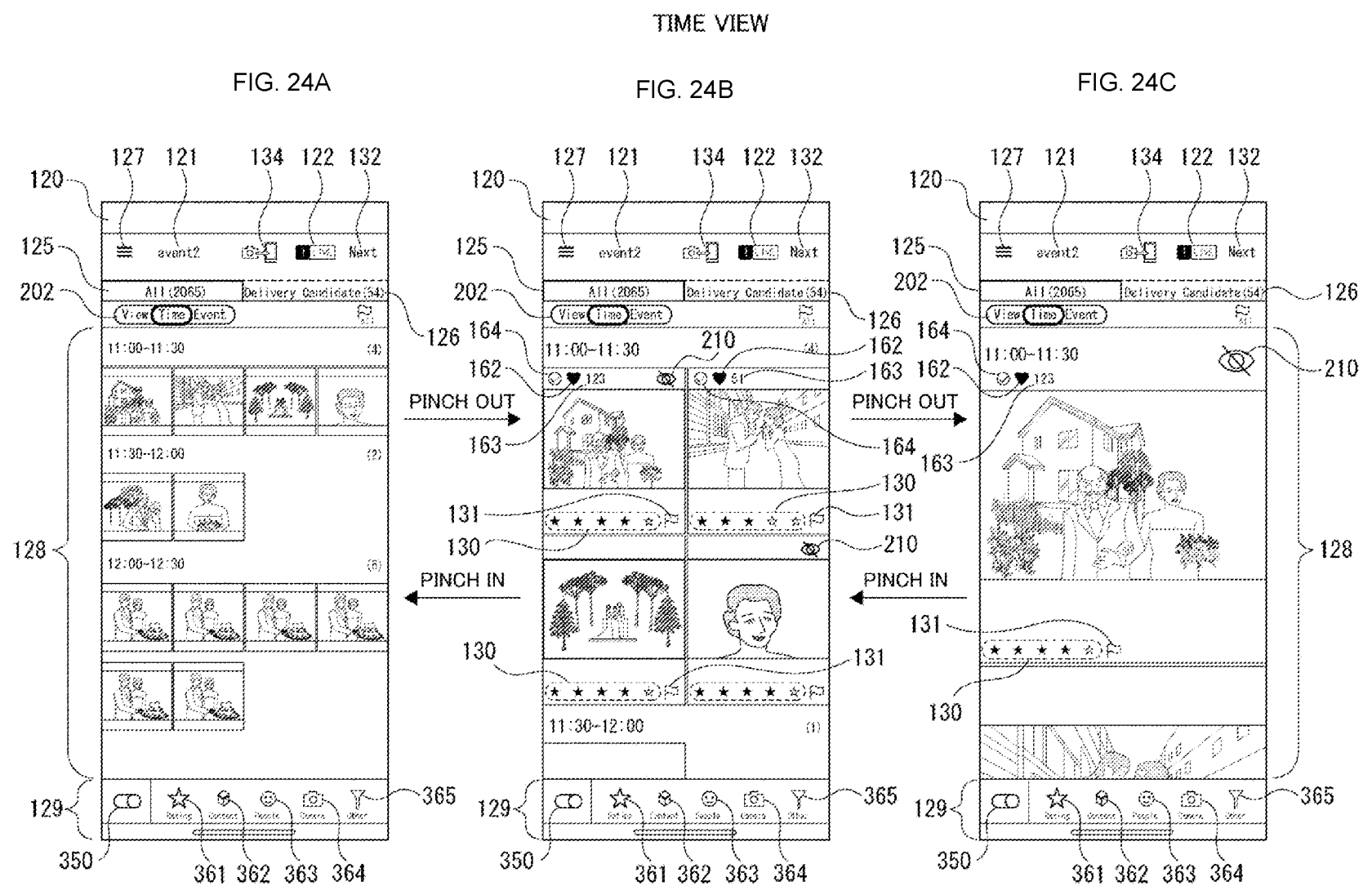

In the time view 120, the display form changes in response to zoom in/zoom out operations, as indicated in FIGS. 24A, 24B, and 24C.

Figure 23:
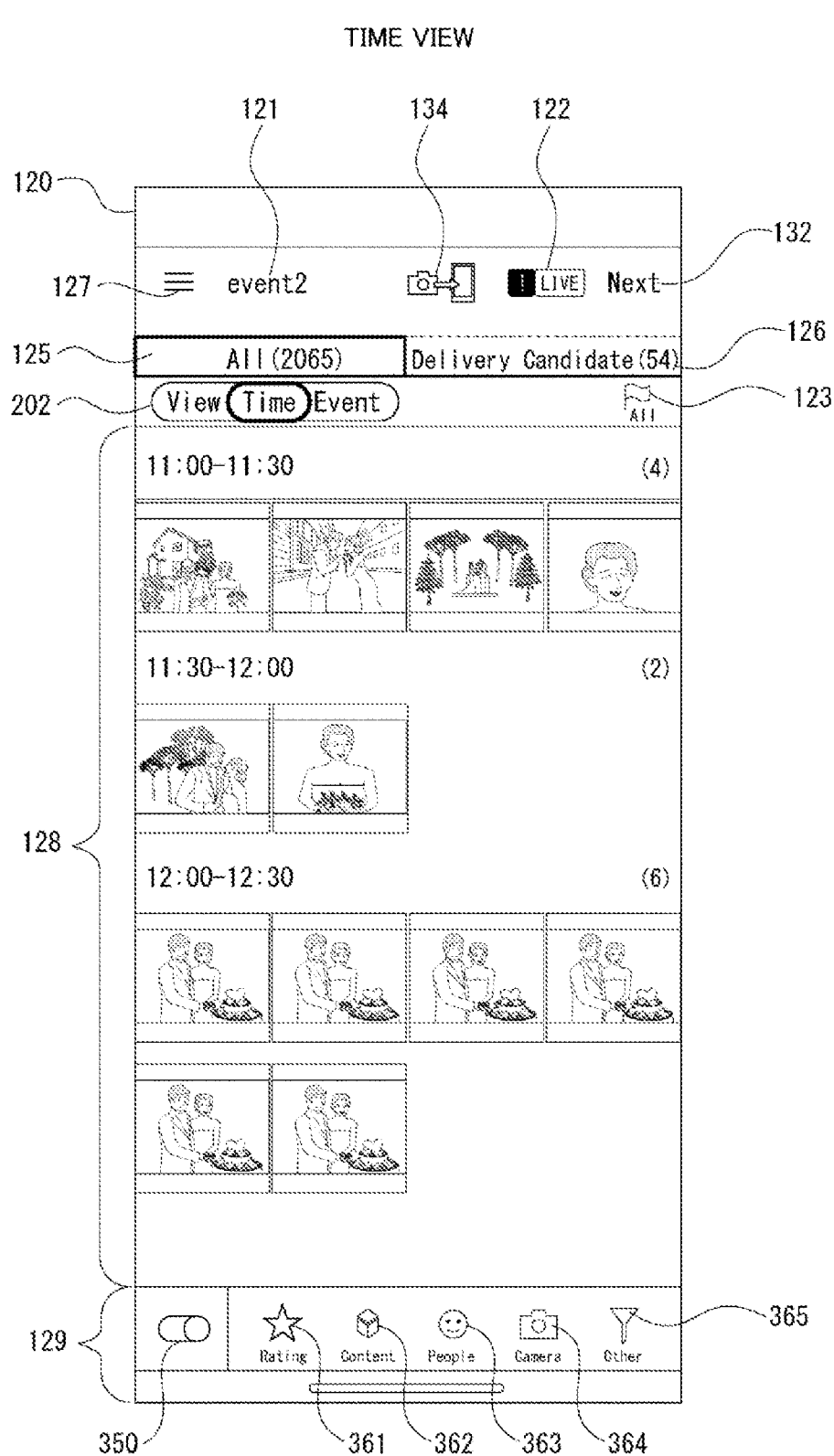
FIG. 23 is an explanatory diagram illustrating a time view in the embodiment.

FIGS. 23 and 24A illustrate a state in which four images are arranged in a row in the image area 128, FIG. 24B illustrates a state in which two images are arranged in a row, and FIG. 24C illustrates a state in which one image is arranged along the vertical direction of the screen. The user can adjust the image size as desired and view the list display.

Figure 25:
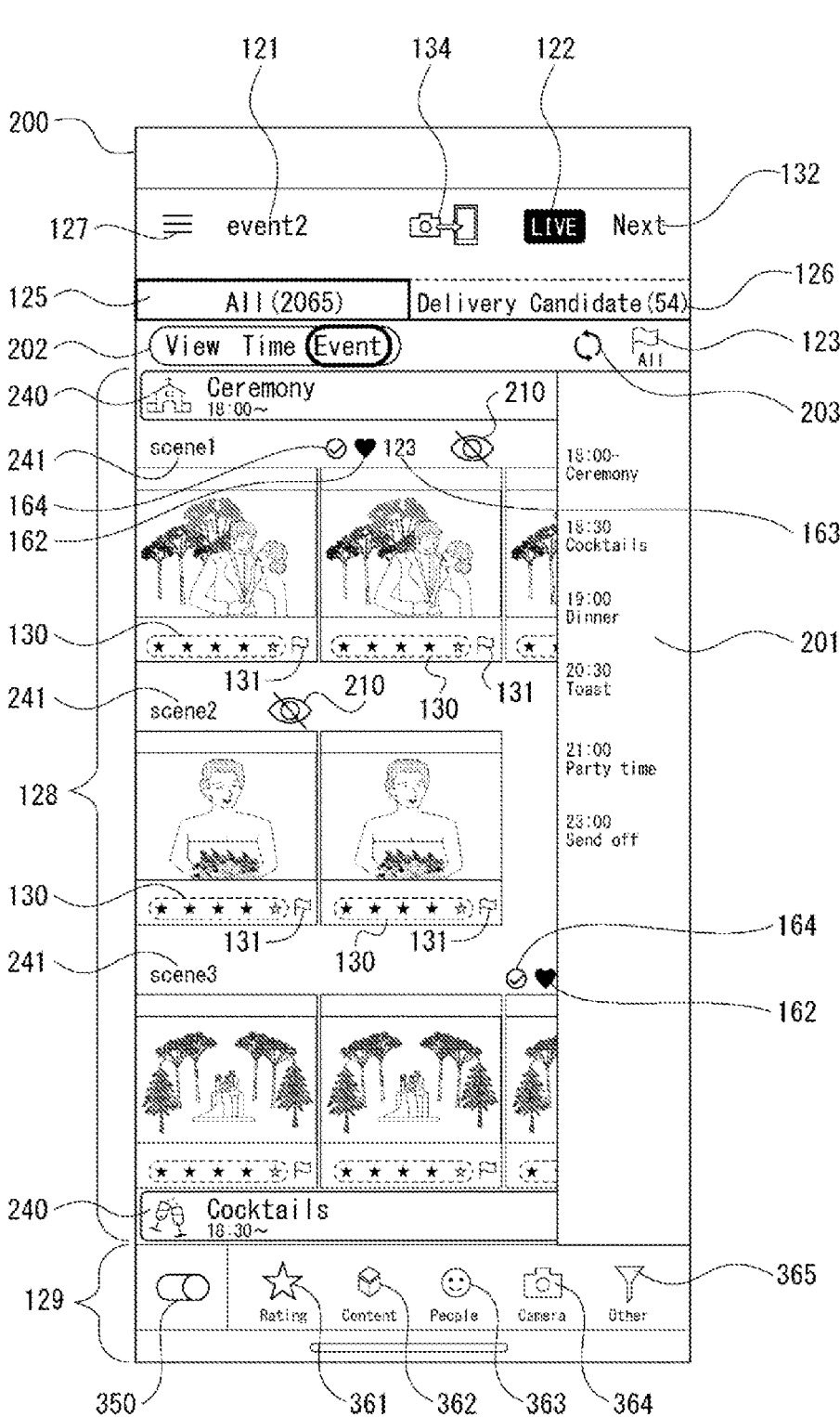
FIG. 25 is an explanatory diagram illustrating an event view in the embodiment.
Figure 26:
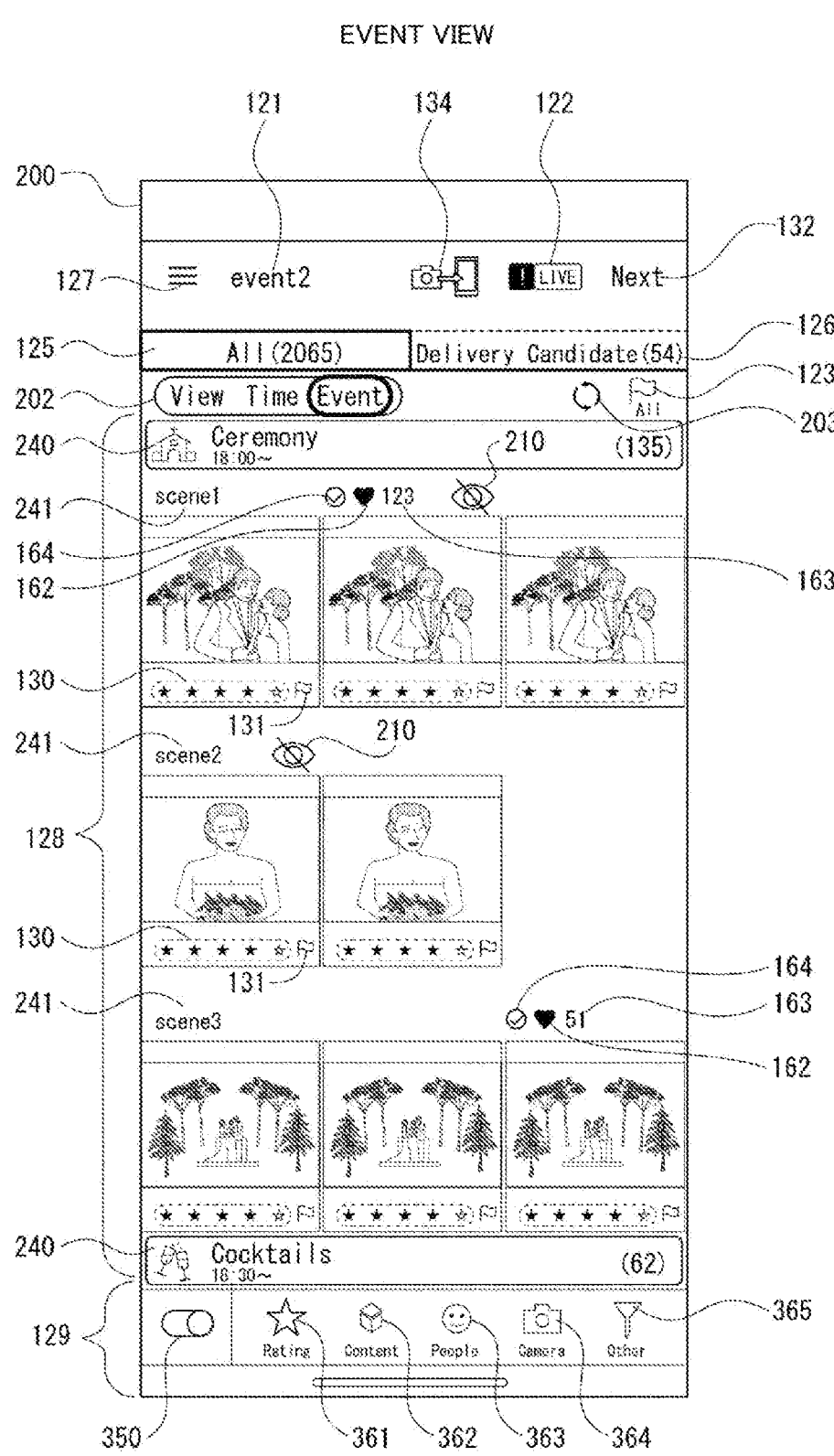
FIG. 26 is an explanatory diagram illustrating an event view in the embodiment.

In addition, in the event image list display in step S211 of FIG. 17, the staff terminal 1 may display an event view 200, such as that illustrated in FIGS. 25 and 26, rather than the time view 120.

The image area 128 is also provided in the event view 200, and the images are displayed in a list, but in this case, breaks such as sub-events, scenes, and the like are set for each image, and the list is displayed in units of sub-events and scenes. Sub-events and scenes are obtained by subdividing an event, such as a wedding ceremony, in chronological order. For example, when a wedding ceremony and a wedding reception are taken as a single event, there are a variety of events which serve as breaks, such as the ceremony, the wedding reception, greetings, cutting the cake, making a toast, throwing the bouquets, and the like. Although the details of the breaks can be determined as desired, for example, when, for example, a wedding ceremony sequence is taken as an event, the individual events into which the ceremony is divided will be called "sub-events" for descriptive purposes. A single sub-event may be further divided by determining to split the sub-event in two levels. The result of this division will be called a "scene".

FIG. 25 illustrates a state in which an index bar 201 is displayed in the event view 200, and FIG. 26 illustrates a state in which the index bar 201 is not displayed.

In the time view 120 and the event view 200, a project name 121 is displayed, as well as the live icon 122, a flag all icon 123, a next icon 132, the communication icon 134, the menu icon 127, and the like.

The menu icon 127 is an operator for displaying various menu items.

The communication icon 134 is an icon for displaying the state of FTP communication with the image capturing device 2 and the like.

The flag all icon 123 is an operator for setting the selection flags, which indicate whether the images are to be used in the image collection, on or off for all of the images.

The next icon 132 is an operator for transitioning to the next screen.

The live icon 122 is an operator that presents the state of the live gallery and displays the management panel 300 of the live gallery.

The display form of the live icon 122 changes between an execution period and a non-execution period of the live gallery. "Execution period" as used here refers to a period in which the captured images are set to be uploaded to (candidates for) the live gallery. Specifically, a period from when the start button 301 of the management panel 300, which will be described later, is operated, to when a stop button 302 is operated, corresponds to the execution period, and other periods correspond to non-execution periods. "Non-execution period" as used here does not correspond to a period in which the distribution itself of the live gallery is not being performed by the server device 4. Instead, this is merely a period in which the camera staff is not transferring images to the server device 4 as images for the live gallery. Accordingly, even during the non-execution period, the live gallery itself may continue, and images are transferred from the staff terminal 1 to the server device 4 upon being captured.

During the non-execution period, the live icon 122 is displayed, for example, as text reading "!LIVE", with the "!" displayed in red and the "LIVE" displayed in white, as indicated in FIG. 23, which enables the camera staff to recognize that the distribution has not yet been started.

During the execution period, the live icon 122 is displayed with the text reading "LIVE" displayed in green, for example, as indicated in FIG. 25, which enables the camera staff to recognize that the captured images are being distributed.

As described above, the image area 128 is provided in the time view 120 and the event view 200, and the images transferred from the image capturing device 2 are displayed as thumbnails in a list, but the all tab 125 in the candidate tab 126 are provided for the display of the image area 128.

When the all tab 125 is selected, the images transferred from the image capturing device 2 are displayed in the image area 128 regardless of whether the selection flags are on or off. For example, FIG. 23 is assumed to be a list display in which the all tab 125 is selected.

Figure 27:
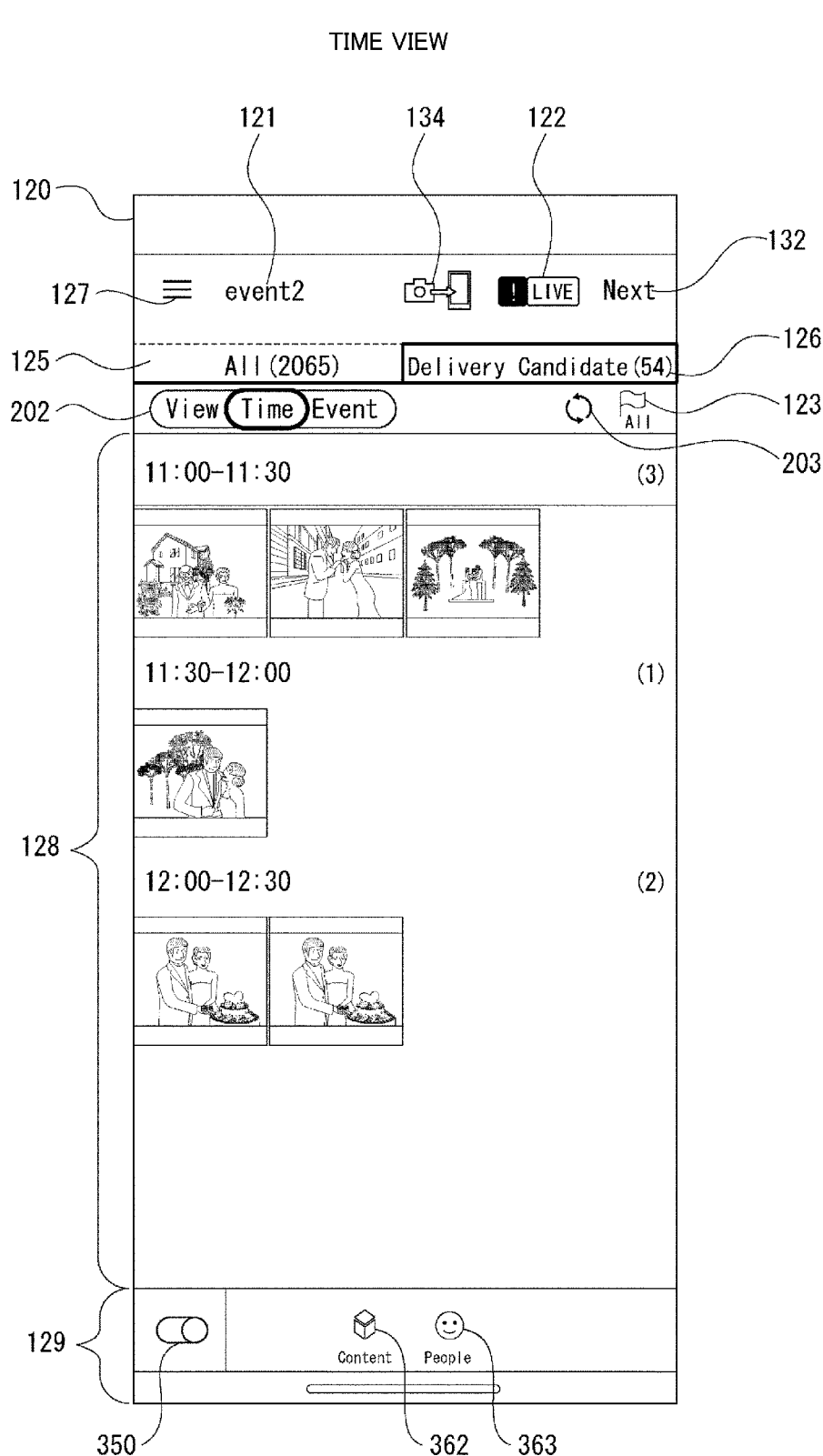
FIG. 27 is an explanatory diagram illustrating a time view candidate tab screen in the embodiment.

On the other hand, when the candidate tab 126 is selected, only the images, among all of the images transferred from the image capturing device 2, for which the selection flag is set to on are displayed in a list in the image area 128. For example, FIG. 27 illustrates an example of a list display when the candidate tab 126 is selected. The selection flag is set to on or off based on whether the camera staff decides to use each individual image in the web gallery.

The number of corresponding images is also displayed in the all tab 125 and the candidate tab 126. The "2065" in FIG. 23 is the number of images displayed in the all tab 125, and the "54" is the number of images displayed in the candidate tab 126. Note that if the number of images displayed in the all tab 125 or the candidate tab 126 has been narrowed down through the filter processing described later, the number of images displayed may be set to the number obtained after the narrowing down. Alternatively, the number displayed may not be changed, and the overall number may be indicated instead, even if filter processing is performed.

A switch view button 202 is displayed in the time view 120 and the event view 200. The time view 120 is displayed in response to "Time" being selected as indicated in FIG. 23. The event view 200 is displayed in response to "Event" being selected as indicated in FIG. 25.

For the list display, the user can switch between the time view 120 and the event view 200 as desired. For example, the view alternates between "Time" and "Event" each time the switch view button 202 is tapped.

An eyes closed icon 210 may be displayed, as indicated in FIGS. 24B, 24C, and 25, for each image in the image area 128 of the time view 120 and the event view 200.

This uses an icon to indicate that a subject person in the image has their eyes closed, using closed eye information, which is one piece of information in the above-described analysis information.

In particular, when comparatively small thumbnail images are displayed as indicated in FIGS. 24B and 25, it can be difficult to determine whether a person has their eyes closed. Using the eyes closed icon 210 to present an indication that the eyes are closed is useful for the camera staff when confirming the images.

However, this example assumes that the eyes closed icon 210 is not displayed in FIG. 24A. This is because when viewing a large number of images at once by making the thumbnail images extremely small, displaying the eyes closed icon 210 complicates the screen. On the other hand, an example in which the eyes closed icon 210 is displayed even in such a case is also conceivable.

In addition, a rating icon 130 and a flag setting icon 131 are displayed in correspondence with the image, as indicated in FIGS. 24B, 24C, and 25, for each image in the image area 128 in the time view 120 and the event view 200.

The rating icon 130 not only displays the rating information, in which a number of stars is set, but also serves as an operator for changing the rating. For example, the number of stars can be changed by tapping or sliding the part corresponding to the rating icon 130, and this is a rating change operation.

The flag setting icon 131 indicates whether the selection flag is on or off by changing the color or brightness of the icon or the like, for example. The flag setting icon 131 is also used as an operator to switch the selection flag on and off. For example, the selection flag can be switched on or off through a tapping operation.

Note that in FIG. 24A, the rating icon 130 and the flag setting icon 131 are not displayed. This is so that the rating icon 130 and the flag setting icon 131 are displayed when the display corresponding to the image takes on a size that is easy to see or easy to manipulate, as illustrated in FIG. 24B.

Of course, even in the state illustrated in FIG. 24A, the rating icon 130 and the flag setting icon 131 may be displayed corresponding to the image.

A high rating mark 162, a high rating number 163, and a distribution mark 164 may be displayed for the images displayed in the image area 128 in the time view 120 and the event view 200.

The distribution mark 164 indicates that the image has been uploaded to the live gallery.

The high rating mark 162 is a mark shown for an image in which the viewer of the live gallery has made a high rating operation.

A number indicating how many of the viewers of the live gallery have made the high rating operation is displayed as the high rating number 163.

A filter designation area 129 is also provided in the time view 120 and the event view 200.

A filter on/off button 350 that enables/temporarily disables filtering is provided in the filter designation area 129.

Icons indicating a rating filter 361, a content filter 362, a people filter 363, a camera filter 364, and an other filter 365 are displayed in the filter designation area 129 as displays indicating a variety of filters.

The camera staff can set various filter conditions and execute filtering by operating the filter designation area 129 in this manner. This will be described in detail later.

Figure 28:
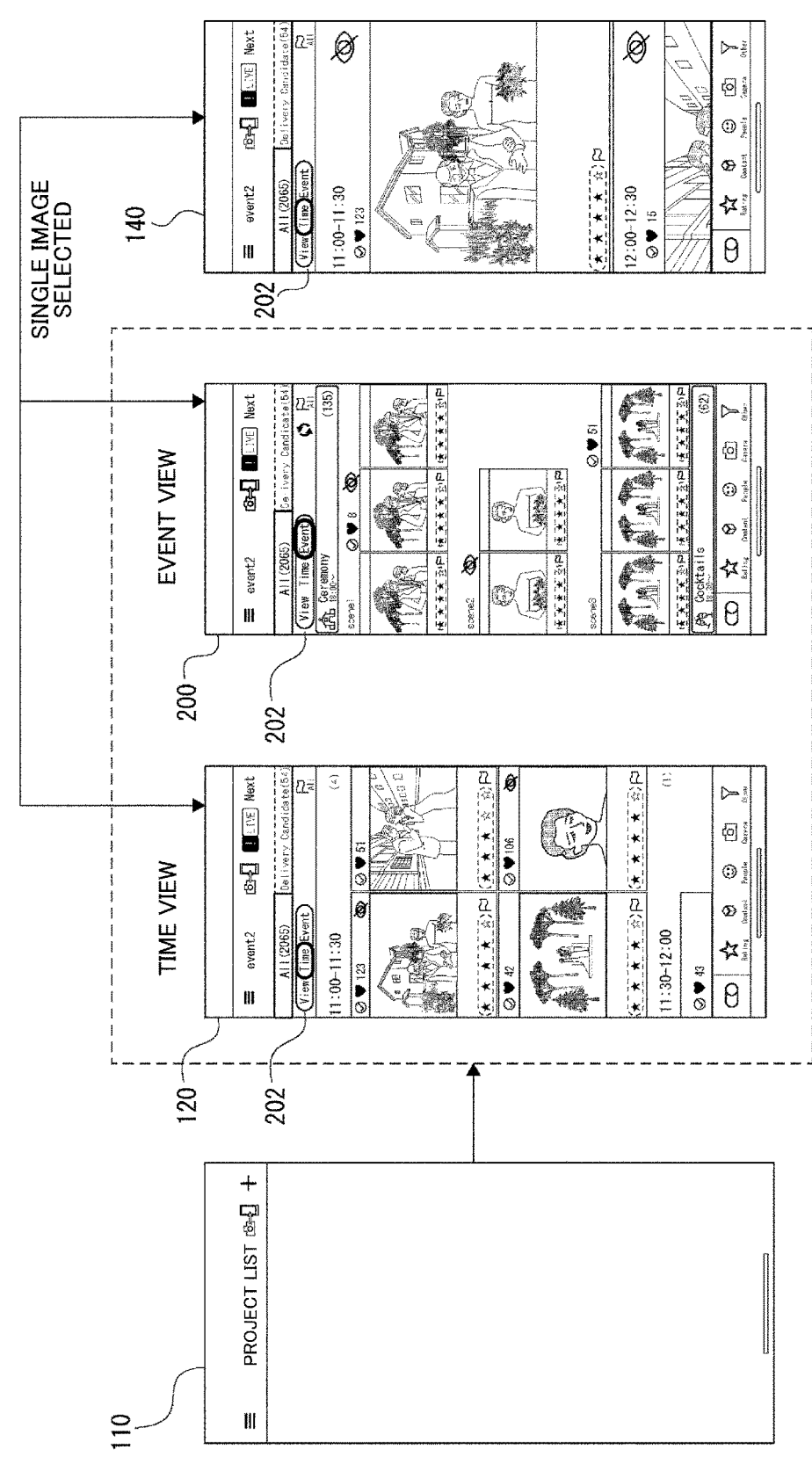
FIG. 28 is an explanatory diagram illustrating view switching in the embodiment.

FIG. 28 illustrates the display switching between the time view 120 and the event view 200, as described above, and a single image display screen 140, which will be described later.

As described above, the display is switched to the project list screen 110, the time view 120, or the event view 200 in step S211 of FIG. 17. It is conceivable that which view is displayed at this time is the last view that was selected for that event the last time the event was viewed. The camera staff can then switch between the time view 120 and the event view 200 at any time using the switch view button 202.

When a single image is selected from the time view 120 or the event view 200, the display transitions to the single image display screen 140. When a return icon 133 in the single image display screen 140 is operated, the display returns to the time view 120 or the event view 200 as the list state from before transitioning to the single image display screen 140.

The differences between the time view 120 and the event view 200 are as follows. In the time view 120 in FIG. 23, the images are simply arranged in chronological order by image capture time. The user can confirm each image by scrolling in the vertical direction. However, in other words, if an image of a desired sub-event is to be confirmed, the desired image cannot be reached without scrolling for a long time in the vertical direction while aiming for the general time of that image.

In contrast, in the event view 200 illustrated in FIGS. 25 and 26, the scenes are arranged in the vertical direction, with a plurality of images for each scene arranged in the horizontal direction. When searching for an image in a scene, each image of that scene is displayed in the image area 128 by scrolling horizontally. Sub-events and scenes are arranged in the vertical direction, and thus if there is a sub-event for which the images are to be confirmed, it is possible to reach the scene of that sub-event relatively quickly by scrolling in the vertical direction. The index bar 201 can also be used to specify a desired sub-event or scene and jump to that location.

Moreover, the images of the scene to be confirmed are arranged in the horizontal direction, which makes it easy to compare the images.

Based on this, the event view 200 has advantages in that it is easier to access each image than when in the time view 120, and it is also easier to compare the images from the same scene for the purpose of making selections.

Although a plurality of images from a single scene are arranged in the horizontal direction in a single row, when the number of images in a scene becomes too high, the horizontal scrolling may take longer and hamper the usability. Accordingly, an upper limit is set for the number of images arranged in the horizontal direction. For example, 30 is set as the upper limit on the number of images arranged in the horizontal direction. If the number of images in the scene exceeds that number, the remaining images are arranged horizontally using the following line.

Accordingly, the images of a scene may be displayed across a plurality of lines.

Figure 19:
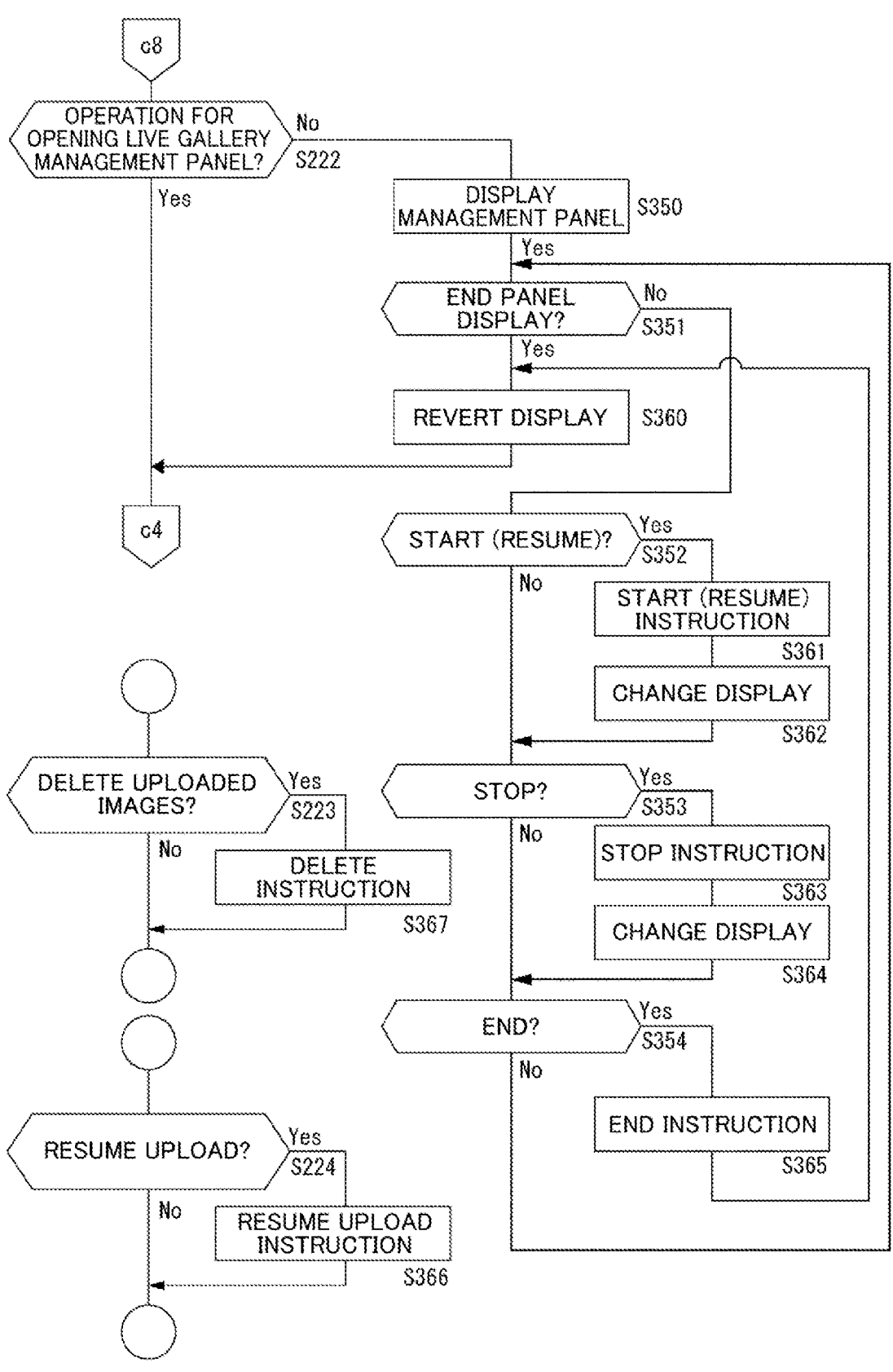
FIG. 19 is a flowchart illustrating UI-related processing by a staff terminal in the embodiment.

The staff terminal 1 processes the monitoring loop from step S212 to step S222 of FIG. 19 when the time view 120 or the event view 200 described above is displayed in step S211 of FIG. 17.

In step S212 of FIG. 17, the staff terminal 1 monitors the operation of the next icon 132. Processing performed when the operation of the next icon 132 is detected will be described later.

In step S213, the staff terminal 1 monitors tab switching operations. The tab switching operation is an operation of the candidate tab 126 when a list is being displayed in the all tab 125, or an operation of the all tab 125 when a list is being displayed in the candidate tab 126.

Upon detecting a tab switching operation, the staff terminal 1 performs processing for switching the content of the list display in the image area 128 in step S240 according to the tab which has been selected.

Note that the processing pertaining to filtering is also performed when the tabs are switched, and this will be described in detail later.

In step S214, the staff terminal 1 monitors the operations performed by the camera staff with respect to the screen state made in the image area 128.

The operations with respect to the screen state referred to here are operations for zooming in/zooming out on an image, scrolling through the screen, showing/hiding display items, and the like.

For example, the staff terminal 1 monitors pinching operations. Here, the pinching operations are a pinch-out operation for zooming out from an image and a pinch-in operation for zooming in on an image.

Upon detecting a pinching operation, in step S241, the staff terminal 1 zooms in or zooms out the display state in the image area 128.

FIGS. 24A, 24B, and 24C illustrate examples of changes in the display in the image area 128 in response to a pinch-in/pinch-out.

FIG. 24A illustrates a display state in which the thumbnail images are the smallest. When a pinch-out operation is made, the images displayed as a list are enlarged, as indicated in FIG. 24B. Making another pinch-out operation enlarges the images as illustrated in FIG. 24C.

When a pinch-in operation is made, the images are reduced from the state illustrated in FIG. 24C to the state illustrated in FIG. 24B, and the display returns to the state illustrated in FIG. 24A when another pinch-in operation is made.

In addition, whether to display the eyes closed icon 210, the rating icon 130, the flag setting icon 131, and the like is switched in response to zooming in/zooming out as described above.

In step S214, the staff terminal 1 also monitors swipe operations. For example, in the time view 120 illustrated in FIG. 23 and the event view 200 illustrated in FIG. 25, a vertical swipe operation is recognized as a scroll operation in the vertical direction, and causes the display to be scrolled vertically in step S241.

The staff terminal 1 also recognizes a horizontal swipe operation in the event view 200 as a scroll operation in the horizontal direction, and the staff terminal 1 causes the display to be scrolled horizontally in step S241.

Figure 22:
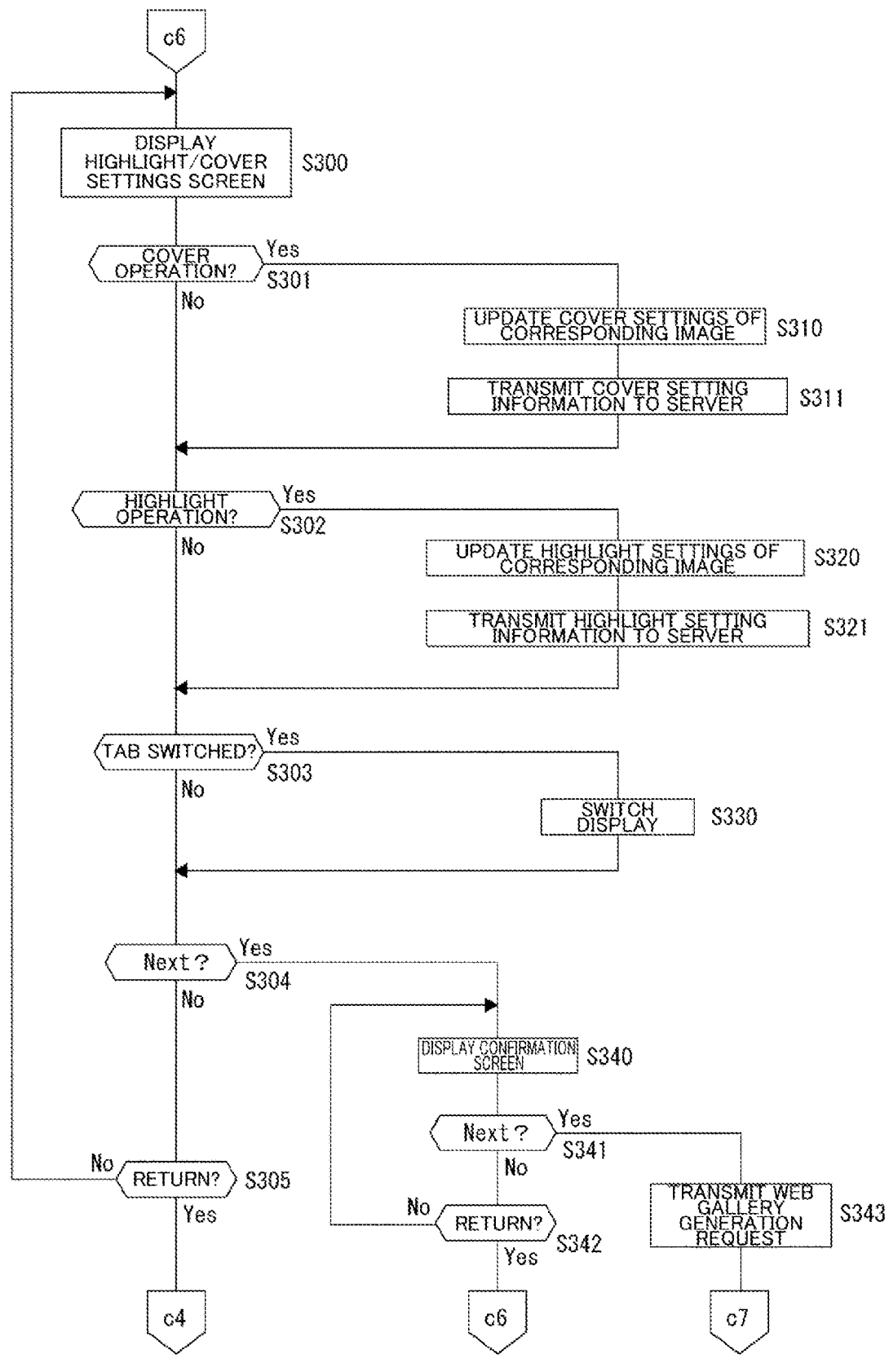
FIG. 22 is a flowchart illustrating UI-related processing by a staff terminal in the embodiment.

The staff terminal 1 also recognizes a swipe operation in the right direction on the index bar 201 in the event view 200 as an operation to clear the index bar 201, for example, and recognizes a swipe operation from the right end of the screen to the left in the state illustrated in FIG. 22 as an operation to call the index bar 201. Then, in step S241, the display is controlled to close or display the index bar 201.

In step S215 of FIG. 17, the staff terminal 1 monitors whether one of the images displayed in the image area 128 has been subjected to a selection operation. This is an operation such as tapping a single thumbnail image, for example. Processing performed when this selection operation is detected will be described later.

In step S216, the staff terminal 1 monitors operations in the filter designation area 129. This is an operation of the filter on/off button 350, the operation of the rating filter 361, the content filter 362, the people filter 363, the camera filter 364, and the other filter 365, or the like.

Upon detecting any of these operations, the staff terminal 1 performs processing corresponding to the operation in step S242. Specifically, the display is updated in response to filtering being activated or deactivated by operating the filter on/off button 350, a screen transition is performed in response to an icon such as the rating filter 361 being operated, and the like.

In step S217, the staff terminal 1 monitors filter operations. This is mainly the operation pertaining to the filter conditions made in the screen transitioned to from the rating filter 361, the content filter 362, the people filter 363, the camera filter 364, and the other filter 365.

If a filter operation is detected, the staff terminal 1 moves the sequence to step S243, sets and stores the filter conditions in accordance with the operations, performs filtering processing in accordance with the filter conditions, and extracts the corresponding images. The images extracted as a result of the filtering are then displayed in the image area 128.

Specific examples of the processing of step S242, step S243, and the like will be described later.

Figure 18:
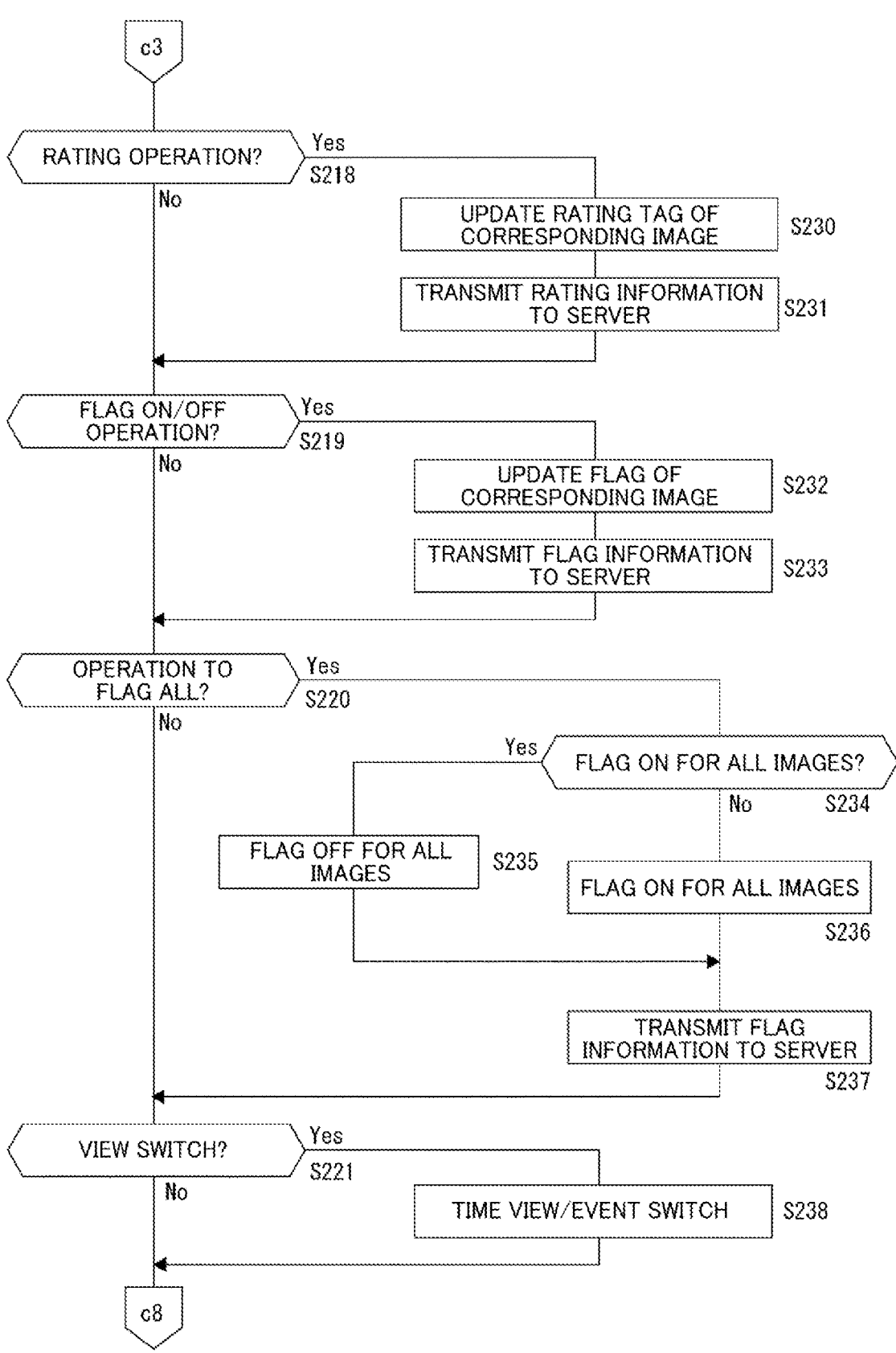
FIG. 18 is a flowchart illustrating UI-related processing by a staff terminal in the embodiment.

Next, in step S218 of FIG. 18, the staff terminal 1 monitors rating operations.

These are, for example, operations of the rating icon 130 such as that indicated in FIGS. 24B, 24C, and 25.

If an operation of the rating icon 130 is detected, the staff terminal 1 moves the sequence to step S230 and updates the event data 60 such that the rating information of the image corresponding to the rating icon 130 takes on a value corresponding to the operation.

In step S231, the staff terminal 1 transmits the updated rating information to the server device 4 such that the event data 90 is updated on the server device 4 side. In other words, a state of synchronization is maintained.

In step S219, the staff terminal 1 monitors flag on/off operations. This is, for example, an operation made on the flag setting icon 131 illustrated in FIGS. 24B, 24C, and 25.

If an operation made on the flag setting icon 131 is detected, the staff terminal 1 moves the sequence to step S232 and updates the event data 60 such that the selection flag is switched on or off as the selection information of the image corresponding to that flag setting icon 131.

In step S233, the staff terminal 1 transmits the updated flag information to the server device 4 such that the event data 90 is updated on the server device 4 side. In other words, a state of synchronization is maintained.

In step S220, the staff terminal 1 monitors the operation of the flag all icon 123. If an operation made on the flag all icon 123 is detected, the staff terminal 1 moves the sequence to step S234, where the processing branches according to whether the selection flags of all the images is currently on. If some of the images are flagged or all of the images are not flagged, and all of the images are flagged, the staff terminal 1 moves the sequence to step S236 and updates the event data 60 such that all of the images are flagged.

On the other hand, if the flag all icon 123 has been operated when all images are flagged, the staff terminal 1 moves the sequence to step S235 and updates the event data 60 such that all of the images are not flagged.

In step S237, the staff terminal 1 transmits the updated flag information to the server device 4 such that the event data 90 is updated on the server device 4 side. In other words, a state of synchronization is maintained.

In step S221, the staff terminal 1 monitors view switching operations. In other words, whether the display of the time view 120 has been instructed by the switch view button 202 being operated in the state in which the event view 200 is displayed, or whether the display of the event view 200 has been instructed by the switch view button 202 being operated in the state where the time view 120 is displayed, is monitored.

When an operation on the switch view button 202 is detected, the staff terminal 1 moves the sequence to step S238 and performs view switching processing. In other words, if the time view had been displayed until then, the view is switched to the event view. If the event view had been displayed until then, the view is switched to the time view.

In step S222 of FIG. 19, the staff terminal 1 monitors operations for opening the management panel 300 of the live gallery. This is, for example, the live icon 122 being operated.

If an operation for opening the management panel 300 is detected, the staff terminal 1 moves the sequence to step S350 and displays the management panel 300.

Although the management panel 300 is also illustrated in FIG. 14A, the staff terminal 1 displays the management panel 300 superimposed on the display of the time view 120 or the event view 200. It is conceivable to gray out the display content of the time view 120 or the event view 200, for example, to disable operations thereof while the management panel 300 is being displayed.

Figure 30:
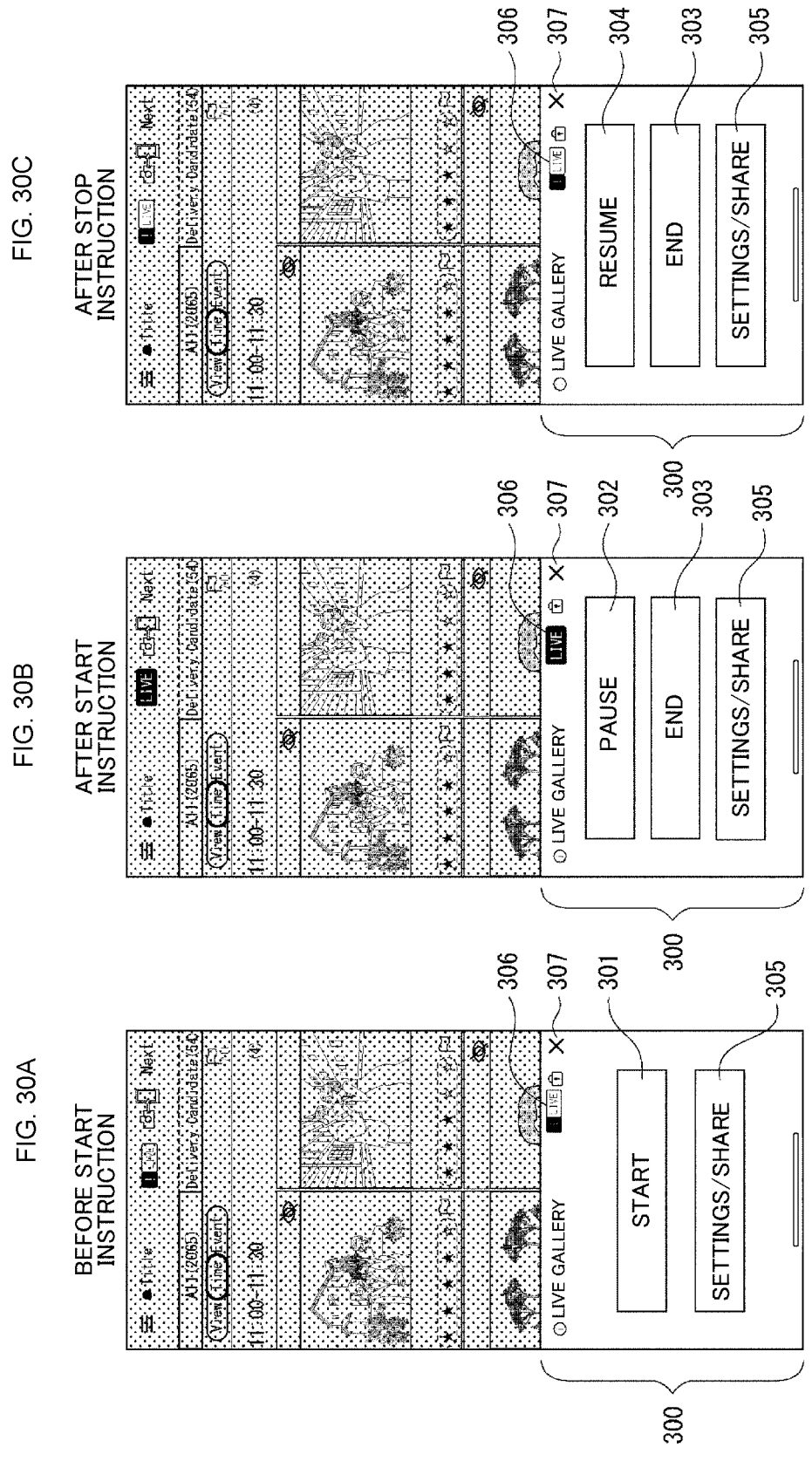
FIGS. 30A, 30B, and 30C are explanatory diagrams illustrating a live gallery operation screen in the embodiment.
FIGS. 32A, 32B, 32C, 32D, 32E, 32F, 32G, and 30H is an are explanatory diagrams illustrating screen transitions in the embodiment.

FIG. 30A illustrates an example of the management panel 300 prior to the live gallery distribution start instruction. In this case, the start button 301 and the settings/share button 305, such as those described with reference to FIG. 14A, are displayed in the management panel 300. A live icon 306 and a close button 307 are also displayed.

The display form of the live icon 306 in the management panel 300 is similar to the display form of the live icon 122 in the time view 120 or the event view 200. Accordingly, in the case of FIG. 30A, the live icon 306 reads "!LIVE", and indicates the non-execution period for which no start instruction has yet been made with respect to the live gallery.

The display content of the management panel 300 varies depending on the state as indicated in FIGS. 30B and 30C. FIG. 30B illustrates a state in which captured images being distributed after the instruction to start distributing the live gallery has been made. In this case, the live icon 306 serves as an indication of the execution period, and a stop button 302 for making a stop instruction and an end button 303 for making an end instruction are displayed instead of the start button 301.

FIG. 30C illustrates a state in which the live gallery distribution is stopped. In this case, the live icon 306 serves as a display indicating the non-execution period, and a resume button 304 and the end button 303 are displayed.

Note that "stop instruction" means "pausing", which is a state where the live gallery is not ended but the captured images are not being distributed through the live gallery.

On the other hand, "end instruction" refers to terminating the transfer of new images to be distributed through the live gallery.

After the staff terminal 1 displays the management panel 300 illustrated in FIG. 30A in step S350 of FIG. 19, the staff terminal 1 performs the monitoring processing from step S351 to step S354.

In step S351, operations for ending the display of the management panel 300, i.e., the close button 307 being operated, are monitored. Upon detecting the close button 307 being operated, the staff terminal 1 ends the display of the management panel 300 in step S360 and returns to the display of the original time view 120 or the event view 200.

The close button 307 illustrated in FIGS. 30A, 30B, and 30C is always displayed in the management panel 300, and the user can close the management panel 300 as desired by operating this button. Note that this operation is an operation for closing the management panel 300, and does not change the execution state, standby state, or the like of the live gallery.

The user can perform an operation for making a start instruction or a resume instruction in the display state of the management panel 300 illustrated in FIG. 30A or 30C. That is, the start button 301 or the resume button 304 can be operated. If these operations are detected, the staff terminal 1 moves the sequence from step S352 to step S361, and performs processing for transmitting a start instruction or a resume instruction to the server device 4 for the distributed images.

The "start instruction" in this case means instructing the server device 4 to use the images captured by the image capturing device 2 after that point in time as candidates for distribution through the live gallery. In response, the server device 4 selects images captured after that time and uploads the images to the live gallery.

Once the start instruction has been made, the staff terminal 1 changes the display in step S362. This is processing for changing the management panel 300 to the state illustrated in FIG. 30B.

In the display state of the management panel 300 illustrated in FIG. 30B, the user can perform an operation to make a stop instruction for the distribution. In other words, this is the stop button 302 being operated.

When the stop button 302 being operated is detected, the staff terminal 1 moves the sequence from step S353 to step S363 of FIG. 19, and performs processing for transmitting the stop instruction to the server device 4 for the images being distributed.

The "stop instruction" in this case means instructing the server device 4 not to use the images captured by the image capturing device 2 after that point in time as candidates for distribution through the live gallery. In response, the server device 4 does not use the images captured after that time for the live gallery unless the resume button 304 is operated.

Once the stop instruction has been made, the staff terminal 1 changes the display in step S364. This is processing for changing the management panel 300 to the state illustrated in FIG. 30C.

In the display state of the management panel 300 illustrated in FIG. 30B or 30C, the user can perform an operation for making an end instruction for the live gallery distribution. That is, the end button 303 is operated.

If the end button 303 being operated is detected, the staff terminal 1 moves the sequence from step S354 of FIG. 19 to step S365, and performs processing for transmitting the end instruction to the server device 4.

Note that when operating the end button 303, the sequence may move to step S365 after inserting a confirmation screen for indicating whether to end or cancel the end operation.

The end instruction notifies the server device 4 that the transfer of new images to be distributed through the live gallery is to be ended as described above, and has the meaning of ending the capturing of images for the live gallery. This is an operation for the camera staff to communicate to the server device 4 that although the live gallery itself need not be made unavailable for viewing immediately, the transfer of images to be used in the live gallery to the server device 4 is to be ended. In response, the server device 4 recognizes that the transfer of images for the live gallery has ended and performs the necessary processing. For example, counting of the passage of time from that point until the live gallery may be started. The server device 4 closes the live gallery after a predetermined period of time has passed, such as two hours after the end instruction, for example.

Once the end instruction is made in step S365, the staff terminal 1 closes the management panel 300 in step S360 and returns the screen to the original time view 120 or the event view 200.

Following the monitoring processing performed up to step S222 as described above, the staff terminal 1 returns the sequence to step S211 of FIG. 17 and repeats the monitoring processing.

The progress of the live gallery, implemented by processing performed in response to the management panel 300 being operated, will be described with reference to FIG. 31.

Figure 31:
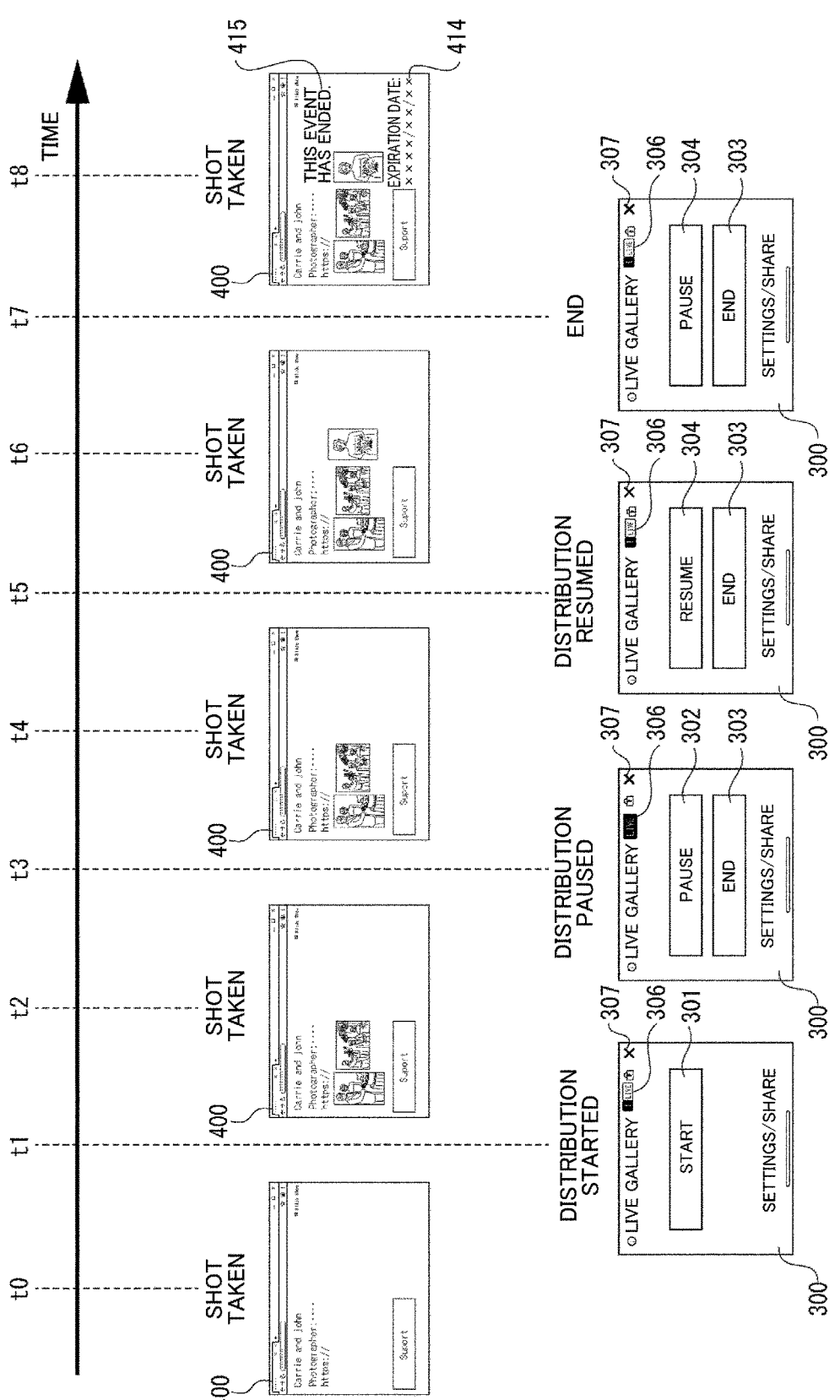
FIG. 31 is an explanatory diagram illustrating progress of a live gallery in the embodiment.

In FIG. 31, the transitions of the images displayed in the live gallery viewing screen 400 viewed by a remote attendee, and the state of the management panel 300 of the staff terminal 1, are illustrated in chronological order.

Time t0 is before the start of the live gallery, and there are no images that can be viewed in the live gallery viewing screen 400.

Assume that the start button 301 is operated in the staff terminal 1 at time t1.

Captured images in the image capturing device 2 from that point on are candidates to be uploaded to the live gallery, and some of these images are selected by the server device 4 and uploaded to the live gallery.

Accordingly, at time t2, the remote attendee can view some images in the live gallery viewing screen 400.

Assume that the stop button 302 is operated in the staff terminal 1 at time t3. Captured images in the image capturing device 2 from that point on are excluded from the live gallery.

Accordingly, at time t4, the captured images captured after time t3 are not added even if the remote attendee views the live gallery viewing screen 400.

Assume that the resume button 304 is operated in the staff terminal 1 at time t5. Captured images in the image capturing device 2 from that point on are candidates to be uploaded again to the live gallery, and some of these images are selected by the server device 4 and uploaded to the live gallery.

Accordingly, at time t6, the remote attendee can view the newly-added images in the live gallery viewing screen 400.

Assume that the end button 303 is operated in the staff terminal 1 at time t7. At this point, the transfer of images used for the live gallery from the staff terminal 1 to the server device 4 is ended. In other words, the server device 4 is notified that the resume button 304 will not be operated. Accordingly, uploading of new images to the live gallery by the server device 4 is also ended. Although details will be given later, there are cases where an image which has been captured before the stop instruction and has been transferred at a delay is uploaded.

At time t8, the server device 4 makes a notification of the end of the live gallery event in the live gallery, and closes the live gallery at a predetermined time.

In this manner, images captured by the image capturing device 2 between when the camera staff operates the start button 301 and when the camera staff operates the stop button 302 serve as distribution candidates for the live gallery, and the images selected by the server device 4 are uploaded to the live gallery.

An example of a screen transition executed through the processing illustrated in FIG. 19 will also be described.

Figure 32:
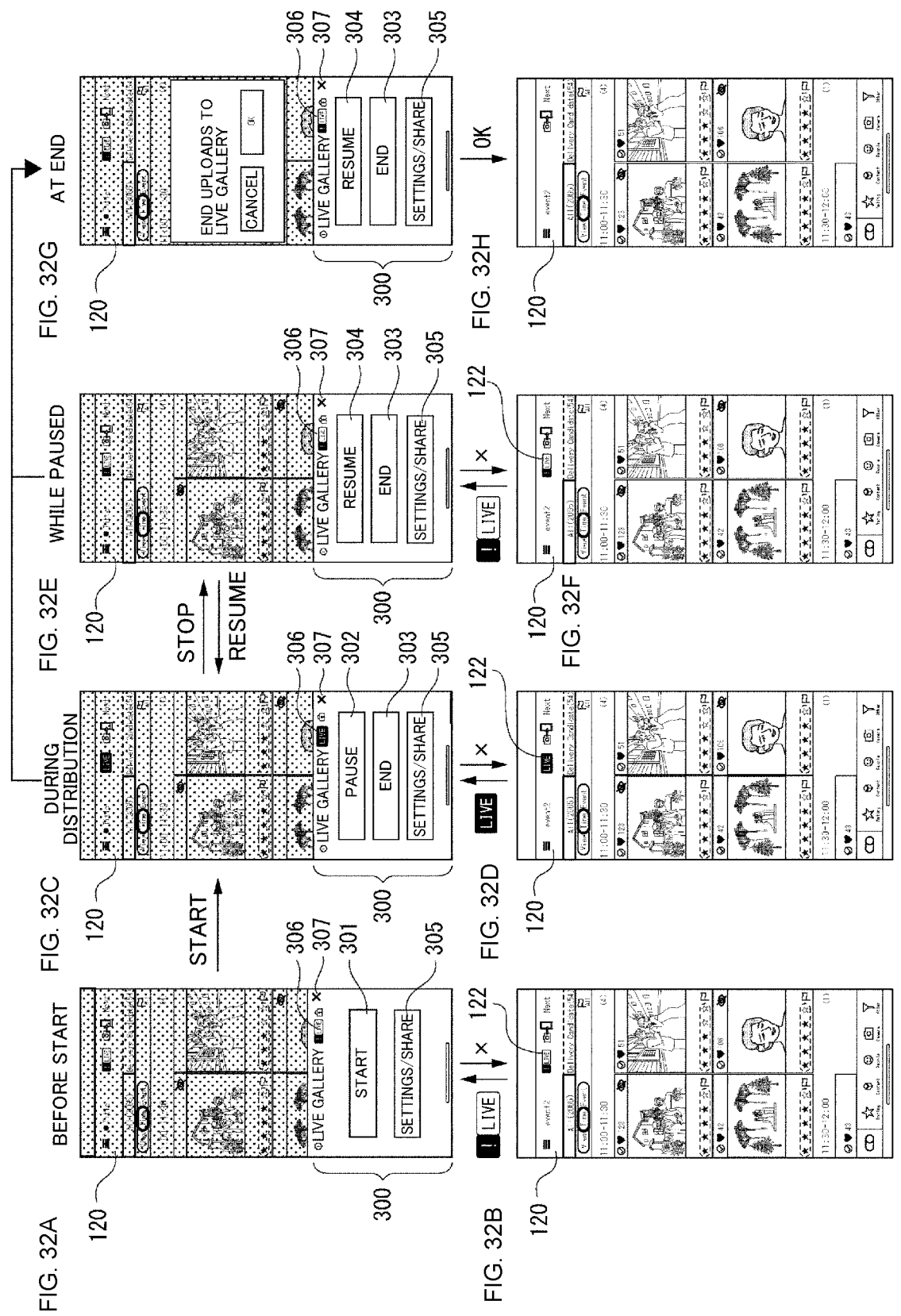

FIG. 32B illustrates a time view 120 prior to the start of the live gallery. The live icon 122 indicates that the period is the non-execution period.

The management panel 300 is displayed as illustrated in FIG. 32A in response to the live icon 122 being operated in this state, for example. The live icon 306 indicates that the period is the non-execution period.

The view returns to the time view 120 illustrated in FIG. 32A in response to the close button 307 being operated in the management panel 300 illustrated in FIG. 32A.

The management panel 300 enters the state illustrated in FIG. 32C in response to the start button 301 being operated in the management panel 300 illustrated in FIG. 32A. The live icon 306 changes to a state indicating that the period is the execution period.

The view returns to the time view 120 illustrated in FIG. 32D in response to the close button 307 being operated in the management panel 300 illustrated in FIG. 32C. At this time, the live icon 122 indicates that the period is the execution period.

The management panel 300 illustrated in FIG. 32C is opened in response to the live icon 122 being operated in the time view 120 illustrated in FIG. 32D.

The management panel 300 enters the state illustrated in FIG. 32E in response to the stop button 302 being operated in the management panel 300 illustrated in FIG. 32C. The live icon 306 changes to a state indicating that the period is the non-execution period.

The view returns to the time view 120 illustrated in FIG. 32F in response to the close button 307 being operated in the management panel 300 illustrated in FIG. 32E. At this time, the live icon 122 indicates that the period is the non-execution period.

The management panel 300 illustrated in FIG. 32E is opened in response to the live icon 122 being operated in the time view 120 illustrated in FIG. 32F.

The management panel 300 enters the state illustrated in FIG. 32C in response to the resume button 304 being operated in the management panel 300 illustrated in FIG. 32E.

The management panel 300 enters the state illustrated in FIG. 32G in response to the end button 303 being operated in the management panel 300 illustrated in FIG. 32C or 32E. An example of displaying a confirmation screen for ending is illustrated here. If the camera staff makes an operation to cancel the end operation, the state returns to that illustrated in FIG. 32C or 32E.

If the end operation is accepted, the view returns to the time view 120 illustrated in FIG. 32H. The time view 120 in this case is an example where the display of the live icon 122 is also ended in response to the end of the live gallery.

Although the foregoing has described screen transitions from the time view 120, the event view 200 may be thought of in the same way as the time view 120.

Incidentally, in addition to the operations made from the management panel 300 described above, the live gallery can also be operated from the live gallery settings screen 310 illustrated in FIG. 14B.

The camera staff can transition to the live gallery settings screen 310 using the settings/share button 305 in the management panel 300.

In this case, there are situations where the delete button 315 and the resume upload button 316 are operated, which are illustrated in FIG. 19.

If the live gallery settings screen 310 is opened and the delete button 315 being operated is detected, the staff terminal 1 moves the sequence from step S223 to step S367, and makes a delete instruction to the server device 4.

In this case, an operation for deleting all the images, operations for specifying and deleting individual images, and the like are possible, for example. When specifying and deleting individual images, the camera staff can delete an image displayed in a single image display area 142 from the live gallery by performing an operation such as tapping the distribution mark 164 illustrated in FIG. 29 in a state where the image is displayed in the single image display area 142. In response to the deletion operation by the camera staff, the staff terminal 1 transmits a delete instruction for all the images, a delete instruction for specified images, or the like to the server device 4. In response, the server device 4 performs processing for deleting the images from the live gallery.

This enables the camera staff to delete images from the live gallery even after the live gallery has been started, such as when an image which is not to their liking has been uploaded to the live gallery.

If the live gallery settings screen 310 is opened and the resume upload button 316 being operated is detected, the staff terminal 1 moves the sequence from step S224 to step S366, and makes a resume upload instruction to the server device 4.

This is processing for notifying the server device 4 that the transfer of images serving as upload candidates to the server device 4 will be resumed, for the live gallery for which the transfer of images to be uploaded has been ended due to the end button 303 being operated once.

In response, the server device 4 resumes the processing for uploading new images to the live gallery.

This enables the camera staff to resume uploading newly-captured images to the server device 4 as candidates for a live gallery that has been ended once. In response, the server device 4 resumes the processing of selecting the received images, and uploads the images to the live gallery.

This makes it possible to handle situations such as, for example, when the end button 303 is operated to end the transfer of images for the live gallery when the wedding ceremony or the wedding reception ends, but the transfer is to be resumed during an afterparty.

Processing performed when an image selection operation is detected in step S215 of FIG. 17 will be described next.

This is, in other words, a case where, while viewing, a user performs an operation for selecting a single image in the time view 120 or the event view 200.

Figure 20:
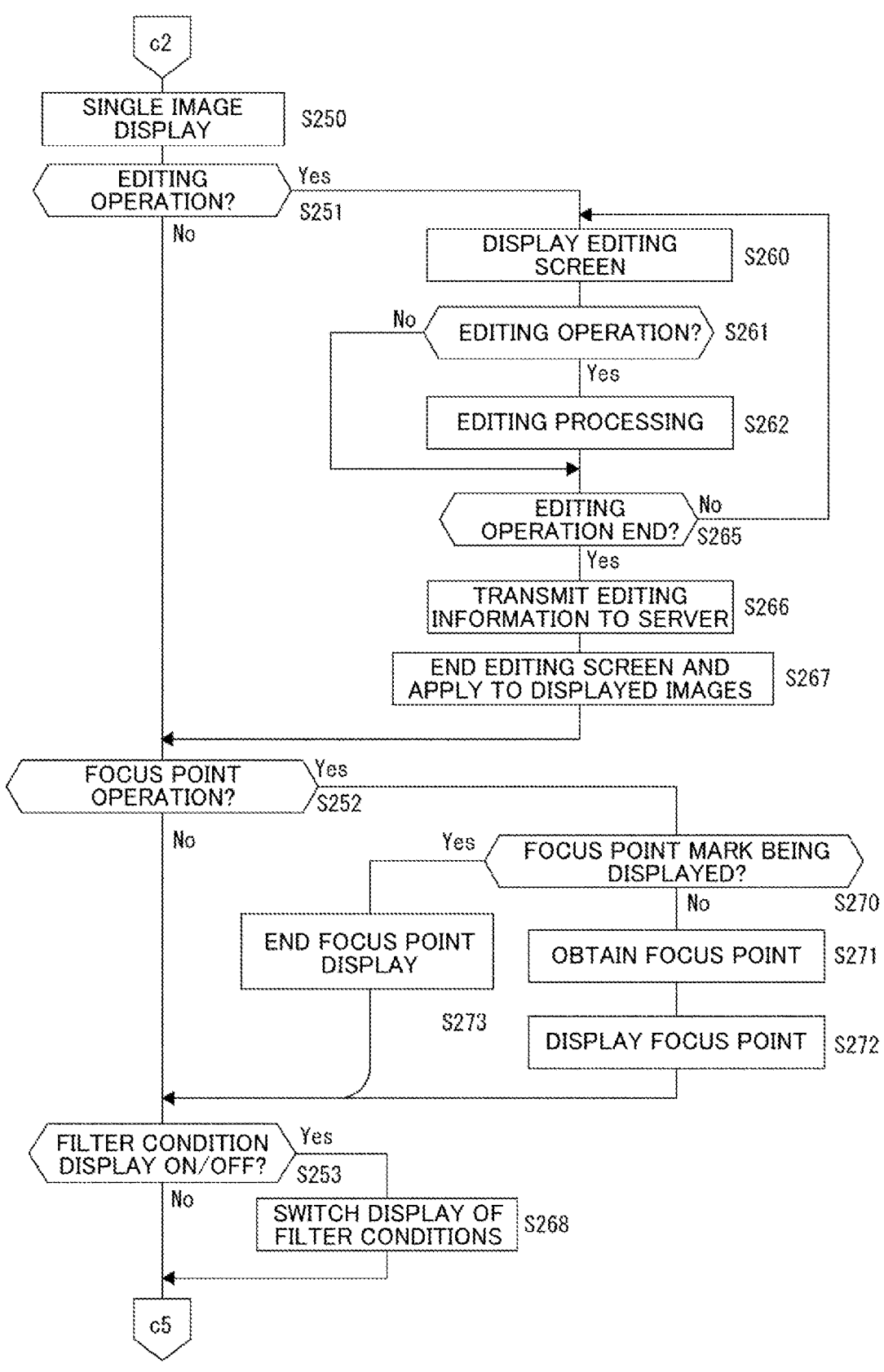
FIG. 20 is a flowchart illustrating UI-related processing by a staff terminal in the embodiment.
Figure 29:
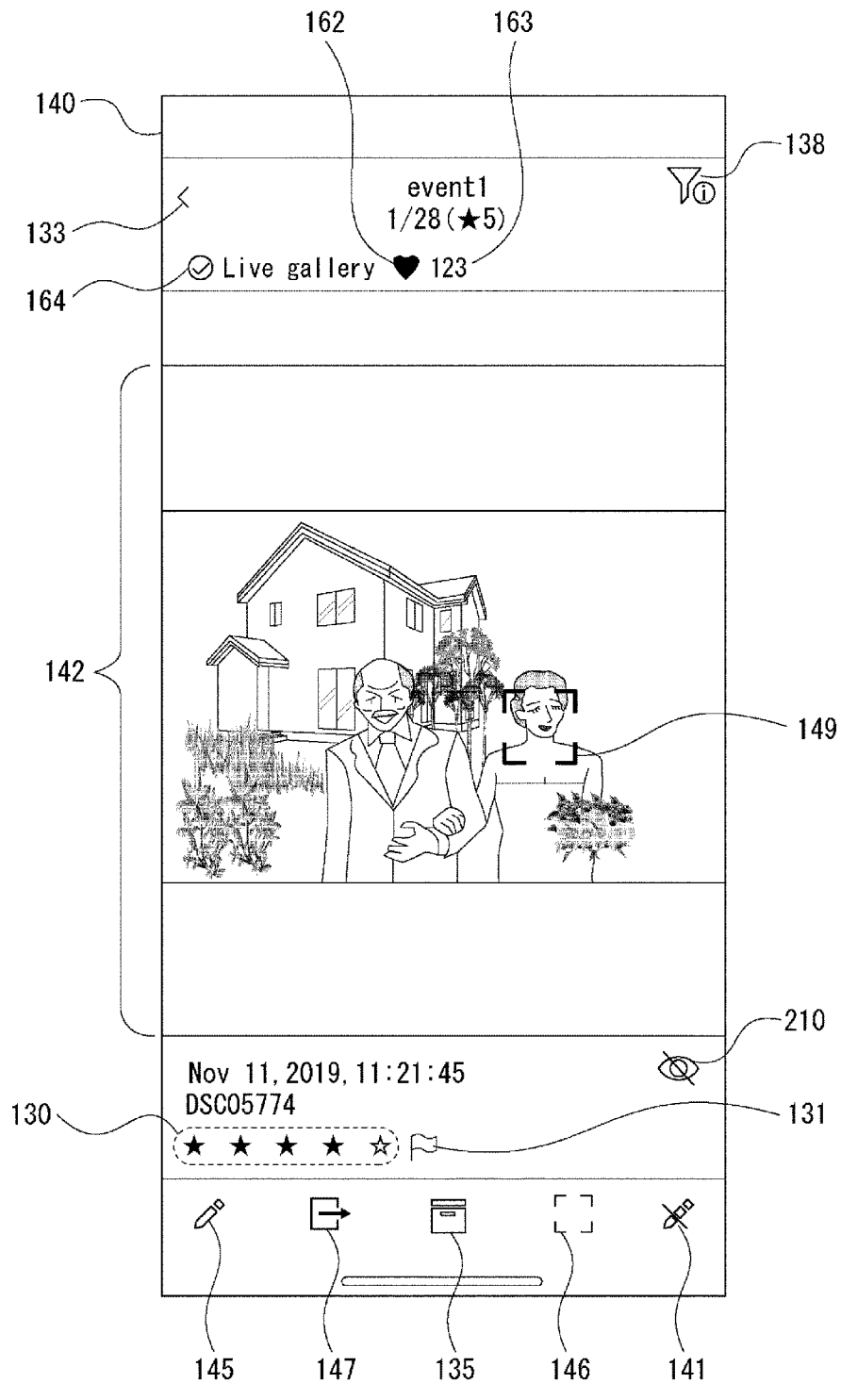
FIG. 29 is an explanatory diagram illustrating a single image display screen according to the embodiment.

In this case, the processing by the staff terminals 1 moves to step S250 in FIG. 20, and the single image display screen 140 is displayed as illustrated in FIG. 29.

The single image display screen 140 is provided with the single image display area 142, in which the selected image is displayed at a large size.

The image displayed in the single image display area 142 is, for example, an image corresponding to the edited image data managed by the event data 60. In other words, this is an image obtained by playing back the edited image data generated through the auto retouch processing in step S106 of FIG. 11, which is image data to which the retouching parameters in the advance settings information 61 have been applied.

There are also cases where a focus point mark 149 indicating an in-focus position in the image is displayed in the image.

The return icon 133, which is an operator for returning the display to the time view 120 or the event view 200, a filter condition icon 138 for displaying the filter conditions, the rating icon 130 and the flag setting icon 131 for the displayed image, and the like are also displayed in the single image display screen 140.

The eyes closed icon 210 is displayed if the closed eye information for that image indicates a state in which the eyes are closed.

The distribution mark 164 is displayed if that image has been uploaded to the live gallery.

Additionally, the high rating mark 162 and the high rating number 163 are displayed if a viewer of the live gallery has given a high rating to that image.

Note that the camera staff can delete an image corresponding to an image displayed in the single image display area 142 of the staff terminal 1 from the live gallery by using the staff terminal 1 to operate the distribution mark 164. Additionally, if an image deleted from the live gallery in response to the camera staff operating the distribution mark 164 is an image which has been given a high rating by viewer of the live gallery, information indicating that the image has a high rating, such as the high rating mark 162 and the high rating number 163 illustrated in FIG. 29, remains displayed in the staff terminal 1.

Additionally, an edit icon 145, a focus point operation icon 146, an export icon 147, an archive icon 135, and an original icon 141, which are for making operations related to the displayed image, are displayed in the single image display screen 140.

Figure 21:
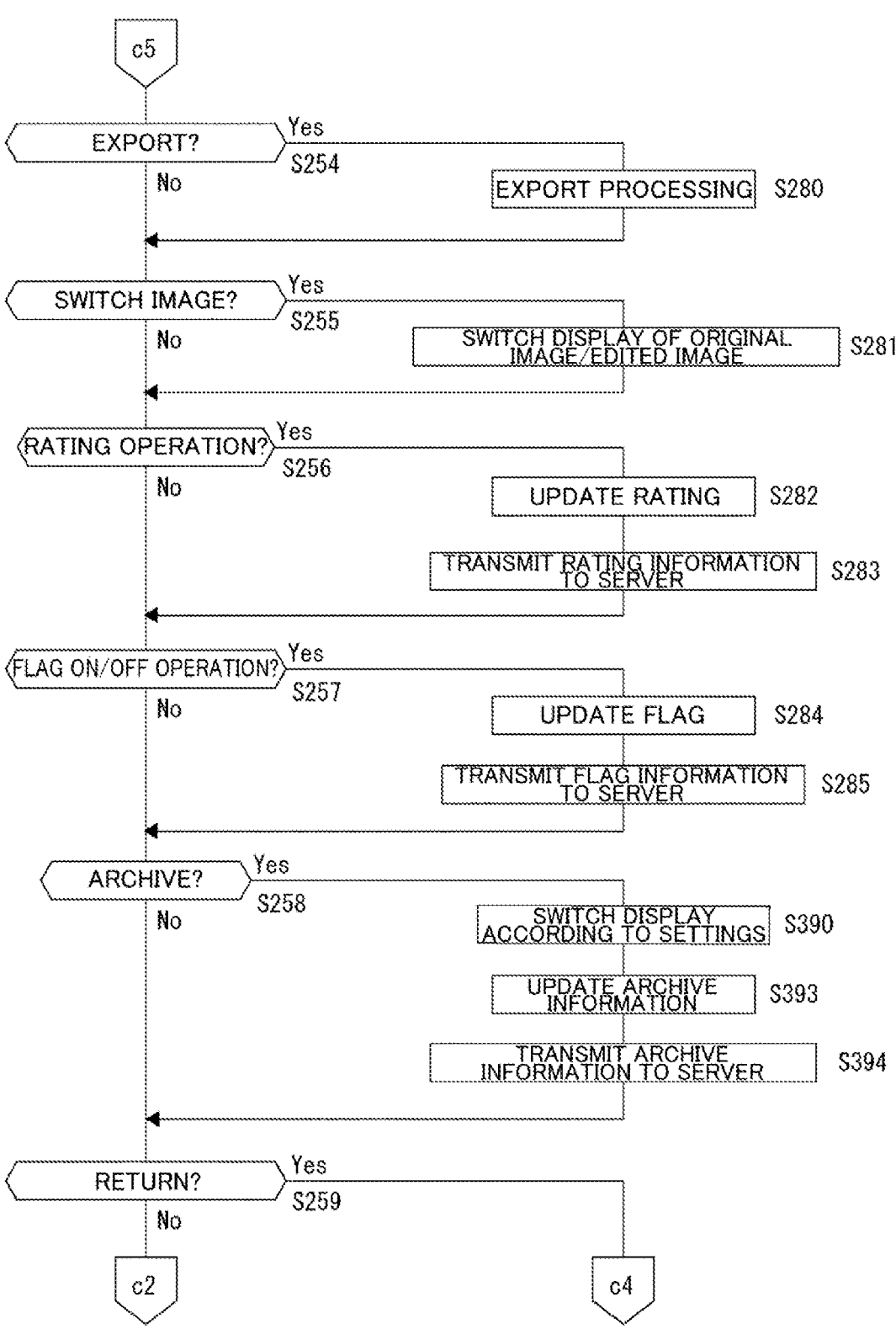
FIG. 21 is a flowchart illustrating UI-related processing by a staff terminal in the embodiment.

The staff terminal 1 performs the monitoring loop processing from step S251 to step S259 of FIGS. 20 and 21 in a state where this single image display screen 140 is displayed.

In step S251, the staff terminal 1 monitors operations of the edit icon 145.

If the operator of the edit icon 145 being operated is detected, the staff terminal 1 moves the sequence to step S260, and an editing screen, which is not shown, is displayed. In the editing screen, a user interface that enables retouching operations, tilt correction operations, and the like, for example, is provided, and the camera staff can perform image editing operations through that user interface.

For the retouching operations, brightness adjustment values, color adjustment values, contrast adjustment values, sharpness adjustment values, and the like can be set as retouching parameters, for example.

For example, an operator that adjusts the angle of the image is provided for the tilt correction operations.

Note that the editing screen may be a screen separate from the single image display screen 140, or may be a screen in which the various operators are displayed superimposed on the single image display screen 140.

If editing operations such as retouching operations or tilt correction operations have been detected, the staff terminal 1 moves the sequence from step S261 to step S262, and performs editing processing.

For example, in the case of retouching processing, the edited image data is subjected to further editing processing using the retouching parameters entered by operations made by the camera staff. In this case, the retouching parameters which have been entered are stored in the event data 60 as editing information for individual pieces of image data.

The tilt correction processing is processing for editing the edited image data using tilt correction parameters entered through operations made by the camera staff. In this case too, the tilt correction parameters which have been entered are stored in the event data 60 as editing information for individual pieces of image data.

Once the editing operations are detected as having ended in step S265, in step S266, the staff terminal 1 transmits the editing information of the event data 60 updated as a result of the editing processing to the server device 4, and the event data 90 on the server device 4 side is updated. In other words, a state of synchronization is maintained.

In step S267, the staff terminal 1 terminates the editing screen and returns to the normal single image display screen 140. The image displayed at this time is assumed to reflect the results of the editing.

By performing operations from the edit icon 145 in this manner, the camera staff can perform image editing, such as retouching and tilt correction, for any desired image.

With the single image display screen 140 displayed, the staff terminal 1 monitors operations of the focus point operation icon 146 in step S252.

If the focus point operation icon 146 being operated is detected, the staff terminal 1 moves the sequence to step S270, where the processing branches depending on whether the focus point mark 149 is displayed on the image in the single image display area 142.

If the focus point mark 149 is not currently displayed, the staff terminal 1 moves the sequence to step S271, where information on the focus point is obtained for the displayed image. The focus point is information that indicates the position in the image on which the image capturing device 2 was focused during capture, and is denoted in the metadata. For example, the focus point is denoted as coordinate information of a single point in the image.

The staff terminal 1 obtains focus point information from the metadata of the displayed image and displays the focus point mark 149 on the displayed image in accordance with the information, as illustrated in FIG. 29. For example, the focus point mark 149 is displayed as an area having a predetermined spread centered on the coordinate information of one point in the image stored as the focus point. This enables the user to confirm the subject that was in focus when the image was captured.

The display form of the focus point mark 149 is a mark that indicates four corners (a square represented by brackets) in FIG. 29, but another display form may be used, such as a quadrangular frame or a circular frame. A plurality of focus point marks 149 may be displayed as well.

Although the focus point mark 149 is assumed to be displayed in the single image display screen as illustrated in FIG. 29, the focus point mark 149 may be displayed on an image displayed in the list in the image area 128 of the time view 120, the event view 200, or the like, for example.

If the focus point operation icon 146 being operated is detected in step S252 while the focus point operation icon 146 is being displayed, the staff terminal 1 moves the sequence from step S270 to step S273, and ends the display of the focus point operation icon 146.

Accordingly, the camera staff can turn the display of the focus point mark 149 on and off using the focus point operation icon 146.

In step S253, the staff terminal 1 monitors on/off operations of the filter condition display. In other words, operations made on the filter condition icon 138 are monitored. In this case, the staff terminal 1 moves the sequence to step S268 and controls the display of the current filter conditions.

Displaying the current filter conditions enables the camera staff to recognize the conditions according to which the current image is being displayed.

The staff terminal 1 monitors operations of the export icon 147 in step S254 of FIG. 21 in a state in which the single image display screen 140 is displayed.

If the export icon 147 being operated is detected, the staff terminal 1 moves the sequence to step S280 and performs export processing. In other words, export processing is performed for information pertaining to the displayed image data.

In step S255, the staff terminal 1 monitors operations for switching the image. In this case, the "operation for switching the image" is the original icon 141 being operated.

If the original icon 141 being operated is detected, the staff terminal 1 moves the sequence to step S281, and switches between the image based on the original image data and the image based on the edited image data. In other words, if an image based on the edited image data was being played back at that time, the image based on the original image data is played back. On the other hand, if an image based on the original image data was being played back at that time, the image based on the edited image data is played back.

Accordingly, the camera staff can compare the edited image with the original image as desired by operating the original icon 141.

The rating icon 130 for the image being displayed is displayed in the single image display screen 140.

In step S256, the staff terminal 1 monitors rating operations.

If the rating icon 130 being operated is detected, the staff terminal 1 moves the sequence to step S282 and updates the event data 60 such that the rating information of the image being displayed takes on a value corresponding to the operation.

In step S283, the staff terminal 1 transmits the updated rating information to the server device 4 such that the event data 90 is updated on the server device 4 side. In other words, a state of synchronization is maintained.

The flag setting icon 131 for the image being displayed is displayed in the single image display screen 140.

In step S257, the staff terminal 1 monitors the flag on/off operations, i.e., operations of the flag setting icon 131.

If the flag setting icon 131 being operated is detected, the staff terminal 1 moves the sequence to step S284 and updates the event data 60 such that the flag in the selection information of the image being displayed is switched on or off.

In step S285, the staff terminal 1 transmits the updated flag information to the server device 4 such that the event data 90 is updated on the server device 4 side.

In other words, a state of synchronization is maintained.

In step S258, staff terminal 1 monitors archiving operations made on an image.

This is operations of the archive icon 135, for example. Alternatively, an upward swipe on the image in the screen may be used as the archiving operation.

If the staff terminal 1 detects an archiving operation, the sequence moves to step S390, and the display is switched according to the display setting at that time. In this case, the display setting is a setting as to whether archived images are displayed. This can be selected using filter conditions, which will be described later.

If archived images are set to be displayed, the image is not switched even if an archiving operation is made. However, the display color of the archive icon 135 is changed to indicate that the displayed image has already been archived. If archived images are set not to be displayed, another image is switched to in response to the archiving operation. For example, the next image in chronological order is switched to.

The staff terminal 1 then moves the sequence to step S393 and updates the archive information. In other words, the staff terminal 1 updates the archive information in event data 60 such that the displayed image is taken as being archived.

In step S394, the staff terminal 1 transmits the updated archive information to the server device 4 such that the event data 90 is updated on the server device 4 side.

In other words, a state of synchronization is maintained.

By enabling images to be archived as described above, the camera staff can archive images that need not be displayed which, together with the filter processing described below, can reduce the number of images displayed in the list or individually. This reduces the number of parameters in the selection task and streamlines the selection.

Note an image which has been archived can be unarchived.

For example, operating the archive icon 135, which indicates that the image is archived by changing color, is made to unarchive the image.

In terms of the processing by the staff terminal 1, for the archiving operation detected in step S258, if the operation is for unarchiving (i.e., if the operation is an archiving operation for an archived image), an unarchiving dialog is displayed in step S390, the state is updated to being unarchived in step S393, and the processing of step S394 is performed accordingly.

In step S259, the staff terminal 1 monitors operations of the return icon 133.

If the return icon 133 being operated is detected, the staff terminal 1 moves the sequence to step S211 of FIG. 17, ends the single image display screen 140, and returns to displaying the time view 120 or the event view 200.

Although not illustrated in the flowchart, it is also possible to switch images to the previous image or the next image by making a swipe operation in the horizontal direction in the single image display screen 140, for example.

Processing performed when the next icon 132 being operated is detected in step S212 of FIG. 17 will be described next.

Figure 33:
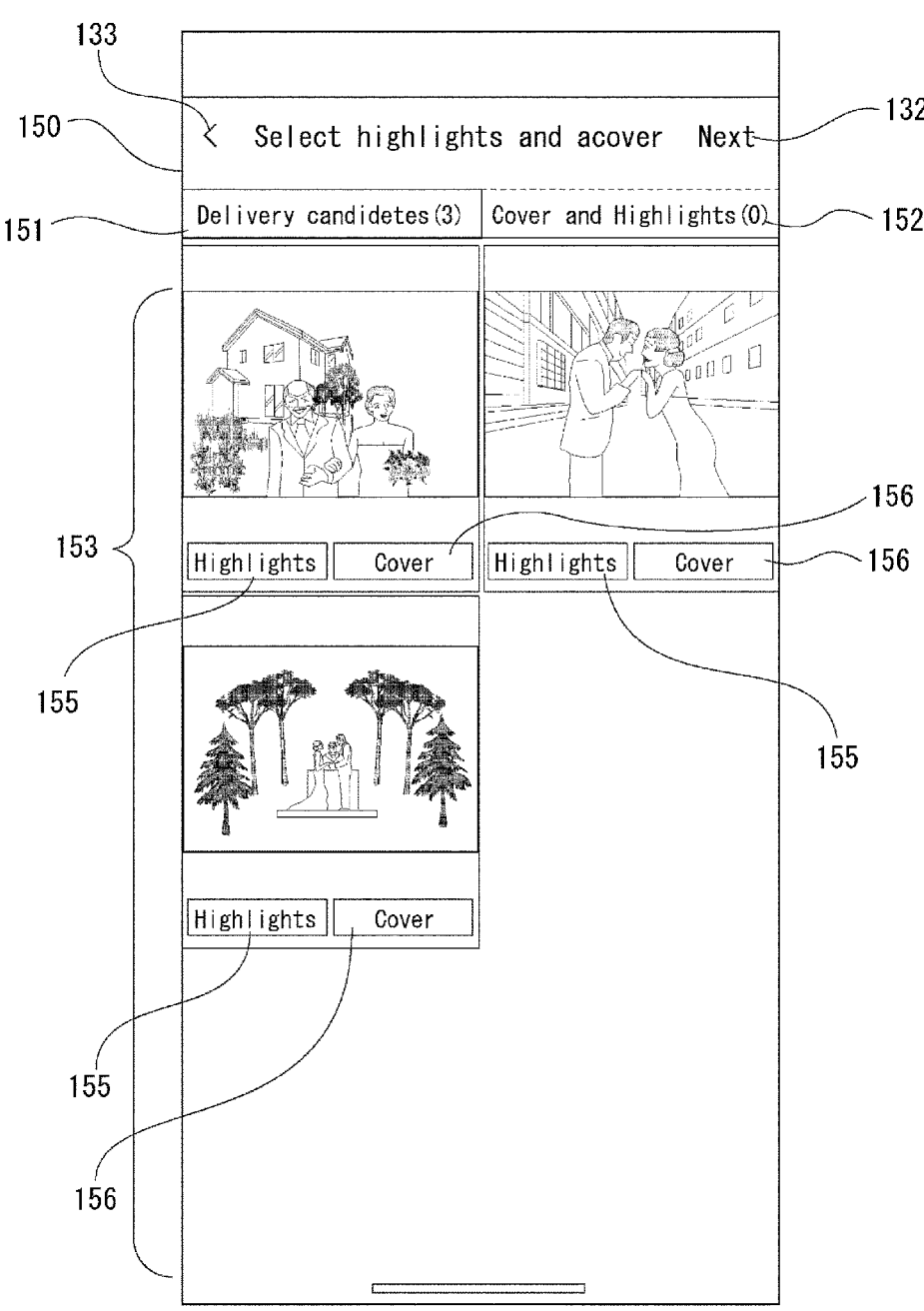
FIG. 33 is an explanatory diagram illustrating a cover/highlights selection screen in the embodiment.

In this case, the staff terminal 1 moves the sequence to step S300 of FIG. 22 to display a cover/highlights selection screen 150 such as that illustrated in FIG. 33.

The cover/highlights selection screen 150 is a screen used by the camera staff to perform operations for selecting an image to be used as the cover (front cover) of the web gallery, images to be highlighted, and the like.

The return icon 133 and the next icon 132 are displayed in the cover/highlights selection screen 150.

A list designation area 153 is provided in the cover/highlights selection screen 150, as well as a candidate tab 151 and a selection tab 152.

When the candidate tab 151 is selected, the list designation area 153 displays a list of the images for which flags are on, i.e., images selected to be used in the web gallery.

A highlight button 155 and a cover button 156 are also displayed for each image.

The highlight button 155 is an operator for designating the image to be highlighted, and the cover button 156 is an operator for designating the image as the cover.

Note that the display form of the highlight button 155 may be used to express whether highlighting is currently set, and the display form of the cover button 156 may be used to express the current cover setting state.

When the selection tab 152 is selected, the images designated as the cover or highlights are displayed as a list in the list designation area 153.

The camera staff operates the cover/highlights selection screen 150 and selects images to be serve as the cover or be highlighted.

In a state where the cover/highlights selection screen 150 is displayed, in step S300 of FIG. 22, the staff terminal 1 performs the processing of the monitoring loop from step S301 to step S305.

In step S301, the staff terminal 1 monitors operations of the cover button 156.

If the cover button 156 being operated is detected, the staff terminal 1 moves the sequence to step S310, sets the cover image information in the selection information to set the corresponding image as the cover image, and updates the event data 60.

In step S311, the staff terminal 1 transmits the updated selection information to the server device 4 such that the event data 90 is updated on the server device 4 side.

In other words, a state of synchronization is maintained.

In step S302, staff terminal 1 monitors operations of the highlight button 155.

If the highlight button 155 being operated is detected, the staff terminal 1 moves the sequence to step S320, sets the highlighted image information in the selection information to set the corresponding image as a highlighted image, and updates the event data 60.

In step S321, the staff terminal 1 transmits the updated selection information to the server device 4 such that the event data 90 is updated on the server device 4 side.

In other words, a state of synchronization is maintained.

In step S303, the staff terminal 1 monitors tab switching operations. The tab switching operation in this case is an operation of the selection tab 152 when a list is being displayed in the candidate tab 151, or an operation of the candidate tab 151 when a list is being displayed in the selection tab 152.

Upon detecting a tab switching operation, the staff terminal 1 performs processing for switching the content of the list display in the list designation area 153 in step S330 according to the tab which has been selected.

In step S305, the staff terminal 1 monitors operations of the return icon 133. If the return icon 133 being operated is detected, the staff terminal 1 moves the sequence to step S211 of FIG. 17, and returns to displaying the time view 120 or the event view 200.

This enables the camera staff to suspend the cover/highlight designation, redo the selection from the setting of the flags, or the like.

Upon completing operations in the cover/highlights selection screen 150, the camera staff operates the next icon 132 in FIG. 33.

In step S304 of FIG. 22, the staff terminal 1 monitors the operation of the next icon 132. If the next icon 132 being operated is detected, the staff terminal 1 moves the sequence to step S340 and displays a confirmation screen.

Figure 34:
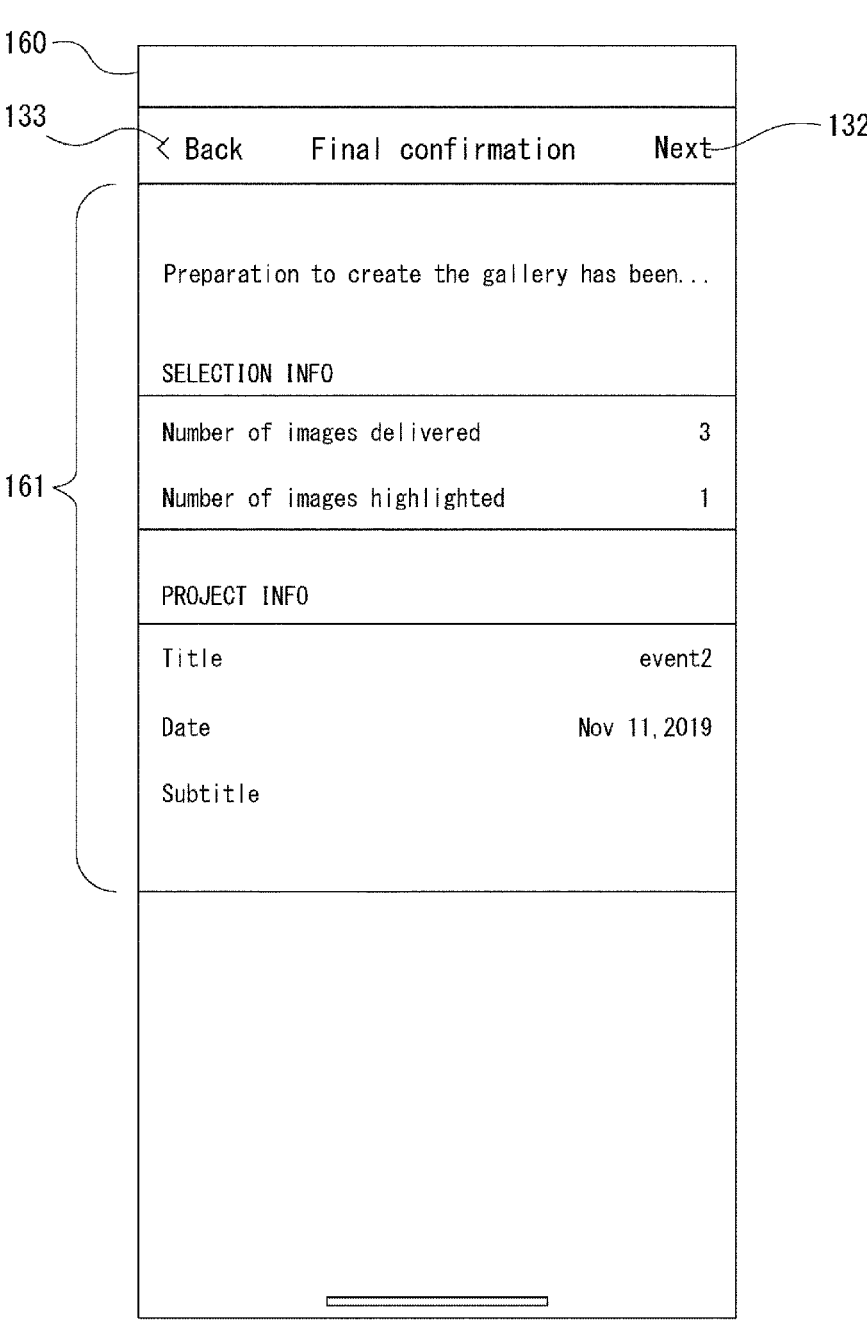
FIG. 34 is an explanatory diagram illustrating a confirmation screen in the embodiment.

FIG. 34 illustrates an example of a confirmation screen 160. The confirmation screen 160 is provided with the return icon 133 and the next icon 132, as well as a details area 161, in which final confirmation details are displayed. For example, the number of images flagged for used in the web gallery, the number of images to be highlighted, titles, dates, and other detailed information are displayed.

The staff terminal 1 monitors the operations of the next icon 132, illustrated in FIG. 34, in step S341 of FIG. 22, and monitors the operations of the return icon 133 in step S342.

If the return icon 133 being operated is detected, the staff terminal 1 returns the sequence to step S300, and returns to a state in which the cover/highlights selection screen 150 is displayed.

If the next icon 132 being operated is detected, staff terminal 1 moves the sequence to step S343, and transmits a web gallery generation request to the server device 4. The sequence then moves to step S201 in FIG. 16, and returns to a state in which the project list screen 110 is displayed. In this case, the sequence may move to step S211 of FIG. 17 to return to the time view 120 or the event view 200.

6. Server Project Correspondence Processing

The processing by the staff terminal 1 up to the stage of the selection in step S3 of FIG. 2 has been described thus far, and the processing performed on the server device 4 will be described here.

Figure 35:
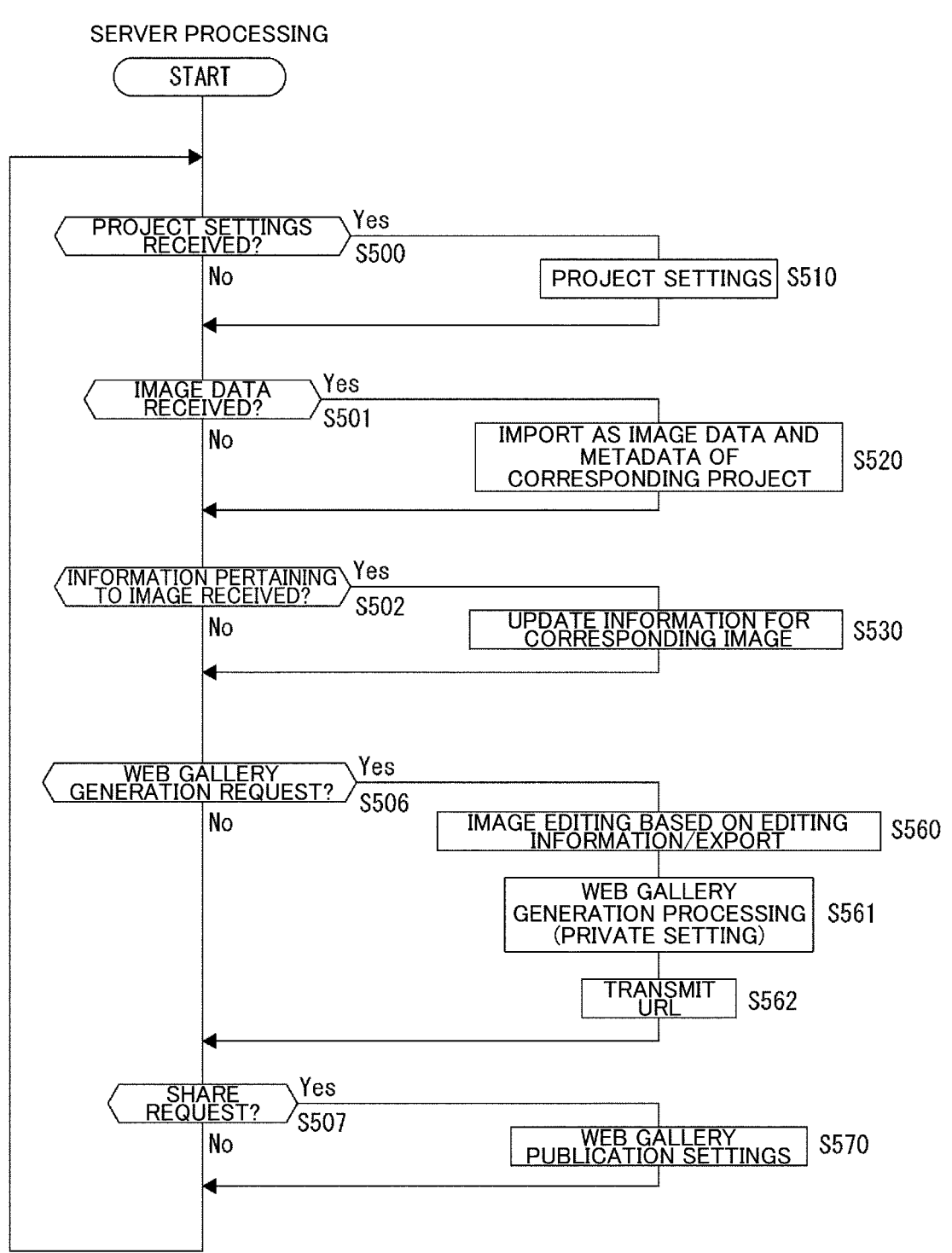
FIG. 35 is a flowchart illustrating processing by a server device in the embodiment.
Figure 36:
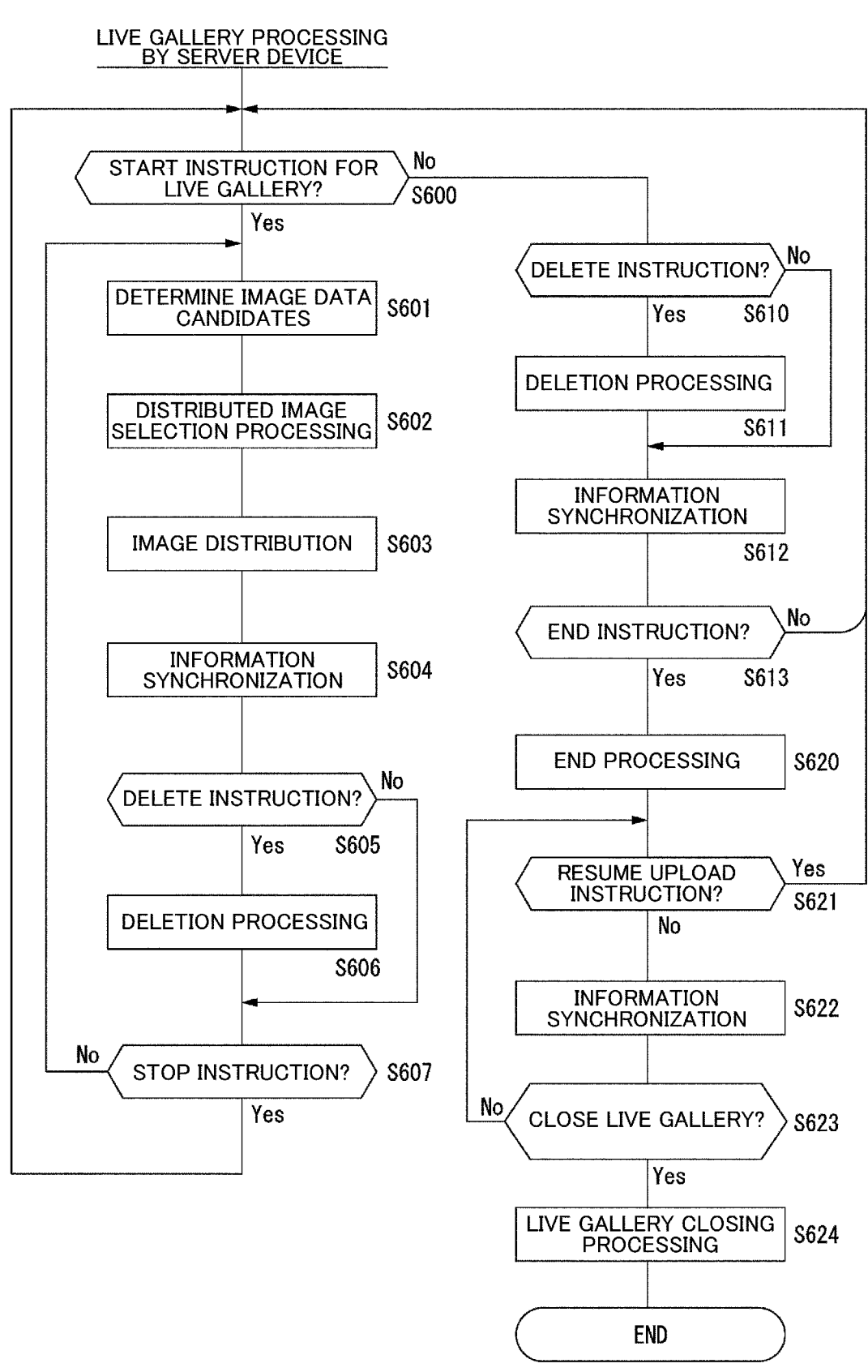
FIG. 36 is a flowchart illustrating live gallery processing by a server device in the embodiment.

FIGS. 35 and 36 illustrate the processing performed by the server device 4 in response to communication from the staff terminal 1. Note that the processing by the server device 4 described below is processing performed by the CPU 71 of the information processing device 70 having the functions illustrated in FIG. 7. In FIG. 35, the processing is mainly executed by the functions of the server data management unit 40, the image collection generation unit 41, and the live distribution processing unit 44.

At the stage of step S1 of FIG. 2, the advance settings information from the staff terminal 1 is transmitted to the server device 4.

Upon receiving the information pertaining to the project settings from the staff terminal 1, the server device 4 moves the sequence from step S500 to step S510 in FIG. 35, and project setting processing is performed within the server device 4.

Communication of project settings from the staff terminal 1 is communication that staff terminal 1 performs with respect to the server device 4 in the processing from step S10 to step S13 of FIG. 12. For example, information such as the event name, time, location, and the like of the created project is transmitted. Based on this information, the server device 4 set a new project and sets the event data 90 thereof.

On the staff terminal 1 side, not only the project itself is set up, but also auto retouch settings, watermark settings, and the like are also made, and the setting information is sequentially transmitted to the server device 4. The server device 4 synchronizes the event data 90 with the event data 60 in the advance settings by writing that information into the event data 90 as the advance settings information 91.

At the stage of step S2 of FIG. 2, images transferred from the image capturing device 2, metadata including the rating information, the analysis information, and the like are transmitted to the server device 4 through the processing performed by the staff terminal 1 in step S106 of FIG. 15.

Upon receiving the images, metadata, and the like from the staff terminal 1, the server device 4 moves the sequence from step S501 to step S520 of FIG. 35, and imports the images, metadata, analysis information, and the like as the information in the event data 90 of the corresponding project. The rating information in the metadata is extracted from the metadata and managed in the event data 90 in a state which allows for subsequent updates.

In the stage of step S3 of FIG. 2, during the processing of FIG. 16 to FIG. 22 performed by the staff terminal 1, the staff terminal 1 transmits various information pertaining to the image data to the server device 4 for maintaining synchronization with the image capturing device 2. For example, the rating information, selection information, editing information, and archive information are transmitted.

Upon receiving this information pertaining to the images from the staff terminal 1, the server device 4 moves the sequence from step S502 to step S530 of FIG. 35, and updates the information for the corresponding images in the event data 90 of the corresponding project.

This ensures that changes in ratings, updates to the used image information indicated by the flag settings, cover image information indicating the cover, highlighted image information indicated by the highlight settings, and the like, updates to the image editing information, updates to the archive states, and the like are sequentially made on the server device 4 side as well.

Upon receiving the web gallery editing information from the staff terminal 1, the server device 4 moves the sequence from step S506 to step S560. This is information transmitted by the staff terminal 1 in step S343 of FIG. 22.

In step S560 of FIG. 35, the server device 4 first performs image editing processing using the editing information (including editing information in the advance settings information 61) as parameters for each image for which the flag is turned on as the used image information, and writes the result as an image for the web gallery. In other words, each edited image is generated to be stored in the image folder 97 illustrated in FIG. 9.

In step S561 of FIG. 35, the server device 4 performs web gallery generation processing. In other words, the webpage settings information 96 illustrated in FIG. 9, which is HTML data or the like, for example, is generated and entered as a webpage. A web gallery is created as a result.

The server device 4 transmits the Uniform Resource L (URL) of the web gallery to the staff terminal 1 in step S562 of FIG. 35. This enables the staff terminal 1 to view the web gallery.

Note that at this point, the web gallery is still set to private and can be viewed only by the staff terminal 1 to which the URL is transmitted.

The processing up to this point is processing by the server device 4 that corresponds to the processing by the staff terminal 1 up to step S3 of FIG. 2.

Although not illustrated in FIG. 35, the processing for providing the event data 90 is performed as necessary for the staff terminal 1 logged into the server device 4 (see the descriptions of step S201 of FIG. 16).

After the web gallery is generated, a share request is transmitted from the staff terminal 1 to the server device 4 (described later with reference to FIG. 37) at the stage of step S4 of FIG. 2.

In this case, staff terminal 1 moves the sequence from step S507 to step S570 of FIG. 35 and sets the corresponding web gallery to be public. For example, the gallery is set to be viewable from the client terminals 5 as well.

Here, at the stages of steps S1, S2, and S3 of FIG. 2, the staff terminal 1 transmits the start instruction, the stop instruction, the end instruction, the resume instruction, the delete instruction, and the like pertaining to the live gallery to the server device 4 through the processing performed by the staff terminal 1 illustrated in FIG. 19.

Upon receiving the instruction information pertaining to the live gallery, the server device 4 performs the processing pertaining to the live gallery as illustrated in FIG. 36.

In other words, for a project in which the live gallery is set to be executed, the server device 4 performs the processing illustrated in FIG. 36 in parallel with the processing illustrated in FIG. 35.

In step S600 of FIG. 36, the server device 4 monitors start instructions for the live gallery. In other words, this is a start instruction from step S361 of FIG. 19, which is performed by the staff terminal 1 when the camera staff operates the start button 301 or the resume button 304.

The processing of steps S600, S610, S612, and S613 is repeated while standing by for the start instruction.

"Standing by" refers to before the start of the live gallery, after a stop instruction is made with respect to a started live gallery, or the like.

If the start instruction is received, the server device 4 moves the sequence to step S601, where processing for determining whether each piece of image data transferred from the staff terminal 1 is a candidate for the live gallery, i.e., candidate determination, is performed.

Although examples of the candidate determination will be given later in terms of various different situations, basically, image data captured by the image capturing device 2 after the time of the start instruction but before the time of the stop instruction is taken as a candidate for an image to be distributed through the live gallery.

Processing for selecting the images to be distributed is performed in step S602. This is processing for selecting the images to actually be uploaded from among the images selected as candidates for uploading to the live gallery. In other words, as described with reference to FIG. 3, rather than uploading all of the captured images to the live gallery within the period from the start instruction to the stop instruction, images are selected and uploaded.

The server device 4 performs image distribution processing in step S603. In other words, the server device 4 uploads the image data selected in step S602 to the live gallery, which enables remote attendees and the like to view the distributed images.

Information is synchronized in step S604. In this case, the server device 4 sequentially updates the distribution information, evaluation information, and the like for the live gallery in the event data 90, and also maintains a synchronized state by transferring the information to the staff terminal 1 and updating the event data 60.

With respect to the distribution information, the server device 4 updates the event data 90 with the information on the execution of the distribution, and updates the event data 60 by notifying the staff terminal 1, for the image data uploaded to the live gallery. This enables the staff terminal 1 to recognize whether each image has been uploaded to the live gallery.

With respect to the evaluation information, the server device 4 sequentially detects the high rating information from viewers and updates the event data 90 periodically. Then, the staff terminal 1 is notified of the high rating number in step S604, for example. In response, the staff terminal 1 updates the event data 60, which makes it possible to recognize the ratings made by viewers of the live gallery.

In step S605, the server device 4 monitors the delete instruction. This is, for example, the delete instruction described with reference to steps S223 and S367 of FIG. 19.

If a delete instruction has been made, the server device 4 performs deletion processing in step S606 of FIG. 36. In other words, the server device 4 performs processing for deleting the image specified by the delete instruction from the live gallery.

In step S607, the server device 4 monitors the stop instruction. This is the stop instruction described with reference to steps S353 and S363 of FIG. 19.

The server device 4 repeats steps S601 to S606 until a stop instruction is received. Through this, the images which have been selected from among the transferred images are sequentially uploaded to the live gallery. Accordingly, remote attendees can enjoy the live gallery, which is continuously added to and updated, in real time.

If a stop instruction has been made, the server device 4 returns to a state of repeating the processing of steps S600, S610, S612, and S613.

The delete instruction is monitored in step S610. This is because on the staff terminal 1 side, the camera staff can make a delete instruction in step S223 of FIG. 19 even when the live gallery is not being executed. For example, the delete instruction at the stage of step S14 of FIG. 12, a delete instruction while the live gallery is stopped, and so on can be made in step S223 of FIG. 19.

If a delete instruction has been made, the server device 4 performs processing for deleting the corresponding image from the live gallery in step S611 of FIG. 36.

The server device 4 synchronizes information in step S612. Even after a stop instruction has been made, the live gallery itself is still public, and the evaluation information from viewers continues to be updated. As such, the server device 4 sequentially updates the evaluation information in the event data 90 even when the live gallery is stopped, and also maintains a synchronized state by transferring the information to the staff terminal 1 and updating the event data 60.

In step S613, the server device 4 monitors the end instruction. This is the end instruction described with reference to steps S354 and S365 of FIG. 19.

If a start instruction is made by operating the start button 301 or the resume button 304 in a state in which the processing of steps S600, S610, S612, and S613 are being repeated as described above, the server device 4 performs the processing of steps S601 to S607 again.

If an end instruction is detected in step S613, the server device 4 performs end processing in step S620.

This is processing for ending new uploads to the live gallery. However, at this point in time, the live gallery is not closed to viewing, but remains open to viewing for a certain period of time.

For example, the live gallery is closed automatically once a predetermined period of time has passed following the end instruction. Accordingly, a time count until the gallery is closed is started in step S620.

The predetermined period of time is two hours or the like. This is, of course, merely an example, and the predetermined period of time may be five hours, or 24 hours.

In step S621, the server device 4 monitors an instruction to resume the transfer of the live gallery. As described with reference to steps S224 and S366 of FIG. 19, the camera staff can, for a live gallery in which the transfer of images to be uploaded has been ended once by operating the end button 303, perform an operation for resuming the transfer of images that are candidates to be uploaded to the server device 4. If such a notification to resume the transfer is received, the server device 4 returns the sequence to step S600 from step S621, and returns to a state in which new images can be uploaded to the live gallery.

The server device 4 synchronizes information in step S622. Even after an end instruction has been made, the live gallery itself is still public, and the evaluation information from viewers continues to be updated. As such, the server device 4 sequentially updates the evaluation information in the event data 90 even after the end instruction, and also maintains a synchronized state by transferring the information to the staff terminal 1 and updating the event data 60.

In step S623, the server device 4 determines whether it is time to close the live gallery. In other words, it is determined whether the predetermined period of time, such as two hours, has passed since the time the end instruction was made.

Even before the predetermined period of time has passed, if an instruction to close the live gallery is made from the staff terminal 1 in response to an operation by the camera staff, that time is taken as the time to close the live gallery.

The server device 4 repeats the processing of steps S621 and S622 until it is time to close the live gallery.

Once it is time to close the live gallery, the server device 4 moves the sequence to step S624, where the live gallery for that project is closed. In other words, remote attendees and the like become unable to view the live gallery.

Note that if, for example, the passage of a predetermined period of time such as two hours is taken as the time to close the live gallery, a notification inquiring whether the live gallery can be closed may be made to the staff terminal 1, and the live gallery may be closed in response to an approval operation made by the camera staff.

Additionally, even if a stop instruction or an end instruction has not been made, the server device 4 may automatically determine that the event has already ended and the live gallery should be closed, and perform the closing processing, when a set period of time has passed after new images have ceased being transferred from the staff terminal 1.

Here, when processing for closing the live gallery is performed, all the images in the live gallery are deleted or hidden, and information indicating that the live gallery distribution has ended, information indicating that there are no images in the live gallery, or the like is displayed in the live gallery viewing screen 400. Note that even when processing for closing the live gallery has been performed, the URL of the live gallery is not deleted, and thus the camera staff can set a live gallery which has been closed to be distributed again by operating the staff terminal 1. After reopening the live gallery, the images which were displayed before the live gallery was closed are not displayed, and images captured by the image capturing device 2 after the distribution of the live gallery are set to be distributed.

Additionally, even when processing for closing the live gallery has been performed, the images which had been displayed in the live gallery, the information such as high ratings pertaining to the images, and the like remain stored in the server device 4, and the images which had been displayed in the live gallery before the live gallery was closed need not be deleted from the server device 4. In this case, the closed live gallery can be re-distributed and the images that were displayed before the live gallery was closed can be displayed again when an instruction to start distribution of the live gallery is made from the staff terminal 1 through an operation by the camera staff.

In addition, the camera staff deleting the URL of the webpage of the live gallery makes it impossible to redistribute the live gallery or access the live gallery.

7. Web Gallery Delivery Processing

The processing by the staff terminal 1 at the stage of the web gallery delivery processing in step S4 of FIG. 2 will be described with reference to FIG. 37.

When the web gallery generation request is transmitted to the server device 4 as described above, the server device 4 generates the web gallery based on the event data 90, and the URL of that webpage is transmitted. FIG. 37 illustrates processing by the staff terminal 1 after obtaining the URL.

The staff terminal 1 accesses the webpage using the obtained URL in step S370. As a result, the web gallery can be previewed in the staff terminal 1.

Figure 38:
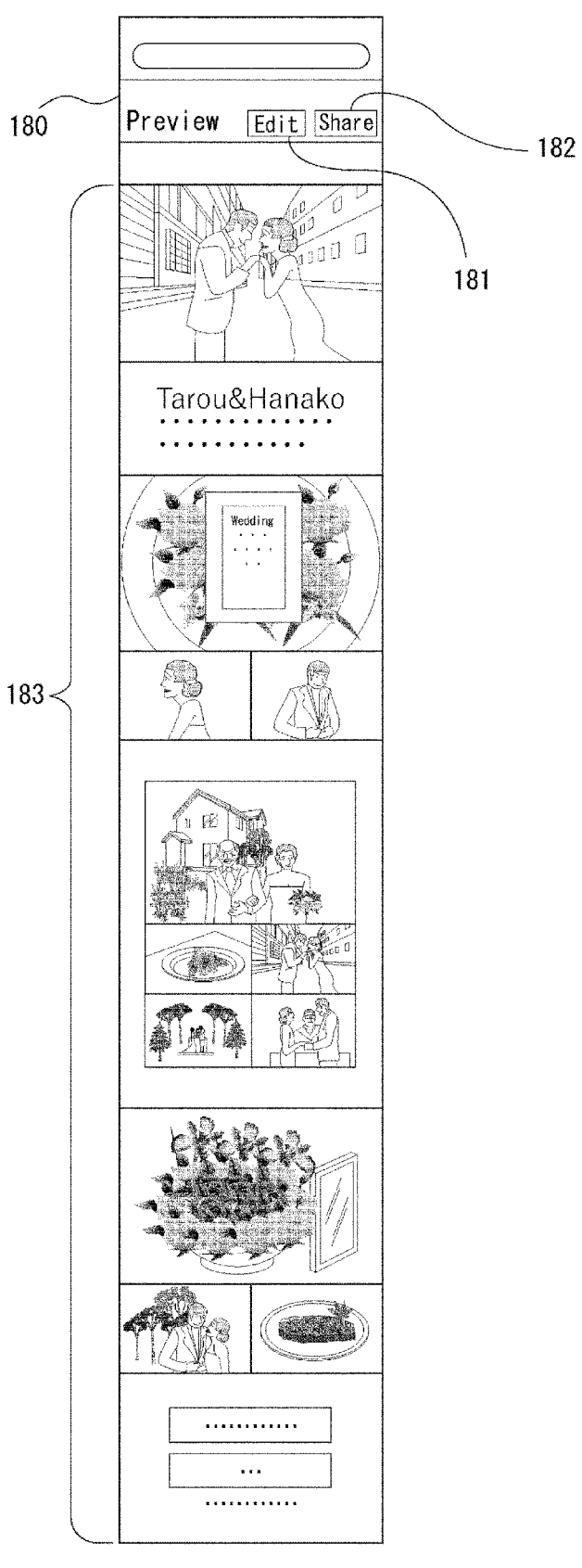
FIG. 38 is an explanatory diagram illustrating a preview screen of a web gallery according to the embodiment.

This is a preview view for the purpose of confirmation by the camera staff, and the web gallery for this preview is as indicated by a preview screen 180 in FIG. 38, for example.

For example, the created web gallery is displayed in a preview area 183, and an edit button 181, a share button 182, and the like are provided.

The content of the web gallery displayed in the preview area 183, i.e., the web gallery created by the server device 4, is configured such that the images for which the flags are set to on are arranged in chronological order, for example. The image for which the cover image information has been set is displayed at the top as the front cover. Meanwhile, images set to be highlighted using the highlighted image information are displayed at a larger size than images not set to be highlighted.

Note that even images not set to be highlighted may be automatically arranged at a large size. This is done in order to balance and streamline the gallery as a whole.

Figure 37:
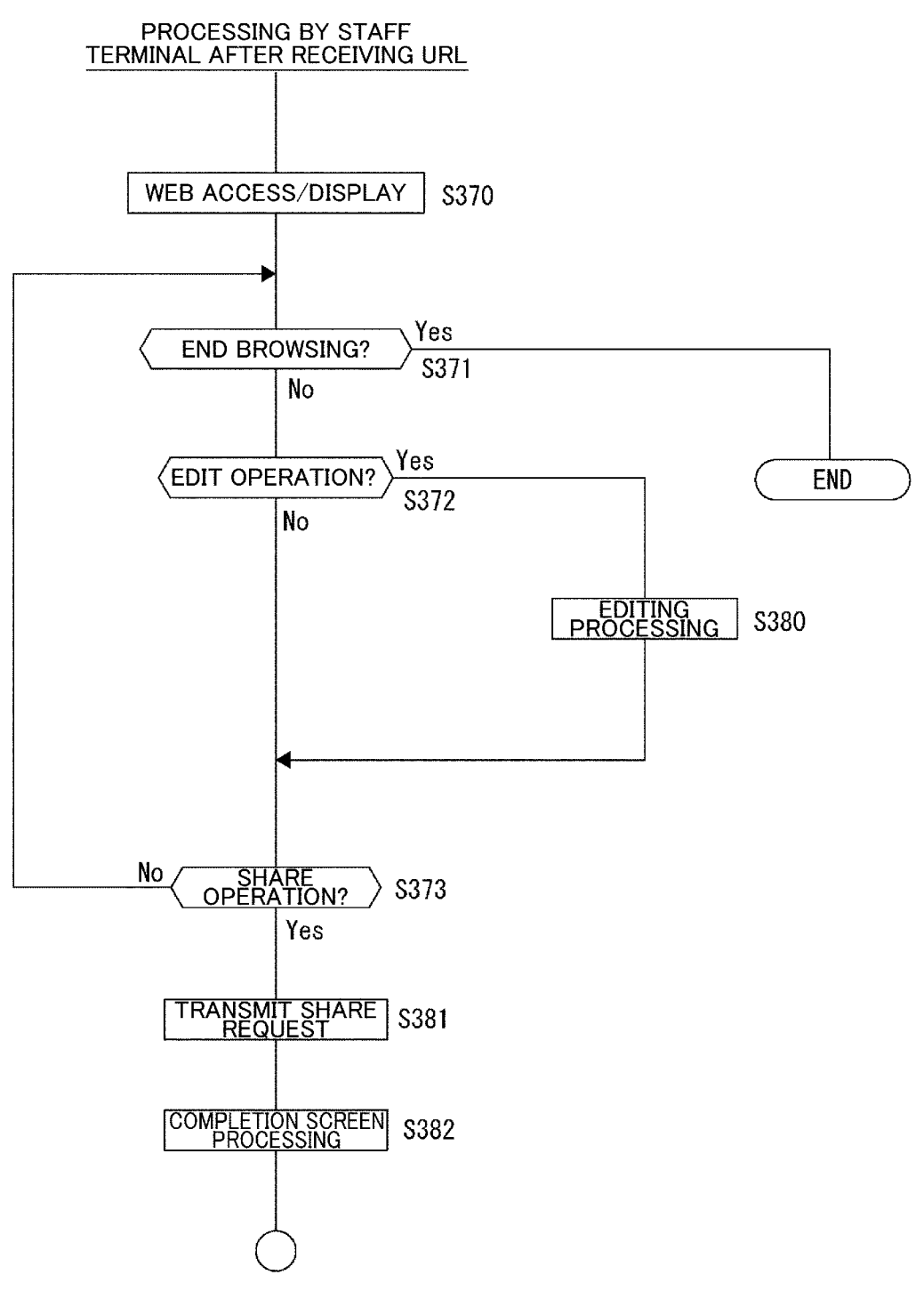
FIG. 37 is a flowchart illustrating processing by a terminal device after receiving a URL in the embodiment.

The staff terminal 1 monitors an operation for ending browsing in step S371 of FIG. 37, monitors an operation of the edit button 181 in step S372, and monitors an operation of the share button 182 in step S373.

When an operation for ending the browsing is detected, the webpage viewing is ended.

If the edit button 181 being operated is detected, the staff terminal 1 moves the sequence to step S380 and performs editing processing.

The camera staff can confirm the content of the web gallery in the preview area 183 and, if necessary, further editing can be performed by operating the edit button 181. In the editing processing of step S380, the staff terminal 1 displays an interface image for editing, accepts operations from the camera staff, and edits a preview image accordingly. For example, the background color, title font, title color, title position, slideshow music, and the like can be edited.

The editing information is then transmitted to the server device 4 in response to an editing completion operation, and the editing operations are applied to the web gallery.

After performing the editing operations as necessary, the camera staff operates the share button 182. In this case, the staff terminal 1 moves the sequence to step S381 and transmits a share request to the server device 4. As described above, in response to the share request, the server device 4 set the web gallery to public in step S570 of FIG. 35.

In step S382 of FIG. 37, the staff terminal 1 displays a screen indicating the completion of delivery of the web gallery, and performs processing corresponding to operations made in the screen.

Figure 39:
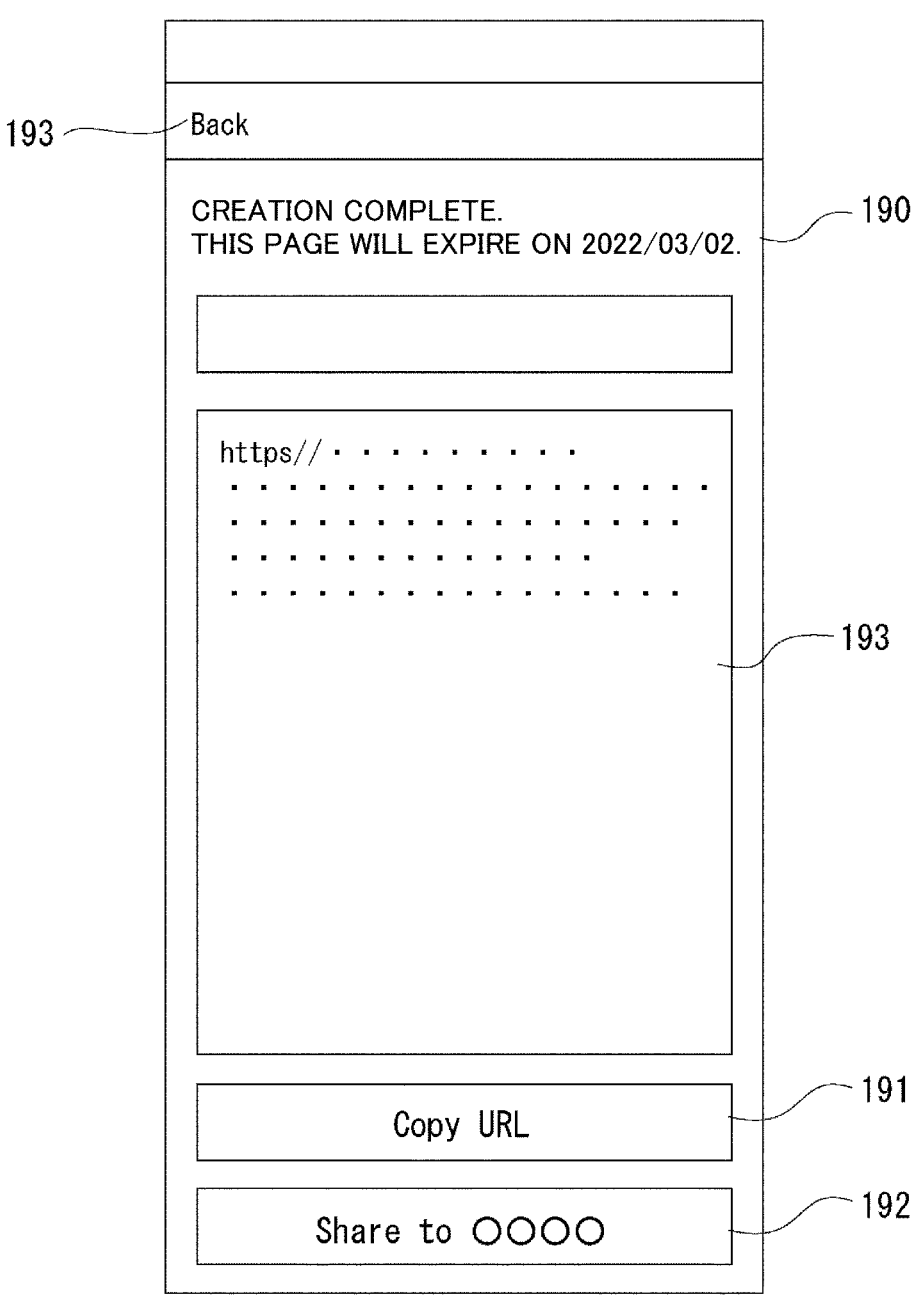
FIG. 39 is an explanatory diagram illustrating a web gallery delivery screen in the embodiment.

For example, the staff terminal 1 displays a web gallery delivery screen 190, illustrated in FIG. 39. The web gallery delivery screen 190 displays a notification that the web gallery has been created, an expiration date, and a URL 193 of the web gallery. A copy button 191 and a share button 192 are also displayed.

The camera staff can operate the copy button 191 to copy the URL, attach the URL to an email, or the like and transmit the URL to the client terminal 5. The share button 192 can also be operated to provide the URL to a SNS or the like so that the client can browse the web gallery via the SNS.

Through this, the client will be able to view the web gallery very early on, such on the day of the wedding ceremony after the ceremony has ended.

Note that an example of the URL being distributed to a client such that the image collection can be viewed as a web gallery has been described here. However, for example, the image collection content corresponding to the web gallery described above may be created and distributed to the client as a content file.

8. Final Delivery Processing

Final delivery processing is performed at the stage of step S5 of FIG. 2.

Figure 40:
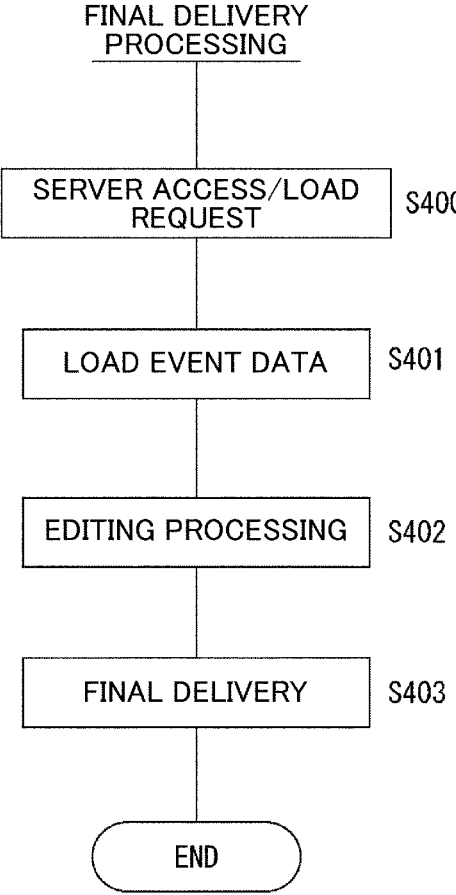
FIG. 40 is a flowchart illustrating final delivery processing by a terminal device in the embodiment.

FIG. 40 illustrating processing performed at the stage of the final delivery. This is processing performed, for example, by the personal computer 3 or the staff terminal 1. The following will describe this as processing performed by the personal computer 3.

The camera staff performs operations using the personal computer 3, accesses the server device 4 as step S400, and makes an information load request for final delivery.

Then, in step S401, the event data 90 is obtained from the server device 4.

For example, in this case, it is conceivable that the server device 4 allows the rating information, selection information, evaluation information, distribution information, editing information, and the like to be downloaded as an XMP file and applied to RAW image files in the personal computer 3.

In other words, the rating information, the used image information indicating the flag setting, the cover image information indicating that a cover image has been set, the highlighted image information indicating that highlighting has been set, and the like are carried over to the personal computer 3. In addition, whether to distribute to the live gallery, information on high ratings made by the viewers of the live gallery, and the high rating number are also carried over to the personal computer 3.

Note that all of the event data 90 may be provided to the personal computer 3.

The camera staff loads the RAW image data as image data captured by the image capturing device 2 into the personal computer 3, and generates an image collection for final delivery using the RAW image data. In this case, the creation task can be streamlined by obtaining an XMP file based on the event data 90 from the server device 4. In particular, images having high ratings from viewers of the live gallery can be included in the image collection for final delivery.

The personal computer 3 performs necessary editing processing in step S402, and completes the image collection for final delivery.

Processing for the final delivery is then performed as step S403. For example, processing for generating content data as the image collection content, and transmitting the data electronically, recording the data into a recording medium, printing the data, or the like, is performed.

The created content data, the recording medium in which the content data has been recorded, or an image collection printed onto a paper medium is then delivered to the client.

9. Live Gallery Distributed Images

The above-described image data serving as a candidate for live gallery distribution will be described next.

Whether an image captured by the image capturing device 2 is a candidate for distribution in a live gallery can be controlled by the camera staff operating the start button 301 and the stop button 302. The term "candidate" is used because the image that is actually uploaded to the live gallery is selected in the server device 4. In other words, "candidate" means whether the image is to be included in the selection for uploading to the live gallery.

At this time, the start button 301 and the stop button 302 are operated in the staff terminal 1, and the images are captured by the image capturing device 2. In addition, the transfer between the image capturing device 2 and the staff terminal 1 is not always performed in real time, and delays or temporary communication failures may occur.

In light of such circumstances, it is desirable that images not to be used as images in the live gallery can be controlled as desired by the camera staff, and by the photographer in particular.

First, assuming that the image data captured by the image capturing device 2 is transferred to the staff terminal 1 almost without delay, it is conceivable that whether an image is to be a candidate for the live gallery is determined based on the reception time at the staff terminal 1.

In this case, for example, in step S105 of FIG. 15, the staff terminal 1 adds the information on the reception time of the transfer from the image capturing device 2 to the metadata, and then transfers the image to the server device 4. Through this, the server device 4 can determine whether the transferred image has been received by the staff terminal 1 between the start instruction and the end instruction.

However, in this case, a delay in the transfer from the image capturing device 2 to the staff terminal 1 or the like may cause a deviation between the image capture time and the reception time.

For example, even if the image capturing device 2 is in a mode for transmitting captured images to the staff terminal 1 in real time, delay may occur due to communication conditions, processing conditions in the device, or the like. Furthermore, a mode in which the image capturing device 2 transfers the captured images to the staff terminal 1 all at once at a given point in time is also possible.

In this case, it is normally assumed that the reception time in the staff terminal 1 and the image capture time of the respective pieces of image data will be different from each other.

In addition, even when images captured and recorded are loaded into the staff terminal 1 as what is known as a camera roll, the image capture times and the reception time are different.

Assuming these conditions, it is desirable to make the determination using the image capture time. Accordingly, whether each piece of image data is a candidate for the live gallery is determined using the information in the image capture time (year, month, time, minute, and second).

Although "time" is used in the present disclosure includes "year, month, and day" from the standpoint of "year, month, day, hour, minute, and second", "hour, minute, and second" is an example of the minimum information. However, it is desirable to include "year, month, and day" because there may be events that last more than two days and the date changes partway through.

The information of the image capture time is recorded in the metadata of each piece of image data in the image capturing device 2. Accordingly, by referring to the metadata, the staff terminal 1 and the server device 4 can determine the image capture time at which each piece of image data is captured.

Figure 41:
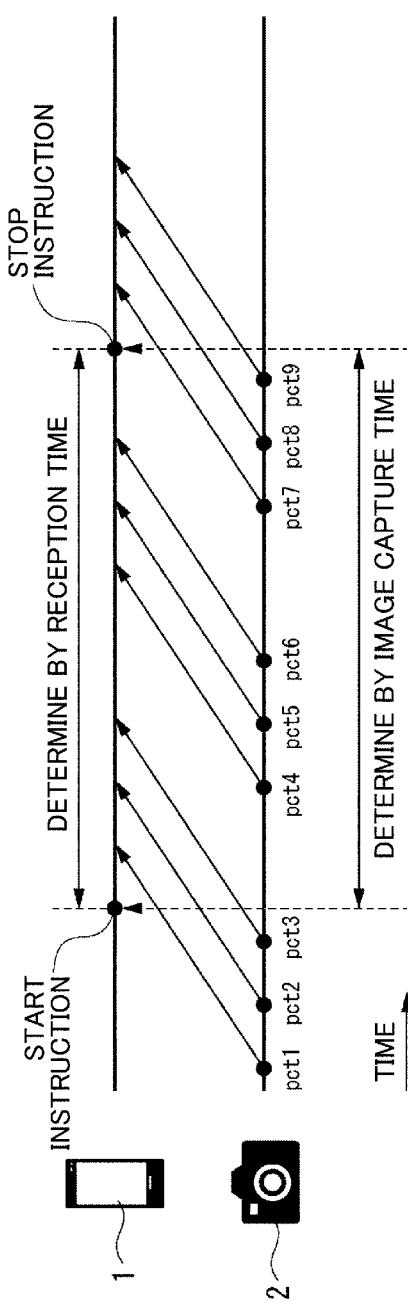
FIG. 41 is an explanatory diagram illustrating images for live gallery distribution in the embodiment.

FIG. 41 illustrates the difference between the image capture times of the image data captured by the image capturing device 2 and the times at which the image data is received by the staff terminal 1.

The drawings indicate the captured image data as images pct1, pct2, pct3, and so on.

This drawing illustrates, as an example, a state in which the images pct1, pct2, pct3, and so on captured by the image capturing device 2 are received by the staff terminal 1 together at a delay.

As illustrated, the start instruction and the end instruction are assumed to have been made at a given point in time by operating the staff terminal 1.

If an image for which the reception time is a time between the start instruction and the end instruction is taken as a candidate for the live gallery, the image pct1 to the image pct6 are candidates, and the images selected therefrom by the server device 4 are uploaded to the live gallery.

On the other hand, if an image for which the image capture time is a time between the start instruction and the end instruction is taken as a candidate for the live gallery, the image pct4 to the image pct9 are candidates, and the images selected therefrom by the server device 4 are uploaded to the live gallery.

Either of these methods can be used. However, images shot after operating the start button 301 in the staff terminal 1 being taken as candidates is easier to understand, particularly for the photographer. This is because by operating the start button 301 in the staff terminal 1, the photographer can know that the shots taken from that point will be subject to distribution through the live gallery. In addition, by operating the stop button 302, the photographer can know that the shots taken from now on will not be distributed through the live gallery. Accordingly, it is preferable to considering images as candidates for the live gallery based on the image capture time.

Various cases from capturing to uploading to the live gallery will be described hereinafter with reference to FIGS. 42 to 54. Each drawing illustrates the transfer of images in the image capturing device 2, the staff terminals 1, and the server device 4, and the images included in the live gallery viewing screen 400 which can be viewed in the remote attendee terminal 7.

These are cases where the candidates for the live gallery are determined based on the image capture time. In addition, the start instruction, the stop instruction, and the end instruction from the staff terminal 1 to the server device 4 in response to operations by the camera staff are indicated by broken lines.

The descriptions will assume that the camera staff is a single photographer, and the photographer operates the image capturing device 2 and the staff terminals 1, for example. This is merely one form, and the following descriptions also apply when multiple camera staff members operate the image capturing device 2 and the staff terminal 1 separately.

Figure 42:
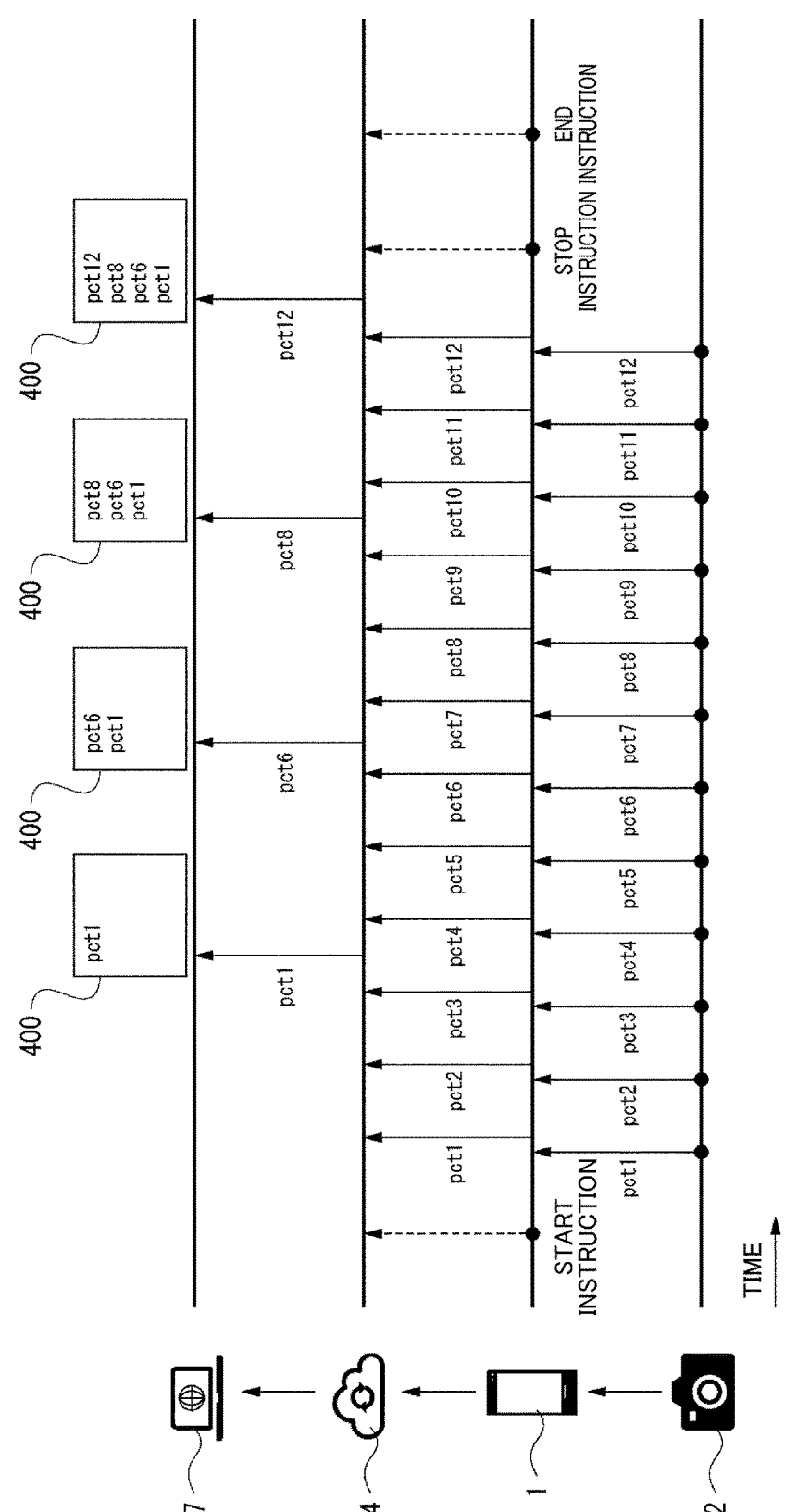
FIG. 42 is an explanatory diagram illustrating an example from image capture to distribution in the embodiment.

FIG. 42 illustrates the basic flow up to the live gallery distribution.

This state is one in which the image pct1 to an image pct12, which are images captured by the image capturing device 2 in a period from when a start instruction was issued to the server device 4 from the staff terminal 1 to when a stop instruction was issued, are taken as distribution candidates, and images pct1, pct6, pct8, and pct12 selected therefrom are uploaded to the live gallery sequentially.

A stop instruction followed by an end instruction ends the transfer and upload of candidate images to the live gallery.

Figure 43:
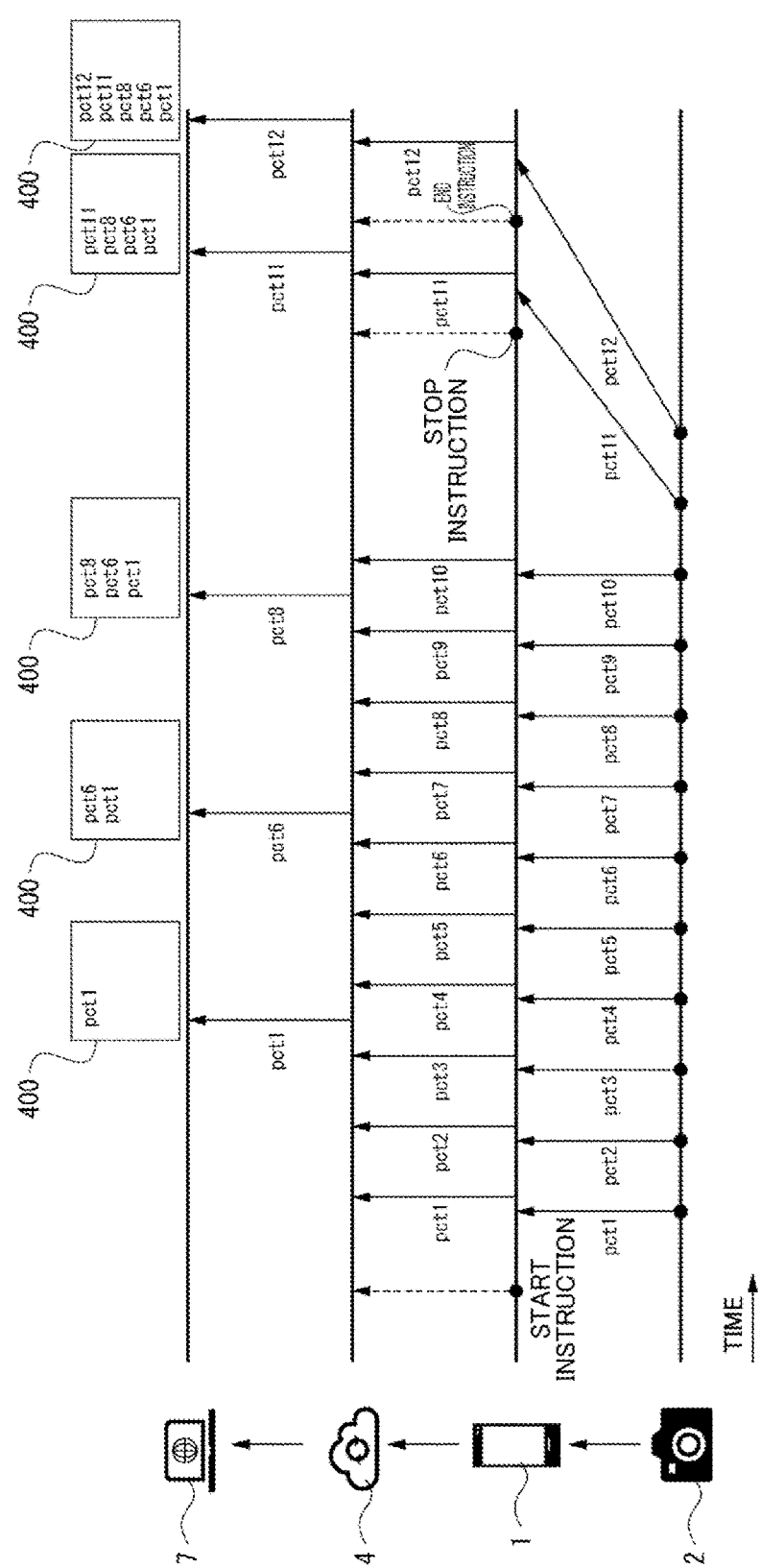
FIG. 43 is an explanatory diagram illustrating an example from image capture to distribution in the embodiment.

FIG. 43 illustrates a case where there is a delay in the transfer from the image capturing device 2 to the staff terminal 1.

For example, assume the photographer captures the image pct1 to the image pct12 after making the start instruction, and then makes a stop instruction or an end instruction. Assume, however, that the transfer of the images pct11 and pct12 is delayed, and those images are received by the staff terminal 1 after the stop instruction or the end instruction.

The server device 4 receives the image pct11 after the stop instruction, and receives the image pct12 after the end instruction.

Even in this case, because the server device 4 determines whether the image is within the period from the start instruction to the end instruction based on the image capture time, the images pct11 and pct12 are determined to be candidates for the live gallery, are selected for uploading through the processing in the server device 4, and are uploaded to the live gallery as a result, as illustrated in the drawing.

Figure 44:
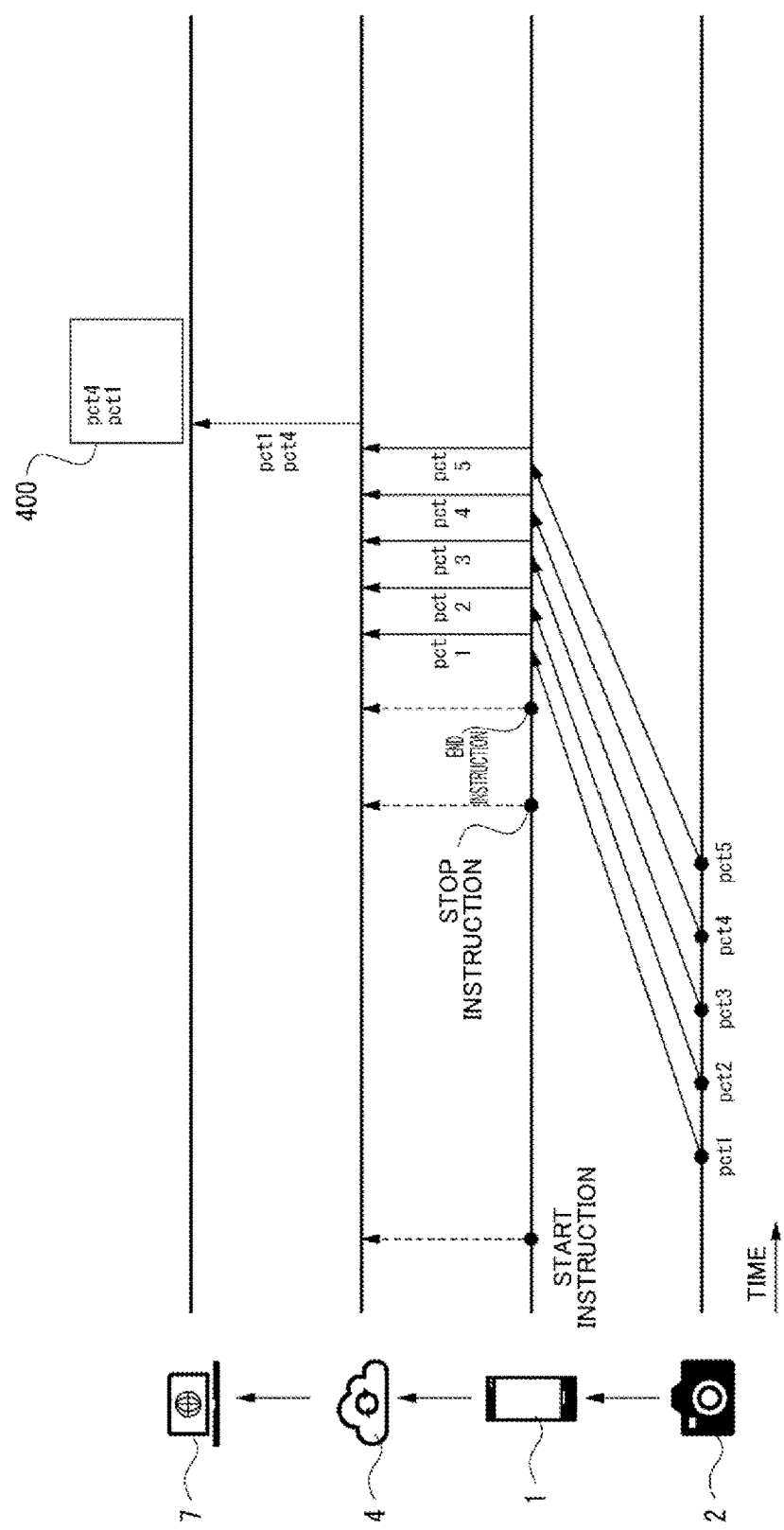
FIG. 44 is an explanatory diagram illustrating an example from image capture to distribution in the embodiment.

FIG. 44 illustrates a case of importing from a camera roll.

For example, assume the photographer makes a start instruction through the staff terminal 1, captures the image pct1 to the image pct5 with the image capturing device 2, and then makes a stop instruction or an end instruction. Furthermore, assume that all the captured image data from the image pct1 to the image pct5 has been transferred to staff terminal 1 in response to the operations by the photographer after the end instruction.

The server device 4 receives the image pct1 to the image pct5 after the end instruction.

The server device 4 determines that the image pct1 to the image pct5, for which the image capture time is within the period from the start instruction to the end instruction, are candidates for the live gallery, and uploads the selected images to the live gallery.

Figure 45:
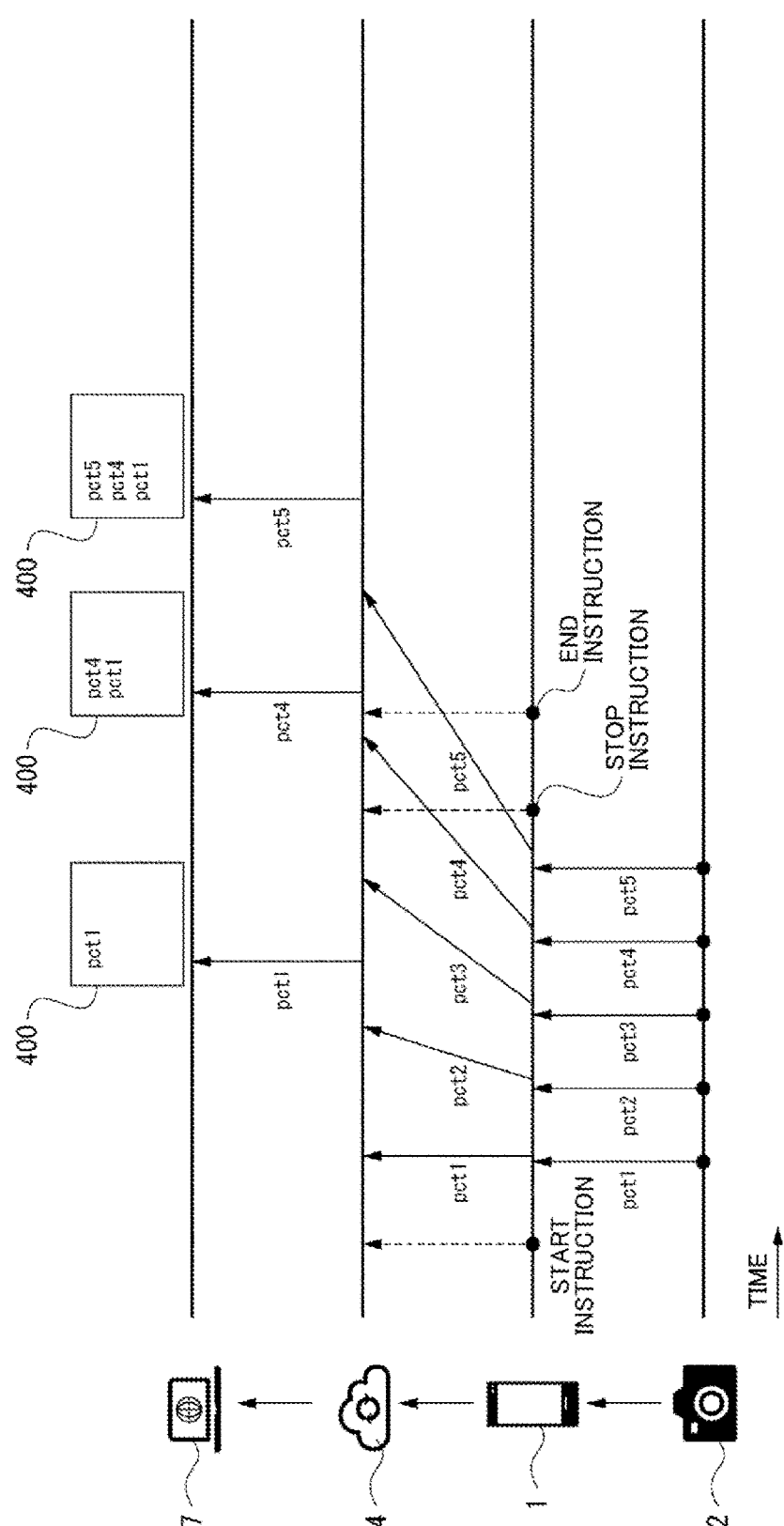
FIG. 45 is an explanatory diagram illustrating an example from image capture to distribution in the embodiment.

FIG. 45 illustrates a case where the transfer from the staff terminal 1 to server device 4 is delayed.

For example, assume the photographer makes a start instruction through the staff terminal 1, captures the image pct1 to the image pct5 with the image capturing device 2, and then makes a stop instruction or an end instruction.

The image pct1 to the image pct5 are received by the staff terminal 1 before the stop instruction.

Assume that of these, the image pct1 to the image pct3 were transferred to server device 4 before the stop instruction, but the images pct4 and pct5 were received by server device 4 after the stop instruction or the end instruction.

The server device 4 determines that the image pct1 to the image pct5, for which the image capture time is within the period from the start instruction to the end instruction, are candidates for the live gallery, and uploads the selected images to the live gallery.

Figure 46:
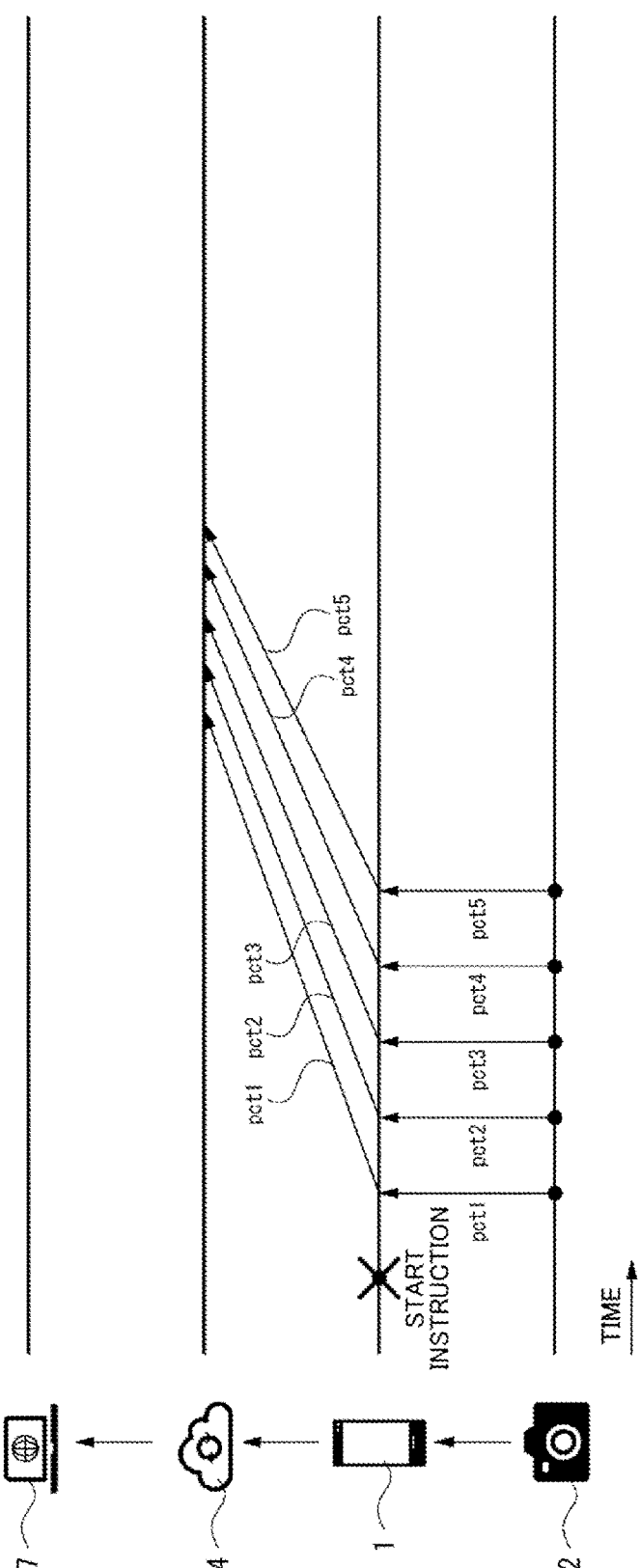
FIG. 46 is an explanatory diagram illustrating an example from image capture to distribution in the embodiment.

FIG. 46 illustrates a case where the staff terminal 1 is not communicably connected to the server device 4.

For example, assume the photographer makes a start instruction through the staff terminal 1, and captures the image pct1 to the image pct5 with the image capturing device 2.

However, because the staff terminal 1 is not connected to the server device 4 when the start instruction was made, the start instruction is not communicated to the server device 4.

In this case, the image pct1 to the image pct5 are transferred to the server device 4 when the staff terminal 1 is subsequently communicably connected to the server device 4. However, because the server device 4 has not received the start instruction, these images are not candidates for the live gallery.

If the start instruction made by the photographer in the staff terminal 1 is accepted despite the staff terminal 1 not being communicably connected to the server device 4, images captured while there is no communication connection may be excluded from the candidates for the live gallery, contrary to the photographer's intention, problems with synchronization with other image capturing devices may arise, and so on. To prevent this, in the present embodiment, the staff terminal 1 is prevented from making start instructions and stop instructions for distribution to the live gallery if the staff terminal 1 is not communicably connected to the server device 4. For example, the staff terminal 1 may display information indicating that it is not connected to the network or that network communication cannot be used.

Figure 47:
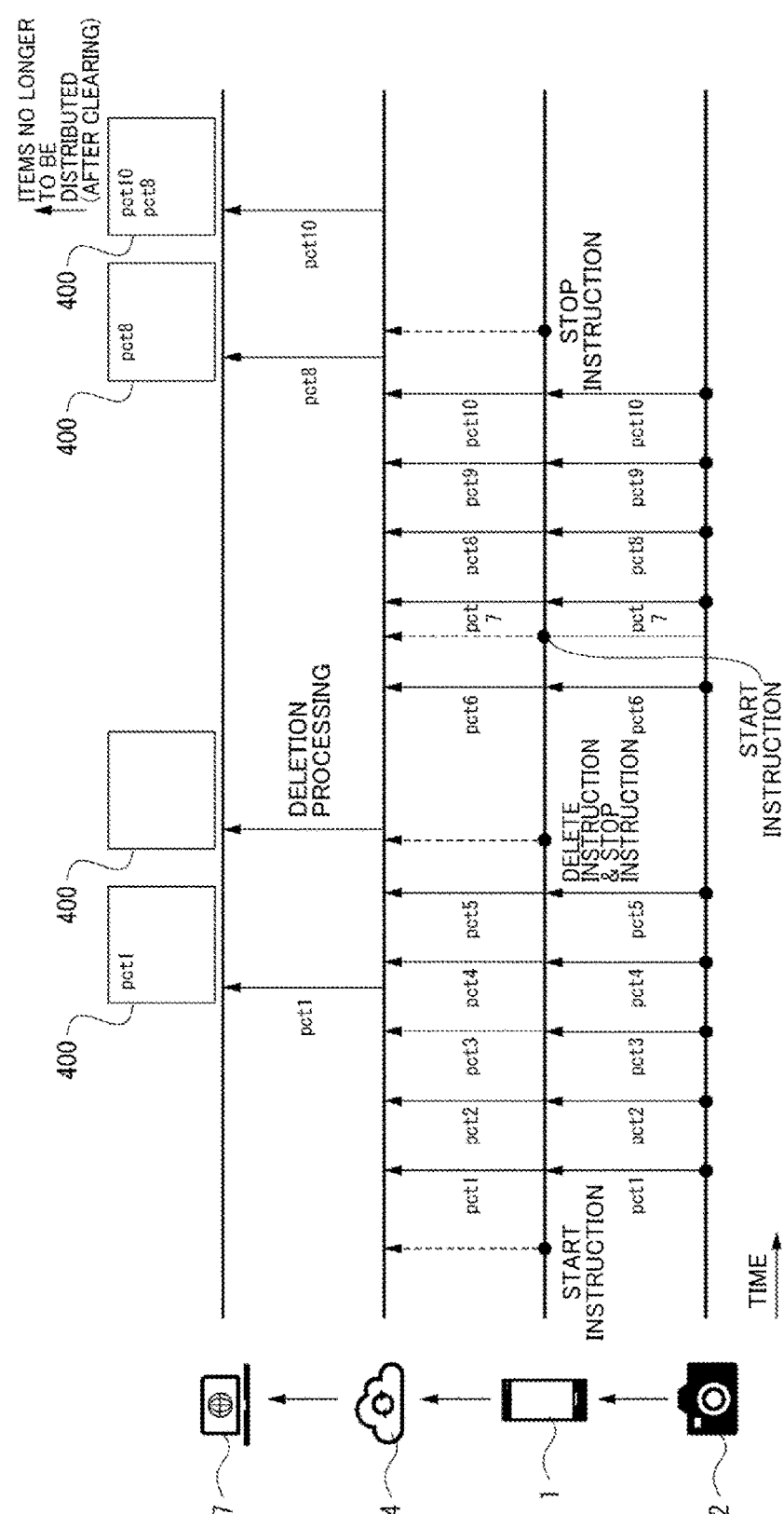
FIG. 47 is an explanatory diagram illustrating an example from image capture to distribution in the embodiment.

FIG. 47 illustrates a case where a delete instruction for all images has been made. For example, assume that as the preparations for the live gallery (see step S14 of FIG. 12), the photographer makes a start instruction in the staff terminal 1, captures the image pct1 to the image pct5 using the image capturing device 2, and then makes a delete instruction and a stop instruction for all the images.

In this case, the image pct1 to the image pct5, which are trial images, are candidates, and of these, the image pct1 is uploaded to the live gallery. This enables the camera staff to confirm that the live gallery is operating. The delete instruction also causes the trial image pct1 to be deleted from the live gallery by the server device 4 performing the deletion processing.

Then, assume that in the actual event, the photographer captures the image pct6, then makes the start instruction, captures the image pct7 to the image pct10, and then makes the stop instruction.

In this case, the server device 4 determines that the image pct7 to the image pct10, which have image capture times within the period from the start instruction to the end instruction, are candidates for the live gallery, and uploads the selected images to the live gallery. If am image was captured before the stop instruction, the image may be uploaded after the stop instruction, as with the image pct10.

Figure 48:
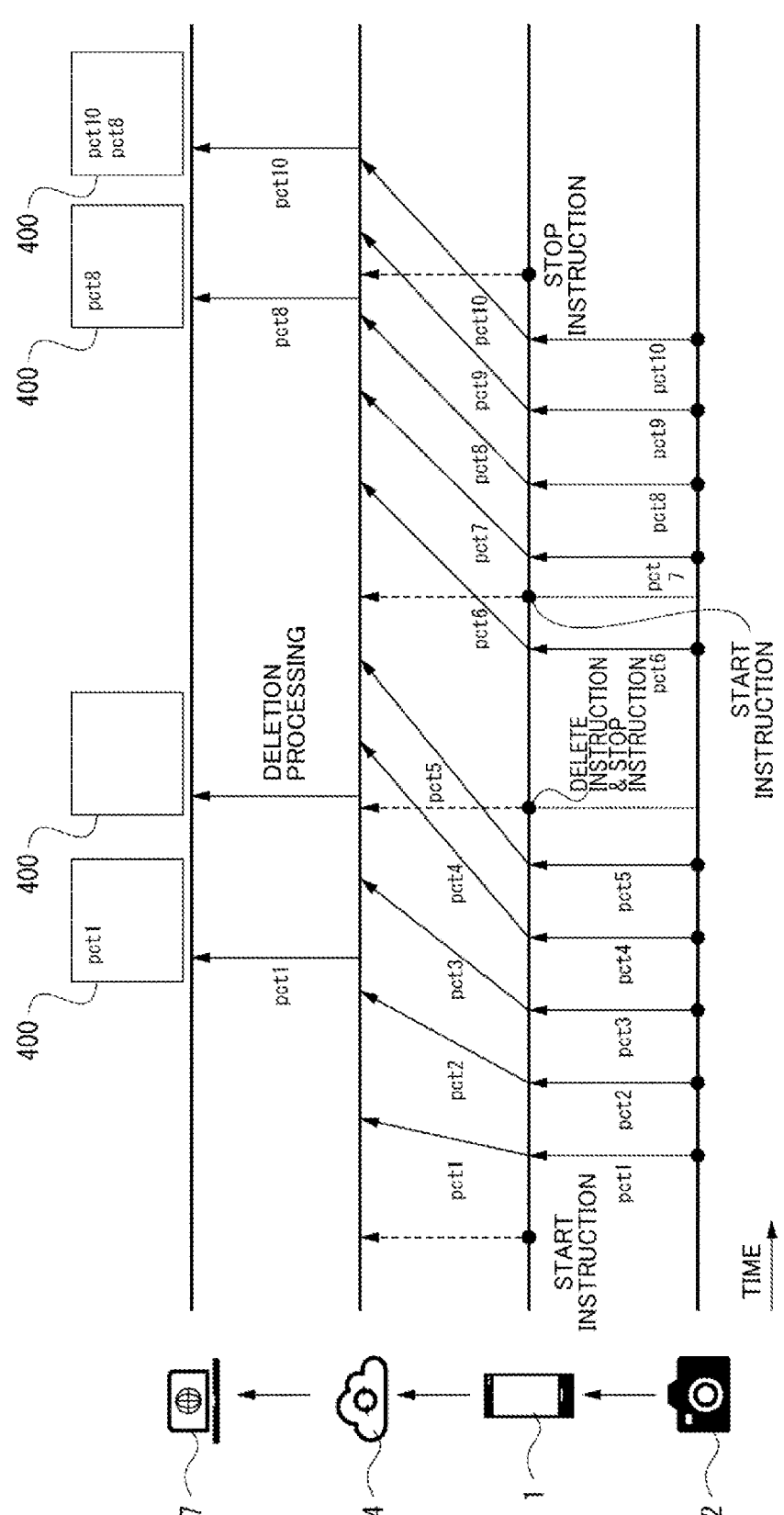
FIG. 48 is an explanatory diagram illustrating an example from image capture to distribution in the embodiment.

FIG. 48 illustrates a case where a delete instruction for all images has been made and the transfer from the staff terminal 1 to the server device 4 has been delayed. For example, as in FIG. 47, assume that as the preparations for the live gallery, the photographer makes a start instruction in the staff terminal 1, captures the image pct1 to the image pct5 using the image capturing device 2, and then makes a delete instruction and a stop instruction for all the images. The images pct4 and pct5 are delivered to the server device 4 after the delete instruction and the stop instruction. In this case, the image pct1 to the image pct3, which are trial images, are candidates, and of these, the image pct1 is uploaded to the live gallery. The images pct4 and pct5 can also be candidates, but because those images are images from before the delete instruction for all the images, they are taken as targets for deletion and are not selected as candidates.

Then, in the example of FIG. 48, assume that during the actual event, the photographer captures the image pct6, then makes the start instruction, captures the image pct7 to the image pct10, and then makes the stop instruction.

In this case, it is assumed that the image pct6 is received by the server device 4 after the start instruction. It is also assumed that the images pct9 and pct10 are received by the server device 4 after the stop instruction.

The server device 4 determines that the image pct7 to the image pct10, which have image capture times within the period from the start instruction to the end instruction, are candidates for the live gallery, and uploads the selected images to the live gallery.

Figure 49:
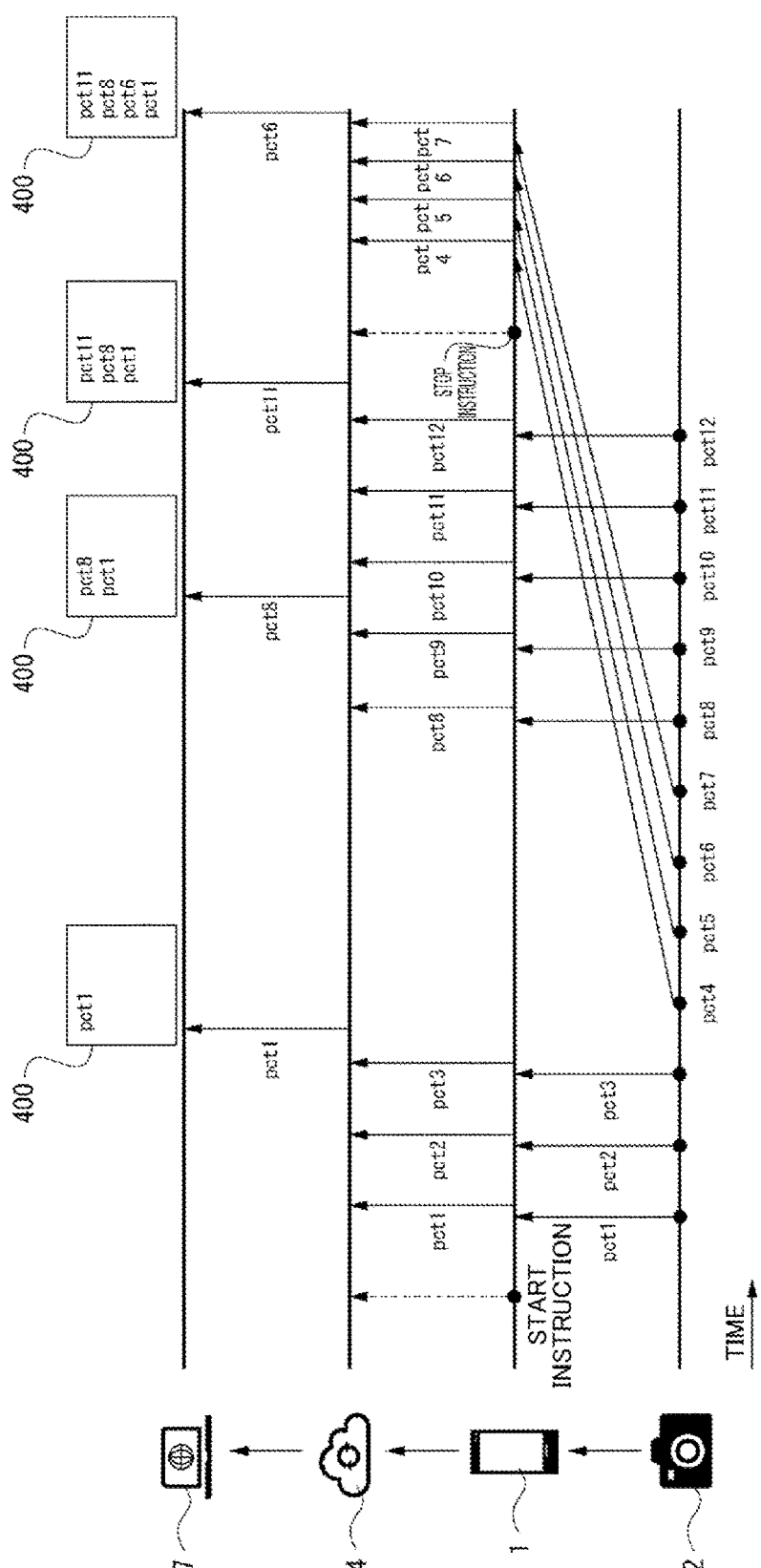
FIG. 49 is an explanatory diagram illustrating an example from image capture to distribution in the embodiment.

FIG. 49 illustrates a case where a captured image having an image capture time from a time before the stop instruction was made is transferred from the image capturing device 2 to the staff terminal 1. This is, for example, a case where the transfer was delayed, the transfer of some of the camera roll was performed at a later time, or the like.

For example, assume the photographer makes a start instruction through the staff terminal 1, captures the image pct1 to the image pct12 with the image capturing device 2, and then makes a stop instruction.

Furthermore, assume that the images pct1, pct2, pct3, and the image pct8 to the image pct12 were transferred to the staff terminal 1 almost in real time, but the image pct4 to the image pct7 were transferred to the staff terminal 1 after the stop instruction. The image pct4 to the image pct7 are received by the server device 4 after the stop instruction.

In this case too, the server device 4 determines that all the images from the image pct1 to the image pct12, which have image capture times within the period from the start instruction to the end instruction, are candidates for the live gallery, and uploads the selected images to the live gallery.

Here, all images (i.e., the image pct1 to the image pct12 in FIG. 49) having an image capture time within the period from the start instruction to the end instruction are described here as being uploaded to the live gallery. However, the present technique is not limited thereto, and if the staff terminal 1 receives an image having an image capture time that is a predetermined period of time before the image capture time of the captured images already transferred from the staff terminal 1 to the server device 4, the server device 4 may not take the past captured images as candidates for the live gallery, and may not upload those images to the live gallery. Using FIG. 49 as an example, the server device 4 receives the images pct1, pct2, pct3 and the image pct8 to the image pct12 after receiving the past captured images (i.e., the image pct4 to the image pct7), but because the image pct4 to the image pct7 are determined not to be candidates for the live gallery, the image pct6 is not distributed through the live gallery.

FIGS. 50 to 54 illustrate examples of image analysis processing periods for selecting images to the uploaded from among the images taken as candidates in the server device 4. The selection processing period (SL1, SL2, and the like) in each drawing is a period during which the server device 4 is executing image analysis processing for selecting images to be uploaded.

Although the server device 4 may basically perform the selection processing between the start instruction and the stop instruction, as in the example above, from the standpoint of the server device 4, image data that should be used as candidates may be received after the stop instruction or the end instruction. In addition, because the stop instruction and the end instruction are based on operations by the camera staff, it is possible that camera staff may leave the camera without making a stop instruction or an end instruction. Communication failures and delays are also possible.

As such, the selection processing in the server device 4 is made to be capable of handling situations where a stop instruction or an end instruction is not received after a certain amount of time has passed after receiving the stop instruction or the end instruction.

Figure 50:
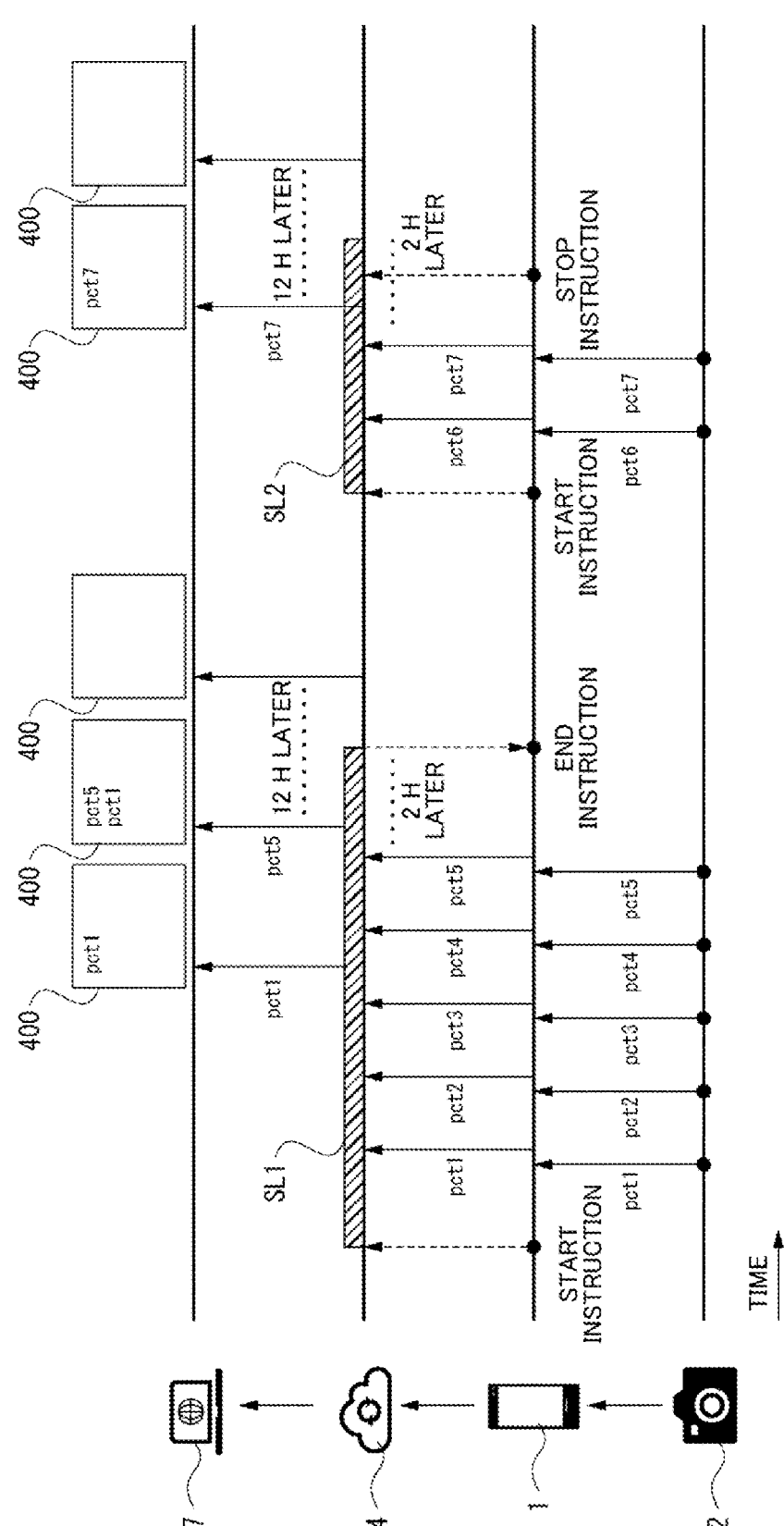
FIG. 50 is an explanatory diagram illustrating an example from image capture to distribution in the embodiment.

FIG. 50 illustrates a case where the photographer makes a start instruction in the staff terminal 1, captures the image pct1 to the image pct5 with the image capturing device 2, and then leaves the device for an extended period of time without making a stop instruction or the like.

The server device 4 selects the image pct1 to the image pct5, which are images from image capture times after the start instruction, as candidates, and performs selection processing after the start instruction (selection processing period SL1). Assume that, for example, the images pct1 and pct5 are uploaded as a result. Assume, however, that after receiving the image pct5, no images are transferred from the staff terminal 1 for two hours, for example. In this case, the server device 4 ends the selection processing and communicates the stop instruction to the staff terminal 1.

For example, the server device 4 may consider that two hours passing without the transfer of a new image in this manner to be equivalent to a stop instruction having been received in step S607 of FIG. 36, and process this in the same manner, as well as notify the staff terminal 1.

On the other hand, the staff terminal 1 may process this notification in step S364 of FIG. 19 in the same manner as if the stop button 302 has been operated.

The server device 4 also performs processing for closing the live gallery when there has been no image transfer from the staff terminal 1 for 12 hours, for example, after receiving the image pct5.

Assume that the photographer then makes a start instruction in the staff terminal 1, captures the images pct6 and pct7 with the image capturing device 2, and then makes a stop instruction.

The server device 4 reopens the closed live gallery, takes the images pct6 and pct7, which are the images having image capture times from after the start instruction, as candidates, and performs the selection processing after the start instruction (selection processing period SL2). The image pct7 is uploaded as a result, for example.

Assume that the photographer has not captured images with the image capturing device 2, or has not made an end instruction through the staff terminal 1, after the stop instruction. Then, after receiving the image pct7, the server device 4 ends the selection processing for the selection processing period SL2 with no images transferred from the staff terminal 1 for, for example, 2 hours. The processing for closing the live gallery in then performed after 12 hours.

Figure 51:
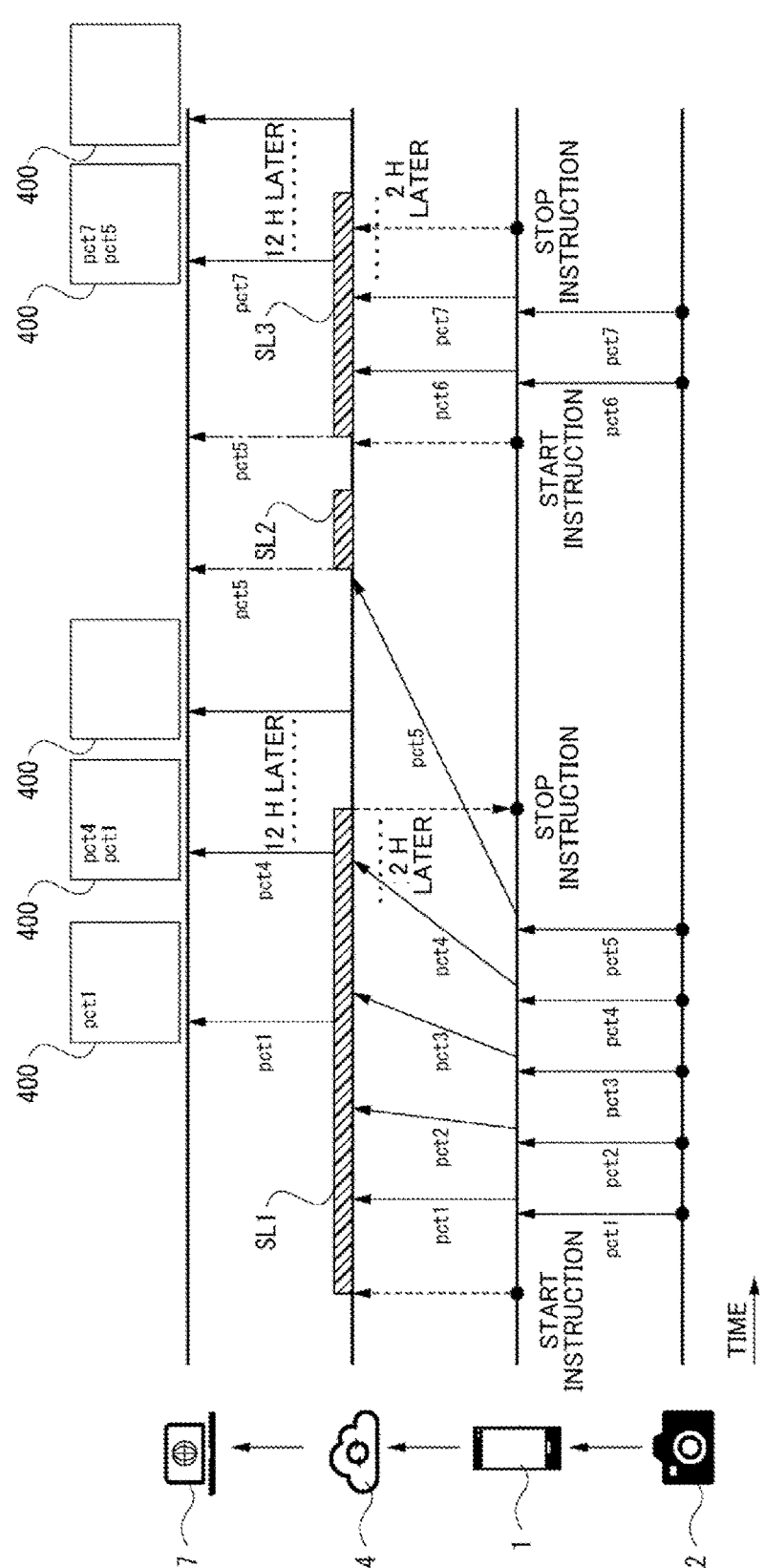
FIG. 51 is an explanatory diagram illustrating an example from image capture to distribution in the embodiment.

FIG. 51 illustrates a case where candidate image data is received after the selection processing is stopped.

Assume the photographer makes a start instruction in the staff terminal 1, captures the image pct1 to the image pct5 with the image capturing device 2, and then leaves the device for an extended period of time without making a stop instruction or the like. Assume also that the transfer of the image pct5 is delayed.

The server device 4 selects the image pct1 to the image pct4, which are images from image capture times after the start instruction, as candidates, and performs selection processing after the start instruction (selection processing period SL1). After the image pct4 is received, if no images are transferred from the staff terminal 1 for, for example, 2 hours, the server device 4 ends the selection processing and communicates a stop instruction to the staff terminal 1.

The server device 4 also performs processing for closing the live gallery when there has been no image transfer from the staff terminal 1 for 12 hours, for example, after receiving the image pct4.

Assume, however, that the image pct5, which should be a candidate, is subsequently received by the server device 4.

In this case, the selection processing may be resumed as indicated by the selection processing period SL2. However, it is also conceivable that the selection processing will not be resumed, assuming that the live gallery has already been closed.

Assume that the photographer then makes a start instruction in the staff terminal 1, captures the images pct6 and pct7 with the image capturing device 2, and then makes a stop instruction.

The server device 4 selects the images pct6 and pct7, which are images from image capture times after the start instruction, as candidates, and performs selection processing after the start instruction (selection processing period SL3). At this time, the earlier image pct5 may be included in the selection processing.

The subsequent processing is the same as that illustrated in FIG. 50.

Figure 52:
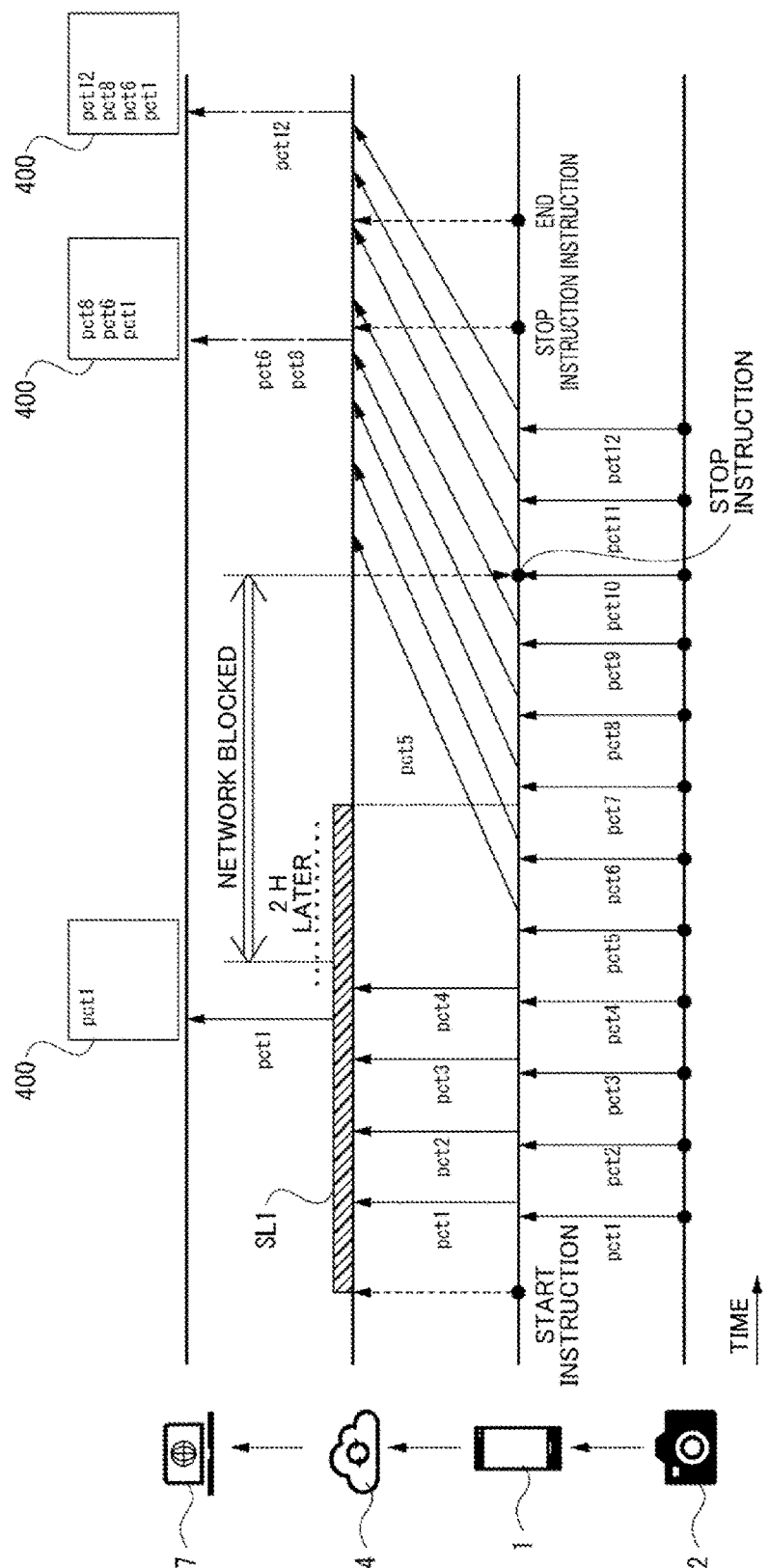
FIG. 52 is an explanatory diagram illustrating an example from image capture to distribution in the embodiment.

FIG. 52 illustrates a case where the network is blocked.

Assume the photographer makes a start instruction through the staff terminal 1, captures the image pct1 to the image pct12 with the image capturing device 2, and then makes a stop instruction or an end instruction. However, assume that a network blockage has occurred during the period when the image pct5 to the image pct9 are being captured.

The server device 4 selects the image pct1 to the image pct4, which are images from image capture times after the start instruction, as candidates, and performs selection processing after the start instruction (selection processing period SL1). After the image pct4 is received, if no images are transferred from the staff terminal 1 for, for example, 2 hours due to the network blockage, the server device 4 ends the selection processing and communicates a stop instruction to the staff terminal 1.

Assume that the network is then restored and the images pct5 and on, which should be candidates, are received by server device 4.

In this case, it is conceivable that the selection processing is not resumed, i.e., the image pct5 on are not uploaded to the live gallery.

Alternatively, if the time for closing the live gallery has not yet been reached, such as before 12 hours have passed in the example in FIG. 50, the selection processing may be performed for the image pct5 and on, and those images may be uploaded to the live gallery as indicated by the dot-dash line in accordance with the result of the selection processing.

Figure 53:
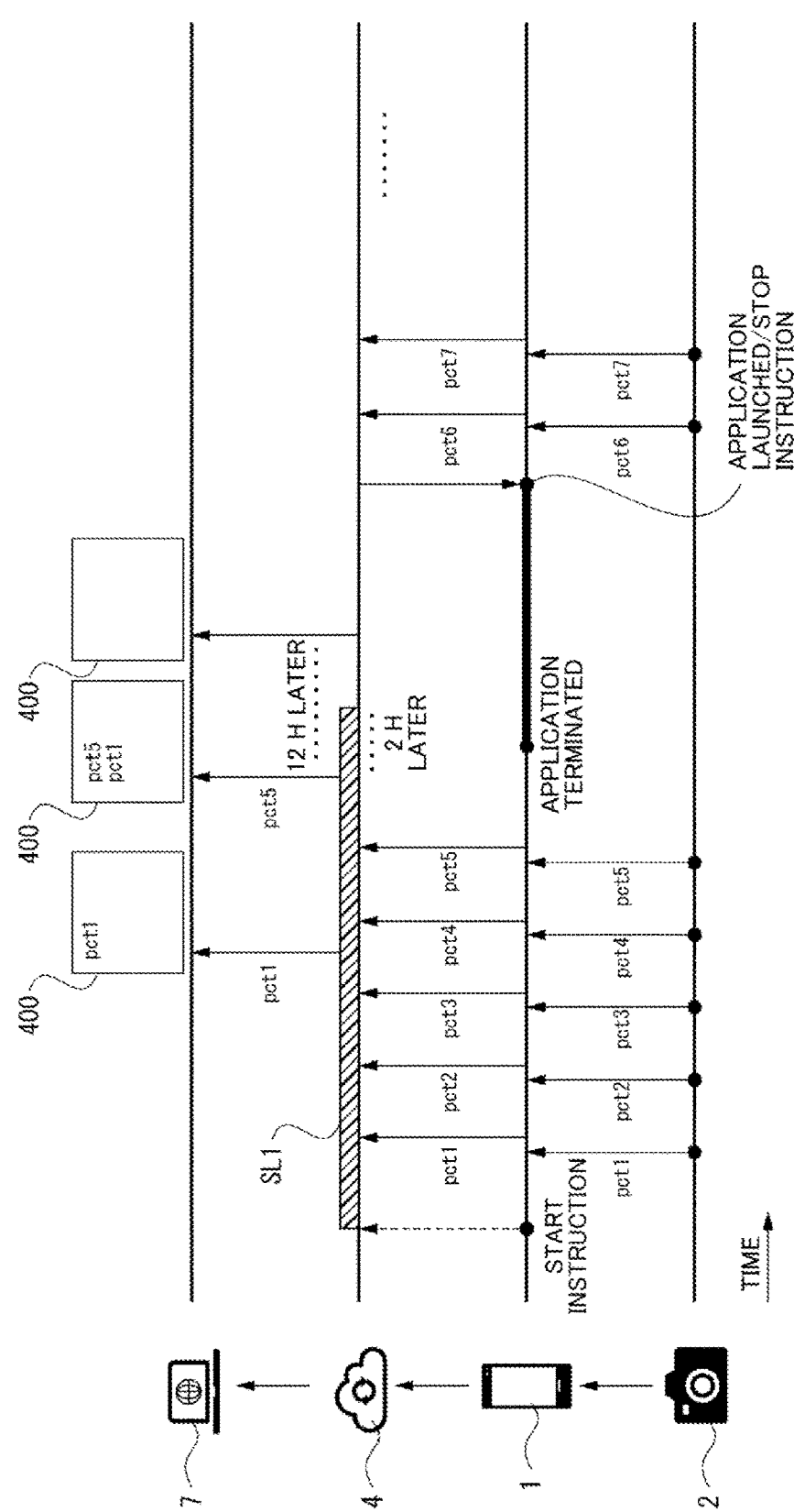
FIG. 53 is an explanatory diagram illustrating an example from image capture to distribution in the embodiment.

FIG. 53 illustrates a case where the selection processing by the server device 4 is ended when the application program that performs the processing described in the present disclosure is closed in the staff terminal 1.

Assume that after the photographer makes a start instruction in the staff terminal 1, the image capturing device 2 captures the image pct1 to the image pct5, then the application program is then closed, and then the application program is then launched again a stop instruction is made. Assume also that the photographer then captures the images pct6 and pct7.

The server device 4 selects the image pct1 to the image pct5, which are images from image capture times after the start instruction, as candidates, and performs selection processing after the start instruction (selection processing period SL1). After the image pct5 is received, if no images have been transferred from the staff terminal 1 for two hours, for example, the server device 4 ends the selection processing. After another 12 hours pass, the live gallery is closed.

The application program is then launched in the staff terminal 1, and in this case, the state of the selection processing in the server device 4 is confirmed, and if no selection processing is being performed, the state is the same as if a stop instruction has been made. This means that the images pct6 and pct7 captured thereafter are not candidates for the live gallery.

Figure 54:
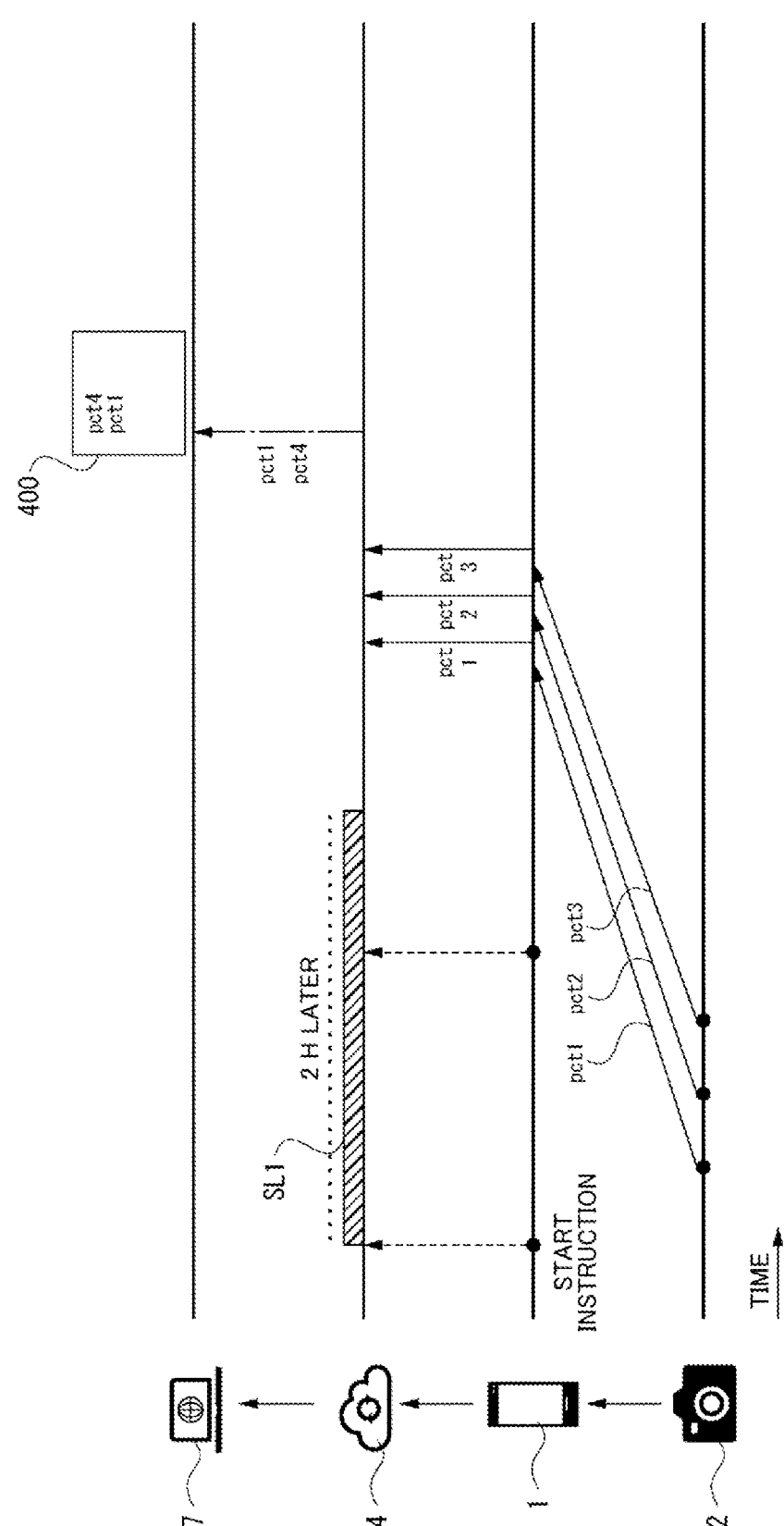
FIG. 54 is an explanatory diagram illustrating an example from image capture to distribution in the embodiment.

FIG. 54 illustrates a case where images are transferred from the staff terminal 1 to the server device 4 after the selection processing by the server device 4 has ended. Assume the photographer makes a start instruction through the staff terminal 1, captures the image pct1 to the image pct3 with the image capturing device 2, and then makes a stop instruction.

However, assume that the image pct1 to the image pct3 are transferred from the image capturing device 2 to the staff terminals 1 after the stop instruction is made. The server device 4 performs the selection processing after the start instruction (the selection processing period SL1), but ends the selection processing when no images have been transferred from the staff terminal 1 for two hours, for example.

Thereafter, the image pct1 to the image pct3 are received by the server device 4 as images to be taken as candidates, but in this case, it is conceivable that the server device 4 does not resume the selection processing, i.e., the image pct5 and on are not uploaded to the live gallery. This is due to the transfer from the image capturing device 2 to the staff terminal 1 being in a mode which is not performed in real time. Alternatively, if the time for closing the live gallery has not yet been reached, such as before 12 hours have passed in the example in FIG. 50, the server device 4 may perform the selection processing for the image pct1 to the image pct3, and those images may be uploaded to the live gallery as indicated by the dot-dash line in accordance with the result of the selection processing.

Note that FIGS. 50 to 54 illustrate examples of the image analysis processing period for selecting images to be uploaded from the candidate images in the server device 4, and when there has been no stop instruction from the camera staff to the staff terminal 1 for at least a predetermined period of time (FIG. 50) or no image transfer for at least a predetermined period of time (FIGS. 51 to 54), the server device 4 ends the image analysis processing for selecting images to be uploaded to the live gallery, closes the live gallery, or the like. However, the server device 4 need not set the image analysis processing period. In other words, rather than the server device 4 automatically stopping and ending the image analysis processing, and stopping the distribution and closing the live gallery as described above, these actions may be performed in response to operations made by the photographer in the staff terminal 1.

The above examples for the various situations are merely examples, and other examples are conceivable. For example, some of the various processing illustrates in FIGS. 42 through 54, from capturing images to uploading images to the live gallery, need not be performed.

Although an example in which a start instruction and an end instruction are issued to the server device 4 separately from the transfer of image data (steps S361 and S363 of FIG. 19), for example, has been described, the staff terminal 1 may add information indicating whether the image is a candidate for the live gallery or not to the metadata of the image data, and then transfer the image data to server device 4. In other words, an example in which a start instruction and a stop instruction pertaining to distributed images are communicated to the server device 4 together with the image data.

In this case, the processing in step S361 of FIG. 19 is setting processing for adding live gallery target image information to the metadata of image data for which the image capture time is after the operation of the start button 301, and when managing the event data in step S105 of FIG. 15, the transfer in step S107 is performed after adding the live gallery target image information to the metadata. Additionally, the processing in step S363 of FIG. 19 is setting processing for adding non-target image information, for not taking the image as a candidate for the live gallery, to the metadata of image data for which the image capture time is after the operation of the stop button 302, and when managing the event data in step S105 of FIG. 15, the transfer in step S107 is performed after adding the non-target image information to the metadata.

Even in such a case, the server device 4 can distribute images through the live gallery according to the intent of the camera staff.

10. Filtering

The filtering performed in the staff terminal 1 will be described next. The following are mainly specific examples of the processing of steps S216, S217, S242, S243, and S240 of FIG. 17.

Figures 55A, 55B:
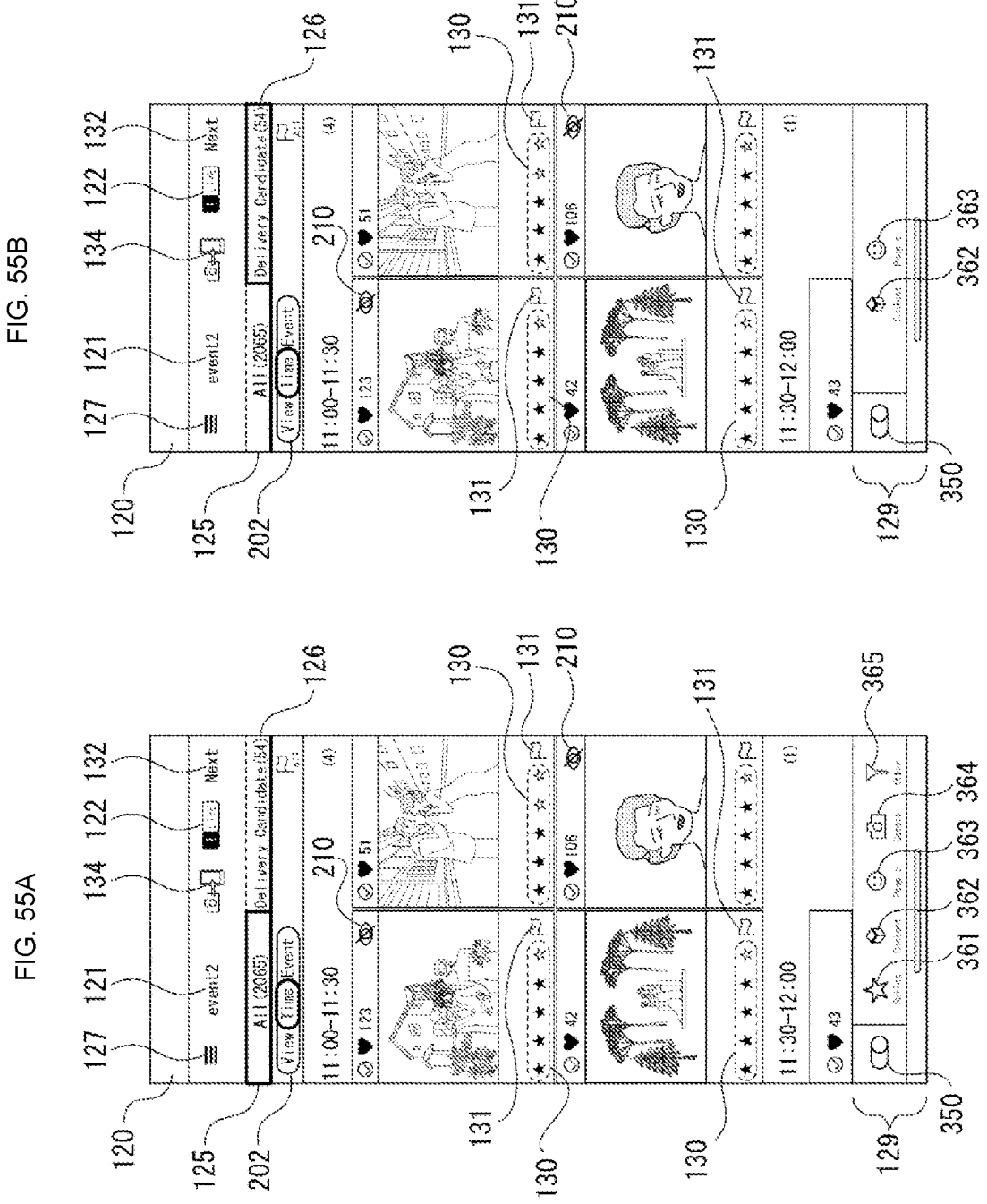
FIGS. 55A and 55B are explanatory diagrams illustrating a filter designation area in the embodiment.

FIG. 55A illustrates an example of the all tab 125, and FIG. 55B illustrates an example of the candidate tab 126. The filter on/off button 350, as well as the icons for the rating filter 361, the content filter 362, the people filter 363, the camera filter 364, and the other filter 365, are displayed in the filter designation area 129 under the all tab 125.

In the case of the candidate tab 126, the filter on/off button 350, as well as the icons of the content filter 362 and the people filter 363, are displayed in the filter designation area 129. The reason the rating filter 361, the camera filter 364, and the other filter 365 are not displayed in the candidate tab 126 is that the corresponding filtering is used mainly to set the selection flags, and these filters are therefore less necessary in the candidate tab 126, which displays a list of the images for which the selection flags are on.

On the other hand, the content filter 362 and the people filter 363 provide useful filtering for confirming the balance of objects and people to be included in the image collection, and are therefore made available in the candidate tab 126 as well.

Specific processing examples will be described below with reference to FIGS. 56, 57, and 58, along with examples of screen displays in FIGS. 59A, 59B, 60A, 60B, 60C, 61A, 61B, 62A, 62B, 63A, 63B, 63C, 64A, 64B, 65A, 65B, 65C, 66A, and 66B.

Figure 56:
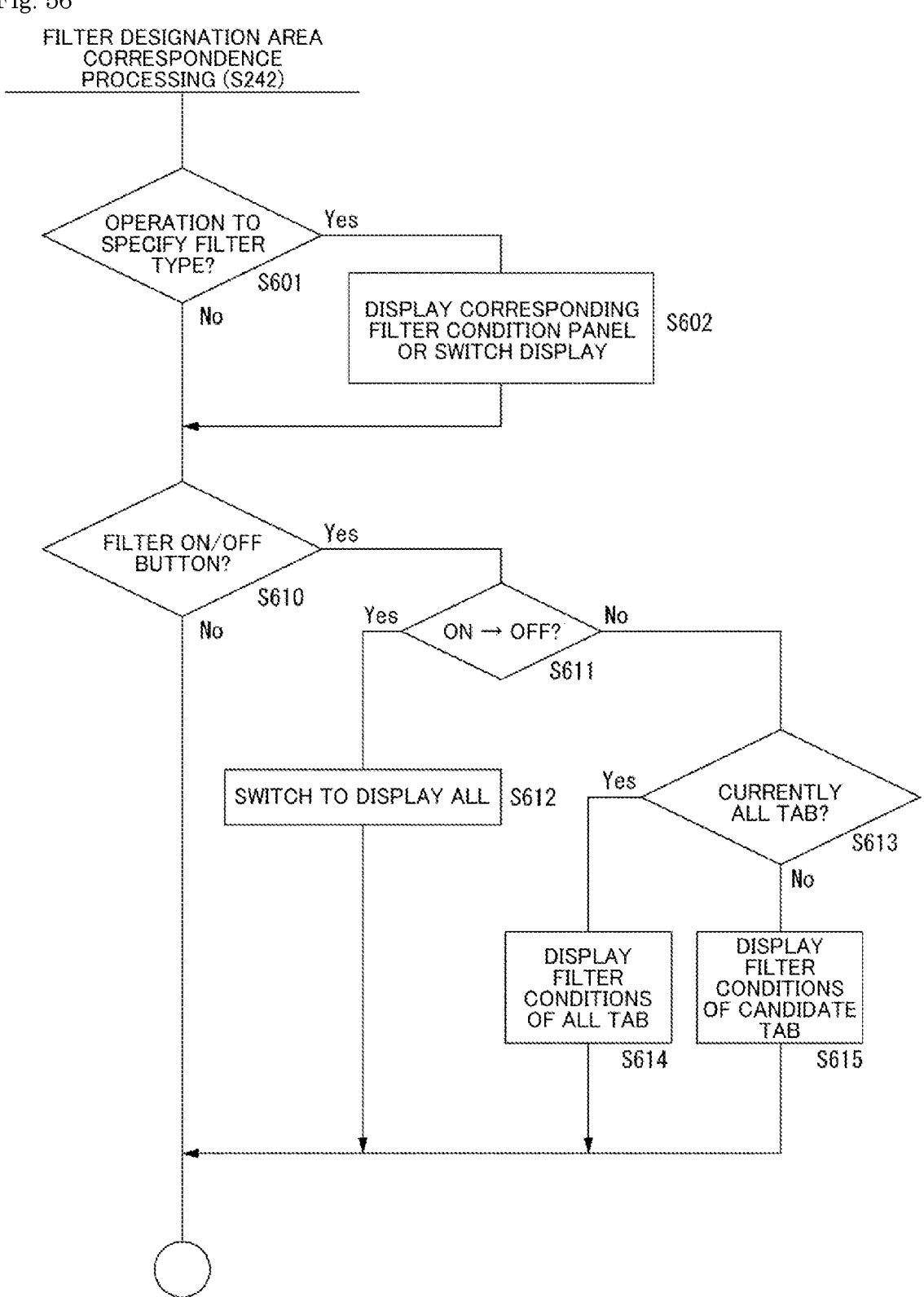
FIG. 56 is a flowchart illustrating filter designation area correspondence processing in the embodiment.

FIG. 56 is an example of the processing in step S242 of FIG. 17. In other words, this is a case where the filter designation area 129 is operated in either the time view 120 or the event view 200, in a state where the all tab 125 or the candidate tab 126 is displayed, as illustrated in FIG. 55A or 55B.

In step S601 of FIG. 56, the staff terminal 1 monitors an operation for specifying a filter type. In other words, this is monitoring whether the icon of the rating filter 361, the content filter 362, the people filter 363, the camera filter 364, or the other filter 365 has been operated. In the case of candidate tab 126, this is monitoring whether the people filter 363 or the camera filter 364 has been operated.

If any one of these icons being operated is detected, the staff terminal 1 moves the sequence to step S602, and controls the display of a corresponding filter condition panel.

Alternatively, if the icon of another filter is operated in a state where the filter condition panel is already being displayed, control for switching the display of the filter condition panel is performed.

"Filter condition panel" refers to a rating condition panel 320, a content condition panel 321, a people condition panel 322, a camera condition panel 323, and an other condition panel 324, which will be described below.

Figures 59A, 59B:
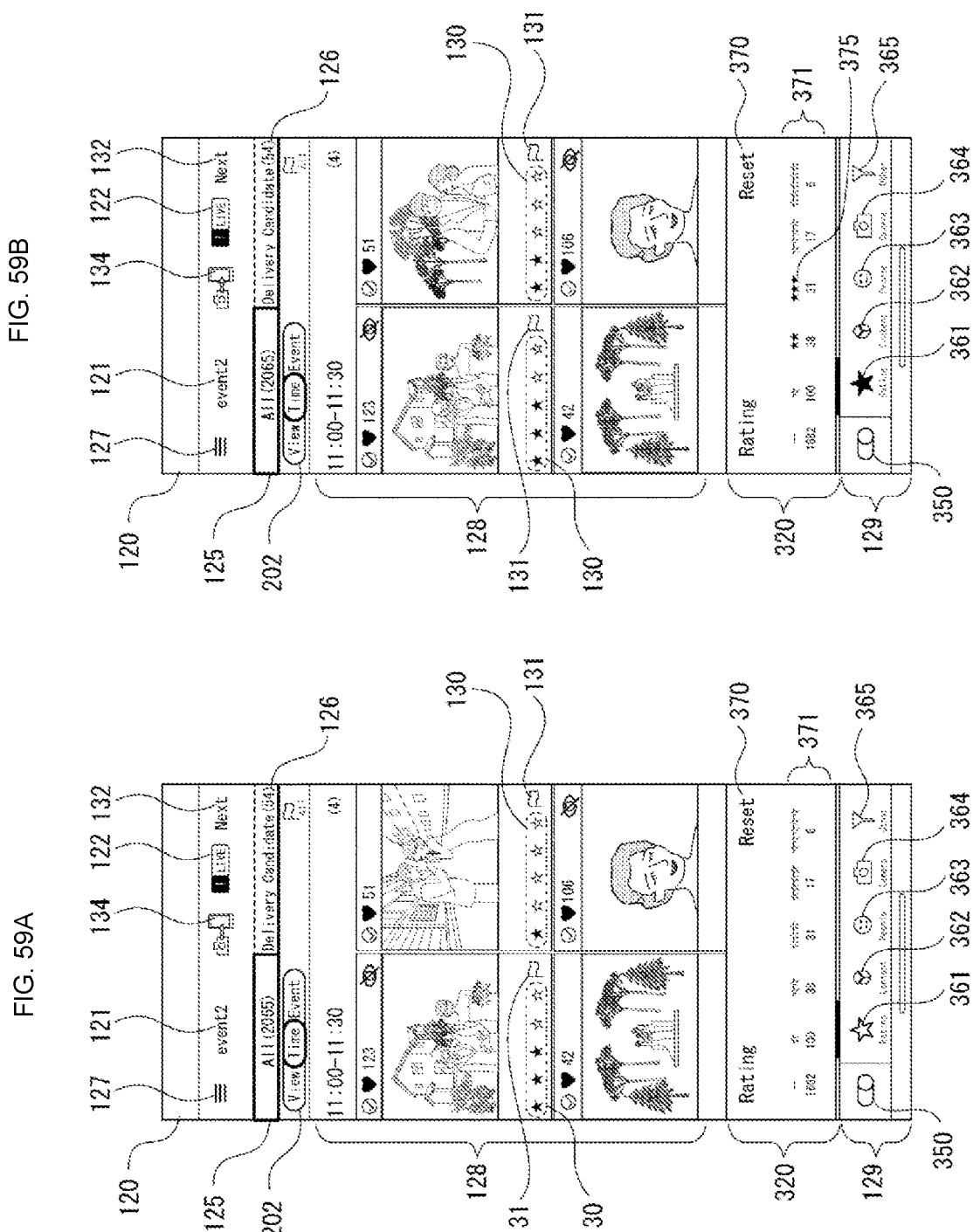
FIGS. 59A and 59B are explanatory diagrams illustrating a rating condition panel in the embodiment.

FIG. 59A illustrates the rating condition panel 320 displayed in step S602 of FIG. 56, in response to the rating filter 361 being operated.

The rating condition panel 320 is provided with a rating condition selection part 371, and filter conditions can be specified by making a rating in six steps, for example.

For example, an operator that indicates a rating level as a number of stars is provided. For example, operators for "no stars", "one star", "two stars", "three stars", "four stars", and "five stars" are displayed.

In the initial state, none of the individual operators are selected. When one is selected, the corresponding content becomes the filter condition. For example, if the "three stars" operator is operated, the filter condition is set to extract images having rating information of "three stars".

A plurality of operators can also be selected. In this case, the filter condition is an OR condition. For example, if the "three stars" operator and the "four stars" operator are operated, the filter condition is set to extract images having rating information of "three stars" or "four stars".

In the rating condition selection part 371, the number of images for which the rating has been set is also indicated next to the operator for the number of stars. This gives the viewer an idea of the number of images which will be filtered for when the filter conditions are specified.

A reset button 370 is also provided in the rating condition panel 320.

The reset button 370 is an operator that resets the settings in the rating condition selection part 371.

FIG. 60B illustrates a state in which the content condition panel 321 is displayed in step S602 of FIG. 56 in response to the content filter 362 being operated from the state illustrated in FIG. 60A.

A thing condition selection part 372 is provided in the content condition panel 321. The thing condition selection part 372 is provided with various things (i.e., content) and check boxes for selecting each thing, and a desired thing can be specified using the check boxes.

For example, objects such as "dress", "cake", "flowers/plants", "accessories", "suit", "meal", "tableware", "nail polish", and "lips", as well as actions of people such as "dance", "smile (person laughing)", and "tears (person crying)", are assumed to be listed in the thing condition selection part 372, as things related to wedding ceremony events.

The types of "things" listed in the thing condition selection part 372 as these things or actions may be determined for each type of event, for example, or the staff terminal 1 may detect things present as subjects through image analysis processing and list the results in the thing condition selection part 372.

In an initial state, none of the things listed in the thing condition selection part 372 are selected. When one is selected, the corresponding content becomes the filter condition. For example, if "dress" is selected, a filter condition is set to extract images in which a dress appears.

A plurality of things can also be selected. In this case, the filter condition is an AND condition. For example, if "dress" and "cake" are selected, a filter condition is set to extract images in which a person wearing a dress appears with a cake.

Note that the filter condition may be an OR condition, or an AND condition or an OR condition may be selected.

In addition, for each thing, the number of images corresponding to that thing is also indicated in the thing condition selection part 372. This gives the viewer an idea of the number of images which will be filtered for when the filter conditions are specified.

The reset button 370 is provided in the content condition panel 321.

The reset button 370 in this case is an operator that resets the settings in the thing condition selection part 372.

Figures 62A, 62B:
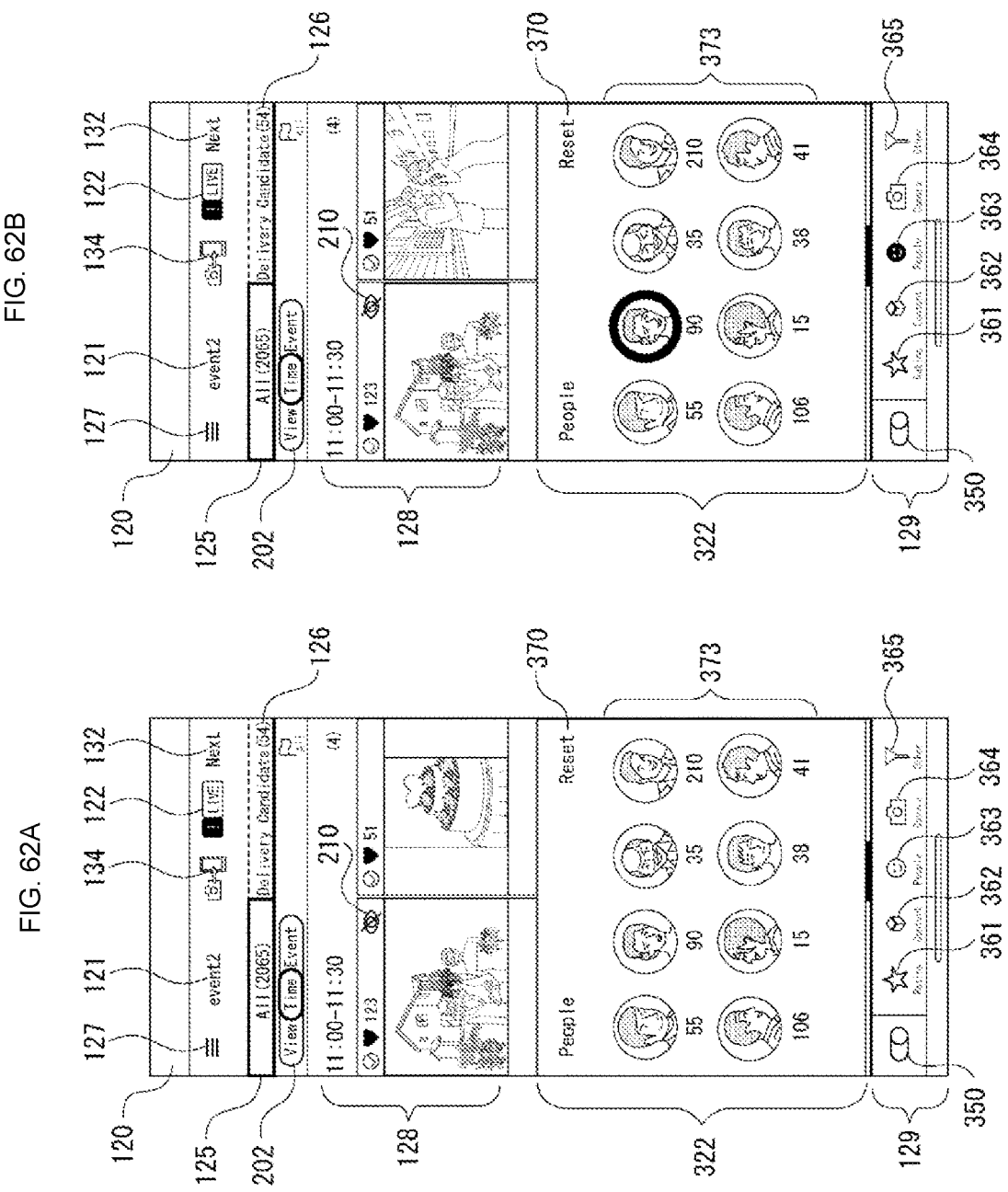
FIGS. 62A and 62B are explanatory diagrams illustrating a people condition panel in the embodiment.

FIG. 62A illustrates a state in which the people condition panel 322 is displayed in step S602 of FIG. 56 in response to the people filter 363 being operated in the filter designation area 129.

A person condition selection part 373 is provided in the people condition panel 322. The person condition selection part 373 shows the face of each individual, and any desired person can be specified. For example, the staff terminal 1 identifies individuals based on the results of analysis processing on each image, extracts the face of the person appearing in the image, converts this into an icon, and adds the icon to the person condition selection part 373.

In an initial state, none of the people listed in the person condition selection part 373 are selected. When one is selected, the corresponding content becomes the filter condition. For example, if the face of an individual "person A" is selected, the filter condition will be set to extract images in which person A appears.

A plurality of people can also be selected. In this case, it is conceivable that the filter condition is an AND condition. The condition may also be an OR condition. It may also be possible to select an AND condition or an OR condition.

For each person, the number of images in which the person appears is also indicated in the person condition selection part 373. This gives the viewer an idea of the number of images which will be filtered for when the filter conditions are specified.

The reset button 370 is also provided in the people condition panel 322.

The reset button 370 in this case is an operator that resets the settings in the person condition selection part 373.

Figures 63A, 63B, 63C:
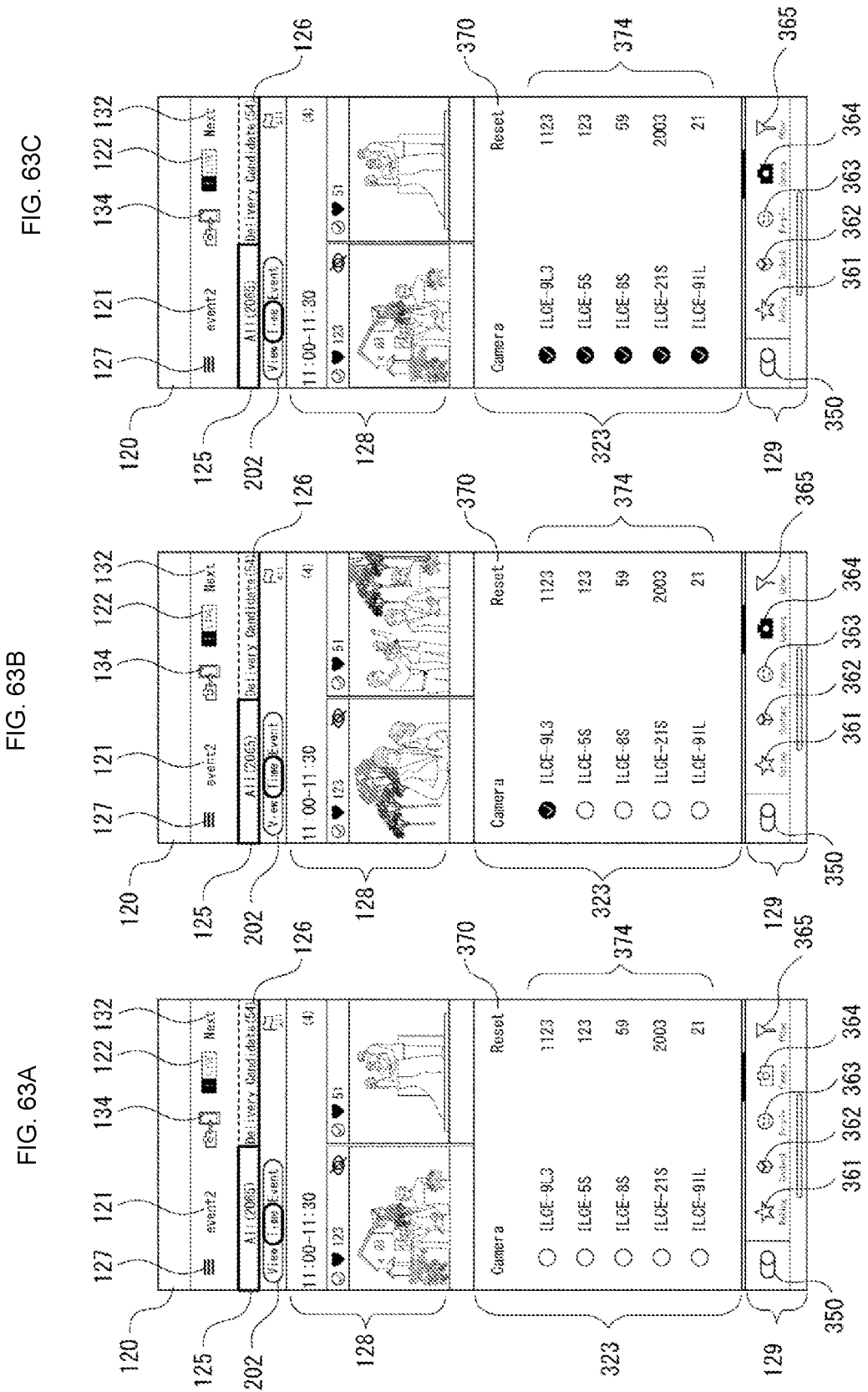
FIGS. 63A, 63B, and 63C are explanatory diagrams illustrating a camera condition panel in the embodiment.

FIG. 63A illustrates a state in which the camera condition panel 323 is displayed in step S602 of FIG. 56 in response to the camera filter 364 being operated in the filter designation area 129.

A camera condition selection part 374 is provided in the camera condition panel 323. The camera condition selection part 374 shows the name, model name, and the like of the image capturing device 2 used by the camera staff, and this can be selected using a check box.

For example, for an image capturing device 2 for which FTP communication settings have been made, the staff terminal 1 may list the equipment name, the model name, and the like in the camera condition selection part 374.

In the initial state, none of the image capturing devices 2 listed in the camera condition selection part 374 are selected. When one is selected, the corresponding content becomes the filter condition. A plurality of image capturing devices 2 can also be selected. In this case, the filter condition is an OR condition.

The initial state may be the state in which all the image capturing devices 2 are selected.

The number of images captured by each image capturing device 2 in the current project is also indicated in the camera condition selection part 374. This gives the viewer an idea of the number of images which will be filtered for when the filter conditions are specified.

The reset button 370 is also provided in the camera condition panel 323.

The reset button 370 in this case is an operator that resets the settings in the camera condition selection part 374.

Figures 64A, 64B:
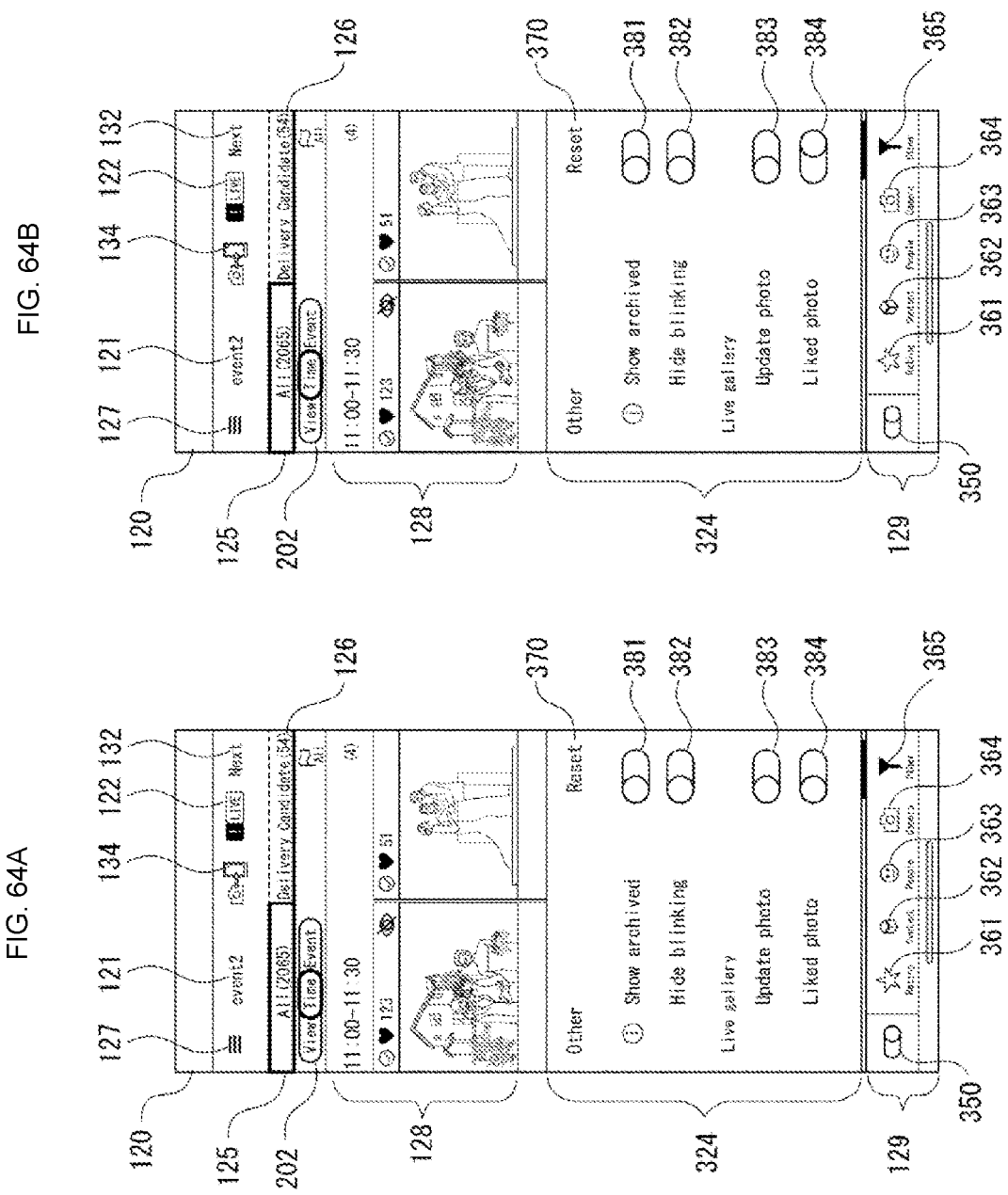
FIGS. 64A and 64B are explanatory diagrams illustrating an other condition panel in the embodiment.

FIG. 64A illustrates a state in which the other condition panel 324 is displayed in step S602 of FIG. 56 in response to the other filter 365 being operated in the filter designation area 129.

An archive condition button 381, an eyes closed condition button 382, a distributed image condition button 383, and an evaluation image condition button 384 are provided in the other condition panel 324.

The archive condition button 381 is an operator to turn archive conditions on and off. For example, the filter condition can be toggled between "show archived images" when on and "hide archived images" when off.

The eyes closed condition button 382 is an operator for turning on and off the display of images in which the eyes of the subject person are detected as being closed. For example, the filter condition can be toggled between "hide images with closed eyes" when on and "show all images" when off.

The distributed image condition button 383 is an operator for turning on and off filter conditions for the images distributed through the live gallery. For example, the filter condition can be toggled between "show only images distributed through live gallery" when on and "show all images" when off.

The evaluation image condition button 384 is an operator for turning on and off filter conditions for the images given high ratings in the live gallery. For example, the filter condition can be toggled between "show only images having high ratings" when on and "show all images" when off.

The number of images resulting from the filtering may be displayed for the archive condition button 381, the eyes closed condition button 382, the distributed image condition button 383, and the evaluation image condition button 384.

The reset button 370 is also provided in the other condition panel 324.

In this case, the reset button 370 is an operator that puts the buttons in the other condition panel 324 into their initial states. The initial states are, for example, the archive condition button 381 being off, the eyes closed condition button 382 being on, the distributed image condition button 383 being off, and the evaluation image condition button 384 being off. These may be different, however.

As in each of the examples described above, in step S602 of FIG. 56, control is performed for displaying the filter condition panel corresponding to the operation made in the filter designation area 129, i.e., displaying one of the rating condition panel 320, the content condition panel 321, the people condition panel 322, the camera condition panel 323, or the other condition panel 324.

In step S610 of FIG. 56, the staff terminal 1 monitors an operation of the filter on/off button 350. When the filter on/off button 350 being operated is detected, the staff terminal 1 performs the processing of step S611 and on. This will be described later.

An example of the processing performed in step S243 of FIG. 17 will be described next with reference to FIG. 57.

Note that the "filter operation" in step S217 of FIG. 17 is mainly an operation for filter conditions, i.e., an operation for designating filter conditions in one of the rating condition panel 320, the content condition panel 321, the people condition panel 322, the camera condition panel 323, or the other condition panel 324.

Figure 57:
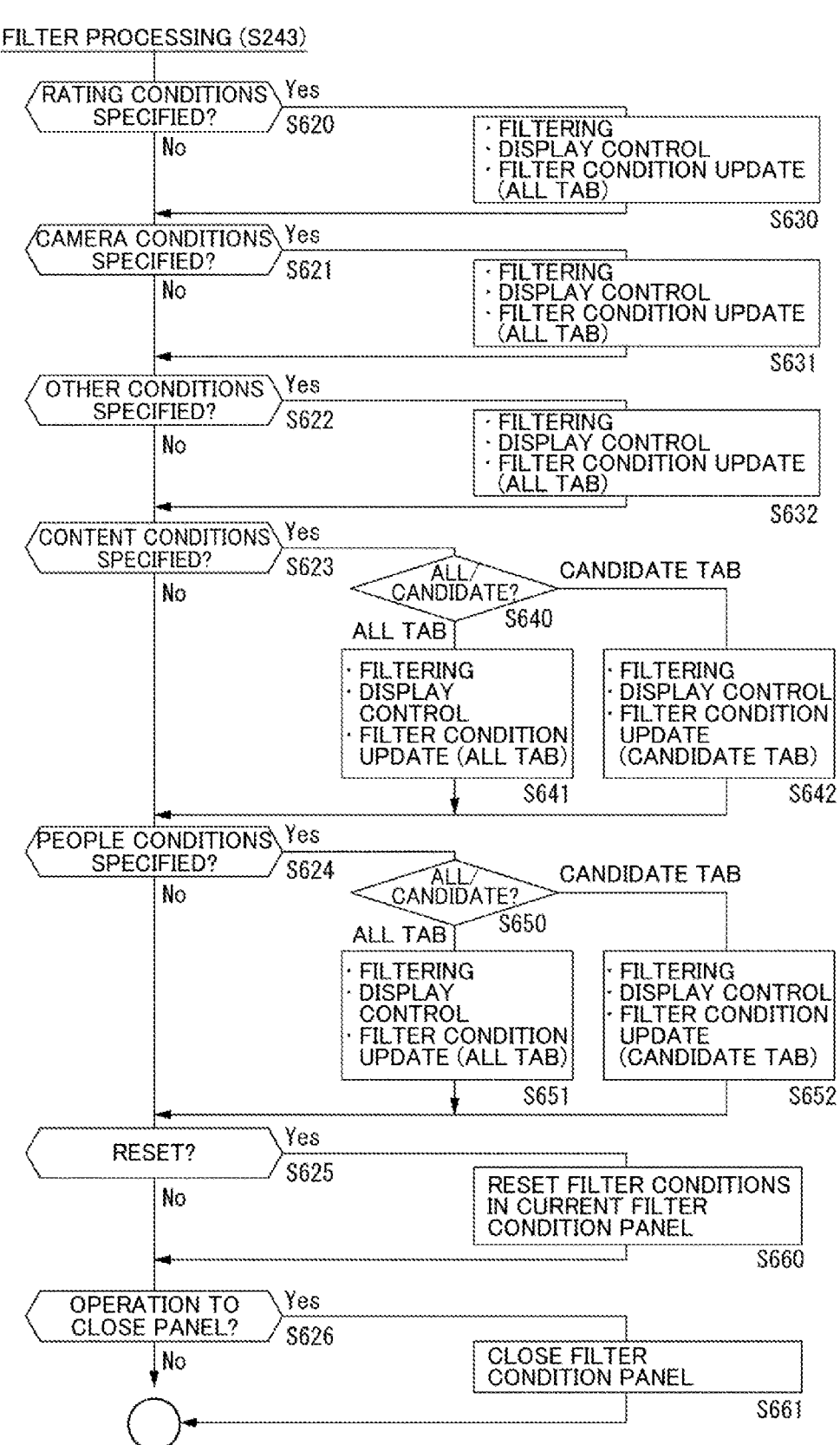
FIG. 57 is a flowchart illustrating filter processing in the embodiment.

If the filter operation detected in step S217 of FIG. 17 is an operation of one of the operators from "no stars" to "five stars" in the rating condition panel 320, the staff terminal 1 moves the sequence from step S620 to step S630 of FIG. 57, and performs processing for filtering using the designated filter conditions, display control based on the results of the filtering, and updating the filter conditions.

For example, FIG. 59B illustrates a case where two operators, namely "two stars" and "three stars", have been selected in the rating condition selection part 371 from the state illustrated in FIG. 59A.

In this case, the staff terminal 1 performs filter processing for extracting images having rating information of "two stars" and "three stars".

Then, as the display control, the extracted images are displayed in the image area 128, and the two operators, namely "two stars" and "three stars", are clearly indicated as being selected by, for example, changing the color thereof or the like. Furthermore, the display color of the rating filter 361 in the filter designation area 129 is changed to clearly indicate that filter conditions based on ratings are set.

The staff terminal 1 also updates and stores the filter conditions based on the rating, namely "OR for "two stars" and "three stars"", as the filter conditions pertaining to the all tab 125, as the processing for updating the filter conditions. Note that the filter conditions are related to the all tab 125 in order to make it possible to select the rating conditions only in the all tab 125.

If the filter operation detected in step S217 of FIG. 17 is an operation for selecting the image capturing device 2 in the camera condition panel 323, the staff terminal 1 moves the sequence from step S621 to step S631 of FIG. 57, and performs filtering, display control based on the result of the filtering, and processing for updating the filter conditions.

For example, FIG. 63B illustrates a case where a single image capturing device 2 is selected from the state illustrated in FIG. 63A.

In this case, the staff terminal 1 performs filter processing for extracting the images from the corresponding image capturing device 2.

Then, as the display control, the extracted images are displayed in the image area 128, and the selected image capturing device 2 is clearly indicated as being selected by checking the check box thereof. Furthermore, the display color of the camera filter 364 in the filter designation area 129 is also changed to clearly indicate that the filter conditions are set based on the type of the image capturing device 2.

The staff terminal 1 also updates and stores the filter conditions based on the type of the image capturing device 2 as the filter conditions pertaining to the all tab 125, as the processing for updating the filter conditions. In this case too, the filter conditions are related to the all tab 125 in order to make it possible to select the filter conditions based on the type of the image capturing device 2 only in the all tab 125.

Furthermore, FIG. 63B illustrates a state in which a plurality of image capturing devices 2 are selected.

In this case, the staff terminal 1 performs filter processing for extracting the images from the corresponding plurality of image capturing devices 2.

Then, as the display control, the extracted images are displayed in the image area 128, and the selected plurality of image capturing devices 2 are clearly indicated as being selected by checking the check boxes thereof.

Furthermore, the filter conditions based on the types of the image capturing devices 2 are updated and stored as the filter conditions pertaining to the all tab 125.

If the filter operation detected in step S217 of FIG. 17 is an operation of one of the buttons in the other condition panel 324, the staff terminal 1 moves the sequence from step S622 to step S632 of FIG. 57, and performs filtering, display control based on the result of the filtering, and processing for updating the filter conditions.

For example, FIG. 64B illustrates a state in which the evaluation image condition button 384 has been operated from the state illustrated in FIG. 64A.

In this case, the staff terminal 1 performs filter processing for extracting images to which high evaluation information has been given.

Then, as the display control, the extracted images are displayed in the image area 128, and the state of the evaluation image condition button 384 is changed to an operational state. Furthermore, the display color of the other filter 365 in the filter designation area 129 is changed to clearly indicate that the filter conditions are set as the other filter.

Additionally, as processing for changing the filter conditions, the staff terminal 1 updates and stores the filter conditions based on the other filter being operated as the filter conditions pertaining to the all tab 125. In this case too, the filter conditions are related to the all tab 125 in order to make it possible to select the filter conditions corresponding to the other filter 365 only in the all tab 125.

In addition to extracting the images to which high evaluation information has been given, for example, processing for extracting images for which the high rating number is at least a predetermined number may be performed as the filter processing when the evaluation image condition button 384 is operated as indicated in the drawings.

Furthermore, the camera staff may enter the high rating number or the like, and the processing may extract images for which the number of times the high rating number has been entered is at least a predetermined number.

It may be made possible for the camera staff to select which of these types of extraction is to be performed.

Additionally, the processing performed in step S632 when the distributed image condition button 383 is operated is processing for extracting images to be uploaded to the live gallery, and processing for displaying those images in the image area 128, changing the display of the distributed image condition button 383 to an operational state, and changing the display color of the other filter 365.

The same can be considered when the archive condition button 381 and the eyes closed condition button 382 are operated.

If the filter operation detected in step S217 of FIG. 17 is a selection operation made in the content condition panel 321, the staff terminal 1 moves the sequence from step S623 to step S640 of FIG. 57, and the processing branches according to whether the all tab 125 is being displayed or the candidate tab 126 is being displayed.

If the all tab 125 is being displayed, the staff terminal 1 moves the sequence to step S641, where filtering, display control based on the result of the filtering, and processing for updating the filter conditions in the all tab 125 are performed.

For example, FIG. 60C illustrates a case where a single thing is selected from the state illustrated in FIG. 60B.

In this case, the staff terminal 1 performs filter processing for extracting images in which that thing appears.

Then, as the display control, the extracted images are displayed in the image area 128, and the selected thing is clearly indicated as being selected by checking the check box thereof. Furthermore, the display color of the content filter 362 in the filter designation area 129 is also changed to clearly indicate that the filter conditions are set according to the thing.

The staff terminal 1 also updates and stores the filter conditions based on the thing as the filter conditions pertaining to the all tab 125, as the processing for updating the filter conditions.

If the candidate tab 126 is being displayed, the staff terminal 1 moves the sequence to step S642, where filtering within the images for which selection flags have been set, display control based on the result of the filtering, and processing for updating the filter conditions for the candidate tab 126 are performed. In this case, the filter conditions based on things are updated and stored as filter conditions pertaining to the candidate tab 126, as the processing for updating the filter conditions. This means that the storage is performed independently from the storage of the filter conditions based on the things for the all tab 125.

Figures 61A, 61B:
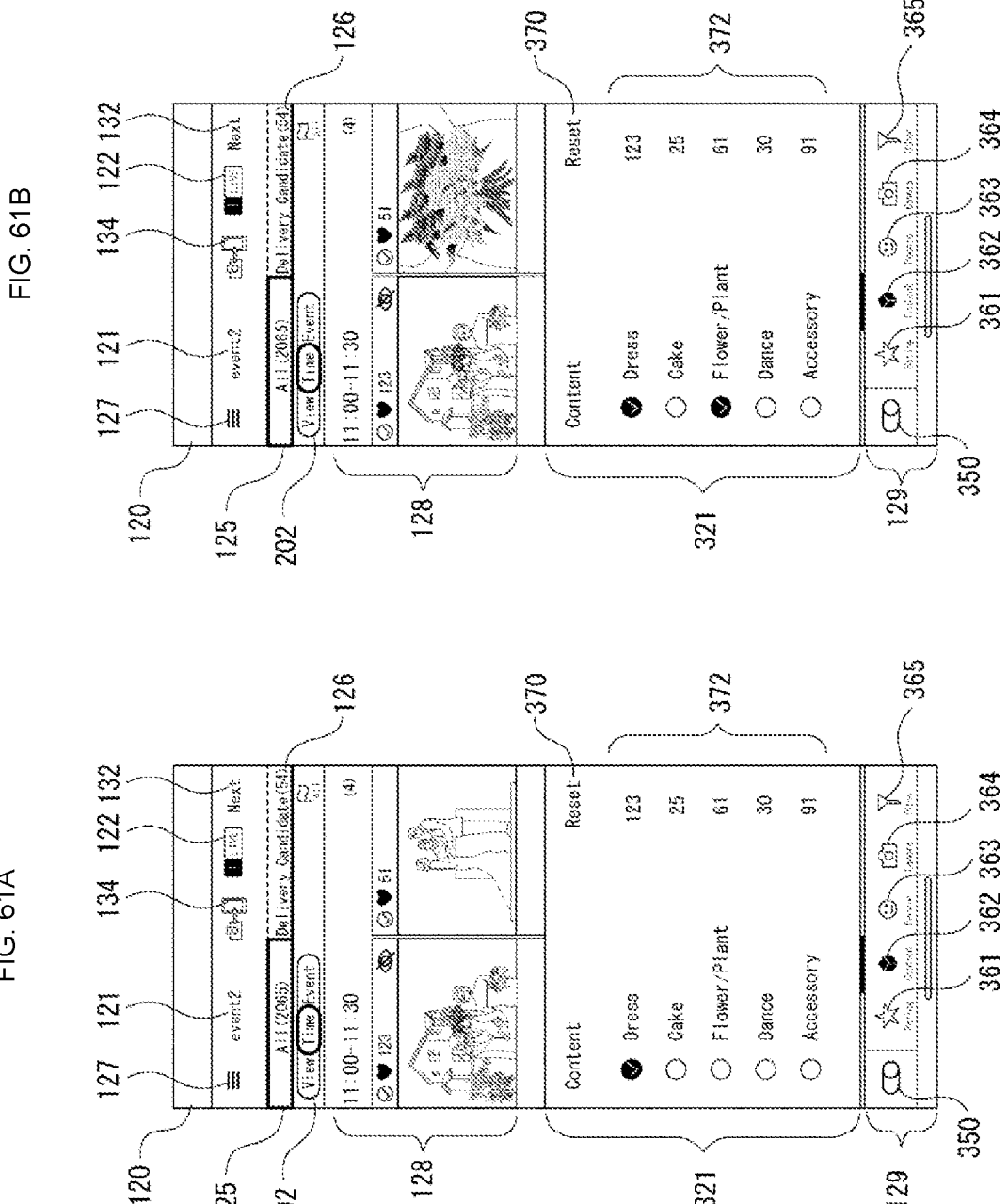
FIGS. 61A and 61B are explanatory diagrams illustrating a content condition panel in the embodiment.

FIG. 61B illustrates a case in which the number of things specified has increased and a plurality of things have been selected, from the state illustrated in FIG. 61A. In this case, the extraction processing in step S641 or step S642 extracts, as an AND condition, images in which the selected plurality of things appear together, and causes those images to be displayed in the image area 128 as the display control.

If the filter operation detected in step S217 of FIG. 17 is a selection operation made in the people condition panel 322, the staff terminal 1 moves the sequence from step S624 to step S650 of FIG. 57, and the processing branches according to whether the all tab 125 is being displayed or the candidate tab 126 is being displayed.

If the all tab 125 is being displayed, the staff terminal 1 moves the sequence to step S651, where filtering, display control based on the result of the filtering, and processing for updating the filter conditions in the all tab 125 are performed.

For example, FIG. 62B illustrates a state in which a given person is selected.

In this case, the staff terminal 1 performs filter processing for extracting images in which that person appears.

Then, as the display control, the extracted images are displayed in the image area 128, and the images of the selected person are clearly indicated as being selected by highlighting the images, changing the color, or the like. Furthermore, the display color of the people filter 363 in the filter designation area 129 is also changed to clearly indicate that the filter conditions are set according to the person.

The staff terminal 1 also updates and stores the filter conditions based on the person as the filter conditions pertaining to the all tab 125, as the processing for updating the filter conditions.

If the candidate tab 126 is being displayed, the staff terminal 1 moves the sequence to step S652, where filtering within the images for which selection flags have been set, display control based on the result of the filtering, and processing for updating the filter conditions for the candidate tab 126 are performed. In this case, the filter conditions based on the person are updated and stored as filter conditions pertaining to the candidate tab 126, as the processing for updating the filter conditions. This means that the storage is performed independently from the storage of the filter conditions based on the person for the all tab 125.

Although the foregoing steps S630, S631, S632, S641, S642, S651, and S652 have been described as a case where given filter conditions are selected in one of the rating condition panel 320, the content condition panel 321, the people condition panel 322, the camera condition panel 323, and the other condition panel 324, if an operation is made to cancel the selections, similar processing is performed in accordance with that operation. In other words, the filtering, display control, and updating of the filter conditions are performed in a state in which given conditions have been canceled.

The "operation to cancel the selection" is, for example, an operation of tapping the operator for the selected filter condition again.

If the filter operation detected in step S217 in FIG. 17 is an operation of the reset button 370, the staff terminal 1 moves the sequence from step S625 to step S660 of FIG. 57, and performs filtering, display control, and processing for updating the filter conditions as processing for resetting the filter conditions in the panel which is currently open as well.

Figures 65A, 65B, 65C:
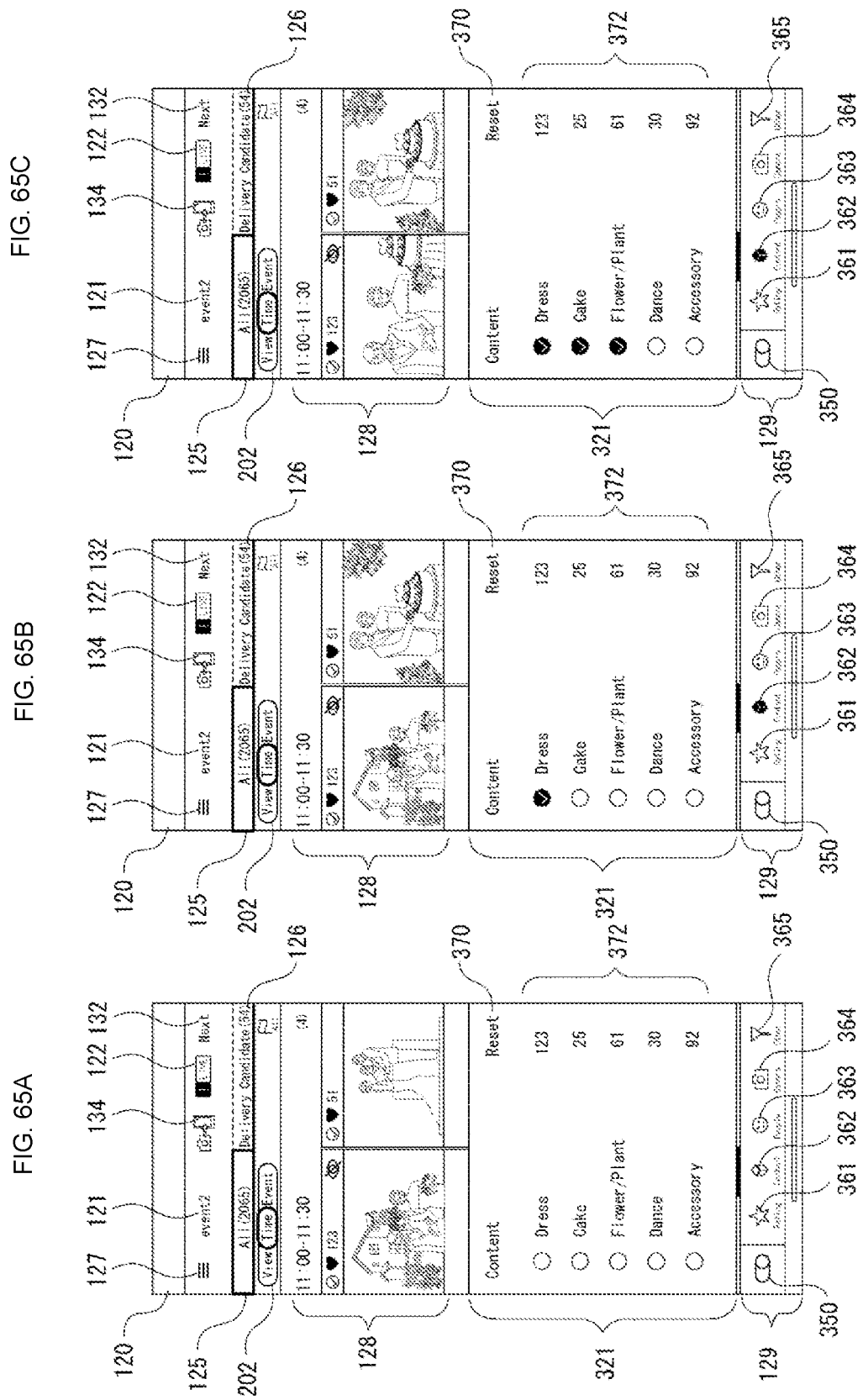
FIGS. 65A, 65B, and 65C are explanatory diagrams illustrating a reset operation in the embodiment.

For example, FIG. 65A illustrates the initial state of the content condition panel 321, FIG. 65B indicates a state in which "dress" is selected, and FIG. 65C indicates a state in which a plurality of things are selected.

With respect to the display in the image area 128, FIG. 65A indicates a state in which no conditions for things are selected, FIG. 65B indicates a state in which images containing "dresses" are extracted and displayed, in FIG. 65C indicates a state in which only images in which all of the selected things appear are extracted and displayed.

For example, if the reset button 370 is operated in the state illustrated in FIG. 65B, the condition of "dress" is reset, and the display state returns to that illustrated in FIGS. 65A, 65B, and 65C.

For example, if the reset button 370 is operated in the state illustrated in FIG. 65C, the conditions for the plurality of things are reset, and the display state returns to that illustrated in FIGS. 65A, 65B, and 65C.

Note that the filter conditions for the all tab 125 or the candidate tab 126 are updated and stored in a state in which the conditions for the things are reset.

Providing the reset button 370 is useful when, after specifying a plurality of filter conditions, those filter conditions are to be canceled.

With respect to the rating condition panel 320, the people condition panel 322, the camera condition panel 323, and the other condition panel 324 as well, the reset processing is performed for the filter conditions selected in that panel in response to the reset button 370 being operated.

Note that although the reset is described as being performed for a single filter condition panel at a time, the filter condition settings for all the filter condition panels may be reset in response to the reset button 370 being operated in a given filter condition panel. However, it is desirable for the filter conditions in the all tab 125 and the filter conditions in the candidate tab 126 to be reset independently of each other.

If the filter operation detected in step S217 of FIG. 17 is an operation for closing the panel, the staff terminal 1 moves the sequence from step S626 to step S661 of FIG. 57, and performs processing for closing the filter condition panel which is currently open (the rating condition panel 320, the content condition panel 321, the people condition panel 322, the camera condition panel 323, or the other condition panel 324).

The "operation for closing the panel" may be, for example, tapping a region outside the filter condition panel, or the like. A close button may also be provided in each panel.

Processing performed when the filter on/off button 350 is operated in step S610 of FIG. 56, mentioned earlier, will be described here.

If the filter on/off button 350 being operated is detected, the staff terminal 1 moves the sequence from step S610 to step S611, and the processing branches depending on whether the operation is an on-to-off operation or an off-to-on operation.

If the operation is an on-to-off operation, the staff terminal 1 moves the sequence to step S612, and performs processing for switching to a full display. In other words, all the images are displayed in the image area 128, assuming that the filter conditions at that point in time have been temporarily canceled.

Figures 66A, 66B:
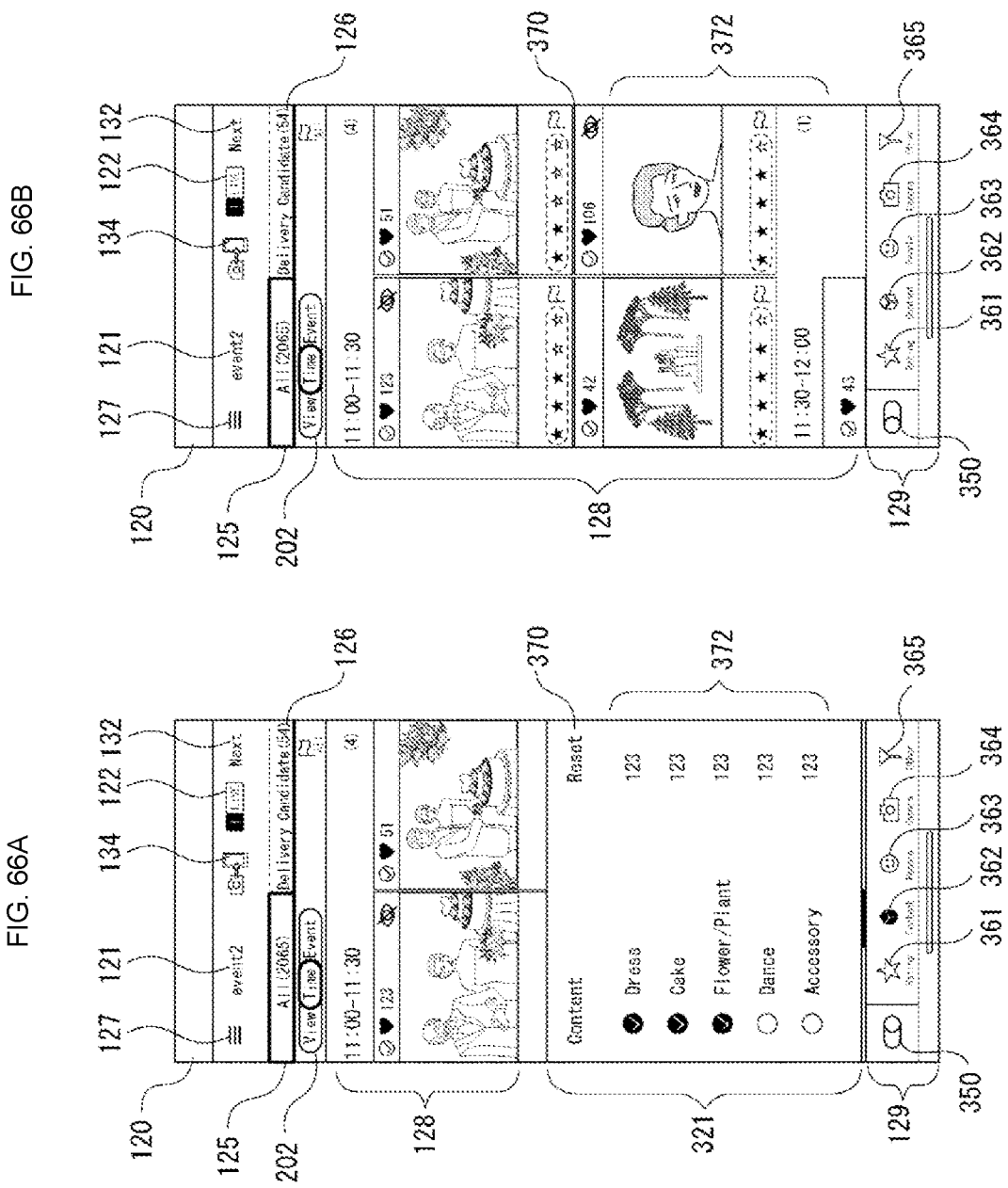
FIGS. 66A and 66B are explanatory diagrams illustrating a filter on/off operation in the embodiment.

FIG. 66A illustrates a state in which filter conditions for things are set in the content condition panel 321. If the filter on/off button 350 is turned off at this time, all the images are displayed regardless of the filter conditions, as illustrated in FIG. 66B.

Note that the on-to-off operation in this case does not clear the storage of the filter conditions. If the filter on/off button 350 has been switched from off to on, for example, the filter conditions illustrated in FIG. 66A are reactivated, and only the images extracted by those filter conditions are displayed in the image area 128.

In other words, in the case of an off-to-on operation, the sequence moves from step S611 to step S613 of FIG. 56, and the processing branches depending on whether the all tab 125 or the candidate tab 126 is being displayed at that time.

If the all tab 125 is being displayed, in step S614, the images extracted according to the filter conditions stored for the all tab 125 at that point are displayed.

If the candidate tab 126 is being displayed, in step S615, the images extracted according to the filter conditions stored for the candidate tab 126 at that time are displayed.

In steps S630, S631, S632, S641, S642, S651, and S652 of FIG. 57 described above, the filter conditions corresponding to the all tab 125 or the candidate tab 126 are updated and stored according to the operation of the filter conditions.

The updating of the filter conditions is performed, for example, as an update of the filter condition information 63 in the event data 60 illustrated in FIG. 6.

Alternatively, the filter conditions may be temporarily stored in the RAM 73 or the like as the latest filter conditions.

In either case, the latest filter conditions are stored at the point in time when the filter on/off button 350 is turned off.

Accordingly, when the filter on/off button 350 is turned on, the display processing can be performed according to the latest filter conditions in step S614 or step S615.

Figure 58:
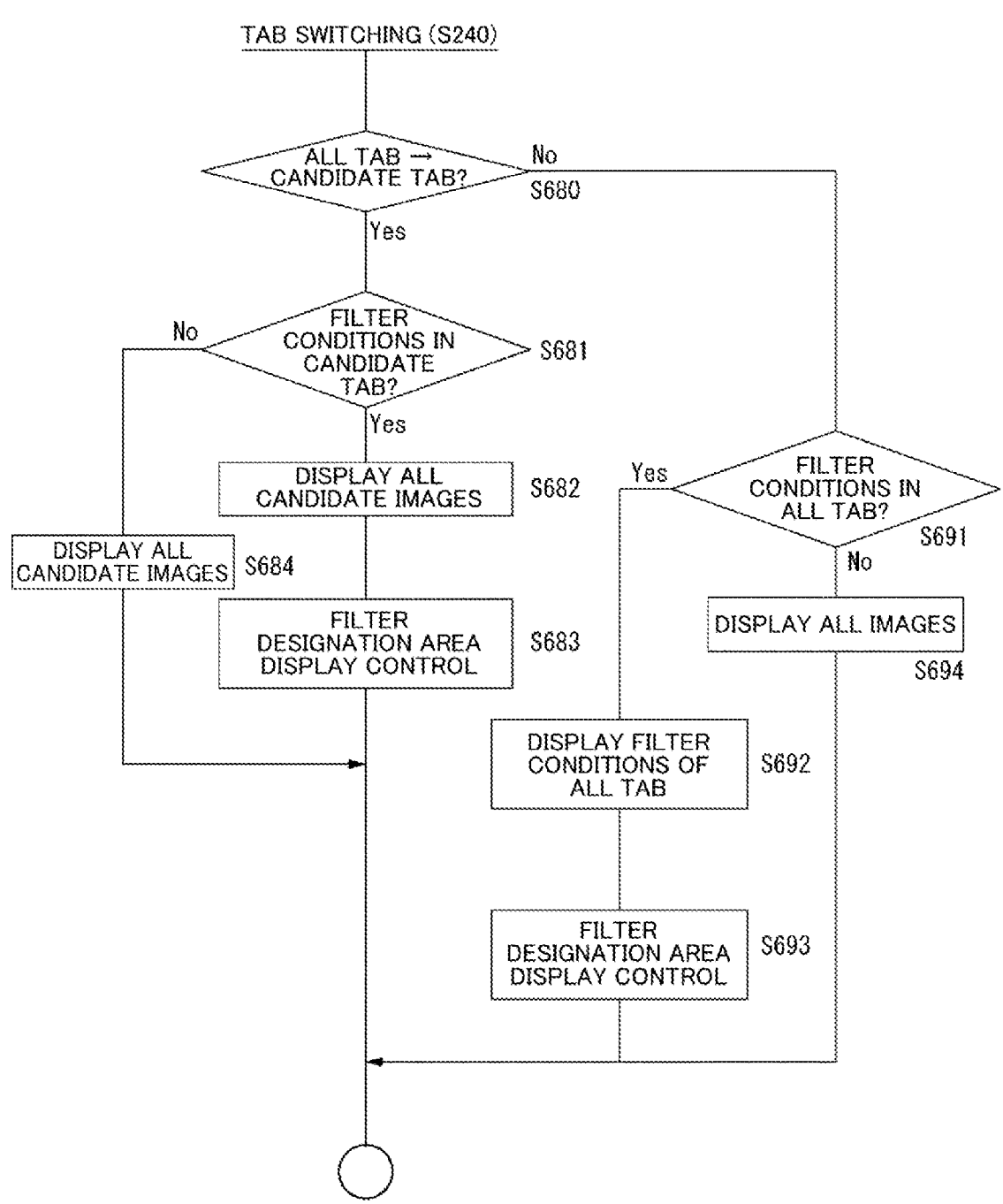
FIG. 58 is a flowchart illustrating tab switching processing in the embodiment.

Processing performed when switching the tab as indicated in FIG. 58 will be described next. This is an example of the processing performed in step S240 of FIG. 17.

In step S680 of FIG. 58, the staff terminal 1 branches the processing depending on whether or not the tab switching operation is from the all tab 125 to the candidate tab 126.

If the operation is a switch from the all tab 125 to the candidate tab 126, the staff terminal 1 confirms the filter conditions for the candidate tab 126 in step S681 by referring to the filter condition information 63 in the event data 60 at that point in time, for example.

If no filter conditions are set, the staff terminal 1 performs control to display all the images that are candidates, i.e., the images for which selection flags are set, in the candidate tab 126 in step S684.

If filter conditions are set, the staff terminal 1 similarly performs control to display all the images that are candidates, i.e., the images for which selection flags are set, in the candidate tab 126 in step S682.

However, the staff terminal 1 controls the display of the filter designation area 129 of the candidate tab 126 in step S683. In this case, the filter on/off button 350 is displayed off, and the display color of each filter display, namely the rating filter 361, the content filter 362, the people filter 363, the camera filter 364, and the other filter 365, is set according to the filter conditions which are set. In other words, the filter type for which the conditions are set is clearly indicated.

If the filter on/off button 350 is turned on thereafter in the candidate tab 126, the filter conditions are activated as a result of the processing in step S615 of FIG. 56 above.

Accordingly, when the display of the candidate tab 126 is started, the images are initially displayed with the filter conditions turned off, even if the filter conditions were set when the candidate tab 126 was previously opened. This is because the candidate tab 126 is for confirming images for which selection flags have been set, and having all the candidate images displayed when the tab is opened is better for the camera staff.

Furthermore, because the filter conditions are stored, the display can be immediately set to the previous filtering state by pressing the turning the filter on/off button 350 on.

If the tab switching operation is a switch from the candidate tab 126 to the all tab 125, the staff terminal 1 moves the sequence from step S680 to step S691, and confirms the filter conditions for the all tab 125 at that point in time by referring to the filter condition information 63 in the event data 60, for example.

If no filter conditions are set, the staff terminal 1 performs control for displaying all the images in the all tab 125 in step S694.

In other words, the images are displayed according to the filter conditions set in the all tab the previous time.

Additionally, the staff terminal 1 controls the display of the filter designation area 129 in step S693. In this case, the filter on/off button 350 is displayed on, and the display color of each filter display, namely the rating filter 361, the content filter 362, the people filter 363, the camera filter 364, and the other filter 365, is set according to the filter conditions which are set. In other words, the filter type for which the conditions are set is clearly indicated.

Accordingly, when the display of the all tab 125 is started, unlike the candidate tab 126, the images are displayed according to the previous filter conditions.

This is because the all tab 125 is better suited for narrowing down the number of images for selection, and moreover, it is thought that the selection task can be streamlined by making use of the previous filter conditions.

The foregoing is realized by independently updating and storing the filter conditions between the all tab 125 and the candidate tab 126.

It is conceivable that the filtering conditions are maintained even when switching between the time view 120 and the event view 200.

That is, if filtering is applied in the time view 120 and the view is then switched to event view 200, the images according to the filtering conditions are displayed in that event view 200 as well. For example, if filtering conditions which prevent archived images from being displayed are set, the archived images will not be displayed even if the view is switched to the event view 200. Additionally, the filter conditions can be changed in the screen of the event view 200.

11. Conclusion and Variations

The following effects can be achieved by the foregoing embodiment.

The staff terminal 1, which is an information processing device according to the embodiment, includes the distribution management unit 35, which performs instruction processing pertaining to image distribution, i.e., live gallery distribution, for image data captured at a specific event such as a wedding ceremony and sequentially transmitted to the server device 4 almost in real time, for example. The staff terminals 1 also includes the event data management unit 30, which performs processing for managing, in association with the image data, evaluation information for images distributed through the live gallery. The staff terminals 1 also includes the filter processing unit 33, which performs filtering processing on the image data using the evaluation information as a filter condition. The instruction processing pertaining to the live gallery distribution includes, for example, instructions to start or end image distribution, such as for images that are candidates for the live gallery, an instruction to end the live gallery, and the like. This makes it possible to distribute the live gallery, and remote attendees viewing the event on remote attendee terminals 7 can also enjoy the event, such as a wedding, even more. In particular, the ability to view images taken by the photographer sequentially almost in real time while the event is underway makes the event more enjoyable for the remote attendees.

Furthermore, by obtaining the evaluation information, such as "likes" for images in the live gallery, and associating that information with the images in the staff terminal 1, filtering can be performed using that evaluation information. This makes it possible to use feedback from the live gallery when selecting images to be delivered. Accordingly, the selections can be made taking into account objective viewpoints, and the accuracy of the selections can be improved. This makes it possible to support the creation of the desired image collection.

Note that the staff terminal 1 is described as managing the live gallery distribution through the distribution management unit 35, and implementing the filtering processing for delivery through the event data management unit 30 and the filter processing unit 33. However, the management of the live gallery distribution and the filtering processing for delivery may be realized by separate information processing devices.

The embodiment described an example in which the distribution management unit 35 processes a start instruction and a stop instruction pertaining to the distributed image as the instruction processing. For example, processing for transmitting the start instruction and the stop instruction to the server device 4 is performed.

For example, in the staff terminal 1, the camera staff can operate the start button 301, the stop button 302, and the like in the management panel 300. Then, using the function of the distribution management unit 35, the staff terminal 1 performs processing for transmitting the start instruction for the distributed images, the stop instruction for the distributed images, and the like to the server device 4 in response to these operations (see FIG. 19). In particular, in the example described in the embodiment, the start timing and the stop timing for the determination of images (e.g., candidate images) for the live gallery distribution is indicated as the basis for determining the image capture times.

This makes it possible for the camera staff to execute live gallery distribution for images from any desired time period.

As mentioned above, as another example of communicating the start instruction to the server device 4 separate from the image data, live gallery target image information in the metadata of the image data having an image capture time after the start button 301 is operated may be communicated. In other words, the start instruction may be transmitted indirectly by adding, to the image data, information indicating that the image was captured after the start instruction was made.

Similarly, the stop instruction may be communicated as non-target image information in the metadata of the image data captured at a time after the stop button 302 was operated. In other words, the stop instruction may be transmitted indirectly by adding, to the image data, information indicating that the image is from the image capture time corresponding to the stop instruction.

The embodiment described the image distribution as a live gallery being a distribution performed for image data captured between the time of the start instruction and the time of the stop instruction.

When the staff terminal 1 makes a start instruction, a stop instruction, or the like pertaining to the images to be distributed in response to an operation made by the camera staff, the server device 4 recognizes the images to be distributed and executes the live gallery distribution.

In this case, the images to be distributed are some or all of the image data captured by the image capturing device 2 during the period from the time of the start instruction made by the start button 301 being operated to the time of the stop instruction made by the stop button 302 being operated (see FIGS. 41 to 54).

Accordingly, when the photographer wants to execute live gallery distribution for the images they are about to capture, they can simply operate the start button 301. If the photographer does not want the live gallery to be distributed for the images about to be captured, they may operate the stop button 302. These operations need only be made between shots, which enables the photographer to concentrate on shooting during the actual shooting. The photographer can also easily control which images are and are not to be distributed.

These make it extremely easy for the photographers to perform an operation for executing the live gallery as desired while shooting.

As mentioned with reference to FIG. 41, the image data falling between the start instruction and the stop instruction may be determined based on the reception time at the staff terminal 1, rather than the image capture time.

The embodiment described the image distribution as a live gallery being a distribution performed for image data, among image data captured between a time of the start instruction and a time of the stop instruction, that has been selected in the server device 4.

The image data to be uploaded to the live gallery is selected in the server device 4 from among the image data captured by the image capturing device 2 during the period from the time of the start instruction made by the staff terminal 1 to the time of the stop instruction. For example, in the server device 4, images from that period that are similar are excluded from being uploaded, or are excluded from being uploaded based on an evaluation of the composition or the expression of the person in the picture (see step S602 of FIG. 36).

This eliminates the need for camera staff to select images to be distributed through the live gallery, and images which are appropriate in terms of content are selected for distribution. Accordingly, high-quality live gallery distribution can be achieved while not imposing an operational burden on the camera staff.

The embodiment described an example in which as the instruction processing, the distribution management unit 35 is capable of processing of a resume instruction pertaining to the distributed image after the stop instruction has been made. For example, processing for transmitting a resume instruction to the server device can be performed.

As described with reference to FIG. 31, in the staff terminals 1, the camera staff can operate the resume button 304 after making a stop instruction by operating the stop button 302. In this case, the staff terminals 1 makes a resume instruction to the server device 4 (see steps S352 and S361 of FIG. 19).

Accordingly, the camera staff can issue the stop instruction and the resume instruction as desired and can therefore freely control the images to be distributed through the live gallery. This makes it possible to execute the live gallery distribution according to the camera staff's own intent.

The embodiment described an example in which as the instruction processing, the distribution management unit 35 is capable of processing of an end instruction indicating transfer of the distributed image is to be ended, after the stop instruction has been made. For example, the end instruction is transmitted to the server device 4.

In the staff terminal 1, the camera staff can make an operation for ending the transfer of images to be distributed through the live gallery using the end button 303. In this case, the staff terminal 1 instructs the server device 4 to end the live gallery distribution event (see steps S354 and S365 of FIG. 19).

This makes it possible for the camera staff to control the timing at which the series of processing for distributing the captured image data through the live gallery ends as desired.

The embodiment described an example in which, as the instruction processing, the distribution management unit 35 performs processing of a transfer resume instruction indicating transfer of the distributed image is to be resumed after the end instruction is transmitted. For example, processing for transmitting, to the server device 4, an instruction to resume uploads to the server device 4 can be performed.

In the staff terminal 1, the camera staff can make an operation for notifying the server device 4 that image transfer for the series of live gallery distribution is to be resumed using, for example, the resume upload button 316 in the live gallery settings screen 310 illustrated in FIG. 14B (see steps S224 and S366 in FIG. 19). This enables the camera staff to control whether to resume image transfer for a live gallery which has been ended once as desired. This can be used when, for example, the image transfer for the live gallery is ended after a wedding reception, but is then to be resumed at an afterparty. Remote attendees can view the series of images from the wedding ceremony to the after-party as a live gallery using a common URL site.

The embodiment described an example in which, as the instruction processing, the distribution management unit 35 performed processing of a delete instruction for the distributed image. For example, the delete instruction is transmitted to the server device 4.

For example, the camera staff can delete an image which has been distributed once from the live gallery by making an operation from the staff terminal 1 (see FIGS. 12 and 14B, and steps S223 and S367 of FIG. 19).

This makes it possible to delete images distributed on a trial basis, when a trial is made for preparing the live gallery, for example.

Additionally, the camera staff can confirm the live gallery during the event, such as a wedding, and if there are images which are not desired to be distributed through the live gallery, those images can be deleted from the live gallery.

Accordingly, live gallery distribution which follows the intent of the camera staff is realized. In particular, making it possible for the camera staff to delete images from the live gallery as desired while images to be distributed are automatically selected and distributed on the server device 4 side, it is possible to both reduce the operational burden on the camera staff and distribute images according to the intent of the camera staff.

The embodiment described an example in which the event data management unit 30 performs processing for managing, in association with the image data, distribution information indicating that the image has been distributed by the server device 4 (see FIG. 6).

This makes it possible to use information indicating whether the image has been distributed through the live gallery. For example, in the filter processing, images to be distributed to the live gallery can be extracted by operating the distributed image condition button 383, as described with reference to FIGS. 64A and 64B. This makes it possible to use the result of the selection processing performed in the server device 4 as to whether to upload images to the live gallery when making selections for the image collection, which can contribute to streamlining the selection.

Additionally, managing the distribution information for the image data using the event data management unit 30 and the server data management unit 40 makes it possible to provide the distribution information as reference information for creating the image collection for final delivery, for example (see step S400 of FIG. 40).

The embodiment described in example in which, for the image data captured at the specific event, the event data management unit 30 performs processing for adding, to metadata, information indicating whether an image is a candidate for distribution by the server device 4 or is not a candidate for distribution by the server device 4 (the live gallery target image information/non-target image information), and transmitting the image data to the server device 4.

The start instruction and the end instruction for the server device 4 may be performed separate from the transfer of the image data, or live gallery target image information or non-target image information based on the start instruction or the end instruction may be added to the image data and transmitted to the server device 4 in this manner. In this case, whether image data which is transmitted is a candidate can be determined for each piece of image data on the server device 4 side, making it unnecessary to manage the time between the start instruction and the end instruction.

The embodiment described an example in which the evaluation information is information based on an input by a viewer with respect to the distributed image. For example, a "like", which is high evaluation information made by a viewer, or a high rating number, may be used as the evaluation information. By filtering based thereon, the camera staff can extract images according to the evaluations made by viewers, and then select images to be delivered. In other words, the camera staff can recognize the ratings of the images from the remote attendees viewing the distributed live gallery through the remote attendee terminals 7, and then select the images to be delivered. Accordingly, the selections can be made taking into account objective view-points, and user satisfaction for the image collection can be increased.

The embodiment described an example in which the staff terminal 1 includes the UI control unit 31, which enables a plurality of types of filter conditions to be selected through an operation, and presents an image extracted through the filtering processing executed by the filter processing unit 33 based on the filter conditions selected.

For example, filtering by rating, filtering by thing, filtering by person, filtering by the type of the image capturing device 2, filtering by evaluation information, filtering by whether an image is to be distributed through the live gallery, filtering by archive, filtering by whether the eyes are closed, and the like are provided as filtering according to various types of filter conditions.

By selecting these by operating the filter designation area 129, the respective condition panels (the other condition panel 324 and the like), and so on, the camera staff can extract images according to desired conditions, which makes it possible to streamline the selection.

Note that the types filter conditions described here are merely examples. For example, an example in which filtering by person is not provided is also conceivable. Other filter types may be added as well.

The embodiment described an example in which the UI control unit 31 performs control for enabling a thing to be selected as the filter condition, and presenting an image extracted through the filtering processing executed by the filter processing unit 33 using the thing as the filter condition.

For example, objects such as "dress", "cake", "flower", and the like, action such as "dancing", and so on can be specified as things for the filter conditions.

This makes it possible for the camera staff to easily confirm images containing those things, and select images which are well-balanced with respect to the things serving as subjects. This makes it possible to streamline the selection and improve the quality of the created image collection. This makes it easy to make selections which do not result in a monotonous image collection containing nothing but images of the same thing, for example.

When things are used as a filter conditions, the things can be selected through the content condition panel 321. This enables the camera staff to easily select the things to be used as filter conditions.

The embodiment described an example in which the UI control unit 31 performs control for enabling a person to be selected as the filter condition, and presenting an image extracted through the filtering processing executed by the filter processing unit 33 using the person as the filter condition.

For example, individual people can be specified as filter conditions by specifying faces in images. This makes it possible for the camera staff to easily confirm images containing individual people, and select images which are well-balanced with respect to the people serving as subjects. This makes it possible to streamline the selection and improve the quality of the created image collection. This makes it easy to make selections resulting in an image collection that contains a good balance of event attendees.

When people are used as the filter conditions, individuals can be selected through the people condition panel 322. This enables the camera staff to easily select the people to be used as filter conditions.

In the embodiment, the UI control unit 31 performed control for presenting the all tab 125, which is a first tab that presents captured images, and the candidate tab 126, which is a second tab that presents an image, among the captured images, that is a candidate for use in the image collection. The embodiment described an example in which the filter conditions which can be selected in all tab 125 and the filter conditions which can be selected in the candidate tab 126 are different.

For example, filter conditions for ratings, things, people, cameras, and others (archive, eyes closed, evaluation information, and distributed images) can be selected in the all tab 125.

On the other hand, filter conditions for things and people can be selected in the candidate tab 126. In other words, the filter conditions which can be selected are different between the all tab 125 and the candidate tab 126.

This makes it possible to provide filtering suited to each tab. For example, a large number of filter conditions are provided in the all tab 125 because the camera staff wishes to make selections having performed filtering according to a variety of conditions.

On the other hand, images which have been selected once are displayed in the candidate tab 126. It is important for the camera staff to confirm the balance of specific things and people in the images in the candidate tab 126 because those images will be used in the image collection. The filter conditions for things and people can therefore be selected and confirmed.

The embodiment described the filter conditions selected in the all tab 125 and the filter conditions selected in the candidate tab 126 as being stored separately.

In other words, filter conditions are set independently between the all tab 125 and the candidate tab 126, and the filtering processing is then performed.

As a result, even when switching between the all tab 125 and the candidate tab 126, images are displayed so as not to affect the filter conditions in the other tab. The all tab 125 and the candidate tab 126 are confirmed for different purposes, and it is therefore preferable that the filter conditions do not affect each other. This also prevents the camera staff from becoming confused when recognizing images.

For example, if filter conditions are shared between the all tab 125 and the candidate tab 126, some images may not be displayed when switching from the all tab 125 to the candidate tab 126. For the camera staff, this is perceived as a situation in which images the camera staff thought were selected as candidates are not displayed in the candidate tab 126, which can easily cause confusion.

Additionally, when returning to the all tab 125 after extracting only a certain thing in the candidate tab 126, it is possible that only images of that thing will be displayed. Making the filter conditions independent from each other makes it possible to avoid such a situation.

Additionally, storing the filter conditions for each tab independent from each other makes it possible to use the previous filter conditions for that tab for display even after switching the tab.

For example, even when filtering is performed in the all tab 125, the tab is then switched to the candidate tab 126 and filtering is performed there, and the tab is then switched back to the all tab 125, images will be displayed according to the filter conditions in the all tab 125 from the previous time. In other words, the camera staff can proceed with the selection using the previous filter condition settings effectively.

The embodiment described an example of performing control for displaying an image in a state in which the filter condition is not applied when switching from the all tab 125 to the candidate tab 126 (see step S381 of FIG. 58).

When switching from the all tab 125 to the candidate tab 126, a display reflecting the filtering is not performed, and all the images included in the candidate tab 126 are displayed. The candidate tab 126 is for confirming the images to be used in the image collection. As such, when switching to the candidate tab 126, all the images taken as candidates are displayed. This makes it possible for the camera staff to accurately confirm the candidate images. This is because displaying a state of filtering based on past filter conditions can easily cause misunderstandings, such as the camera staff not seeing images which they thought were selected as candidates.

The embodiment describe the UI control unit 31 as performing control that enables a filter on/off operation using the filter on/off button 350, causes an image reflecting the filtering processing to be presented in response to a filter on operation, and causes an image not reflecting the filtering processing to be presented in response to a filter off operation. Additionally, the filter condition which is set is maintained even when the filter off operation is performed (see FIGS. 56 and 57).

By operating the filter on/off button 350 in the all tab 125 or the candidate tab 126, whether the state of filtering is applied to the displayed images is turned on and off. Moreover, operating the filter on/off button 350 maintains, rather than discards, the filter condition settings.

This makes it possible for the camera staff to easily switch between activating and deactivating the filtering, and also ensures that filter conditions are not wasted once selected. The selection is streamlined as a result.

The embodiment described in example in which the UI control unit 31 is capable of a reset operation for the filter conditions, and the filter conditions which are set are reset in response to the reset operation.

In other words, the reset button 370 is prepared in each of the rating condition panel 320, the content condition panel 321, the people condition panel 322, the camera condition panel 323, and the other condition panel 324, which enables the reset operation. The reset operation makes it possible to reset the filter conditions selected in each condition panel and put the condition panel in a state in which no filter conditions are selected.

This makes it possible to provide a convenient operation for the camera staff to remove filter conditions. For example, when many things are selected in the content condition panel 321, the selection of all of those things can be canceled with a single touch.

The embodiment described an example in which the UI control unit 31 performs control for presenting the number of images extracted through the filtering processing for each of the filter conditions that can be selected.

For example, the number of images which are displayed as a result of the filtering is displayed in the rating condition panel 320, the content condition panel 321, the people condition panel 322, the camera condition panel 323, and the like (see FIGS. 59A, 59B, 60A, 60B, 60C, 61A, 61B, 62A, 62B, 63A, 63B, and 63C).

This allows the camera staff to see the extent to which the images will be narrowed down as a result of the filtering.

In particular, by displaying the number of images in which each thing appears in the content condition panel 321, the camera staff can grasp the extent to which the images will be narrowed down when selecting each thing as the filter condition, which is favorable for determining what kind of filtering to perform.

Additionally, by displaying the number of images in which each person appears in the people condition panel 322, the camera staff can use that number as a reference to make selections that include each person in image collection to the greatest extent possible. This is particularly suitable for selecting, as candidates, images containing a person who does not appear often in the images. This is also useful, in the people condition panel 322 of the candidate tab 126, for confirming the balance of the numbers of the people appearing in the images to be used for the image collection.

Although the embodiment describes transferring the image files from the image capturing device 2 to the staff terminal 1, and then having the staff terminal 1 upload the image files to the server device 4, the image capturing device 2 may upload the image files to the server device 4 directly.

Some or all of the processing performed by the staff terminal 1 according to the embodiment, e.g., the processing illustrated in FIG. 12, FIGS. 16 to 22, and FIGS. 56 to 58, may be performed by, for example, the server device 4, or by another server device, as cloud server processing.

All the processing by the staff terminal 1 may be performed by the server device 4 or the like, or the staff terminal 1 may be a device used as a user interface, and used only to display UI images provided by the server device 4 or the like, detect operations, and so on.

Although the descriptions in the embodiment assumed the generation of an image collection of still images, the image collection may include moving images as some of the content, and an image collection including a plurality of moving images may be generated. The processing described in the embodiment can be applied in such cases as well.

In this case, the moving images may be moving images having sound, or moving images including only image information and not having sound.

Additionally, the image capturing device 2 may perform the above-described processing of the staff terminal 1 by functioning as the information processing device according to the embodiment. Alternatively, the staff terminal 1 may have an image capturing function, and may function as the image capturing device 2.

The technique of the present disclosure is not limited to processing pertaining to a set of images from an event related to a wedding. The technique is also useful in, for example, the selection of a set of images captured during a sporting event or the like.

In particular, if it is possible in the event view 200 to separate sub-events and scenes in sporting events by competition type or by athletes competing in turn in individual competitions, an extremely convenient list display format for checking and selecting images can be provided. In the case of sports, a more appropriate event view 200 can be implemented by switching the separation conditions for sub-events and scenes for each competition.

The program of the embodiment is a program for causing, for example, an information processing device such as a CPU, a DSP, or a device including these to execute the processing illustrated in FIGS. 12, 16, 22, and 56 to 58.

In other words, the program according to the embodiment is a program which causes an information processing device to execute: instruction processing pertaining to image distribution for image data captured at a specific event and transmitted to the server device 4; processing for managing, in association with the image data, evaluation information for an image that is distributed; and filtering processing on the image data using the evaluation information as a filter condition.

This program makes it possible to realize the staff terminal 1, which is capable of streamlining selections using live gallery instructions, live gallery evaluations, and the like, in, for example, a mobile terminal device, a personal computer, or other devices capable of executing information processing.

A cloud server may perform the processing of the staff terminal 1 using such a program.

The program for implementing the staff terminal 1, a cloud server functioning as the staff terminal 1, or the like can be recorded in advance in an HDD serving as a recording medium embedded in a device such as a computer device, a ROM or the like in a microcomputer that includes a CPU, or the like.

Alternatively, the program can be stored (recorded) temporarily or perpetually on a removable recording medium such as a flexible disc, a compact disc read-only memory (CD-ROM), a magneto optical (MO) disc, a digital versatile disc (DVD), a Blu-ray Disc (registered trademark), a magnetic disk, a semiconductor memory, or a memory card. The removable recording medium can be provided as so-called package software.

The program can be installed from the removable recording medium on a personal computer or the like and can also be downloaded from a download site via a network such as a local area network (LAN) or the Internet.

Such a program is suited to providing the staff terminal 1 of the embodiment over a broad scope. For example, by downloading the program to a mobile terminal device such as a smartphone or a tablet, an image capturing device, a mobile phone, a personal computer, a still camera, a video camera, a game console, a video device, a Personal Digital Assistant (PDA), or the like, it is possible to cause the smartphone or the like to function as the staff terminal 1 according to the present disclosure.

Note that the effects described in the present specification are merely exemplary and not intended to be limiting, and other effects may be provided as well.

Note that the present technique can also adopt the following configurations (1) to (20).

(1)
An information processing device including:
a distribution management unit that performs instruction processing pertaining to image distribution for image data captured at a specific event and transmitted to a server device;
an event data management unit that performs processing for managing, in association with the image data, evaluation information for an image that is distributed; and
a filter processing unit that performs filtering processing on the image data using the evaluation information as a filter condition.

(2)
The information processing device according to (1),
wherein as the instruction processing, the distribution management unit performs processing of a start instruction and a stop instruction pertaining to the image distributed.

(3)
The information processing device according to (2),
wherein the image distribution is distribution performed for image data captured between a time of the start instruction and a time of the stop instruction.

(4)
The information processing device according to (2) or (3),
wherein the image distribution is distribution performed for image data, among image data captured between a time of the start instruction and a time of the stop instruction, that has been selected in the server device.

(5)
The information processing device according to any one of (2) to (4),
wherein as the instruction processing, the distribution management unit is capable of processing of a resume instruction pertaining to the image distributed, or an end instruction indicating transfer of the image distributed is to be ended, after the stop instruction has been made.

(6)
The information processing device according to any one of (1) to (5),
wherein as the instruction processing, the distribution management unit performs processing of a delete instruction for the image distributed.

(7)
The information processing device according to any one of (1) to (6),
wherein the event data management unit performs processing for managing, in association with the image data, distribution information indicating that an image has been distributed by the server device.

(8)
The information processing device according to any one of (1) to (7),
wherein for the image data captured at the specific event, the event data management unit performs processing for adding, to metadata, information indicating whether an image is a candidate for distribution by the server device or is not a candidate for distribution by the server device, and transmitting the image data to the server device.

(9)
The information processing device according to any one of (1) to (8),
wherein the evaluation information is information based on an input made by a viewer for the image distributed.

(10)
The information processing device according to any one of (1) to (9), further including:
a user interface control unit that performs user interface control which enables a plurality of types of filter conditions to be selected through an operation, and presents an image extracted through the filtering processing executed by the filter processing unit based on the filter conditions selected.

(11)
The information processing device according to (10),
Wherein the user interface control unit performs control for enabling a thing to be selected as the filter condition, and presenting an image extracted through the filtering processing executed by the filter processing unit using the thing as the filter condition.

(12)
The information processing device according to (10) or (11),
wherein the user interface control unit performs control for enabling a person to be selected as the filter condition, and presenting an image extracted through the filtering processing executed by the filter processing unit using the person as the filter condition.

(13)
The information processing device according to any one of (10) to (12),
wherein the user interface control unit:
performs control for presenting a first tab, which presents captured images, and a second tab, which presents an image, among the captured images, that is a candidate to be used in image collection; and
makes a filter condition that can be selected in the first tab and a filter condition that can be selected and the second tab different.

(14)
The information processing device according to any one of (10) to (13),
wherein the user interface control unit performs control for presenting a first tab, which presents captured images, and a second tab, which presents an image, among the captured images, that is a candidate to be used in image collection, and
a filter condition selected in the first tab and a filter condition selected in the second tab are stored separately.

(15)

The information processing device according to any one of (10) to (14), wherein the user interface control unit:

performs control for switching between and presenting a first tab, which presents captured images, and a second tab, which presents an image, among the captured images, that is a candidate to be used in image collection; and performs control for displaying an image in a state in which the filter condition is not applied when switching from the first tab to the second tab.

(16)

The information processing device according to any one of (10) to (15), wherein the user interface control unit performs control that enables a filter on/off operation, causes an image reflecting the filtering processing to be presented in response to a filter on operation, and causes an image not reflecting the filtering processing to be presented in response to a filter off operation, and the filter condition which is set is maintained even when the filter off operation is performed.

(17)

The information processing device according to any one of (10) to (16), wherein the user interface control unit enables a reset operation for the filter condition, and the filter condition which is set is reset in response to the reset operation.

(18)

The information processing device according to any one of (10) to (17), wherein the user interface control unit performs control for presenting a number of images extracted through the filtering processing for each filter condition that can be selected.

(19)

An information processing method performed by an information processing device, the information processing method including:

instruction processing pertaining to image distribution for image data captured at a specific event and transmitted to a server device;

processing for managing, in association with the image data, evaluation information for an image that is distributed; and filtering processing on the image data using the evaluation information as a filter condition.

(20)

A program which causes an information processing device to execute:

instruction processing pertaining to image distribution for image data captured at a specific event and transmitted to a server device;

processing for managing, in association with the image data, evaluation information for an image that is distributed; and filtering processing on the image data using the evaluation information as a filter condition.

Incidentally, in addition to the staff terminal 1 according to the embodiment described above, which performs both management of the live gallery distribution by the distribution management unit 35 and the filtering processing for delivery by the event data management unit 30 and the filter processing unit 33, the management of the live gallery distribution and the filtering processing for the delivery may be executed by a separate staff terminal 1.

Accordingly, the configurations described in the following (101) and (102) can be employed as information processing devices corresponding to the staff terminal 1.

(101)

An information processing device including a distribution management unit that performs instruction processing pertaining to image distribution for image data captured at a specific event and transmitted to a server device.

(102)

An information processing device including:

an event data management unit that performs processing for managing, in association with the image data, evaluation information for an image captured at a specific event and distributed to a server device; and a filter processing unit that performs filtering processing on the image data using the evaluation information as a filter condition.

REFERENCE SIGNS LIST

1 Staff terminal
2 Image capturing device
3 Personal computer
4 Server device
5 Client terminal
6 Network
7 Remote attendee terminal
30 Event data management unit
31 UI control unit
32 Communication control unit
33 Filter processing unit
34 Image analysis unit
35 Distribution management unit
60 Event data
61 Advance settings information
62 Image capture/editing information table
63 Filter condition information
70 Information processing device
71 CPU
125 All tab
126 Candidate tab
300 Management panel
301 Start button
302 Stop button
303 End button
304 Resume button
316 Resume upload button
320 Rating condition panel
321 Content condition panel
322 People condition panel
323 Camera condition panel
324 Other condition panel
350 Filter on/off button
370 Reset button
371 Rating condition selection part
372 Thing condition selection part
373 Person condition selection part
374 Camera condition selection part
381 Archive condition button
382 Eyes closed condition button
383 Distributed image condition button
384 Evaluation image condition button
400 Live gallery viewing screen

The invention claimed is:

1. A non-transitory computer-readable medium having stored thereon, computer-executable instructions which, when executed by a computer, cause the computer to execute operations, the operations comprising:

performing instruction processing pertaining to image distribution for image data, wherein a camera captures the image data at a specific event, and the camera transmits the image data to a server device for the image distribution;

managing, in association with the image data, evaluation information for an image, of the image data, that is distributed, wherein the evaluation information comprises viewer ratings for the image, and the viewer ratings are from remote attendees; and performing filtering processing on the image data, based on the viewer ratings.

2. The non-transitory computer-readable medium according to claim 1, further comprising performing, as the instruction processing, processing of a start instruction pertaining to the image distributed, and a stop instruction pertaining to the image distributed.

3. The non-transitory computer-readable medium according to claim 2, wherein the image distribution is for the image data captured between a time of the start instruction and a time of the stop instruction.

4. The non-transitory computer-readable medium according to claim 2, wherein the image distribution is for specific image data, among the image data captured between a time of the start instruction and a time of the stop instruction, that is selected in the server device.

5. The non-transitory computer-readable medium according to claim 2, further comprising processing, as the instruction processing, at least one of a resume instruction pertaining to the image distributed, or an end instruction indicating transfer of the image distributed is to be ended, after the stop instruction is made.

6. The non-transitory computer-readable medium according to claim 1, further comprising performing, as the instruction processing, processing of a delete instruction for the image distributed.

7. The non-transitory computer-readable medium according to claim 1, further comprising managing, in association with the image data, distribution information indicating that the image is distributed by the server device.

8. The non-transitory computer-readable medium according to claim 1, further comprising performing, for the image data captured at the specific event, processing for adding, to metadata, information indicating whether the image is a candidate for distribution by the server device; and transmitting the image data to the server device.

9. The non-transitory computer-readable medium according to claim 1, wherein the evaluation information is based on an input made by a viewer for the image distributed.

10. The non-transitory computer-readable medium according to claim 1, further comprising:

performing user interface control which enables a plurality of filter conditions selectable via an operation;

performing the filtering processing based on the plurality of filter conditions to extract a first image; and presenting the first image extracted by the filtering processing.

11. The non-transitory computer-readable medium according to claim 10, further comprising performing control for enabling a thing to be selected as a filter condition of the plurality of filter conditions;

performing the filtering processing based on the thing as the filter condition to extract to extract the first image; and presenting the first image extracted by the filtering processing.

12. The non-transitory computer-readable medium according to claim 10, further comprising performing control for enabling a person to be selected as a filter condition of the plurality of filter conditions;

performing the filtering processing based on the person as the filter condition to extract to extract the first image; and presenting the first image extracted by the filtering processing.

13. The non-transitory computer-readable medium according to claim 10, further comprising performing control for presenting a first tab, which presents captured images, and a second tab, which presents a second image, among the captured images, that is a candidate for image collection; and control a filter condition, of the plurality of filter conditions, that is selectable in the first tab and a filter condition, of the plurality of filter conditions, that is selectable in the second tab, wherein the filter condition that is selectable in the first tab is different from the filter condition that is selectable in the second tab.

14. The non-transitory computer-readable medium according to claim 10, further comprising performing control for presenting a first tab, which presents captured images, and a second tab, which presents a second image, among the captured images, that is a candidate in image collection, wherein a filter condition, of the plurality of filter conditions, selected in the first tab and a filter condition, of the plurality of filter conditions, selected in the second tab are stored separately.

15. The non-transitory computer-readable medium according to claim 10, further comprising:

performing control for switching between a first tab, which presents captured images, and a second tab, which presents a second image, among the captured images, that is a candidate for image collection; and performing, based on the switching from the first tab to the second tab, control for displaying the second image in a state in which a filter condition of the plurality of filter conditions is not applied.

16. The non-transitory computer-readable medium according to claim 10, further comprising performing control that enables a filter on operation or a filter off operation, wherein the filter on operation causes a second image reflecting the filtering processing to be presented, and the filter off operation causes a third image not reflecting the filtering processing to be presented; and maintaining a filter condition of the plurality of filter conditions based on the filter off operation.

17. The non-transitory computer-readable medium according to claim 10, further comprising performing control to enable a reset operation for a filter condition of the plurality of filter conditions, wherein the filter condition is reset based on the reset operation.

18. The non-transitory computer-readable medium according to claim 10, wherein performing control for presenting a number of images extracted through the filtering processing for each filter condition, of the plurality of filter conditions, that is selectable.

19. An information processing method performed by an information processing device, the information processing method comprising:

performing instruction processing pertaining to image distribution for image data, wherein a camera captures the image data at a specific event, and the camera transmits the image data to a server device for the image distribution;

managing, in association with the image data, evaluation information for an image, of the image data, that is distributed, wherein the evaluation information comprises viewer ratings for the image, and the viewer ratings are from remote attendees; and performing filtering processing on the image data, based on the viewer ratings.

20. An information processing device, comprising:

a distribution management unit configured to perform instruction processing pertaining to image distribution for image data, wherein a camera captures the image data at a specific event, and the camera transmits the image data to a server device for the image distribution;

an event data management unit configured to manage, in association with the image data, evaluation information for an image, of the image data, that is distributed, wherein the evaluation information comprises viewer ratings for the image, and the viewer ratings are from remote attendees; and a filter processing unit configured to perform filtering processing on the image data, based on the viewer ratings.

* * * * *